United States Patent
Fair et al.

[15] 3,668,653
[45] June 6, 1972

[54] CONTROL SYSTEM

[72] Inventors: Donald G. Fair, Belvidere; Harold L. Baeverstad; William G. Fisher, both of Rockford, all of Ill.

[73] Assignee: Sundstrad Corporation

[22] Filed: Oct. 22, 1968

[21] Appl. No.: 769,500

Related U.S. Application Data

[63] Continuation-in-part of Ser. No. 706,365, Feb. 19, 1968, abandoned.

[52] U.S. Cl. ..................................340/172.5, 235/151.11
[51] Int. Cl. ................G05b 15/02, G06f 15/02, G06f 15/20
[58] Field of Search ....................340/172.5; 235/92, 151.11; 318/562, 569–574

[56] References Cited

UNITED STATES PATENTS

| | | | |
|---|---|---|---|
| 3,372,568 | 3/1968 | Lemelson | .................................72/218 |
| 2,866,506 | 12/1958 | Hierath et al. | .................235/151.11 X |
| 3,069,608 | 12/1962 | Forrester et al. | ...............235/151.11 X |
| 3,083,907 | 4/1963 | Crocker et al. | ............................235/92 |
| 3,135,055 | 6/1964 | Butler | ............................235/151.11 X |
| 3,325,633 | 6/1967 | Lukens | .............................235/151.11 |
| 3,375,354 | 3/1968 | McGarrell | ........................235/151.11 |
| 3,417,235 | 12/1968 | Clark et al. | .........................235/151.11 |
| 3,465,298 | 9/1969 | La Duke et al. | ......................340/172.5 |
| 3,439,346 | 4/1969 | McGee | ...............................340/172.5 |
| 3,486,012 | 12/1969 | Burnett et al. | .....................235/151.11 |

OTHER PUBLICATIONS

Integrated Machine Tool System in Automation by W. F. Jessup, April 1958, pages 50–55 (pertinent page 54)

Analog and Digital Computer Technology by N. R. Scott, McGraw-Hill Book Co., Inc. 1960, pages 206–207.

" Multiple Computer System Controls Manufacturing Line" by Sarafin, E. E. Published by Control Engineering, Dec. 1964, pages 83–92.

*Primary Examiner*—Paul J. Henon
*Assistant Examiner*—P. R. Woods
*Attorney*—Hofgren, Wegner, Allen, Stellman & McCord

[57] ABSTRACT

An on-line data processing machine controls the operation of one or more machine tools. A general purpose communications link allows each machine tool and/or the operator therefore to communicate with the data processing machine and either change the operations which the machine tool would otherwise perform under control of an existing stored program, or add new or partly new operations, which if desired can thereafter immediately be performed by the machine tool.

95 Claims, 60 Drawing Figures

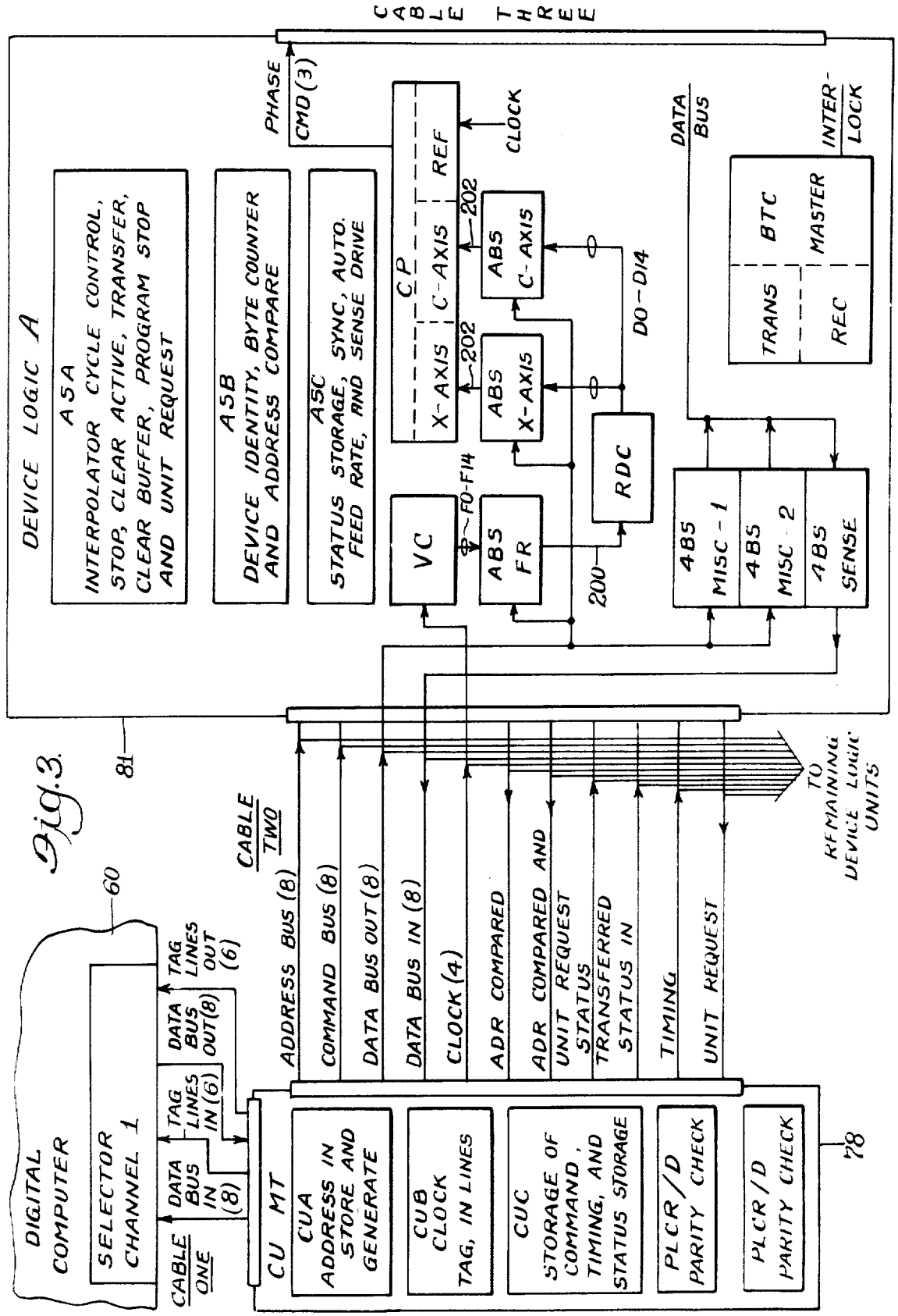

BINARY SEQUENTIAL FORMAT

| BYTE 1 | BYTE 2 | BYTE 3 | BYTE 4 | BYTE 5 | BYTE 6 | BYTE 7 | BYTE 8 |
|---|---|---|---|---|---|---|---|
| 0—7 | 0—7 | 0—7 | 0—7 | 0—7 | 0—7 | 0—7 | 0—7 |
| SEQUENCE NO | | FEEDRATE NO | | X - AXIS | | C - AXIS | |
| 0———15 | | 0———15 | | 0————14 15 | | 0————14 15 | |

BYTE 1, bits 0 1 2 3 4: SPARE SPARE SPARE; LEFT MOST BIT, LOGIC 1 FOR ENTER

SEQUENCE NO: 12 BITS, GROUPED IN SETS OF THREE; 4,2,1 CODE, MAXIMUM NO 7777

FEEDRATE NO: 14 BITS, GROUPED STRAIGHT BINARY; MAXIMUM NO. FRN = 16383, CYCLE TIME = 1082/FRN SEC.

FEED RATE = DISTANCE × FRN / 18.08

LEFT MOST BIT, LOGIC 1 FOR PREVENT FEEDRATE OVERRIDE

X - AXIS: 15 BITS, GROUPED STRAIGHT BINARY MAXIMUM DISTANCE 3.2767 INCHES

RIGHT MOST BIT UNUSED

C - AXIS: RIGHT MOST BIT, LOGIC 1 FOR MINUS DIRECTION

RIGHT MOST BIT, LOGIC 1 FOR MINUS DIRECTION

| BYTE 9 | BYTE 10 | BYTE 11 | BYTE 12 | BYTE 13 | BYTE 14 |
|---|---|---|---|---|---|
| 0—7 | 0—7 | 0—7 | 0—7 | 0—7 | 0—7 |
| SPINDLE | | TOOL CHANGER | | | MISC. |
| 0 — 15 | | 0 — 23 | | | 0 — 7 |
| 0 1 2 3 4 5 6 | 15 | 0 1 2 3 4 | 23 | | 0 1 2 3 4 5 6 7 |

BYTE 14 — MISC.:
- 0 PROGRAM STOP
- 1 OPTIONAL STOP
- 2 COOLANT SIGNAL 2
- 3 COOLANT SIGNAL 1
- 4 COOLANT OFF
- 5 RH CLAMP
- 6 RH UNCLAMP
- 7 PROGRAM END

TOOL CHANGER:
20 BITS GROUPED IN SETS OF 4; CODED 8, 4, 2, 1; MAXIMUM TOOL NO. 99999

- LOGIC 1 FOR LARGE GRIPPER "0" FOR SMALL
- LOGIC 1 FOR LOAD, "0" FOR PICK-UP
- LOGIC 1 FOR MAIN SPINDLE, "0" FOR AUX.
- LOGIC 1 FOR ENTER

SPINDLE:
10 BITS GROUPED STRAIGHT BINARY; SPINDLE SPEEDS 10 TO 1023

- LOGIC 1 FOR START "0" FOR STOP
- LOGIC 1 FOR CCW, "0" FOR CW
- LOGIC 1 FOR HI RANGE, "0" FOR LOW RANGE
- LOGIC 1 FOR SPINDLE POSITIONING
- LOGIC 1 FOR PREVENT SPINDLE SPEED OVERRIDE
- LOGIC 1 FOR ENTER

Fig. 7.

COMMAND BYTE FORMAT

| P | 0-2 | 3 | 4 | 5 | 6 | 7 | |
|---|-----|---|---|---|---|---|---|
| 1 | 0   | 0 | 0 | 0 | 0 | 0 | TEST |
| 0 | 0   | 0 | 0 | 1 | 0 | 0 | SENSE |
| 0 | 0   | 0 | 0 | 0 | 0 | 1 | WRITE |
| 0 | 0   | 0 | 0 | 0 | 1 | 0 | READ |
| 0 | 0   | 0 | 0 | 0 | 1 | 1 | CLEAR ACTIVE |
| 0 | 0   | 0 | 1 | 0 | 1 | 1 | CLEAR BUFFER |
| 1 | 0   | 0 | 1 | 1 | 1 | 1 | STOP |
| 0 | 0   | 1 | 0 | 0 | 1 | 1 | AUTO. OVERRIDE |
| 1 | 0   | 1 | 0 | 1 | 1 | 1 | OP. OVERRIDE |

CONTROL

Fig. 5.

SENSE FORMAT

| BYTE 1 | BYTE 2 | BYTE 3 | BYTE 4 |
|--------|--------|--------|--------|
| 0 — 7  | 0 — 7  | 0 — 7  | 0 — 7  |

Byte 1 (0 1 2 3 4):
- 0 SPARE
- 1 PROGRAM STOP
- 2 RETRACT STOP
- 3 SEQUENCE NO. SEARCH Byte 2 (0 — 15): DESIRED SEQUENCE NO. (SAME FORMAT AS FROM COMPUTER)

Byte 3: SERVICE CONDITIONS

Byte 4: SERVICE CONDITIONS

Fig. 6.

STATUS BYTE FORMAT

- P PARITY
- 0 ATTENTION
- 1 MODIFIER
- 2 CONTROL UNIT END
- 3 BUSY
- 4 CHANNEL END
- 5 DEVICE END
- 6 UNIT CHECK
- 7 UNIT EXCEPTION

SUPERVISOR

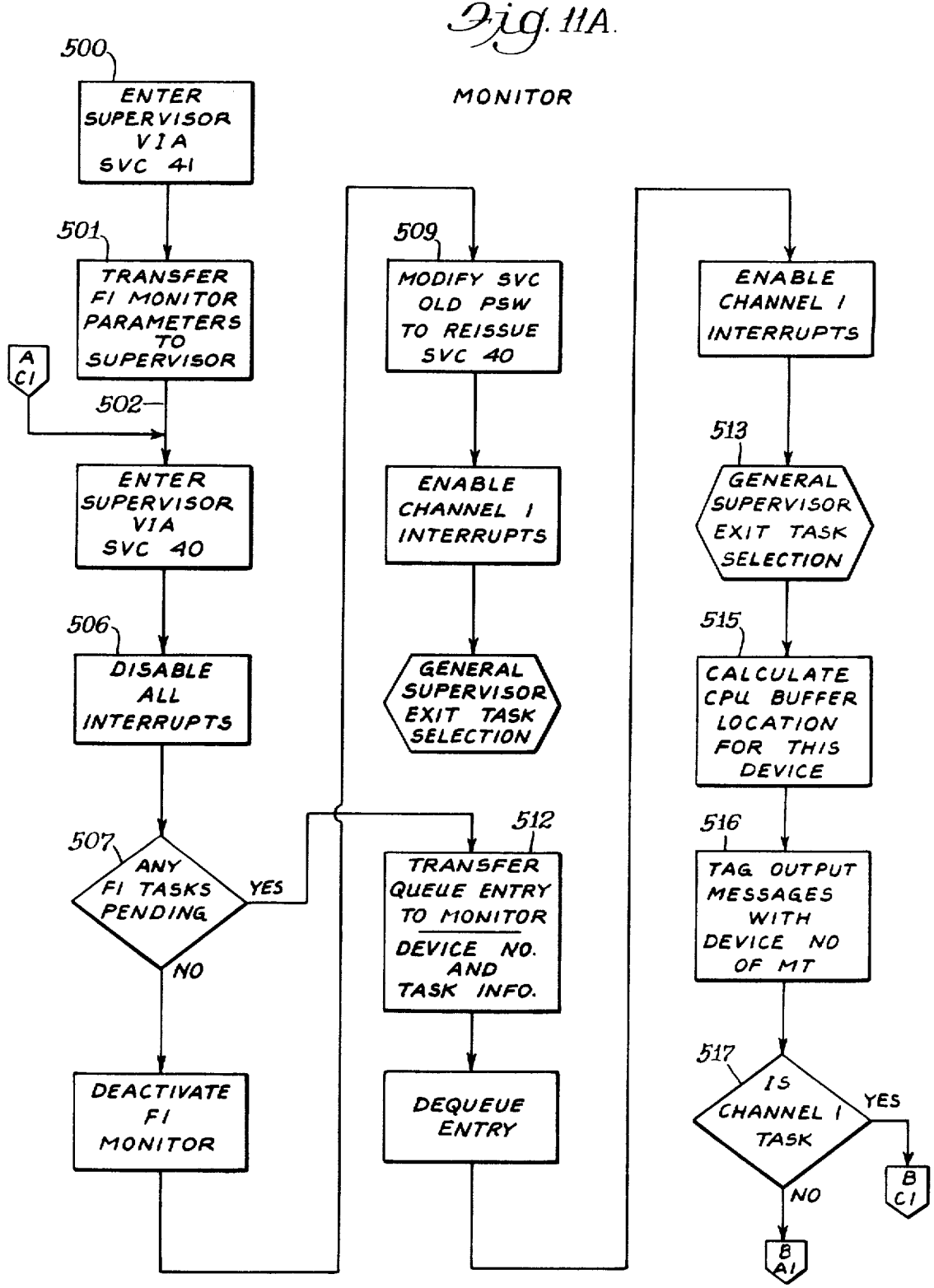

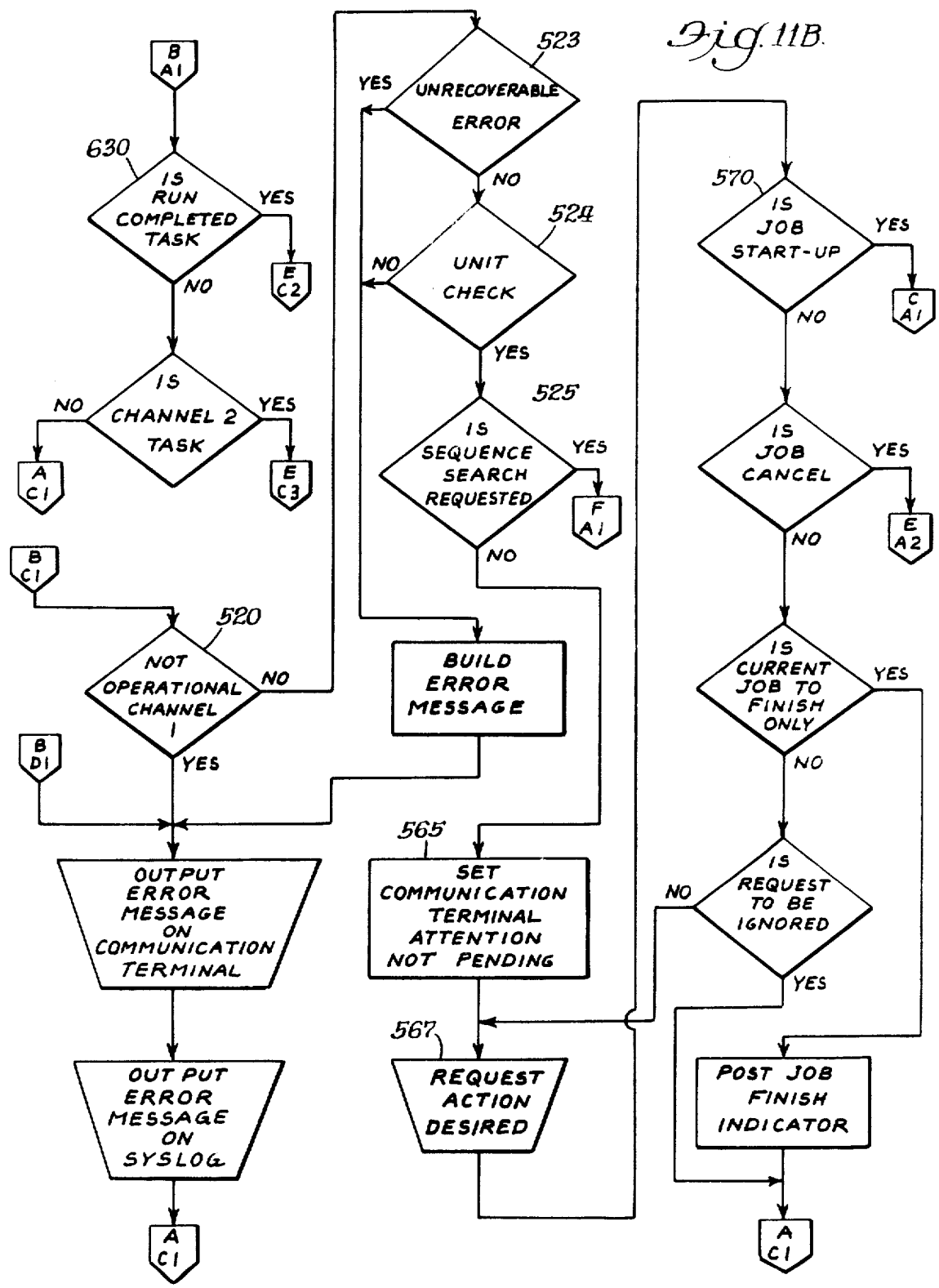

SEQUENCE SEARCH PROGRAM

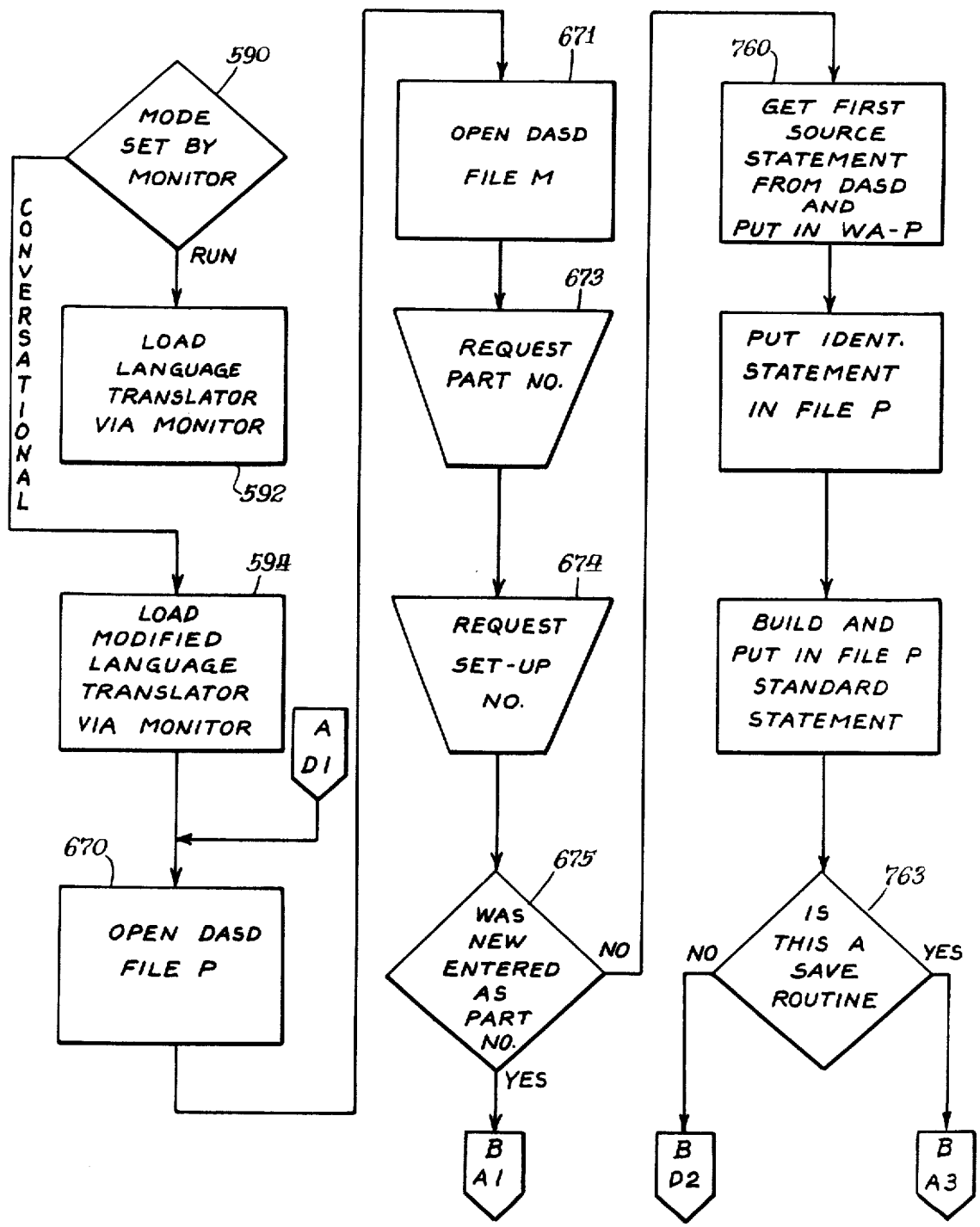
Fig. 12A. MODIFIED LANGUAGE TRANSLATOR

CUA

CUA

CUB

CUB

CUC

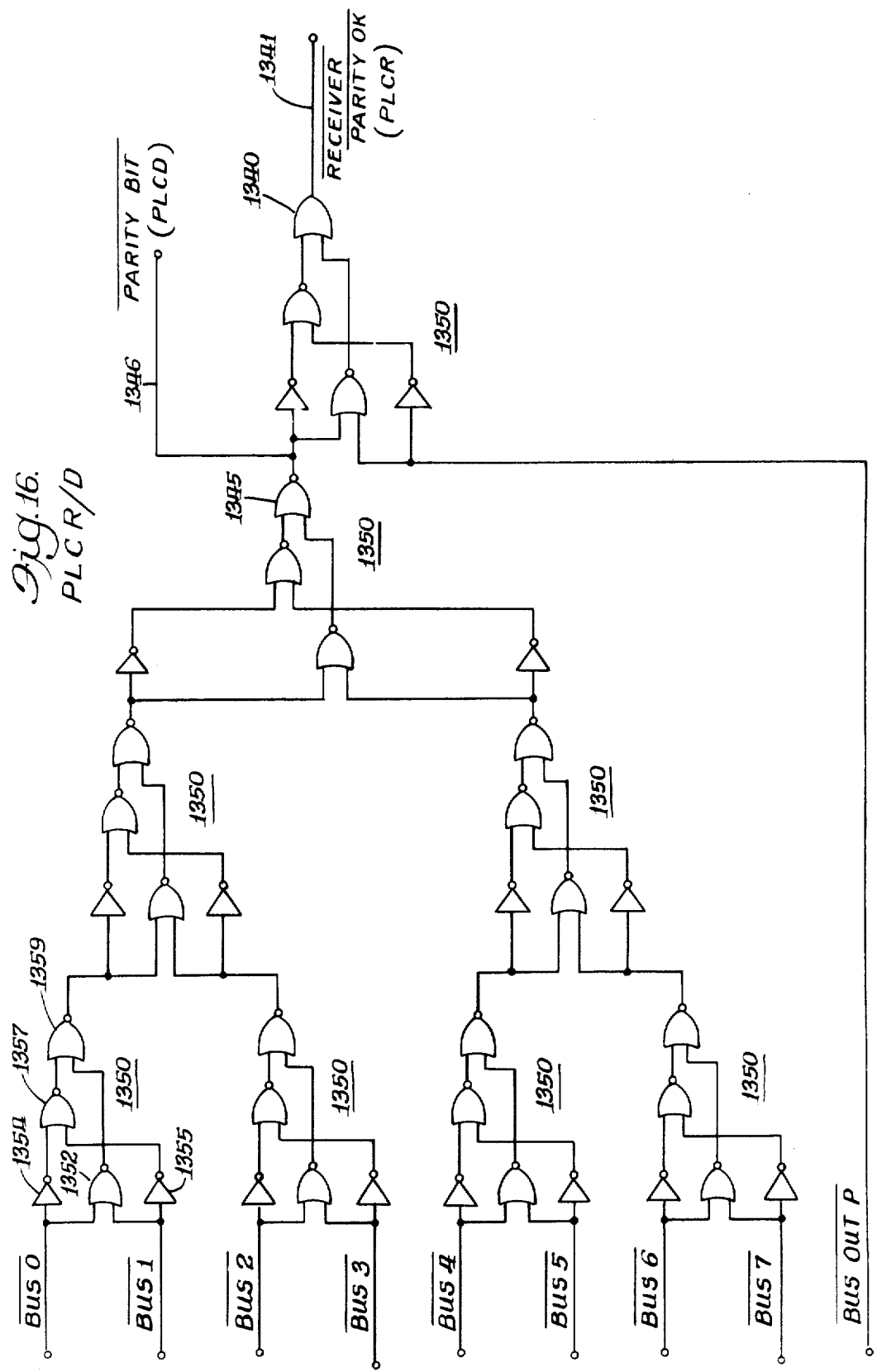
Fig. 16. PLCR/D

CONTROL UNIT INITIATED SEQUENCE

COMPUTER INITIATED SELECTION AND SENSE SEQUENCE

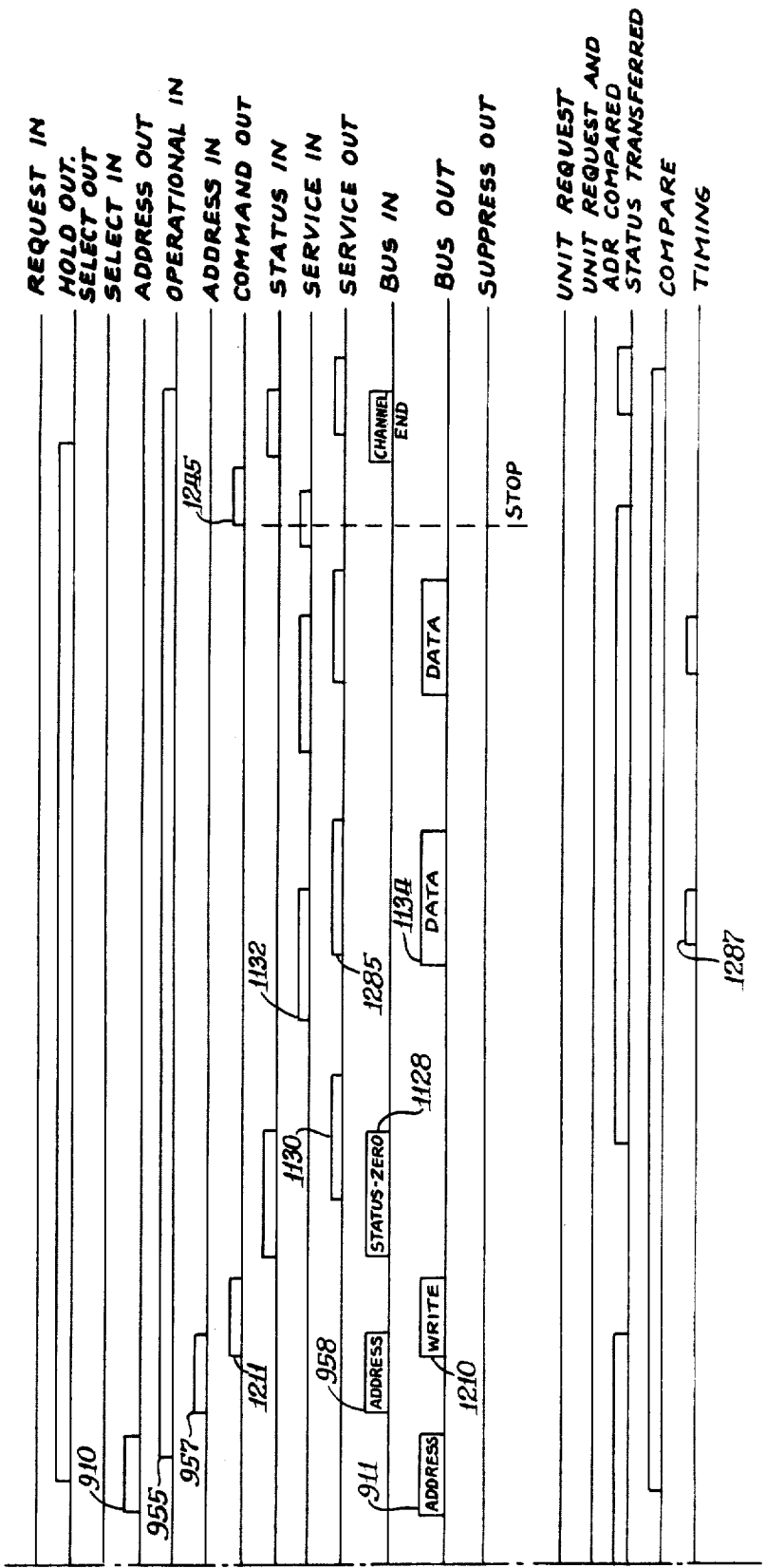
Fig. 17B. COMPUTER INITIATED SELECTION AND WRITE SEQUENCE

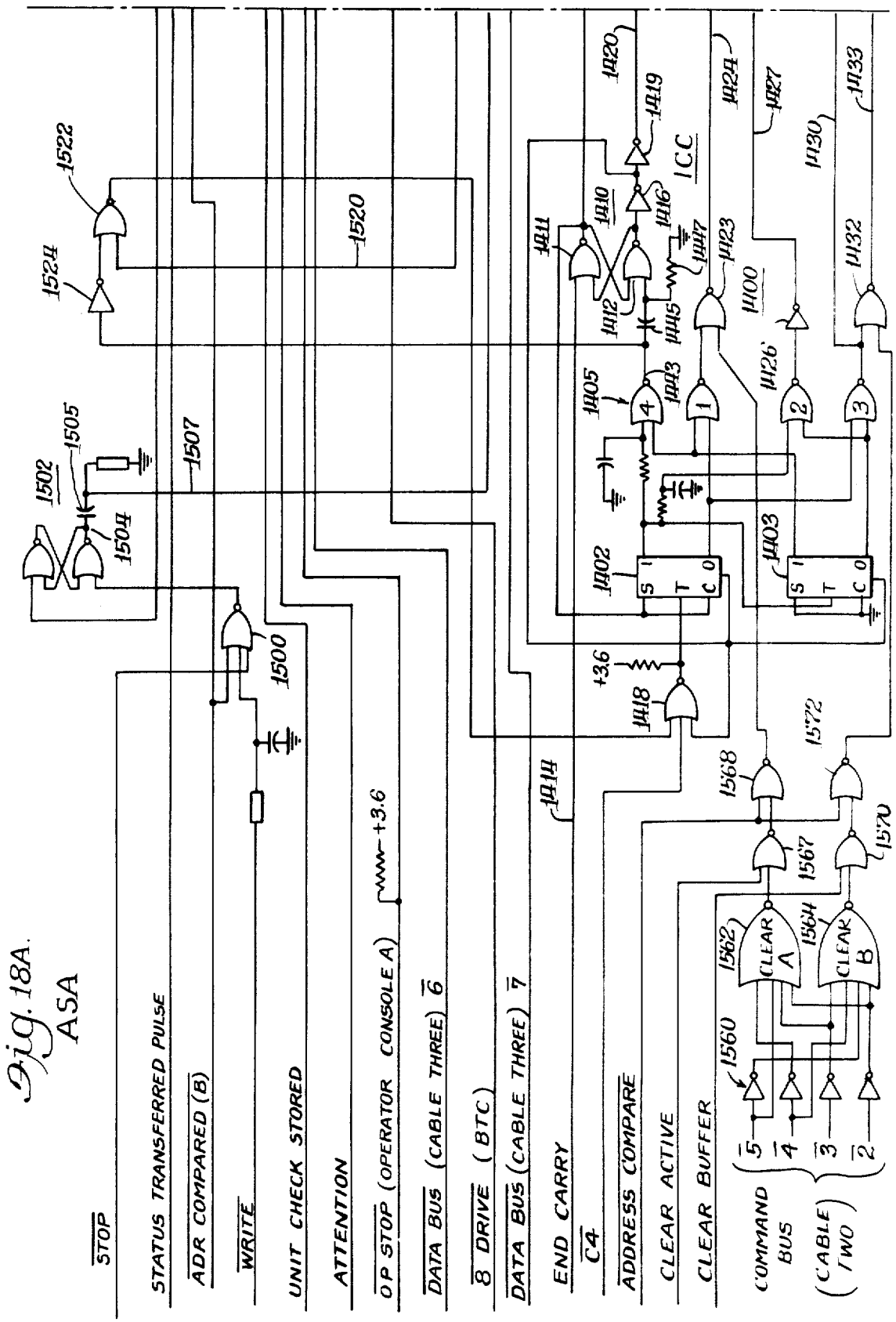
Fig. 18A. ASA

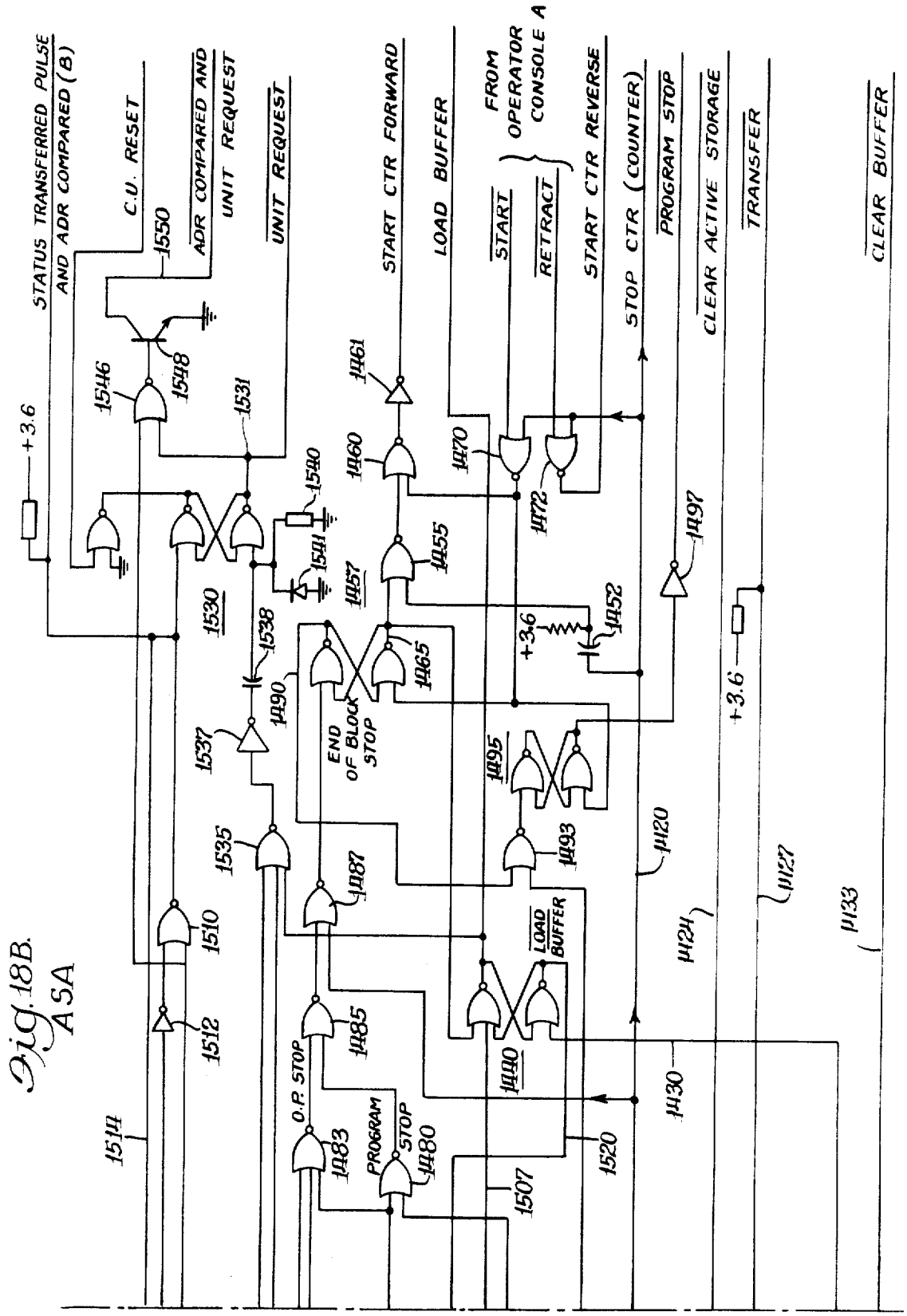
Fig.18B. ASA

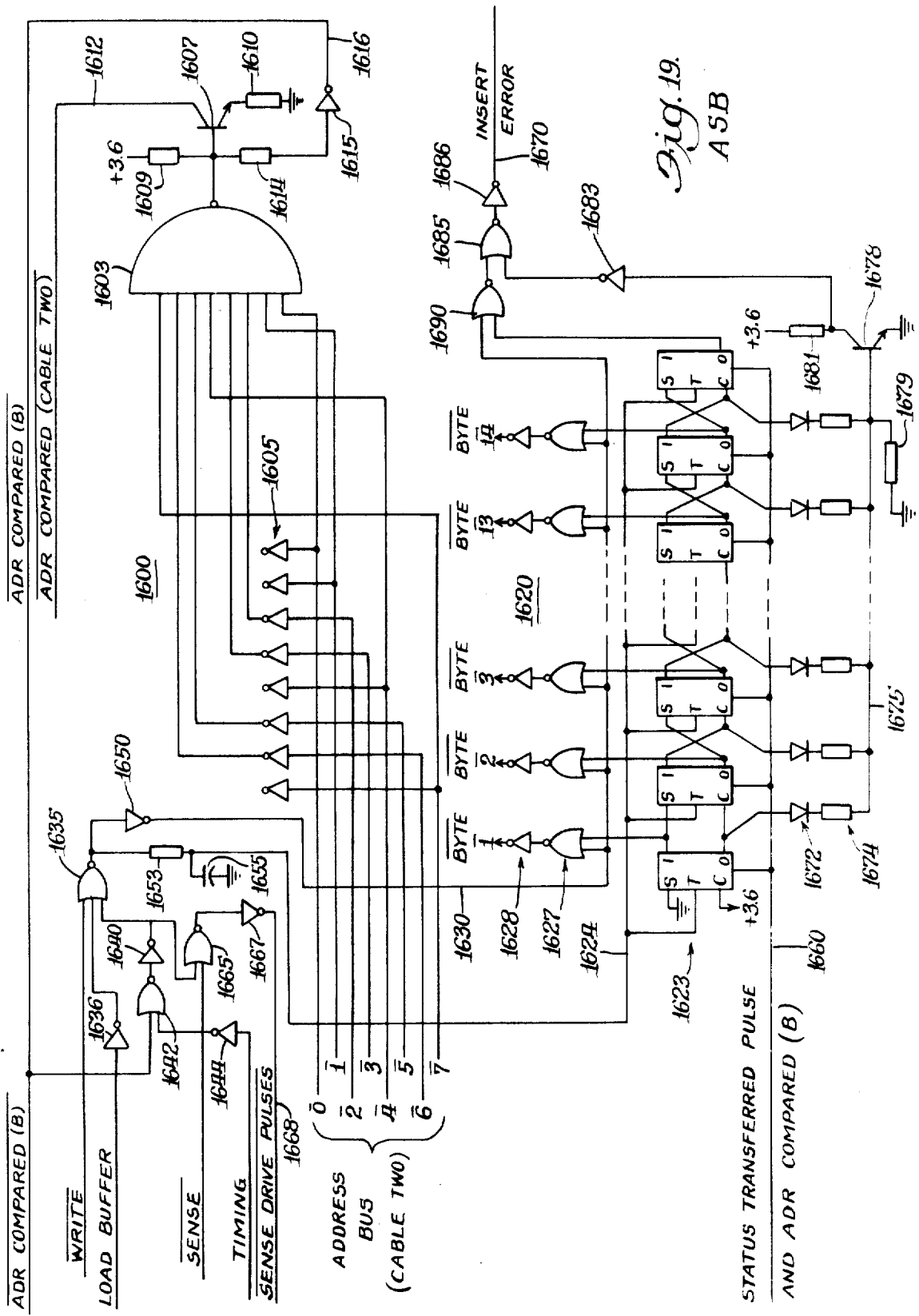
Fig. 19. A5B

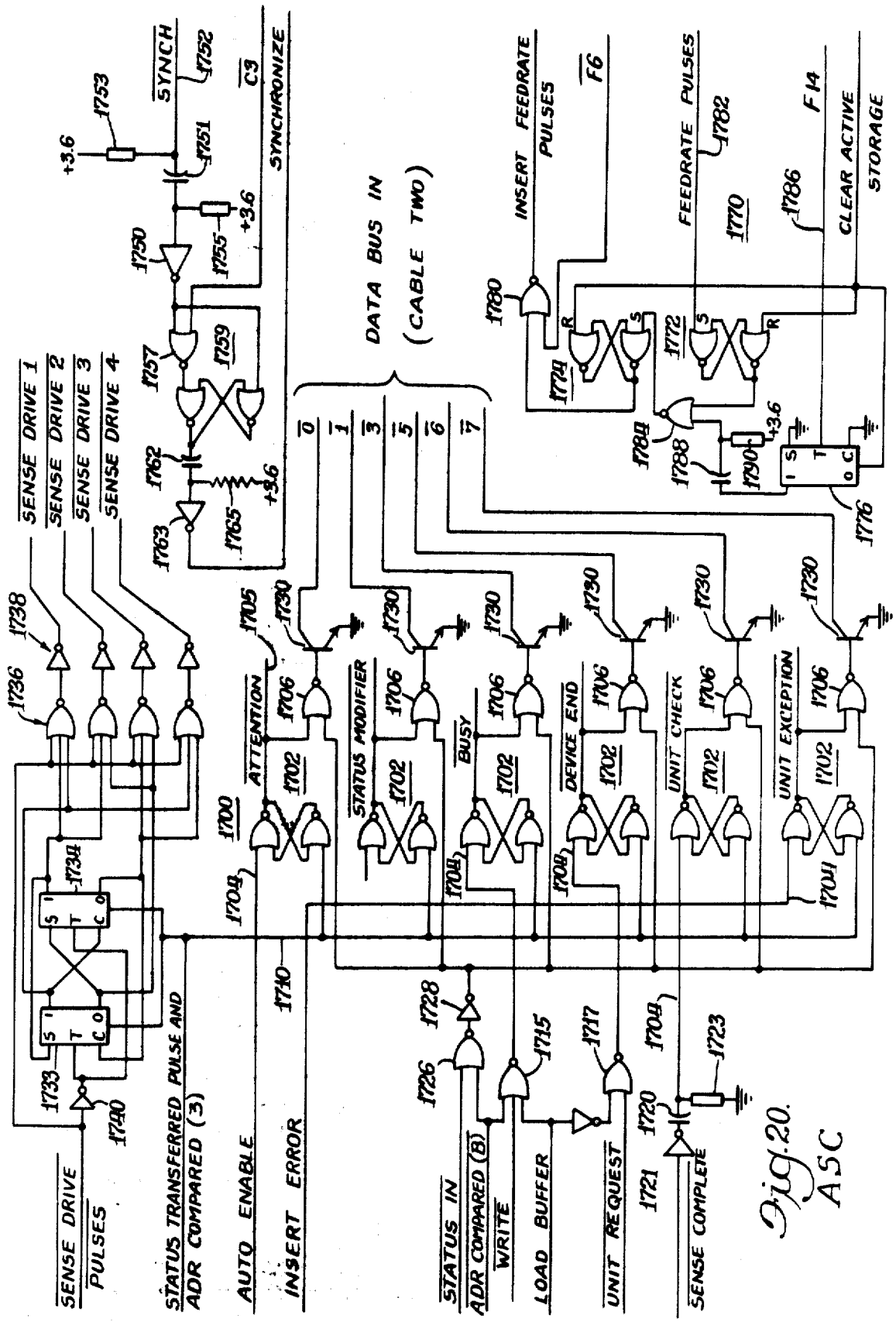
Fig.20. ASC

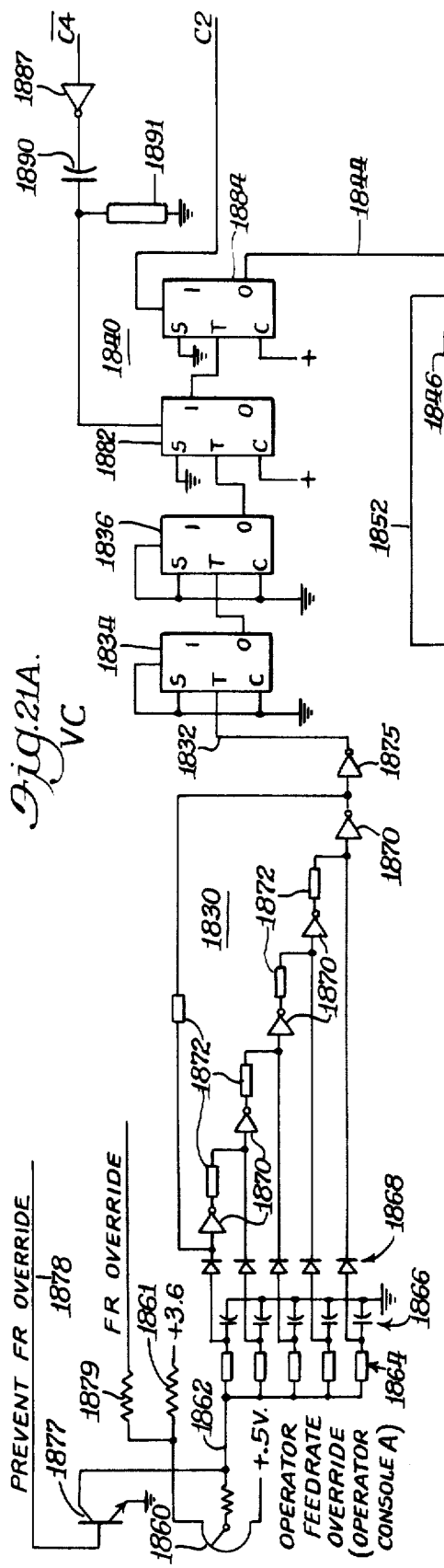
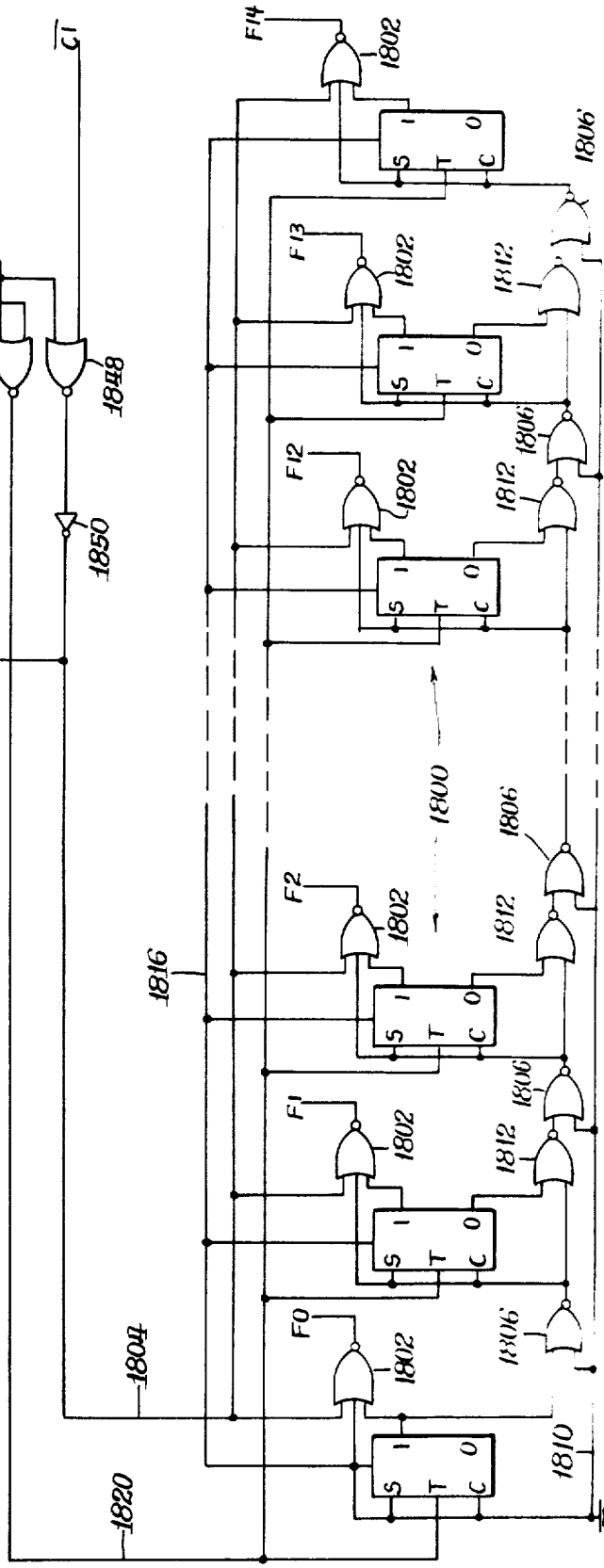
Fig. 21A.

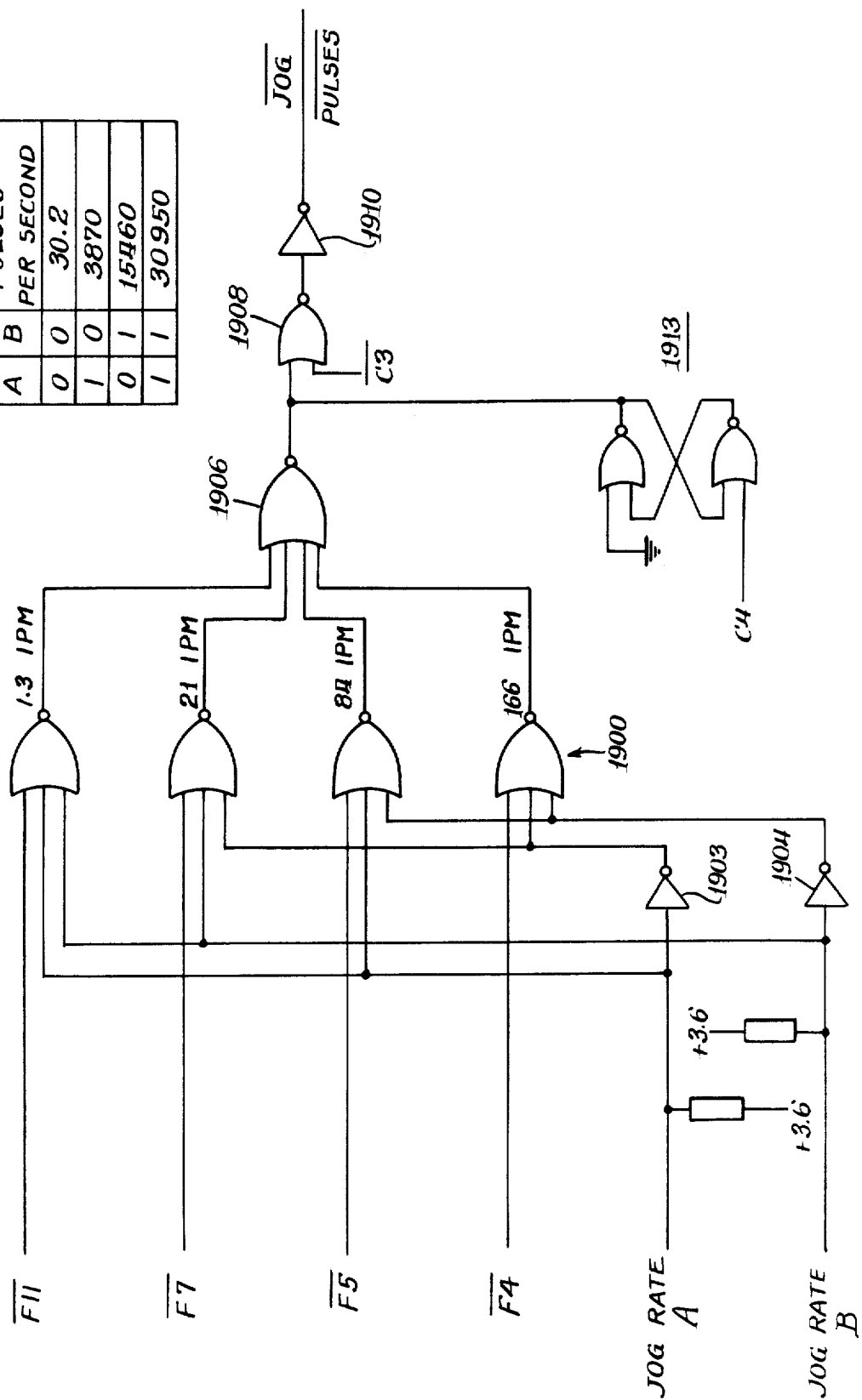

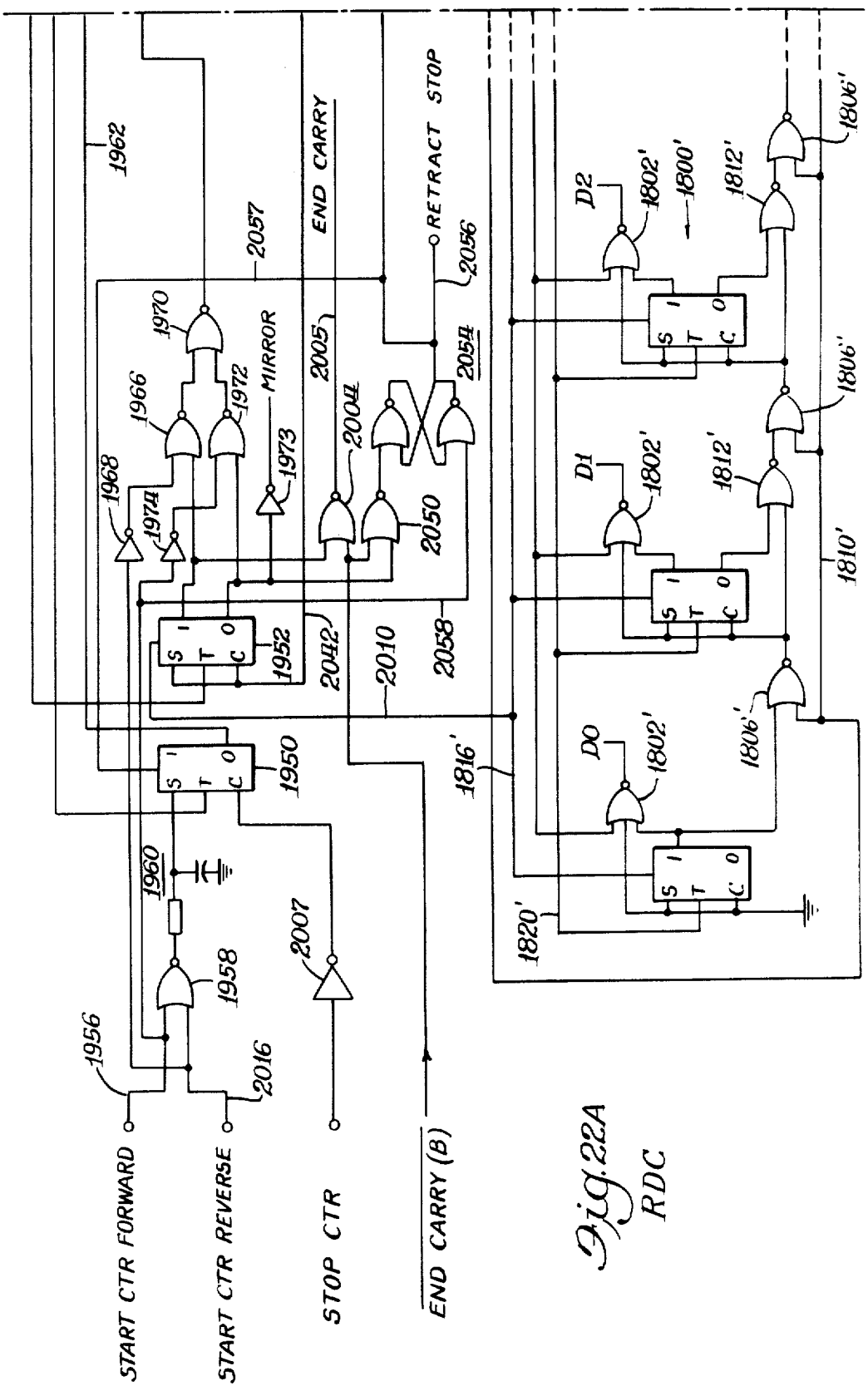
Fig. 22A RDC

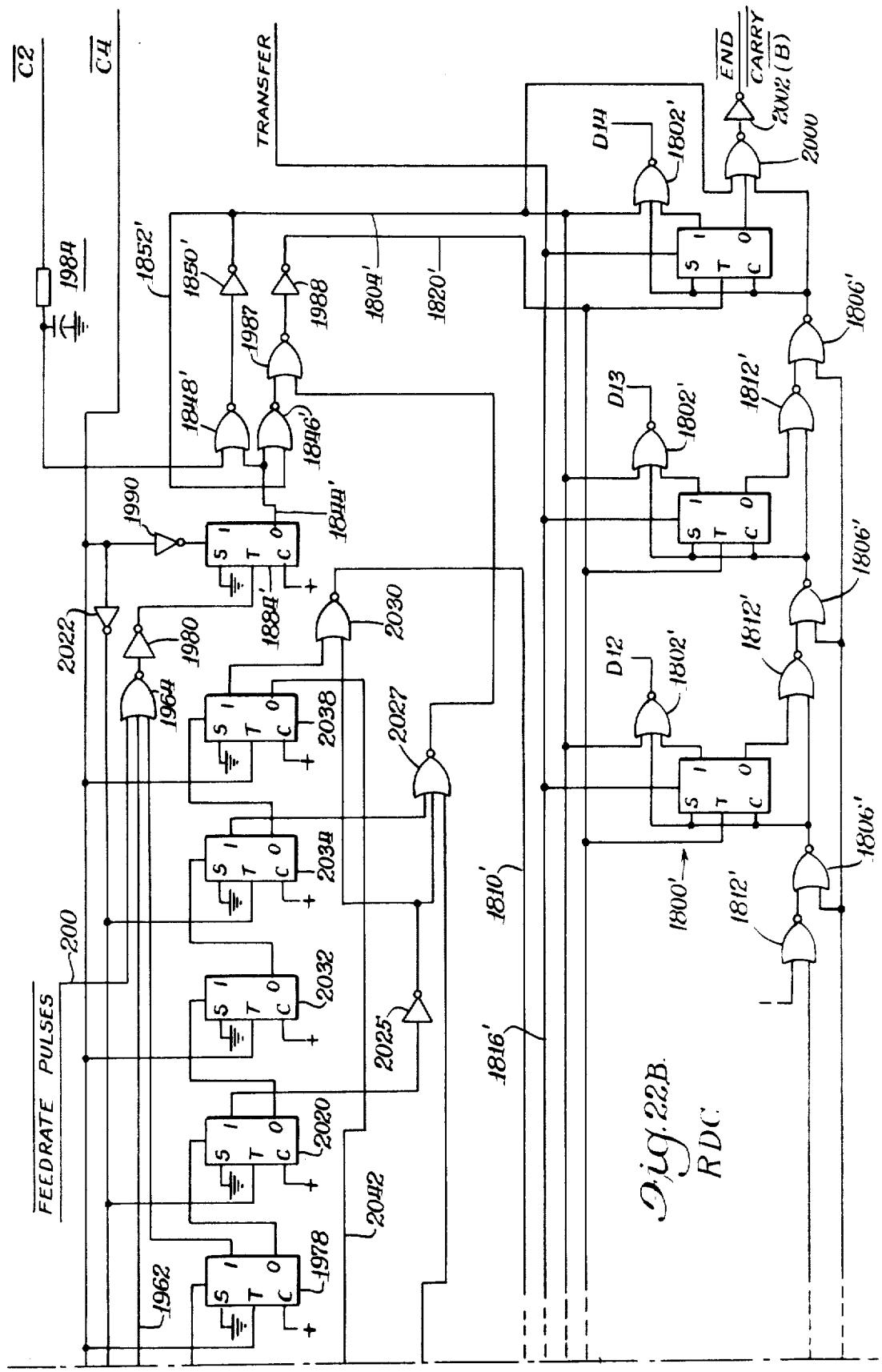

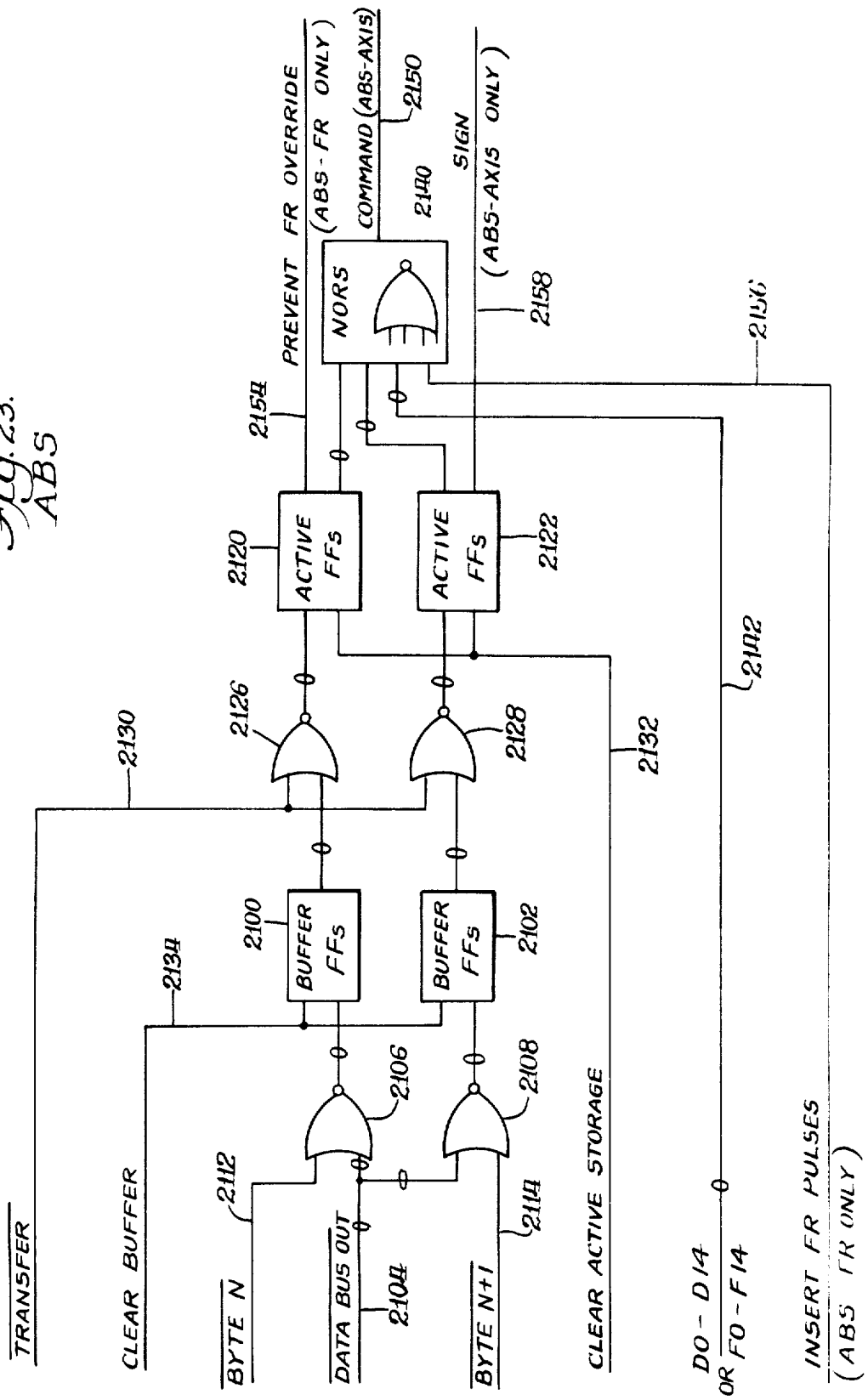

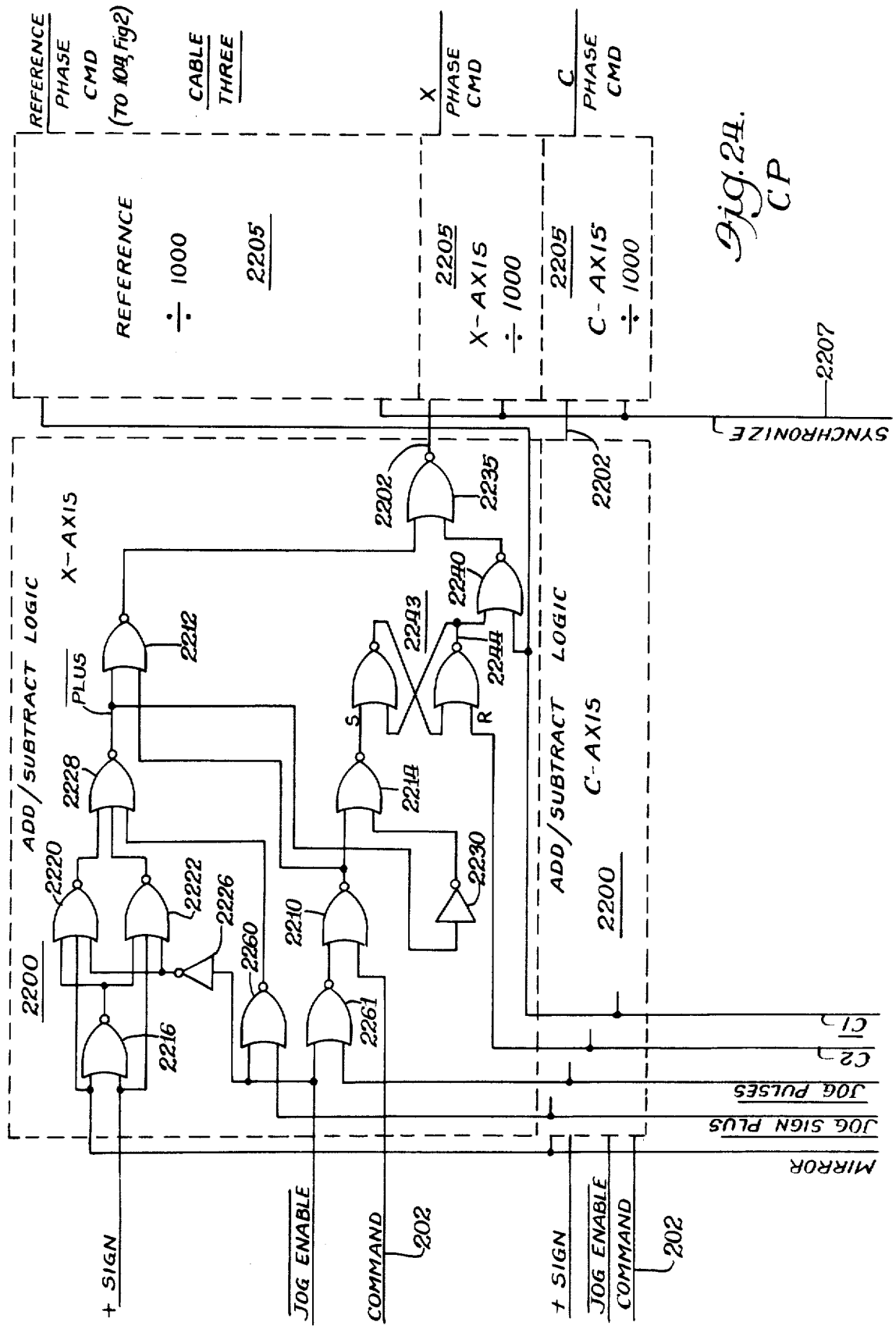
Fig. 24. CP

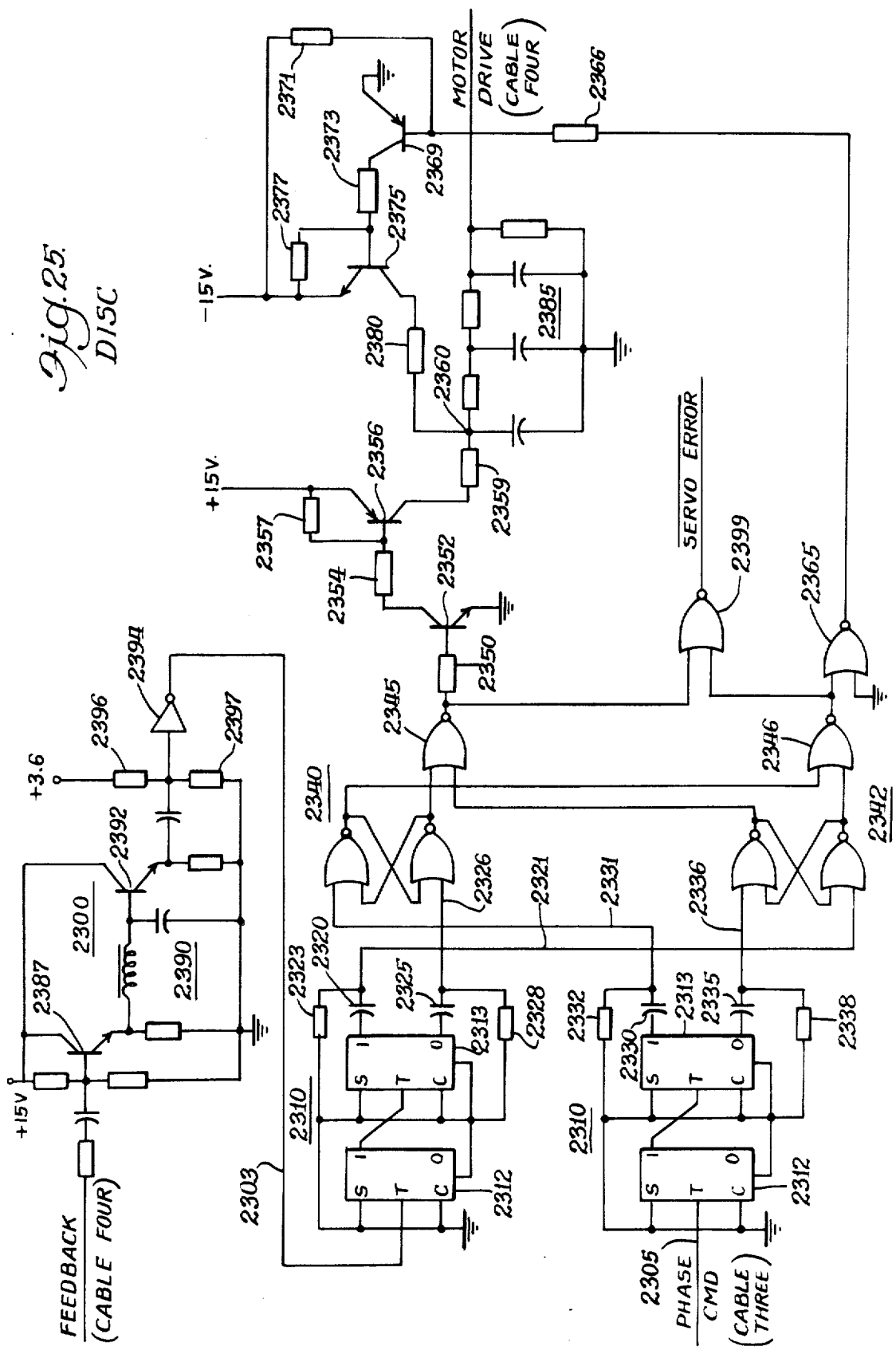

MBS

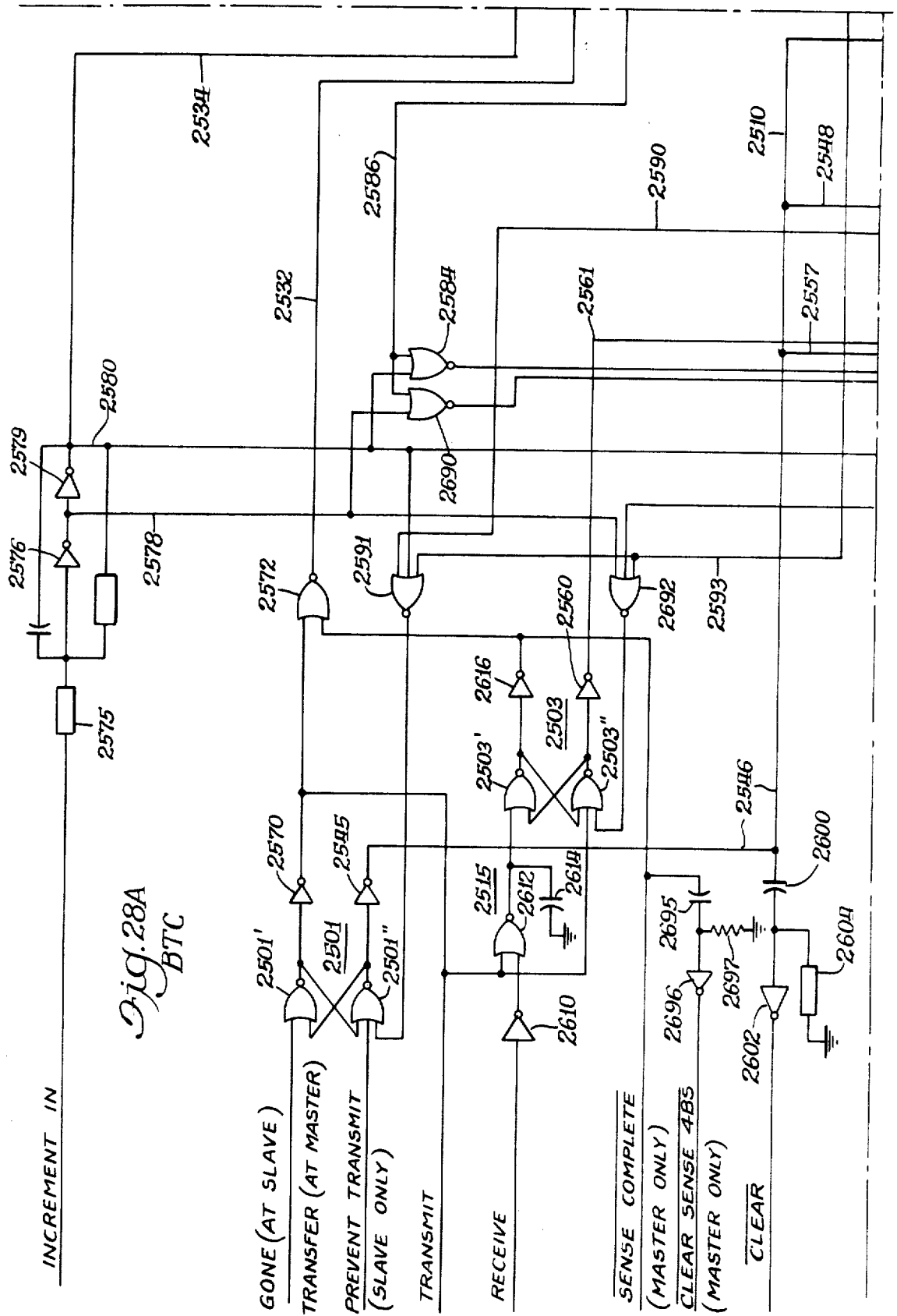

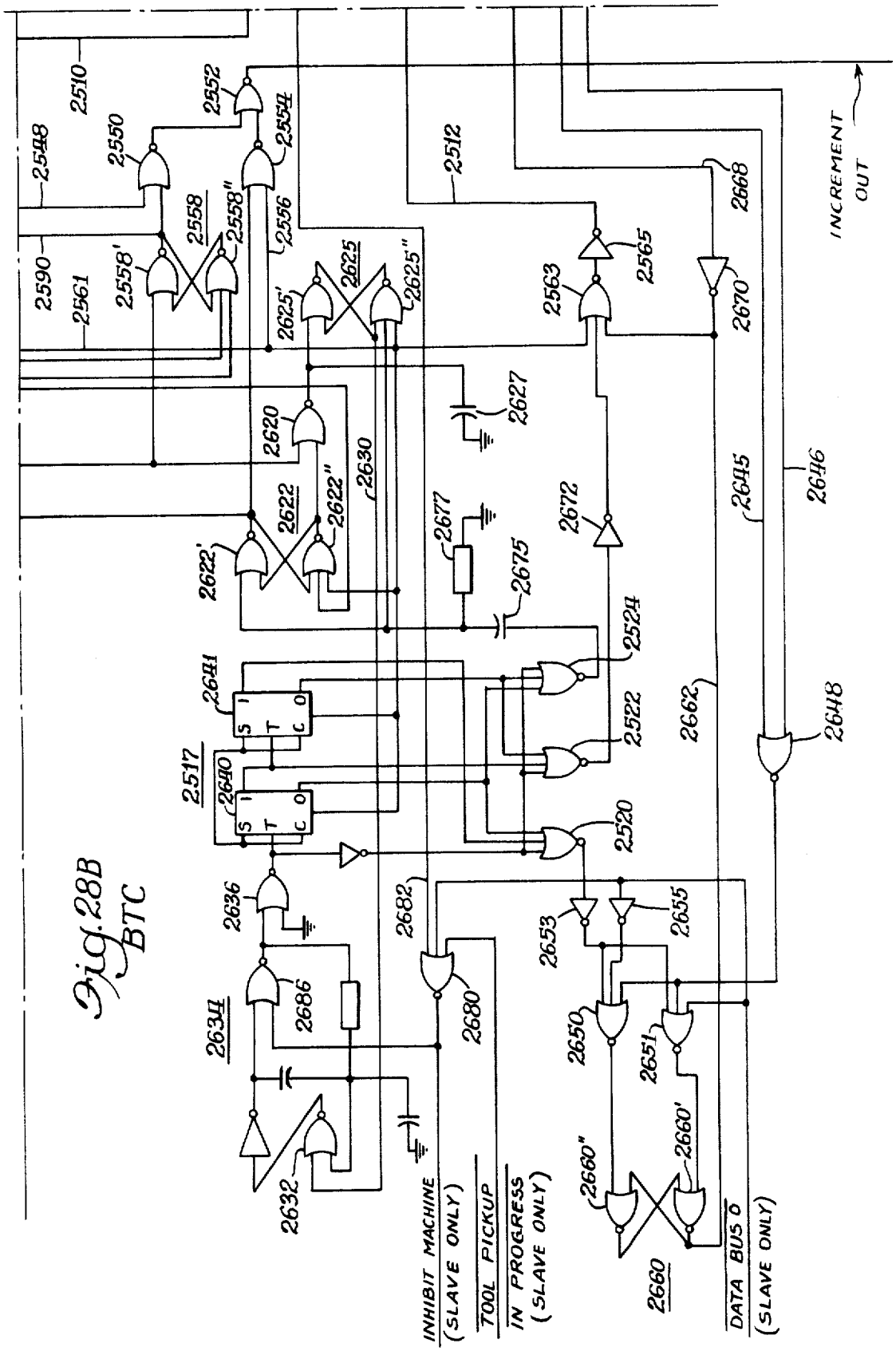

BTC

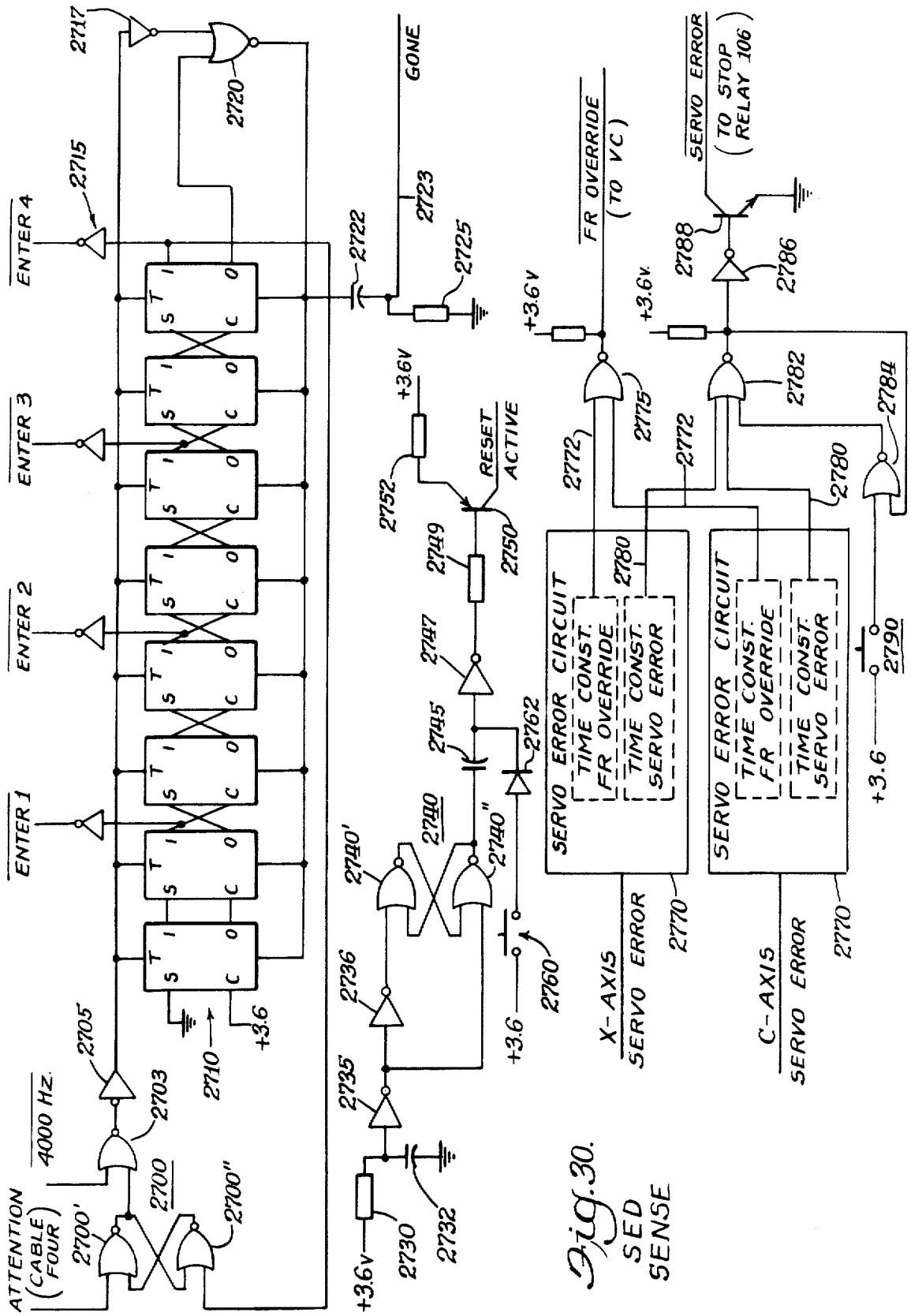

CONTROL SYSTEM

TABLE OF CONTENTS

| Description | Column numbers |
|---|---|
| DESCRIPTION OF THE DRAWINGS | 3 |
| DEFINITIONS | 4 |
| GENERAL DESCRIPTION: | |
| System | 5 |
| Time Share Operation | 6 |
| Noise Immunity | 7 |
| Modes of Operation | 8 |
| Running An Existing Program | 9 |
| Departure From An Existing Program | 12 |
| Generating All or Partly New Programs | 14 |
| CU MT And Related Units | 18 |
| Binary Sequential Format | 22 |
| Device Logic And Related Units | 24 |
| Console Logic And Related Units | 35 |
| DETAILED DESCRIPTION: | |
| Conventions | 37 |
| Control Program | 40 |
| SUPERVISOR Program | 43 |
| MONITOR Program | 51 |
| Modified Language TRANSLATOR Program | 58 |
| CUA | 63 |
| CUB | 67 |
| CUC | 73 |
| PLCR/D | 77 |
| ASA | 78 |
| ASB | 84 |
| ASC | 86 |
| VC | 89 |
| RDC | 93 |
| ABS | 97 |
| CP | 98 |
| DISC | 100 |
| 4BS | 102 |
| MBS | 104 |
| BTC | 105 |
| SED | 115 |

This application is a continuation-in-part application of our copending application entitled "Control System," Ser. No. 706,365, filed Feb. 19, 1968, assigned to the assignee of the present application, and now abandoned in favor of the present application.

This invention relates to a control system, and more particularly to a control system including interface means for directly controlling one or more machine apparatuses, such as machine tools, in accordance with data generated by a data processing machine.

The present control system may be used to control the plural machine tools shown in a copending application of Donald G. Fair, Harold L. Baeverstad, and Carl F. Erikson, entitled "Plural Machine Tools and Part Handling Control System," Ser. No. 684,235, filed Nov. 20, 1967, now U.S. Pat. No. 3,576,540, issued Apr. 27, 1971, and assigned to the assignee of the present application. The data processing machine used in the present invention may also be used to control the part handling apparatus disclosed in the above entitled application, by following the teachings of the copending application.

Some attempts have been made to control one or more machine tools by a general purpose data processing machine such as a digital computer. These attempts have generally been concerned with controlling a specialized machine tool capable of performing only a limited number of machining operations. Control of a general purpose, multi-axis machine tool capable of performing diverse types of machining operations involves problems which prior control systems are incapable of satisfactorily handling.

In a control system for general purpose machine tools, it would be desirable to have communications in both directions between a computer and a machine tool and related equipment. A system in which communications only flows from the computer to the machine tool, with very limited communications in the other direction (such as positional feedback or monitoring of temperature and like conditions), produces an inflexible system analogous to present day tape control systems in which a machine tool operator has extremely limited control over the machining operations being performed on a part. While such limited control is satisfactory for specialized machine tools, it is a disadvantage for general purpose machine tools in which the optimum manner for operating a machine tool cannot be best evaluated until an operator watches the machine tool perform the operation. At that time it may be decided that a change in a prerecorded program is desirable, and such a change should be made as soon as possible, to allow the machine to continue to operate. The change may be either to modify a prerecorded operation or to add new operations.

Finally, a system having maximum flexibility would allow a machine operator to originate a new program while located at the machine tool, and see his new program performed while he is creating it. Such a control, in which the machine operator could generate either a single machining instruction or many machining instructions before causing the machine tool to immediately perform the same, and to save or retain original and/or new instructions in any order, has not previously been possible. Such a control would eliminate the long delays usually associated with making of an error-free new program for machining a part. The present control system incorporates all of the desirable features outlined above.

One object of this invention is the provision of a system for controlling one or more machine apparatuses by an on-line, data processing machine.

Another object of this invention is the provision of a control system in which communications flow in both directions between a data processing machine and a machine tool or similar apparatus. Such communications include instructions which control and alter the performance of the unit to which the instructions are flowing.

One feature of this invention is the provision of a control system in which a general purpose digital computer is connected through interface means with one or more machine tools which are controlled by part programs generated by the digital computer.

Another feature of this invention is the provision of a control system in which an operator while at an automatically controlled machine tool may create new programs for machining a part, or changes pre-existing programs for machining a part, and cause the same, if desired, to be immediately performed by the machine tool. The control system is further characterized in that the operator can create an error-free program for machining a part during the first time that the program is run.

A further feature of this invention is the provision of a control system in which an operator may override a pre-existing program which is automatically controlling a machine tool. The override may be made without changing the pre-existing program, or can be incorporated into the program to form a new program.

A still further feature of this invention is the provision of a control system in which a single data processing machine generates the same or different programs for simultaneously controlling a plurality of machine tools. Each machine tool receives control information as required. The data processing machine through noise immune interface means services all of the machine tools on a time sharing basis which allows for rapid switching between machines and the interrupting of programs while they are being compiled, without the loss of any information being processed and without losing control over any of the machine tools.

Yet another feature of this invention is the provision of a control system which retains knowledge of the instantaneous location of one or more machine tools, and during the running of a single block of instructions for moving the machine tool along plural axes can upon command either proceed to finish the block of instructions or retract along the same path in which the machine tool entered the part, and in both cases stop at a known position at which the same program may continue or a new program of machining operations may occur.

Still another feature of this invention is the provision of a control system in which a single, general purpose, digital computer simultaneously controls a plurality of multi-axis, general purpose, numerically controlled machine tools. Data for controlling each machine tool is generated on a time sharing basis and flows to the machine tool when needed. Both an operator located at the machine tool and the machine tool itself can communicate with the digital computer and alter or change the type of data which flows to the machine tool. Further, the data itself may be from prestored programs or from entirely new programs created while machining a part.

Further features and advantages of the invention will be apparent from the following description and from the drawings.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

DESCRIPTION OF THE DRAWINGS

FIG. 3 is a partly block and partly schematic diagram, in intermediate detail, of another portion of the control system of FIG. 1, particularly illustrating CU MT, DEVICE LOGIC A and CABLE TWO;

FIGS. 4A-B is a chart illustrating the binary sequential format for a single block of machine part instructions for controlling a machine tool;

FIG. 5 is a chart illustrating the binary sequential format for SENSE information transmitted to the data processing machine;

FIG. 6 is a chart illustrating the binary sequential format for the STATUS signal;

FIG. 7 is a chart illustrating the binary sequential format for the COMMAND signal;

FIGS. 10A-I are logic flow charts of the modifications made to a SUPERVISOR program for controlling a data processing machine;

FIGS. 11A-G are logic flow charts of a MONITOR program for a data processing machine, which particularly is concerned with control of the COMMUNICATIONS TERMINAL of FIG. 1;

FIGS. 12A-E are logic flow charts of a modified language TRANSLATOR program for a data processing machine, which is particularly concerned with the CONVERSATIONAL mode of operation;

Figure 17A:
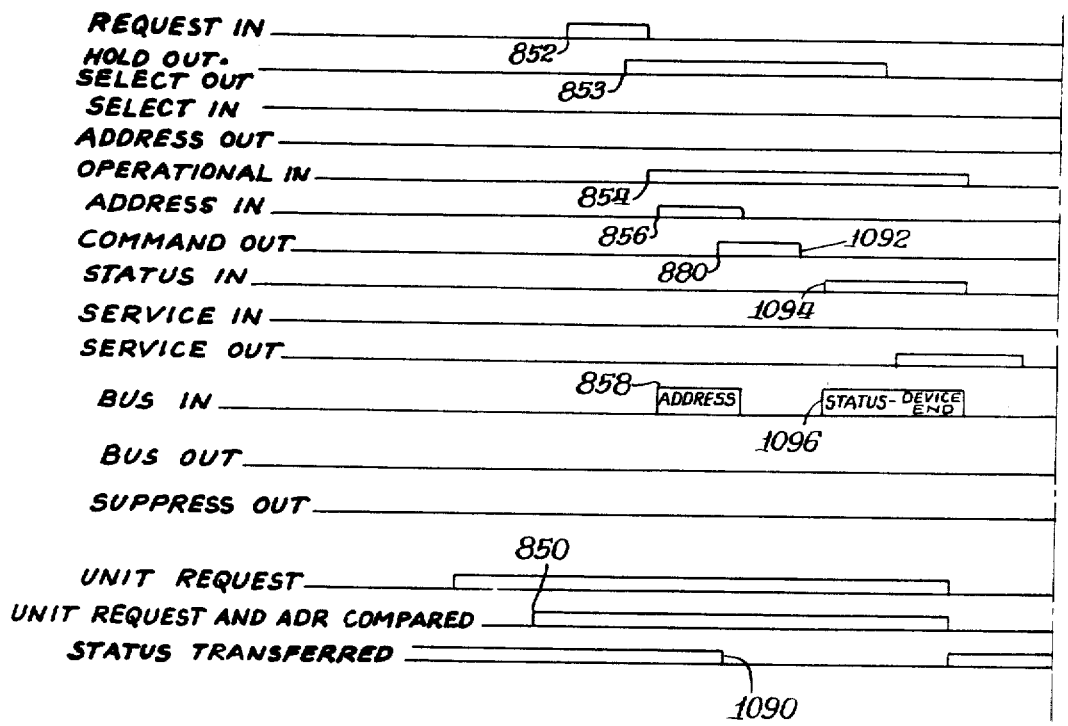
Figure 17C:
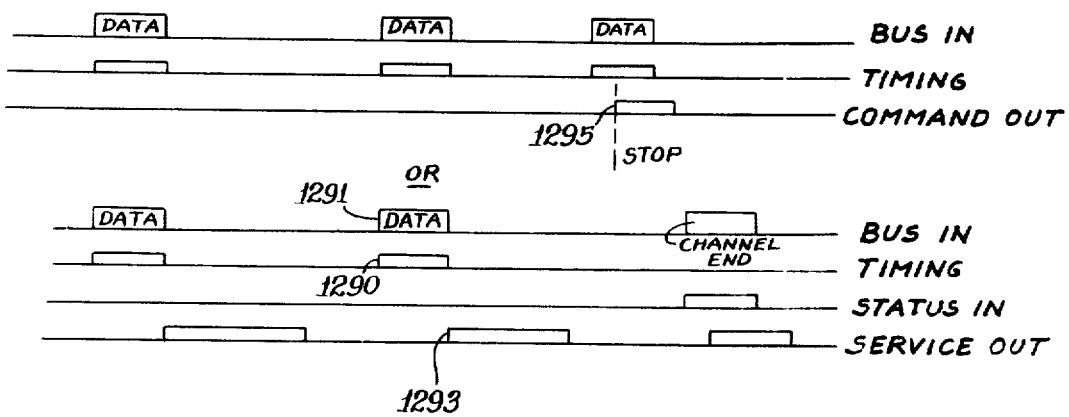
Figure 26:
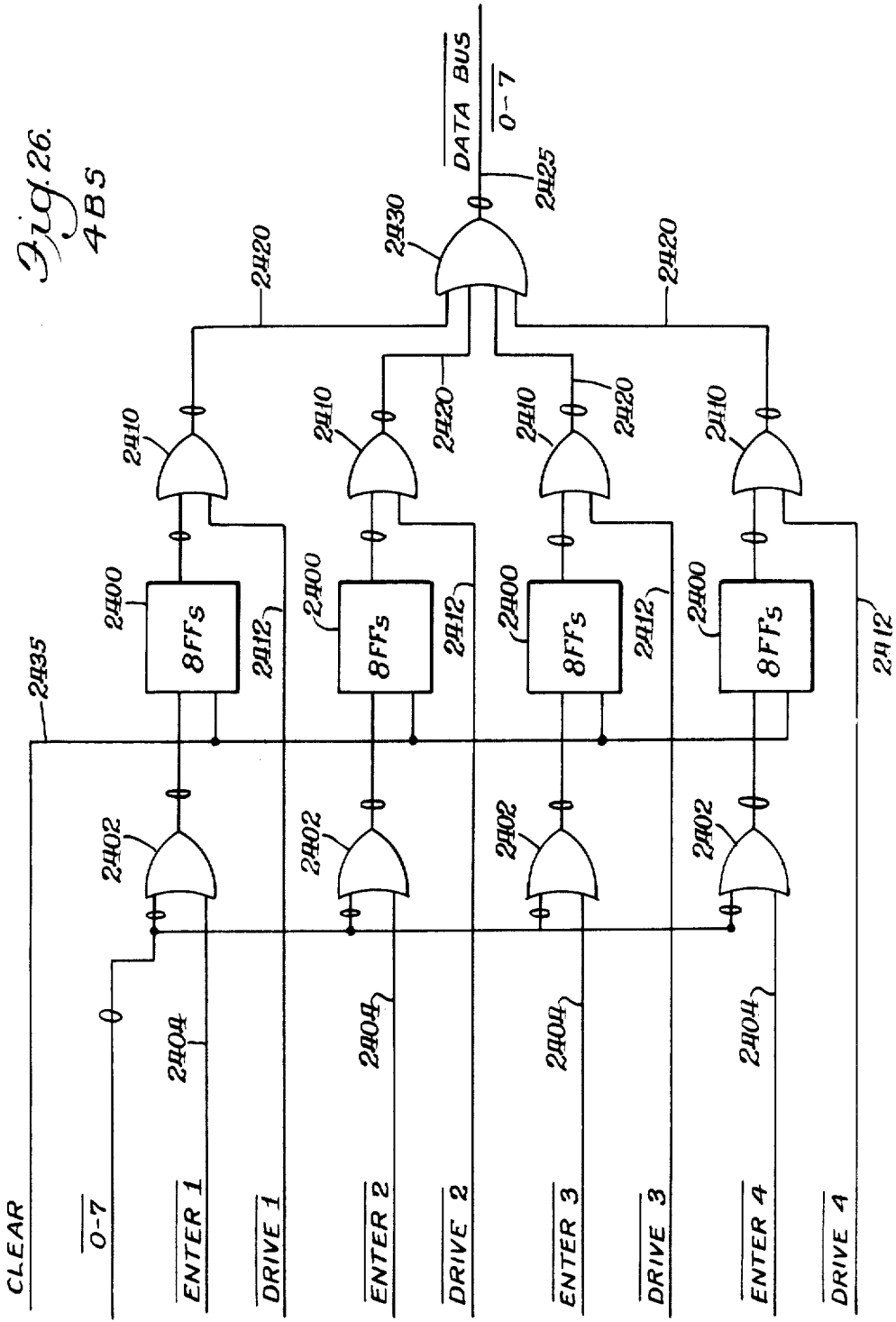
Figure 27:
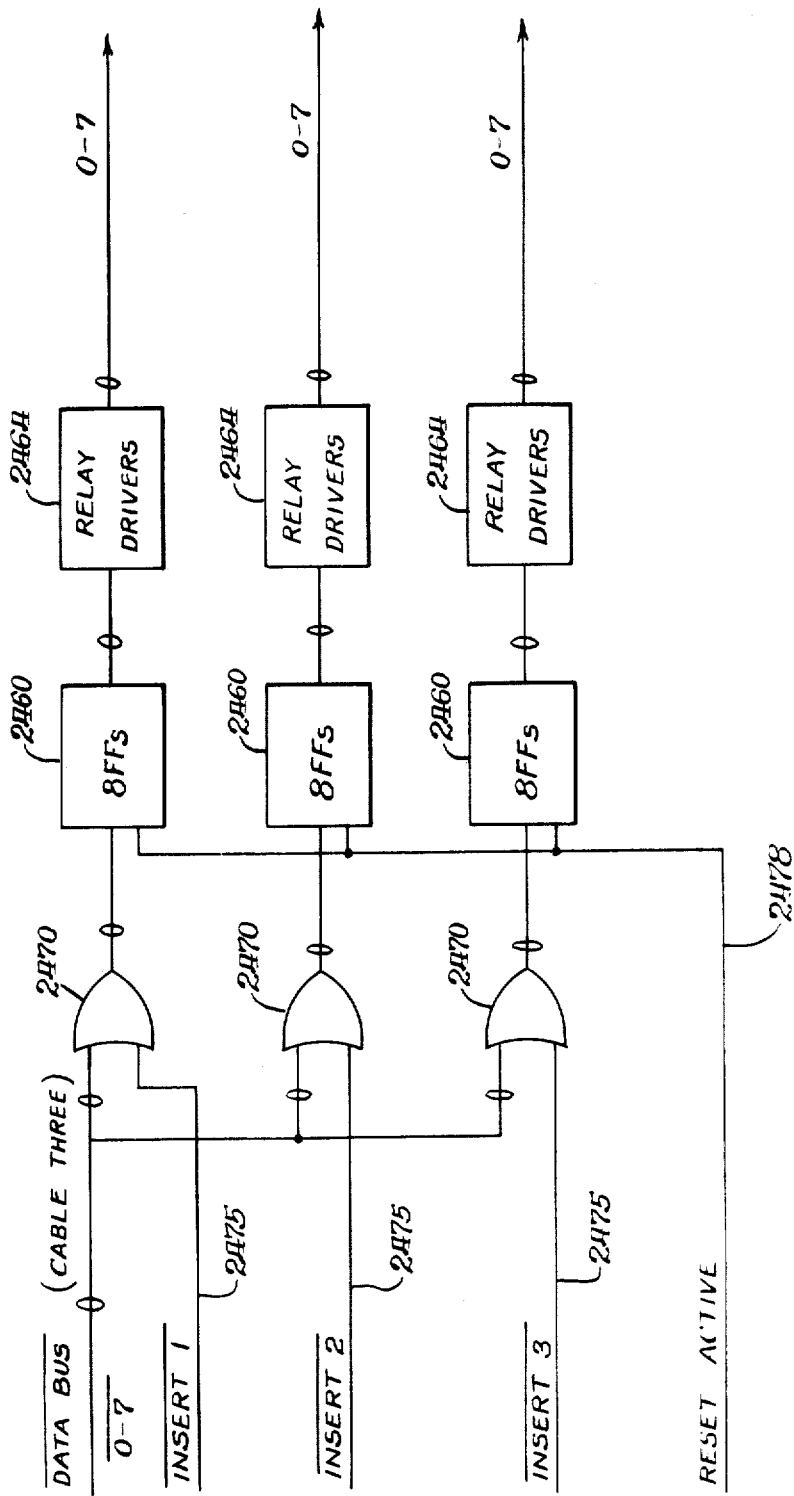
Figure 28C:
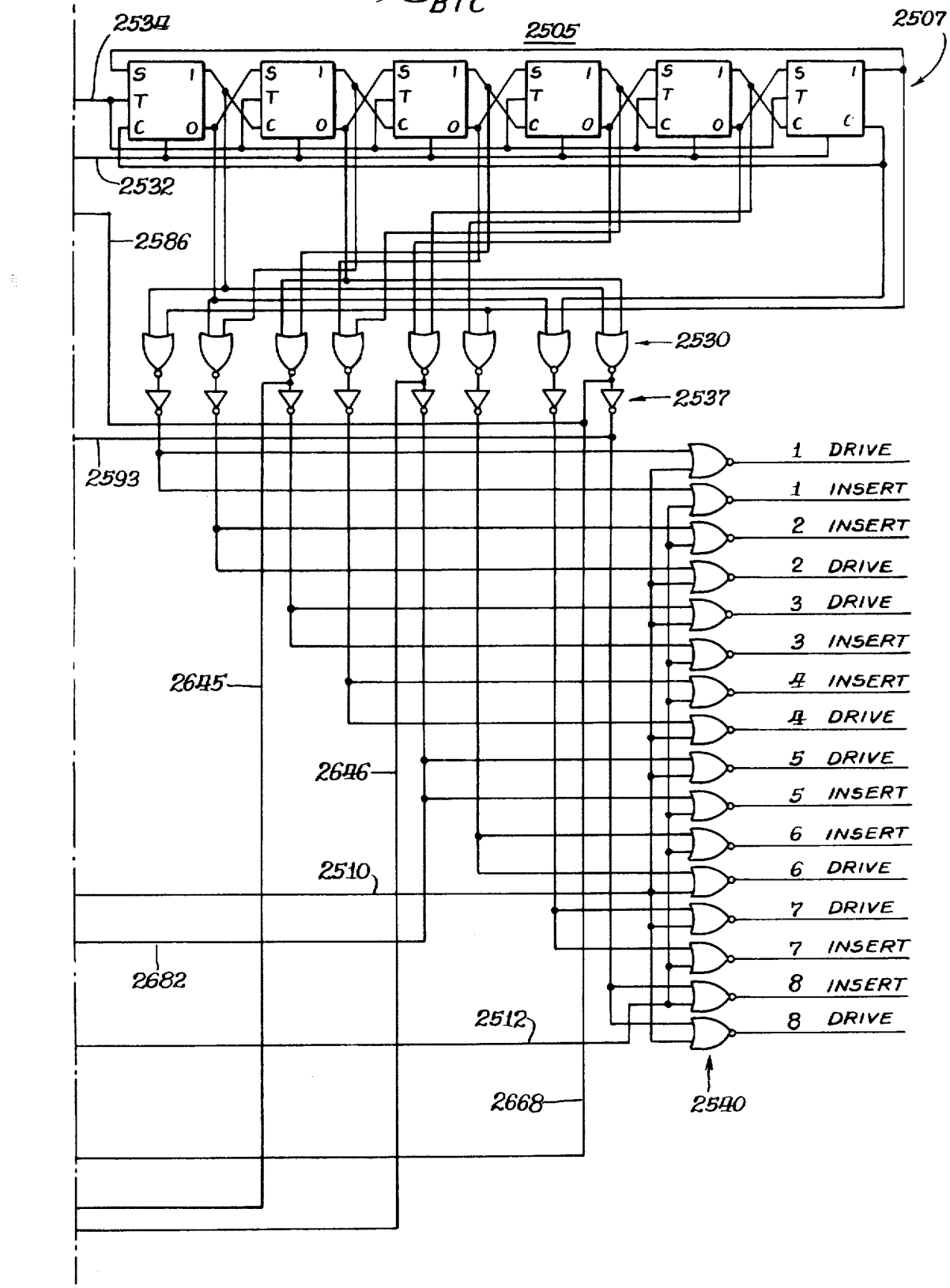
Figure 29:
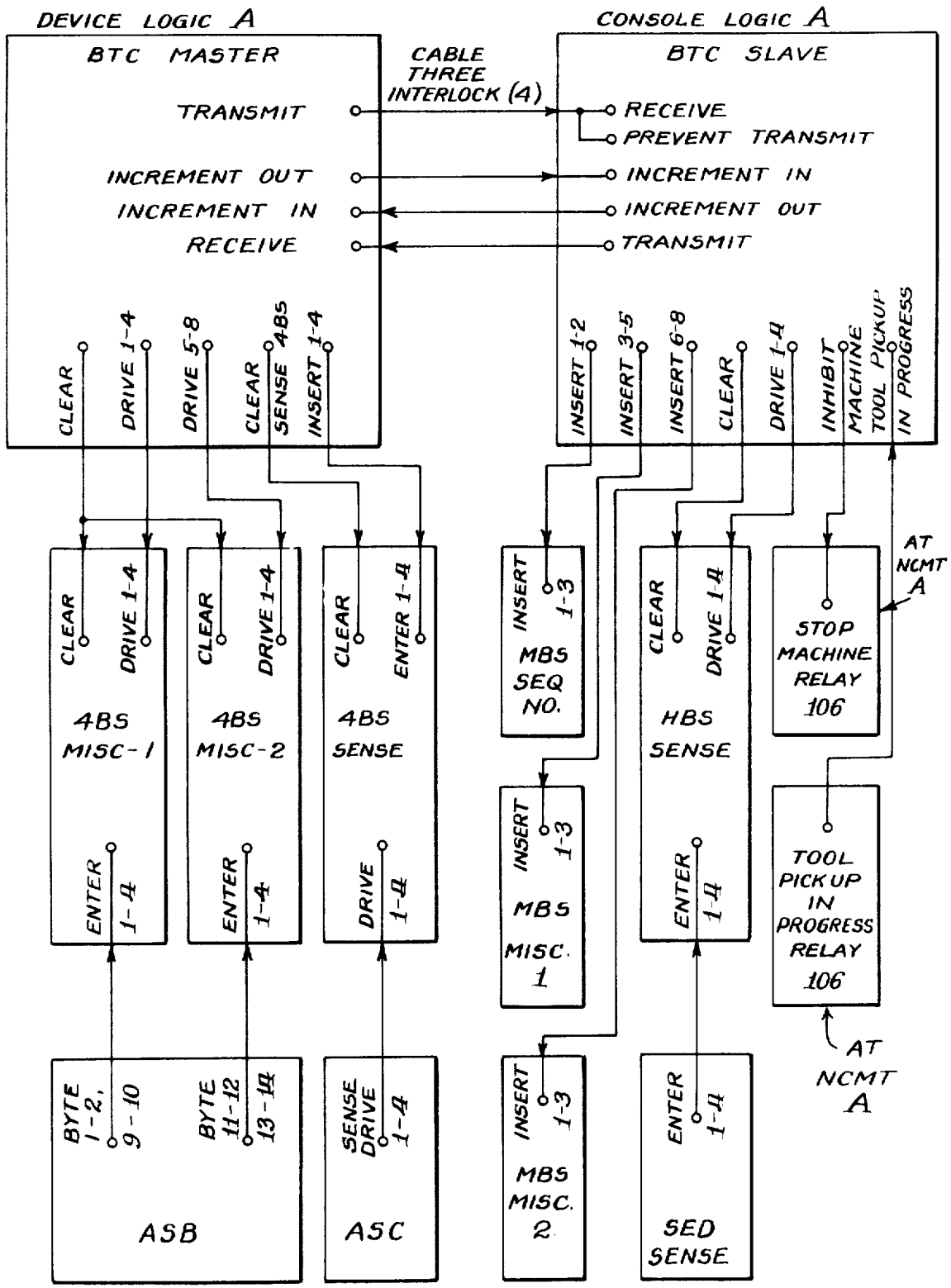

FIG. STATUS is a schematic diagram of the PLCR/D, two being utilized;

FIGS. 17A-C are time charts of the time relation between signals on CABLE ONE and some signals on CABLE TWO;

FIGS. 18A-B are a schematic diagram of the ASA;

FIG. 19 is a schematic diagram of the ASB;

FIG. 20 is a schematic diagram of the ASC;

FIGS. 21A-C are a schematic diagram of the VC;

FIGS. 22A-B are a schematic diagram of the RDC;

FIG. 23 is a simplified schematic diagram of one of several similar ABS units;

FIG. 24 is a partly block and partly schematic diagram of the CP;

FIG. 25 is a schematic diagram of the DISC unit, used for both the X-axis and the C-axis;

FIG. 26 is a simplified schematic diagram of one of several similar 4BS units;

FIG. 27 is a simplified schematic diagram of one of several similar MBS units;

FIGS. 28A-C are a schematic diagram of the BTC unit, used for both the BTC MASTER and the BTC SLAVE;

FIG. 29 is a partly block and partly schematic diagram of the control connections between the BTC MASTER and the BTC SLAVE units, and other units concerned with transfer of data between portions of the machine control; and FIG. 30 is a partly block and partly schematic diagram of the SED SENSE.

DEFINITIONS

For the purposes of the present application, the following terms used in the specification and in the claims are defined as set forth below.

Machine tools intended to be controlled by the present invention are any of a wide variety of machine apparatus which is capable of simultaneously performing two or more operations. Examples are machine tools having a worktable movable along plural axes, or a support for moving a part relative to one axis and a simultaneously movable tool, and includes machine tools wherein the operations performed are in the nature of machining, measurement or testing of parts during or after a machining operation.

Instructions are intelligence which controls an operation. A part instruction is a statement which defines an operation to be performed by a machine tool on a part. A control instruction is a statement for controlling the operation of a data processing machine.

In order to be utilized by a data processing machine, the instructions must be in the form of an alphanumeric language which the data processing machine has been programmed to read and interpret. Typically, instructions and other intelligence enter and leave the computer in the form of a programming language which is reasonably comprehensible by an operator for ease of operator interpretation. For internal use within the data processing machine, the programming language is converted into a machine language in the form of primary intelligence which the data processing machine itself uses in performing computations and other operations. The machine language may be in the form of straight binary or other numbering systems.

A program is a series or sequence of instructions, in either programming or machine language, which defines the type and order of a plurality of operations. A control program is a series of control instructions, and likewise, a part program is a series of part instructions. The data processing machine, under control of a control program, interprets a part program in programming language and generates therefrom a part program in machine language, sometimes referred to herein as a machine part program.

Data is defined to be any form of intelligence, and consists of part and control instructions and programs as well as other types of information associated with machine tools and the part handling and related equipment associated therewith.

GENERAL DESCRIPTION

System

Figure 1:
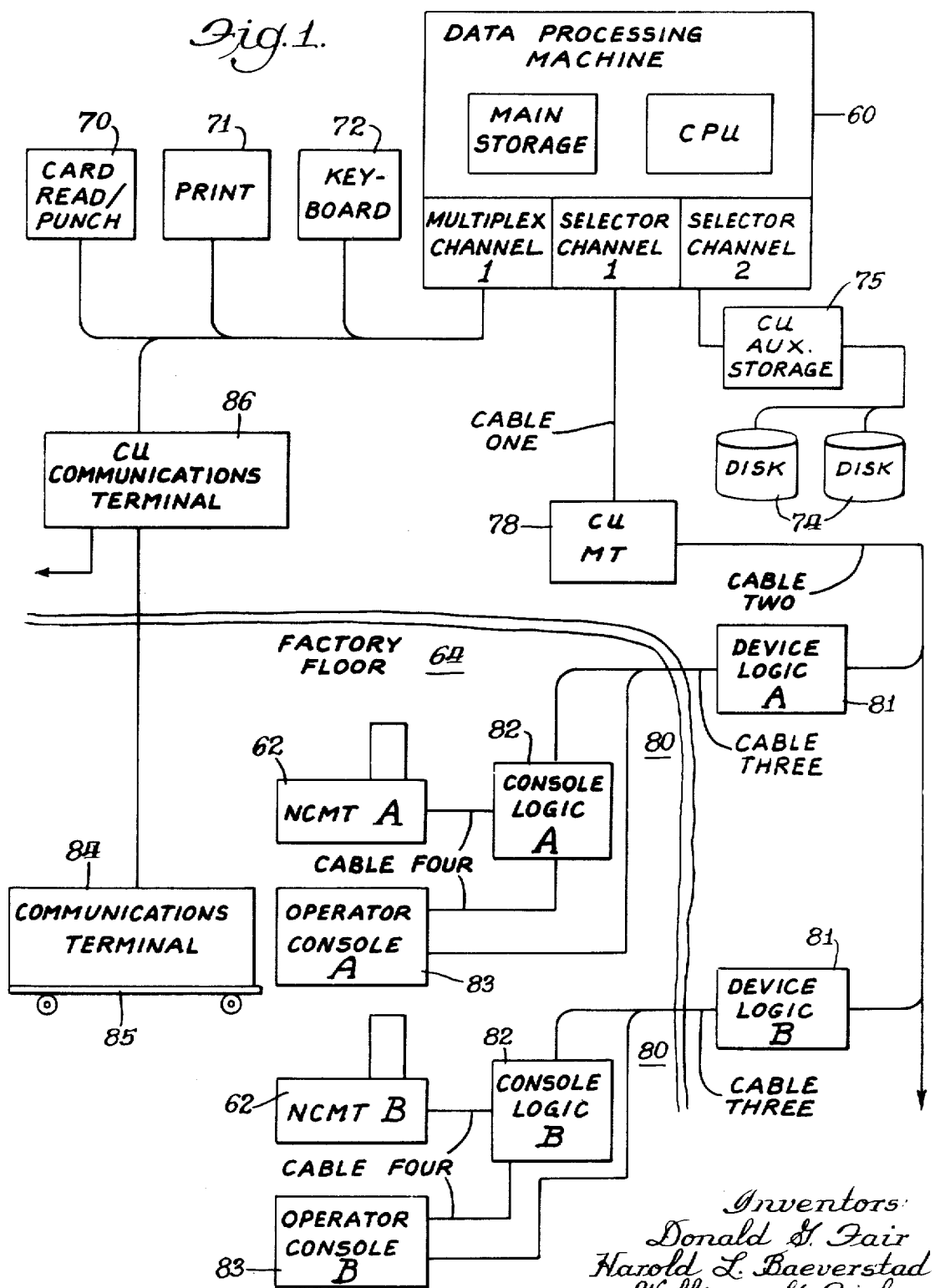
FIG. 1 is a block diagram of the system for controlling one or more machine apparatuses, with two machine tools being illustrated.

Turning to FIG. 1, a block diagram of the control system is illustrated in which a data processing machine 60, such as a high speed, general purpose, digital computer, controls the operation of one or more machine tools 62 remotely located therefrom on a factory floor 64 which may be a substantial distance from the location of machine 60. Some of the machine tools 62 are preferably general purpose, multi-axis machine tools, capable of performing a number of diverse machining operations such as drilling, milling and boring. As an exemplary embodiment of the invention, a pair of numerically controlled machine tools are illustrated, labeled NCMT-A and NCMT-B. As will appear, the control system is capable of controlling a single machine tool 62, or any number of machine tools limited only by the capacity of the computer.

Data processing machine 60 may be a high speed, general purpose, digital computer which includes a central processing unit, labeled CPU, and a memory core, labeled MAIN STORAGE. Data enters and leaves the data processing machine by means of several channels, each of which have lines for input information and lines for output information, and may include lines shared by both input and output information.

The exemplary illustrated data processing machine includes a multiplex channel 1, and selector channels 1 and 2. Multiplex channel 1 is connected through a data link to a number of conventional slow response devices for entering data into the computer, receiving and printing output data, or controlling the manner in which the data processing machine compiles the data; such as a card reader and punch 70, a print unit 71, and a key board 72. The main storage area is of fast access but limited size, and to store the large amount of data to be handled, an external storage memory is provided, consisting of several direct access storage devices (DASD), such as DISK memories 74 connected by a conventional external memory control unit 75 to the data processing machine.

To provide general purpose communications flowing in both directions, an interface 78 is connected between the data link of selector channel 1, called CABLE ONE, and the individual machine control units 80. Each machine control unit 80 interprets or converts the output from data processing machine 60 into a form suitable to control the machine tool 62 associated therewith. The interface, in the form of a control unit labeled CU MT, connects each of the machine control units 80 with data processing machine 60 on a time shared basis.

Each machine control unit 8 includes a DEVICE LOGIC unit 81 which communicates over a shared data link, called CABLE TWO, with CU MT, and interprets or converts information into a form which can be communicated substantial distances over a long data link, called CABLE THREE, to the machine tool location. At the machine tool, a CONSOLE LOGIC unit 82 and an OPERATOR CONSOLE unit 83 form the remaining portion of the machine control 80. These later units are designed to operate in an electrically noisy environment, such as is commonly found in the vicinity of machine tools.

An additional source of general purpose communications with data processing machine 60 is provided at the machine location by a COMMUNICATIONS TERMINAL 84, which allows an operator to use, modify or create programs. Although a separate COMMUNICATIONS TERMINAL 84 could be provided for each machine tool, it is preferred that one such unit service several machine tools. For this purpose, unit 84 is placed upon a portable cart 85 which can be transported across factory floor 64 to whichever machine tool requires the unit. As will appear, the OPERATOR CONSOLE units 83 contain sufficient manually selectable controls to allow an operator to run existing programs without using a COMMUNICATIONS TERMINAL unit.

Each COMMUNICATIONS TERMINAL 84 is connected by a data link through a control unit 86 to multiplex channel 1 of the data processing machine 60. The COMMUNICATIONS TERMINAL may take the form of a typewriter which can be manually selected or controlled by an operator to generate instructions, or remotely controlled by the data processing machine to serve as a data display device. An alternate form for the COMMUNICATIONS TERMINAL may be a keyboard which can be manually actuated by an operator to generate instructions, and including a cathode ray tube display remotely controlled by the data processing machine to serve as a data display device. Other forms, with appropriate control units 86 therefore, are equally usable.

Figure 2:
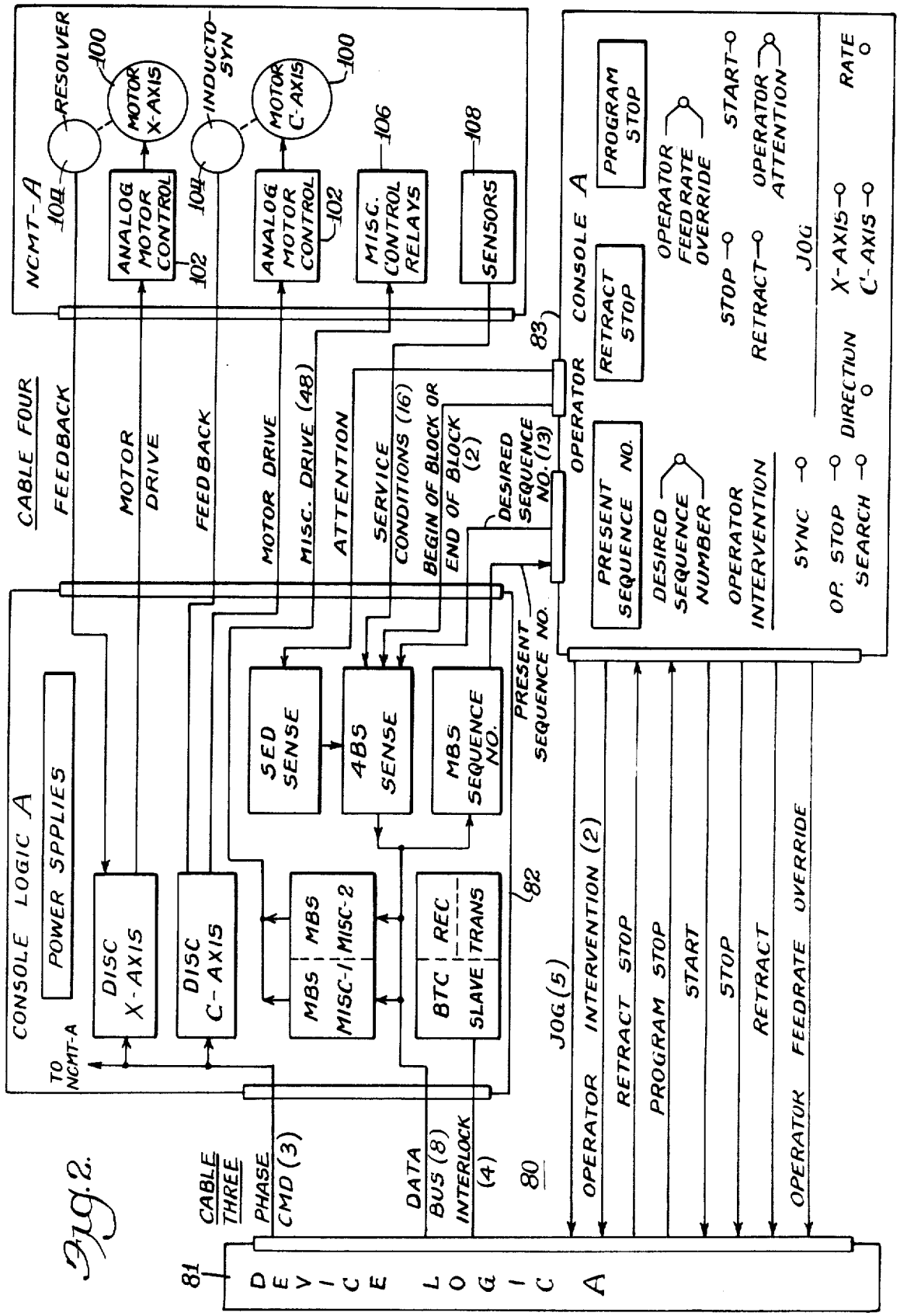
FIG. 2 is a partly block and partly schematic diagram, in intermediate detail, of a portion of the control system of FIG. 1, particularly illustrating CONSOLE LOGIC A, OPERATOR CONSOLE A, NCMT-A, CABLE THREE and CABLE FOUR.

In FIG. 2, NCMT-A and its operator station are shown in more detail. OPERATOR CONSOLE A includes a number of data display indicators, indicated by blocks, which provide a visual output for an operator. In addition, a number of input controls for manually entering information are provided, indicated by the circles. When desired, the COMMUNICATIONS TERMINAL 84, illustrated in FIG. 1, is located adjacent OPERATOR CONSOLE A, so both units are accessible to the operator.

Machine tool 62 may be any conventional, general or special purpose machine tool. The system will be specifically disclosed for a five axes, numerically controlled, general purpose machine tool, as for example an OMNIMIL, Model OM-3, made by Sundstrand Corporation of Rockford, Illinois. For ease of illustration, only two of the three translational axes X, Y and Z and the two rotational axes A and C are illustrated, namely a translational axis X and a rotational axis C, as seen in FIG. 2. Each axis includes an axis motor 100 for driving the associated table or slide (not illustrated). The motors 100 are controlled by conventional analog motor controls 102. To provide a feedback output indicative of the motion of the controlled axes, a feedback device 104 is coupled to the slides in a normal manner. Such machine tool may further include automatic tool changers and other conventional support equipment, portions of which are controlled by miscellaneous control relays 106. Service conditions, as the temperature or lubrication conditions of the machine tool, may be monitored by sensors 108. The above described components of NCMT-A are known and will not be described further.

Time Share Operation

The CU MT serves as a time share or priority unit which connects individual machine controls 80, FIG. 1, one at a time to the data processing machine 60. Each machine control 80, however, contains sufficient storage so that all machine tools 62 are simultaneously operating on previously stored information. After the computer has supplied a block of instructions to a machine tool, or the machine tool has transmitted data to the computer, the machine control 80 for that machine tool is effectively disconnected from CU MT and the next individual machine control 80 which desires service is effectively connected to CU MT. Since a machine tool is a relatively slow acting device, sufficient time exists for the computer to serve in sequence each of the machine tools and return to the first machine tool prior to that machine tool requiring data. The number of machine tools which thus may be kept operating simultaneously by a single computer is limited only by the size of the memory in the computer and the speed of operation of the computer.

If a large number of machine tools are to be controlled by the computer, one or more additional CU MTs may be provided since a single CU MT can handle only a certain number of individual machine controls 80, as for example eight machine controls. Each of the machine controls 80 are connected in parallel CABLE TWO, and are activated when the CU MT, which cycles through the addresses of all of the DEVICE LOGIC units 81 connected thereto, reaches an address corresponding to the address assigned thereto. If a request for communications with the computer exists at that time, by means of a signal called REQUEST, the CU MT is stopped from switching to the next address, and during this time the computer is signalled to come on-line and service the DEVICE LOGIC 81 corresponding to the address now being maintained over CABLE TWO.

At other times, the computer may be off-line and wish to initiate communications with a particular machine control 80. The computer may transmit to CU MT the address of the DEVICE LOGIC unit 81 corresponding to the machine control 80 it wishes to communicate with. The CU MT stops cycling through its addresses, and places the computer initiated address on CABLE TWO in place of the address now being maintained by the CU MT. After the computer finishes communicating with a particular machine control 80, the CU MT is allowed to continue cycling through its addresses, so that future requests from the DEVICE LOGIC units 81 may be serviced.

Thus, any machine control 80 or the computer may initiate communications with the other. Generally, after a given block of information has been exchanged, the computer goes off-line and services other machine tools or runs background programs. The computer comes on-line with respect to any given machine tool when another block of information is to be exchanged, either from the machine tool to the computer or from the computer to the machine tool.

Noise Immunity

The machine controls 80, FIG. 1, are divided into sections located at different locations in order to obviate problems of noise and extraneous signals which exist on and near factory floor 64. The control system is designed to solve conflicting requirements of maximum speed of operation and efficiency which here require signals that are sensitive to external disturbances, and yet remain noise immune.

To make the system compatible with the output generated by data processing machine 60, and allow maximum system speed of operation, the CU MT and DEVICE LOGIC units are designed to operate using straight binary signals transmitted at high transmission rates, such as in excess of 100,000 bits per second per line, rather than BCD (binary coded decimal) or other numbering systems conventionally used by tape readers in a numerically controlled machine tool system. The CU MT and all of the DEVICE LOGIC units may be located at the location of the data processing machine 60, or may be located in any electrically quiet environment a short distance therefrom, as several hundred yards. The signals used by the CU MT and DEVICE LOGIC units are extremely sensitive to extraneous noise signals, such as are commonly found on the floor of manufacturing factories, and cannot as a practical matter be sufficiently shielded to prevent bits of false information, which might cause false movement of the machine tools, from being induced on the lines carrying these signals. Thus, the units which operate using noise susceptible signals are located away from the factory floor.

The DEVICE LOGIC units convert the high transmission rate binary signals into signals, for transmission over CABLE THREE, which are immune to the type of interference and extraneous signals found on factory floor 64. CABLE THREE, which may be of long length, carries the converted signals from the location of the CU MT and DEVICE LOGIC units to the factory location, and across the factory floor to the individual machine tool locations. Generally, the binary signals in excess of 100,000 bits per second per line and are converted into phase shifted square waves of 1 to several kilocycles per second, for controlling the machine tool axes, and binary signals serially transmitted at a slow transmission rate, as 50,000 bits per second per line, for controlling the miscellaneous control relays 106, FIG. 2, and other circuits than the axes motor drives. Several lines may simultaneously carry serially transmitted binary signals to provide a parallel flow of information at the serial bit transmission rate. For example, eight lines or wires allow a byte of information, composed of eight bits, to be transmitted as a single unit to the miscellaneous control relays 106.

The units located on the factory floor, such as the CONSOLE LOGIC and OPERATOR CONSOLE units, maintain these signals in the same type of modes which are relatively noise immune. The COMMUNICATIONS TERMINAL 84 also on the factory floor transmits binary signals to CU COMMUNICATIONS TERMINAL 86 at a slow transmission rate, as 100 to 200 bits per second. Thus, the system as a whole is relatively noise immune, in an environment in which noise is extremely troublesome.

Modes of Operation

All machine tools 62 in the system are controlled by the computer 60, which operates in either a RUN mode or a CONVERSATIONAL mode of operation with respect to each machine tool. The individual mode of operation for any given machine tool is selected by an operator, as when initially starting a program, depending upon the type of operations intended to be performed.

The RUN mode of operation is intended for use in running existing programs which have been previously stored in the computer, especially when no or few changes are to be made in the program. This mode is advantageous for production runs or the like. While in the RUN mode, some deviations from the existing program can be made without changing the program stored in the computer. Such deviations or changes include the ability to automatically retract should a tool break or other condition occur which requires such action, to stop the running of the program at any desired point or at preprogrammed optional stop points, to change the rate of travel of the tool, or to jump to a new instruction in the program in order to rerun operations or to skip operations which have already been performed, as when reworking a previously machined part. As will appear, many of these deviations are also available in the CONVERSATIONAL mode.

The CONVERSATIONAL mode of operation is used to run existing programs or form entirely new programs, and is primarily intended for use when a substantial change is to be made, such as adding new instructions, or deleting existing instructions, as well as other changes of a nature which cannot readily be performed in the RUN mode of operation. A major feature of the CONVERSATIONAL mode is the ability to choose one of several alternatives which allow the addition of entirely new instructions, either to form a new program or to reprogram an existing program, and to delete instructions, followed by corresponding machine motion if desired. Thereafter, the operator may cause the changes to be incorporated into the program, or alternatively can discard the changes so that the program is not modified, even though the changes caused machine motion.

Additional alternatives, some of which are briefly discussed here, provide support for the above by allowing the operator to proceed in steps or continuously through an existing program, to copy portions of an existing program when no changes are to be made, and to move back through several blocks of previously run instructions following the same path in which the tool entered the part. This move back feature is different than the retract operation previously described, in that retract moves the tool back to its starting position prior to the last run machine part instruction block. However, a single source instruction in programming language may generate a number of blocks of machine part instructions. The move back feature allows an automatic retract through all of the blocks of machine part instructions corresponding to the last run source instruction.

In the RUN mode, all of the instructions forming a program, stored in programming language, are converted and translated into a machine language part program, and are thereafter handled in a manner most suitable for rapid transmission to the machine tool, thereby placing minimum demand upon the computer. In the CONVERSATIONAL mode, however, the instructions in programming language are converted and translated individually into machine language part instructions, to afford maximum opportunity to change and control each step in the program. This type of operation necessitates more demand upon the computer and a longer time to run through a program, since the operator must actively participate in each step in the program.

While in the CONVERSATIONAL mode, many of the same deviations which are available in the RUN mode to modify a program without changing an existing program are similarly available. Thus, it is possible to retract the tool or to change the rate of travel of the tool, without changing either a previously existing program or a new program now being prepared.

It will be apparent that many operating features can be performed both in the RUN mode and the CONVERSATIONAL mode of operation. For example, an existing program could be run without making any modifications, extirely in the CONVERSATIONAL mode of operation. However, such would not represent the most optimum manner of accomplishing the final desired result, since increased demand has been placed upon the computer, and a longer time of run has occurred, without any resulting benefit. Thus, the operator would choose the RUN mode of operation for production runs.

In either mode of operation, it is possible to leave a program at any point, proceed to the end of the program without machine motion, and then select the opposite mode of operation. The operator can then return to the same point in the program without machine motion, and thereafter continue to run the program in the new mode of operation. Thus, the operator may start in one mode, and due to some change in circumstance, finish machining the part in the other mode; choosing the desired mode of operation in accordance with the features each offers and the speed with which those features can be accomplished.

The succeeding sections will describe in more detail the running of an existing program, departure from an existing program, and generating all or partly new programs. While each of these operations will be described with reference to the mode of operation most suitable for the final desired result, it will be understood that in many cases the same desired result could be accomplished in the other mode of operation.

Running An Existing Program

A part program, consisting of a series of part instructions to be performed by a machine tool, may be prepared in advance and stored by the computer for subsequent utilization. The part programs, written as a series of source instructions in programming language, are entered in the computer through keyboard 72, FIG. 1, or by being placed on cards or other media read by card reader 70. Each program is identified by a part number or other suitable code which uniquely associates the series of operations to be performed with the particular part on which the operations are to be performed. The part program, in programming language form, is stored in DISK storage 74, when not controlling a machine tool.

A part which is to be machined by a stored program may be conveyed to any one of the machine tools 62. For example, the part may be placed on NCMT-A, and an operator at the machine tool location will operate the OPERATOR ATTENTION control, FIG. 2, on OPERATOR CONSOLE A. The actuation of OPERATOR ATTENTION generates a REQUEST signal, which causes the DEVICE LOGIC A unit to be coupled by CU MT to the computer.

In addition to the REQUEST signal, additional information about the state of NCMT-A is also communicated to the computer by a signal called SENSE, which forces generation of a signal called STATUS. These signals, to be explained in detail later, convey the information necessary for the computer to decide at which point it should pick up with control over the machine tool.

An existing program may be run solely from the controls on OPERATOR CONSOLE 83 or by additionally using controls on the COMMUNICATIONS TERMINAL. Since each machine tool is identified by its own address, i.e., the address of the DEVICE LOGIC unit 81 associated therewith as permanently stored in an ASB unit, FIG. 3, within each DEVICE LOGIC unit 81, the COMMUNICATIONS TERMINAL 84, when used, is entirely general in nature and capable of communications regarding any machine tool, even when the operator and the COMMUNICATIONS TERMINAL are not at the machine tool location.

As an example, it will first be assumed that COMMUNICATIONS TERMINAL 84 has been transported to the location of NCMT-A and is to be used during running of the program. In response to the REQUEST, SENSE and STATUS signals described above, the computer under control of a MONITOR program activates COMMUNICATIONS TERMINAL 84 and causes a message to be typed out in programming language which repeats the address of NCMT-A and indicates that communications with the computer has been established.

The operator now turns to COMMUNICATIONS TERMINAL 84 and types in programming language that he wishes the RUN mode of operation for an already stored program. Next, the operator types the identity of the program which is to be run. For example, such a designation may consist of a part number, which corresponds with the part presently at NCMT-A, and a set up number, i.e., an orientation code which indicates the orientation of the part on the worktable of NCMT-A. Finally, the operator types how many parts are to be machined, i.e., how many times the selected program is to be run.

The computer under control of a SUPERVISOR program now searches and finds the selected part program in external DISK memory 74, and transmits all of the part program to the computer whereupon a language TRANSLATOR program or subroutine compiles a machine part program therefrom. Each program consists of instructions which are to control the machine tool, and extra data intended for operator messages. For example, the program may contain a programmed stop operation prior to a particular sequence number, and a corresponding operator message to indicate that the operator is to move a clamp on the part before proceeding to the next sequence number.

The part instructions, converted into machine language form, are transmitted back to the DISK memory 74, in order to free a large portion of the MAIN STORAGE memory for other uses. A certain number of machine part instructions are always retained in the MAIN STORAGE memory, in separate BUFFER areas corresponding to the machine being controlled, for rapid transmittal to the machine tool control 80. After a given number of instructions are transmitted to the machine control, the SUPERVISOR program causes instructions in DISK memory 74 to be transmitted to the MAIN STORAGE memory in order to replenish the BUFFER areas, as will appear.

The operator messages are not converted into machine language form, but rather are immediately transmitted to the COMMUNICATIONS TERMINAL 84 and are printed out or otherwise displayed in program language form. If the operator is satisfied that the program may now be run, he actuates the START control on OPERATOR CONSOLE A, FIG. 2.

The first instruction in the machine part program is now transmitted from the BUFFER area in the MAIN STORAGE memory and over CABLEs ONE and TWO to DEVICE LOGIC A, FIG. 3, where it is stored in several ABS units and 4BS units, and from there to CONSOLE LOGIC A, FIG. 2, to several DISC units and MBS units for immediate control of NCMT-A. While NCMT-A is performing the indicated operation, the computer may go off-line and control the other machine tools 62 or run other routine programs for accounting or the like, and return on-line when the machine control indicates that the previous stored instruction has been utilized.

A portion of each part instruction consists of the sequence number, which is stored in the MBS unit labeled SEQUENCE NO. in CONSOLE LOGIC A, FIG. 2. The MBS has output lines labeled PRESENT SEQUENCE NO., which are coupled to and energize the PRESENT SEQUENCE NO. visual indicator in OPERATOR CONSOLE A. The number so displayed indicates the step or sequence number of the instruction now being performed by NCMT–A.

Each instruction in the machine part program is transmitted to the machine control 80 until all of the instructions in the program have been performed. The last instruction prior to program END returns the machine tool to its original starting position, and returns the tool to the tool rack (in the case of a machine tool equipped with an automatic tool changer). The final instruction in the program is program END. If the operator had selected only a single program run, the computer would now go off-line and cease communications with the machine tool station. At this time, the operator may cause the part to be removed from the machine tool and be replaced with another part, either similar or different. Alternatively, if the operator had selected multiple program runs, the computer will again run the same program when the operator actuates the START control on OPERATOR CONSOLE A. This allows the operator to remove the previous part and replace it with a similar part before again causing the program to be automatically run.

When a program makes a normal programmed stop, the PROGRAM STOP visual indicator on OPERATOR CONSOLE A, FIG. 2, is energized. This operation also generates an END-OF-BLOCK signal which is transmitted to a 4BS SENSE unit in CONSOLE LOGIC A, FIG. 2, and entered as a bit in the SENSE signal, mainly for use in departing from an existing program or generating all or partly new programs, as will be explained later. The operator, when the PROGRAM STOP indicator is energized, turns to the printed comments and looks for a comment for the sequence number now displayed by the PRESENT SEQUENCE NO. indicator. After performing whatever function is described by the comment, such as moving a clamp on the worktable, the operator actuates the START control on OPERATOR CONSOLE A and causes the program to continue.

During the running of a program, the operator has a choice of stopping the program in two different manners. By selecting OP STOP (operational stop) on OPERATOR CONSOLE A, the machine tool completes running the whole instruction block presently being performed and possibly others until a point is reached at which an optional stop is contained on the program. If the operator had not selected OP STOP, the control would automatically continue running the program upon reaching the optional stop point. This control is useful when there is no program stop. The other choice is the STOP control, which when actuated instantaneously stops the machine tool even if it is in the middle of an instruction block. In both stop conditions, however, the system retains track of the position of the machine tool, and upon actuation of START continues from the exact point at which the machine tool was stopped.

As previously described, an existing program may be run solely from the controls on OPERATOR CONSOLE 83. The functions of the COMMUNICATIONS TERMINAL 84 may be performed by other apparatus. For example, all programs to be run during a period of time may be initially entered on keyboard 72, FIG. 1, and each of the operator comments for the program typed out on print unit 71. The machine tool operator is then given the typed comments for all of the programs which will be run. After a program is completed, it is only necessary for the operator to actuate the START control on OPERATOR CONSOLE 83, FIG. 2, to cause the next program to be performed. All of the other operations previously explained, such as the stop options, can be controlled entirely from OPERATOR CONSOLE 83, freeing the COMMUNICATIONS TERMINAL 84 for use with other machine tools.

Since the computer has access to information regarding the operating conditions of all of the machine tools controlled thereby, many record keeping functions can conveniently be performed when the computer is not busy performing operations for the machine tools 62 or other peripheral equipment. For example, at any time that one of the machine tools is stopped, as during a tool change, a STATUS bit is recorded which allows the computer to log the time of interruption in the production schedule. Each of the interrupt times for one or any combination of machine tools 62 can be summed by the computer for a given time period, such as daily, and transmitted to COMMUNICATIONS TERMINAL 84 or print unit 71 to record production time. Other uses for the computer when not busy will be apparent to those skilled in the art.

Departure From An Existing Program

During the running of a stored program, the operator may wish to depart from the program, but may not wish to alter the program which has been stored at the computer. Some circumstances of this nature occur when the operator wishes to activate a tool retract, to jump to a previous or a forward instruction, or to change the rate of travel of the tool. These circumstances are due to the nature of the immediate operation, and are not of the type which may repeat themselves, hence no permanent modification of the program is necessary.

The retract operation is intended, for example, when a tool should break during cutting, in either the RUN or CONVERSATIONAL mode, and it is necessary to immediately withdraw the tool without the computer losing track of the positions of the controlled axes. In a simple machine tool, such as a drilling machine in which the drill only moves along one axis, it is obvious that upon tool break the drill should move in an opposite direction, which may be arbitrarily designated "up." Prior controls of this simple nature are capable of retracting a tool to a known rest position. However, in the case of a multi-axis machine tool the problem is far more complex, since "up" along any axis has no particular meaning. The only manner in which a tool can be removed from a multi-axis machine tool is by retracting it along the same path in which it entered the part. The present invention automatically accomplishes this result without losing track of position, allowing the program to automatically continue thereafter.

More particularly, upon the occurrence of a tool break or similar condition at NCMT–A, for example, the operator actuates the RETRACT control at OPERATOR CONSOLE A, FIG. 2. In response thereto, machine control 80 for NCMT–A causes the machine tool to retract along the same path in which it entered the part, back to the starting position of the instruction block controlling the machine tool. This is accomplished in an RDC unit in DEVICE LOGIC A, FIG. 3, which supplies pulses to the ABS units for each axis and which are under control of the instruction, by counting back to the starting point of the instruction block. The RETRACT STOP visual indicator on OPERATOR CONSOLE A, FIG. 2 is energized at this time, indicating to the operator that NCMT–A is now at the beginning of the instruction block identified by the sequence number displayed on the PRESENT SEQUENCE NO. visual indicator. When the RETRACT STOP visual indicator is energized at OPERATOR CONSOLE A, a BEGIN-OF-BLOCK signal is generated and transmitted to the 4BS SENSE unit in CONSOLE LOGIC A to form a part of the SENSE signal, and will be used when the operator wishes a departure in the order of running instructions, as will be explained later.

Upon replacing the broken tool, if the operator wishes to rerun the instruction which was being performed when the retract occurred, he pushes the START control on OPERATOR CONSOLE A. The START signal is transmitted over CABLE THREE to DEVICE LOGIC A, which has retained in the ABS units the instruction which was being performed when the retract occurred. In response to the START signal, the retained instruction is again run, allowing the program to continue thereafter in a normal manner.

Rather than return the instruction being performed when the retract occurred, the operator when in the RUN mode may wish to depart from the order of the instructions contained in the program, by jumping to a previous or a forward instruction. This is accomplished by the operator selecting on the DESIRED SEQUENCE NUMBER control on OPERATOR CONSOLE A, FIG. 2, the sequence number of the new desired instruction. This generates a DESIRED SEQUENCE NO. signal which is transmitted to the 4BS SENSE unit in CONSOLE LOGIC A to form a part of the SENSE signal. The operator now simultaneously actuates the SEARCH and OPERATOR ATTENTION controls on OPERATOR CONSOLE A.

The actuation of SEARCH causes a SEQUENCE NO. SEARCH bit to be entered in the SENSE signal, indicating that the computer is to search and find the sequence number now forming a part of the SENSE signal, and then jump to that point in the program. The actuation of OPERATOR ATTENTION causes this SENSE signal to be transmitted to the computer. It will be recalled that the SENSE signal at this time also contains a BEGIN-OF-BLOCK signal, generated during the retract operation.

The jump sequence may be initiated any time the program is stopped when in the RUN mode, and it is not necessary that it be initiated after a retract operation, as is exemplary disclosed herein. When a program makes a normal program pause or stop, the PROGRAM STOP visual indicator on OPERATOR CONSOLE A, FIG. 2, is energized. This causes an END-OF-BLOCK signal to be transmitted to the 4BS SENSE unit in CONSOLE LOGIC A, and be entered into the SENSE signal. Thus, whenever the jump sequence is initiated, the SENSE signal contains sufficient information to inform the computer of the immediate location of the machine tool, that is, whether or not the instruction which the computer had sent DEVICE LOGIC A has been run.

The computer, under control of the SUPERVISOR program and responsive to the information in the SENSE signal, clears the ABS and 4BS storage areas, FIG. 3, at DEVICE LOGIC A of machine control 80, and calculates the difference between the immediate position of the machine tool and the new position to which the machine tool must move in order to run the instruction corresponding to the new sequence number. The new calculated instruction is transmitted to the ABS and 4BS storage areas of FIG. 3 and causes the machine tool to move to the point necessary to continue with the desired instruction. The operator now actuates the START control on OPERATOR CONSOLE A, FIG. 2, causing the machine tool to thereafter proceed in a normal manner through the remaining instructions in the program.

The SENSE signal also contains information regarding the status of other operating conditions concerning the machine tool. For example, service condition information from the sensors 108, FIG. 2, is entered into the SENSE signal, and is transmitted to the computer either when the computer requests this information or the DEVICE LOGIC unit determines the information should be sent to the computer.

The SENSE circuit is general in nature, and may be used to send various types of information to the computer, allowing the computer to act upon the information in accordance with prior programming. This information may also cause a program departure. Because of the general nature of the communications path, adaptive control of the machine tool is practical. Sensors 108 may include adaptive sensors for monitoring conditions which indicate whether the program is producing the desired results. The SENSE circuit allows such adaptive information to be transmitted to the computer whenever needed, and be used depending upon the programming of the computer. The SENSE circuit will be described in detail later.

Another departure from the operations on a stored program concerns an override of the normal programmed feedrate number, which may occur in either the RUN or CONVERSATIONAL mode. When the machine tool 62 being controlled is a numerically controlled machine tool, each block of instructions contains a conventional feedrate number FR, which indicates the spacing of the pulses to be gated to each of the controlled axes. When the machine tool axes are being driven by motors 100 in a traverse mode, the operator may at certain times wish to change the speed of traverse motion by overriding the programmed feedrate number.

To accomplish a change in feedrate, without modifying the feedrate number contained on the program, which is stored in an ABS FR unit, FIG. 3, the operator manually adjusts the continuously variable OPERATOR FEEDRATE OVERRIDE control on OPERATOR CONSOLE A, FIG. 2, which via the OPERATOR INTERVENTION lines on CABLE THREE changes the frequency or repetition rate of pulses otherwise generated by a VC unit in DEVICE LOGIC A, FIG. 3, hence correspondingly changing the speed of the traverse, without the information being communicated to the computer, or changing the FR number from the computer, as stored in the ABS FR unit.

In some cases, it may be undesirable to allow an operator the option of overriding a programmed feedrate number. This is especially true during certain machining operations, in which a number of factors of which the operator may not be aware have to be considered in selecting the feedrate number. In such a situation, the instruction block which is being performed contains additional information which indicates that operator feedrate override must be prevented. This information is communicated to the machine control 80 and stored in a ABS FR unit at DEVICE LOGIC A, FIG. 3, to cause the OPERATOR FEEDRATE OVERRIDE control to be disabled by disabling the override circuit on the VC unit, FIG. 3. In this manner, a computer override takes precedence over a manual operator override of the programmed feedrate number.

Finally, OPERATOR CONSOLE A contains a number of conventional controls which allow the operator to manually control the machine tool from his operator station. This conventional manual operation causes the computer to lose track of the position of the machine tool, and the machine must be re-zeroed after such operation, as is conventional, in order to regain track of the position of the machine tool. However, as will appear in the section on generating new or partly new programs, such manual controls need never be used, and the computer may, following the teachings of this invention, move under control of instructions created by the operator, and still retain track of the instantaneous position of the machine tool.

The manual controls on OPERATOR CONSOLE A consist of conventional JOG controls for each axis, and controls to determine the DIRECTION and RATE of JOG, as shown in FIG. 2. Upon actuation of such conventional JOG controls, the machine control 80 delivers pulses in accordance with the selected JOG rate, direction and distance. Upon finishing a JOG operation, all axes of the machines may be automatically re-zeroed to a reference phase by actuating the OPERATOR INTERVENTION control called SYNC, located on the OPERATOR CONSOLE A. This control resynchronizes all axes in a conventional manner.

Generating All or Partly New Programs

The control system allows an operator to create an all or partly new program while at the machine tool location, and, when desired, to immediately cause the program to be performed by the machine tool in order to decide whether to retain or dispose of the program. In this manner, corrections and deletions to a new program or an existing program can be made while the part is being machined. When the operator finishes machining the part to a desired stage of completion, the computer has retained the program with all new instructions and corrections incorporated in it, and upon request will replay the new or corrected program at any machine tool.

Such operation substantially reduces the time heretofore necessary to prepare a new program for a part and thereafter correct the program. It should be noted that correction of a program is not limited to situations when the machine tool has improperly machined a part. An operator may decide, after approaching a particular machining operation in one manner, that a different manner of approaching the same operation would more speedily or economically accomplish his purpose in future machining of the same part, and may wish to make a change in the program for this reason.

With the control system of the instant invention, the operator, using the COMMUNICATIONS TERMINAL 84, can add entirely new material to form a new program or to insert between instructions in an existing program, delete any desired instructions, correct or change instructions, and can thus rearrange the order of instructions and in general have complete versatility in making modifications. These changes may be permanently incorporated into the program and the new program stored by the computer for future use in its modified forms. Alternatively, when desired, such changes can be made only for the particular part being machined, and be discarded thereafter.

To initiate this new program operation, the operator first signals the computer that he wishes to communicate with it by actuating the OPERATOR ATTENTION control, as previously described. The selection of OPERATOR ATTENTION generates the REQUEST, SENSE and STATUS signals and in response thereto the computer by means of the MONITOR program activates multiplex channel 1 and causes COMMUNICATIONS TERMINAL 84 to ask for the desired mode of operation. The operator now types in programming language that he wishes the CONVERSATIONAL mode of operation, rather than the RUN mode previously described. The CONVERSATIONAL mode of operation causes future statements to be placed in temporary storage areas for subsequent utilization by the machine tool, and insertion into the program when desired.

After selecting the CONVERSATIONAL mode, the operator either types NEW on the COMMUNICATIONS TERMINAL 84, if a completely new program is to be performed, or a part number, if an existing program is to be run. In the case of a new program, the operator assigns a new part number to the program, and types the same after NEW. In the case of an existing program, the first instruction in the program causes the COMMUNICATIONS TERMINAL 84 to retype the part number in order that the operator may make a visual check.

In the CONVERSATIONAL mode, each part instruction in programming language may come from an existing program stored in DISK memory 74, or from the COMMUNICATIONS TERMINAL in response to an operator forming a new instruction. The part instruction is individually transmitted to the MAIN STORAGE memory for conversion, under control of a modified language TRANSLATOR program, into a machine language instruction. If the part instruction is from an existing program and contains an operator comment, it is transmitted to COMMUNICATIONS TERMINAL 84 at this time.

Generally, the new machine language instruction, now under control of the SUPERVISOR program, is coupled to SELECTOR CHANNEL 1 and transmitted to DEVICE LOGIC A for control of machine motion. The same instruction, but in programming language form, is added to a temporary storage area in DISK memory 74, which is used to compile the program as formed. After all instructions have been executed, whether they consist of instructions originally obtained from an existing program or added from the COMMUNICATIONS TERMINAL, or a combination of both, the temporary storage area in DISK memory 74 contains all instructions in programming language which were to be saved. These series of instructions are now placed into a permanent storage area in DISK memory 74, to form a new permanent part program available to the operator for future production runs.

Whether running a new or an existing program, the operator is asked at various stages of handling each part instruction which of several alternatives available at that point in the processing of the part instruction is desired. Each request to select a group of alternatives is given an arbitrary designation which is typed out on the COMMUNICATIONS TERMINAL 84, and to which the operator responds by typing one of several alternative answers, identified by an arbitrary code. Of course, it is not necessary that the computer ask for the particular alternatives to be chosen, as the operator knows, as will be explained later, that after certain stages of processing the part instruction the same request is always asked, an the operator could select the particular desired alternative without the computer reminding him that this operation is to be performed.

The various alternatives in the CONVERSATIONAL mode allow complete flexibility in the handling of present instruction and future instructions. In response to an OK request being typed by the COMMUNICATIONS TERMINAL, the operator may indicate whether the present instruction is okay and should produce machine motion, or should be ignored entirely and a new instruction obtained from DISK (if an existing program is being continued) or from the COMMUNICATIONS TERMINAL (if a totally new program is being formed or an addition is to be made to an existing program). The operator may also indicate that in addition to the present instruction, a series of instructions up to a designated sequence number are all okay and machine motion should proceed uninterrupted to that point in the existing program.

If a machine motion alternative has been chosen, the operator thereafter actuates the START control on OPERATOR CONSOLE A, FIG. 2, and causes the machine to move in accordance with the single part instruction, or without a pause through a series of part instructions up to a prescribed sequence number. The operator observes NCMT-A perform the part instruction and decides whether the actual machining result equals the desired result. Several alternatives described below are now available which allow the operator to add the part instruction which causes machine motion to the program being formed, or deletes the part instructions if it did not cause the type of machine motion desired, and to continue forming the new program. By deleting the part instruction, it is possible for the operator to control machine motion from the operator station, without creating a new program or making a modification to an existing program.

Once machine motion is complete, the computer under control of the MONITOR program activates the COMMUNICATIONS TERMINAL and asks the operator to select the next of a group of alternatives, identified by a PUT request. In response to the PUT request, the operator may select an alternative which causes the prior performed part instruction to be accepted and put into the temporary storage area in DISK, indicating that the part instruction is to be added and be made a part of the program being formed. Conversely, the alternative may cause the entire deletion of the part instruction, as if it did not produce the desired machine motion. Additional alternatives allow the operator to indicate whether the next part instruction should be obtained from an existing program stored on DISK, or from a part instruction to be supplied by the operator from the COMMUNICATIONS TERMINAL.

If the next part instruction comes from DISK, it is retyped at the COMMUNICATIONS TERMINAL, followed by the OK request previously described, thereby making available the alternatives associated with OK. If the next part instruction was to be supplied by the operator, the MONITOR program causes the COMMUNICATIONS TERMINAL to type a STATE request, which asks the operator to state the instruction he wishes performed. The STATE request occurs whenever an alternative to a PUT or an OK message is chosen which indicates that the next instruction is to come from the COMMUNICATIONS TERMINAL.

In response to the STATE message, the operator may select one of several options, the most common being to type a part instruction in programming language. In the case of an existing program, the part instruction will, if accepted, be inserted between the prior and the next stored instruction. If an entirely new program is being formed, the part instruction will, if accepted, be added in sequence to the previously formed part instructions.

More particularly, the COMMUNICATIONS TERMINAL types a new sequence number for the part instruction just supplied by the operator and retypes in programming language the part instruction, followed by the OK request. The alternatives available in response to an OK request may now be selected, thereby producing machine motion if desired, thereafter disposing of the part instruction by either adding it to the program or deleting it, and finally indicating the location of the next part instruction.

For example, if the operator decides the instruction should not produce machine motion, he types a negative response which causes deletion of the instruction, and causes the computer to return and type another STATE request. However, if the operator decides the part instruction is satisfactory, he types a positive response and then actuates the START control on OPERATOR CONSOLE A, causing the machine to move in accordance with the instruction. Following machine motion, the computer returns with the PUT request, allowing the operator to respond by either accepting the part instruction and causing its insertion into the program, or deleting the instructions entirely, and in either event return by causing the computer to make the STATE request at the COMMUNICATIONS TERMINAL. During these steps, the operator could choose an alternative which causes the computer to obtain the next part instruction from DISK, rather than from the COMMUNICATIONS TERMINAL.

In the CONVERSATIONAL mode, the computer always operates on a block-by-block basis, that is, a PROGRAM STOP occurs after each machine motion. The computer under control of the MONITOR program then activates the COMMUNICATIONS TERMINAL 84 and types the PUT request, discussed above, to determine the disposition of the prior part instruction and the location of the next part instruction. Thus, all of the alternatives are available during the processing of each part instruction, allowing the operator maximum versatility in controlling the machine tool.

Other options are available to the operator in response to a STATE request, in addition to his supplying a part instruction. One such option is a COPY response, available during the modification of an existing program. After proceeding to a specified instruction and thereafter making whatever changes are desired, the remaining portion of the program may be satisfactory as originally written. The operator may now add all remaining portions of the existing program to the program being formed, without running through each remaining instruction in the existing program. This is accomplished by typing COPY on COMMUNICATIONS TERMINAL 84 in response to the STATE message, causing the computer to add to the temporary area in DISK all remaining instructions in an existing program, without causing corresponding machine motion.

Another option available in response to a STATE message is CANCEL, which causes the whole program stored in the temporary area in DISK to be completely deleted. A third option in response to the STATE message is MOVE BACK. This causes the part instruction presently controlling the machine tool to be recompiled into machine language blocks having opposite directions to that indicated by the instruction. These complemented blocks of instructions are coupled in reverse order to the machine tool, in order to automatically retract the tool to the position it had at the start of all blocks of machine part instructions corresponding to the last run programming or source part instruction. Other available options will be described later.

At the end of completing a new or old program, the temporary storage area in DISK memory 74 contains the complete program in programming language. After the last instruction has been performed, the operator types an END code. In response to END, the computer re-zeros the machine tool. For this purpose, a section of the computer continuously logs the absolute position of the machine tool. Each instruction causes the log to be up-dated. In response to END, the computer calculates the directions and dimensions necessary to return the machine tool from its present position as indicated by the log, to its home or start position. At the same time, the computer causes all part instructions in the temporary storage area of DISK 74 to be written over the previous part program in the permanent storage area in DISK 74, thus erasing the old program and replacing it with a new program. Or, in the case of a completely new program, a new permanent storage area in DISK 74 is set aside and the program is stored there.

After the END statement is typed at the COMMUNICATIONS TERMINAL, the machine tool is re-zeroed and the part program placed in DISK storage, the computer causes multiplex channel 1 to cease communications with the COMMUNICATIONS TERMINAL 84, and the control system is now returned to its original state.

CU MT and Related Units

In FIG. 3, CU MT unit 78 (Control Unit for the Machine Tools) is illustrated in intermediate detail. CU MT serves as a time share or priority unit which connects individual DEVICE LOGIC units 81 one at a time to the data processing machine or digital computer 60. In functioning as an interface, CU MT also converts some information supplied by computer 60 over CABLE ONE into a different format, coupled over CABLE TWO, which the DEVICE LOGIC units 81 can interpret. Similarly, certain information originating from the DEVICE LOGIC units are transmitted to CU MT over CABLE TWO, and converted and placed on CABLE ONE in a form readable by computer 60.

Various types of data are supplied from SELECTOR CHANNEL 1 of computer 60 to CABLE ONE. CABLE ONE is composed of a plurality of lines, grouped into DATA BUS lines carrying information for controlling the machine tools and the control system, and TAG lines which individually identify the type of information on the DATA BUS. Both the DATA BUS and the TAG lines on CABLE ONE follow the requirements of the particular computer 60 being utilized.

Each BUS in the control system consists of a plurality of lines which simultaneously carry binary signals thereon for parallel flow of information. The TAGs consist of individual lines, generally only one of which is energized when information is on a BUS, in order to identify the type of information on the BUS. The TAG line in its true state, when energized carries a logical "1" bit, unless indicated otherwise, and is called "up" or "raised." When the TAG line, in its true state, is not energized, the line carries a logical "0" bit, unless indicated otherwise, and is called "down" or "lowered."

The flow of information on the lines of CABLE ONE, and most of the remaining lines in the control system, are generally referenced with respect to computer 60. Thus, lines identified as IN carry information flowing in towards the computer, whereas lines identified as OUT carry information flowing out from the computer. The number of lines associated with each TAG and BUS function is indicated by the number in parenthesis in the drawings (lines for checking parity not being counted).

A single DATA BUS OUT, composed of eight lines, carries all data information flowing out from SELECTOR CHANNEL 1. The type of information on DATA BUS OUT includes an ADDRESS signal which identified the DEVICE LOGIC unit 81 to be connected with the computer, a COMMAND signal which controls the flow of information within and certain operations performed by the control system, and DATA signals which consist of blocks of machine part instructions for controlling the machine tool. The TAG LINES OUT identify the type of signals simultaneously present on DATA BUS OUT. Some TAGS LINES OUT are shared for different function, in which case the past history of information flow must be considered in identifying the type of information on DATA BUS OUT.

DATA BUS IN carries information flowing from the machine tool to the computer, and includes STATUS signals which indicate the status of the CU MT and the DEVICE LOGIC units 81, such as whether a machine tool is stopped or desired data, and a DATA signal in the form of SENSE information, previously described. The type of information of DATA BUS IN is identified by signals on the TAG LINES IN as well as the prior history of the information flow in the control system.

DATA BUS OUT of CABLE ONE is logically directly connected to DATA BUS OUT of CABLE TWO, and likewise DATA BUS IN of CABLE TWO is logically directly connected to DATA BUS IN of CABLE ONE. These DATA BUS lines are also connected to certain of the units in CU MT, for the purpose of conveying certain information on the DATA BUS, as identified by the raised TAG lines, to the units forming CU MT. The CU MT identifies and stores certain of this information, and generates TAG signals for other informations not stored.

The DATA signals flowing over DATA BUS OUT and DATA BUS IN are not stored by CU MT, but rather are allowed to flow directly to a DEVICE LOGIC unit or to the computer, respectively. Other signals on the DATA BUSes are also coupled to the DEVICE LOGIC units and the computer, but the raised TAG lines caused the signals to be ignored at this time, i.e., not gated into storage areas therein.

CU MT is composed of several units, called CUA, CUB, CUC and PLCR/D. The CUA (Control Unit A) generates and stores addresses associated with each of the DEVICE LOGIC units 81 connected in parallel to its CABLE TWO. An address counter in the CUA cycles through the addresses of all of the DEVICE LOGIC units, placing the addresses as generated on an ADDRESS BUS of CABLE TWO. When neither the computer nor any of the DEVICE LOGIC units are on-line, the address counter continuously cycles through all of the addresses.

Each time an address is placed on the ADDRESS BUS, the DEVICE LOGIC unit 81 assigned that address will recognize the address and raise the ADR COMPARED tag. Should more than one DEVICE LOGIC unit 81 answer by raising ADR COMPARED, an error is generated by the CUA and the address counter is prevented from cycling to the next address until the error is corrected.

When a DEVICE LOGIC unit originates a request for communications with the computer, it may at any time raise a UNIT REQUEST tag of CABLE TWO. The UNIT REQUEST tag has no immediate effect until the CUA cycles to the address of that DEVICE LOGIC unit. At that time, the ADR COMPARED is raised, while the UNIT REQUEST is up, causing a tag to be raised called ADR COMPARED AND UNIT REQUEST, indicating that both of the former tags are simultaneously raised by the same DEVICE LOGIC unit.

In response to the raised ADR COMPARED AND UNIT REQUEST tag, CUA is stopped from cycling and the instantaneous address generated thereby, corresponding for example to DEVICE LOGIC A, is maintained over the ADDRESS BUS of CABLE TWO. The CUA also gates its address onto DATA BUS IN of CABLE ONE, while the CUB (Control Unit B) raises a TAG LINE IN which identifies an address, in order to inform the computer of the address of the DEVICE LOGIC unit now on-line. The computer responds by raising a tag which indicates acceptance of the address and a request for the STATUS signal. The CUB decodes this tag and raises the STATUS IN tag on both CABLE ONE and CABLE TWO.

As will appear, the STATUS signal includes bits which indicate the condition of both CU MT and the DEVICE LOGIC units. Those bits concerned with the status of CU MT are formed in the CUB, and are gated onto the lines of DATA BUS IN corresponding to the bit position thereof, in response to raising of the STATUS IN tag. The remaining bits concerned with the status of DEVICE LOGIC A are stored in DEVICE LOGIC A and are gated onto the lines of DATA BUS IN corresponding to the bit positions thereof, in response to raising of the STATUS IN tag of CABLE TWO.

The subsequent operation of the CU MT will be described in more detail in the section on DEVICE LOGIC And Related Units. Briefly, after the STATUS signal is gated onto DATA BUS IN, the computer raises a tag which indicates acceptance of the STATUS signal, causing the CUB to generate a STATUS TRANSFERRED signal, used internally by the CU MT, and to raise a STATUS TRANSFERRED tag of CABLE TWO. These cause the STATUS signal formed partly in the CU MT and partly in the DEVICE LOGIC unit to be cleared and the UNIT REQUEST tag to be dropped by the DEVICE LOGIC unit, thereby also causing the ADR compared and unit request tag to be dropped. When the later tag is dropped, the address counter in CUA is released and continues cycling, in order to service subsequent DEVICE LOGIC units 81. The system is now returned to the computer off-line condition.

When the computer initiates a request for communications with a particular DEVICE LOGIC unit, for reasons to be explained later, it places on DATA BUS OUT the ADDRESS signal of the desired DEVICE LOGIC unit 81, while also raising a TAG LINE OUT indicating an address. The address counter in CUA stops cycling, and the ADDRESS signal on DATA BUS OUT is stored in the CUA and gated onto the ADDRESS BUS of CABLE TWO in place of the address of the address counter. If DEVICE LOGIC A, for example, decodes the address as its own, it raises the ADR COMPARED tag. In response thereto, the CUA gates the stored address also onto DATA BUS IN of CABLE ONE and causes the CUB to raise a TAG LINE IN identifying an address, in order to inform the computer of the address of the DEVICE LOGIC unit actually on-line.

Because the address counter in CUA is stopped during a computer initiated selection, no DEVICE LOGIC unit 81 will be skipped when the address counter is released and allowed to continue cycling. This insures that all DEVICE LOGIC units 81 will be serviced in sequence with respect to requests for communications originated with the DEVICE LOGIC units.

After the address exchange, the computer places a COMMAND signal on DATA BUS OUT of CABLE ONE. The COMMAND signal may indicate several requests, to be explained later, as the computer will transmit machine part instructions to the machine tool, called a Write command, or wishes to receive the SENSE signal from DEVICE LOGIC A, called a Sense command. Other alternatives, illustrated in FIG. 7, include Control commands which control circuits in the DEVICE LOGIC units.

The CUC (Control Unit C) decodes and stores the COMMAND signal on DATA BUS OUT of CABLE ONE, and energizes a signal line or a group of coded control lines of the COMMAND BUS of CABLE TWO, which lines correspond to the particular COMMAND signal generated by the computer. Throughout the time an address is held on the ADDRESS BUS of CABLE TWO, one or more of these lines of the COMMAND BUS of CABLE TWO are also maintained raised by CUC to control certain functions of the addressed DEVICE LOGIC unit.

As the computer drops the COMMAND signal on DATA BUS OUT, the CUB raises the STATUS IN tag of CABLE TWO, thereby causing the STATUS signal to again be transmitted to the computer. Normally, there follows the transfer of DATA, either from the computer to DEVICE LOGIC A, in the case of a Write command, or from DEVICE LOGIC A to the computer, in the case of a Sense command. The transfer of DATA is accomplished by the CUC which raises a TIMING tag on CABLE TWO each time DATA is present on the DATA BUS, unit all DATA has been transferred. The raising of the TIMING tag causes the DATA to be accepted and stored. At all other times, the information, if any, on the DATA BUS is ignored by the storage areas. The operator of the CUC, both when servicing Write and Sense commands, will be explained in the section on DEVICE LOGIC And Related Units.

After the transfer of DATA, the CUB again raises the STATUS IN tag of CABLE TWO, causing the STATUS signal to again be transmitted to the computer. After the computer accepts the STATUS signal, it raises an appropriate tag, causing the CUB to generate the STATUS TRANSFERRED signal and raise the STATUS TRANSFERRED tag. This clears the STATUS signal at both CU MT and DEVICE LOGIC A. The address counter in CUA is also enabled, and continues to cycle from the point it had previously been stopped. The computer now goes off-line with respect to DEVICE LOGIC A.

The CUB contains a master oscillator or CLOCK which generates continuously repeating clock pulses coupled to a plurality of CLOCK lines on CABLE TWO. Each cycle of the CLOCK generates four pulses (C1 through C4), each shifted 90° with respect to the preceding pulse, and each coupled to a respective one of the four CLOCK lines. The clock pulses serve to step the flow of information through portions of the control system, and also serve as the master clock for generating pulses used by the numerically controlled machine tool.

DATA BUS OUT and DATA BUS IN each include an additional line, not indicated in the number in parenthesis in the drawings, for checking parity. The PLCR/D (Parity Line Check Receiver/Driver) is a universal unit, two of which are used for parity operations. The Receiver section PLCR of one PLCR/D is associated with DATA BUS OUT. In order that the sum of bits present at any instant of time is either odd or even, and in the embodiment illustrated is odd, the computer generates an extra bit placed on the parity line of DATA BUS OUT. Should any parallel transfer of information from the computer be received with a sum of bits not odd numbered, the Receiver section generates a parity error, which is stored in the CUC.

The stored parity error in CUC is coupled to the CUB and used to enter in the STATUS signal a bit which indicates a failure of valid information transfer. When the STATUS signal is transmitted to the computer at the end of data flow, the computer is advised of the failure and can initiate a sequence which clears the DATA just transmitted to the storage areas at DEVICE LOGIC A, and retransmits the DATA thereto.

Another PLCR/D is associated with DATA BUS IN. The Driver section PLCD thereof sums the bits then on DATA BUS IN, and if the sum if not odd, generates a parity bit which is coupled to the parity line of DATA BUS IN. The computer, upon receipt of a signal, sums the bits on DATA BUS IN, and when not odd numbered, generates an error sequence which causes the desired signal to be retransmitted to the computer.

Generally, after a DEVICE UNIT initiated communications sequence followed by a transfer of STATUS, of after a computer initiated communications sequence followed by data flow and transfer of STATUS, the address counter in CUA is released and the CU MT goes off-line with respect to the computer. The computer can now run other programs, such as background. Even during communications over CABLE ONE, it should be noted that the SELECTOR CHANNEL 1 electronics operates independent of the CPU and MAIN STORAGE areas, FIG. 1, of the computer. Thus, when a block of data is to be transmitted from the BUFFER area of core to a DEVICE LOGIC unit, the SELECTOR CHANNEL 1 electronics controls the flow of information and the raising of appropriate tag lines, freeing the remaining portion of MAIN STORAGE and the CPU for other functions. For this reason, even while data is in the process of being transmitted, the computer is free to run background programs or perform other functions. These factors in combination with the manner in which machine controls are serviced, place minimum demands upon the computer, and utilize the CPU and MAIN STORAGE areas for only a fraction of total computer time, even when running several simultaneously operating machine tools.

If more machine tools are to be serviced than can be handled by one CU MT, additional CU MTs may be connected in parallel to CABLE ONE, each having its individual CABLE TWO coupled in parallel to the machine controls associated therewith. Each machine control in the total system is assigned a unique address, so that any given address identifies only one machine control. When an address is placed on DATA BUS OUT of CABLE ONE, the first CU MT would gate the address onto its ADDRESS BUS, and wait a specified time for the ADR COMPARED tag on its CABLE TWO to be raised. Should the ADR COMPARED tag not be raised, indicating that the desired machine control is not located on its CABLE TWO, the next CU MT would be actuated, causing the address to be placed on its CABLE TWO. This operation would be replaced until a machine control answered the address. The last CU MT upon receiving no raising of the ADR COMPARED tag, would generate a TAG IN which identifies this error. In this manner, as many machine tools can be serviced as is practical for the storage capabilities and speed of operation of the computer being utilized.

Binary Sequential Format

Multiple binary bits, each bit individually associated with a different line, are used to form the signals on the BUSes. Each bit position may have a logical "0" or a logical "1," and when not indicated otherwise, the presence of any signal or bit of information on a true line is indicated by a logical "1", the negated line of the same signal carrying a logical "0" thereon. The TAG lines, as previously noted, consist of individual lines which carry either a logical "0" or a logical "1", and when not indicated otherwise, a signal corresponding to a logical "1" indicates the true state of the TAG is "raised" or "up", the negated state of the same TAG carrying a logical "0" thereon.

The multiple bits are arranged in groups of eight, each group called a byte, for transmission over a BUS. Since each BUS consists of eight lines (parity lines not counted), one byte of information at a time may be transmitted over a BUS, each line of the BUS carrying a signal bit. In order to transmit DATA signals consisting of multiple bytes, each byte is coupled serially to the BUS until all bytes have been transferred. The machine control contains circuits for gating each byte into different storage location, in a predetermined order, to properly record the information contained therein.

The signals transmitted over DATA BUS OUT of CABLE ONE, FIG. 3, may indicated an ADDRESS, a COMMAND, or a DATA signal, i.e., a block of machine part instructions, depending on the TAG line raised, as previously explained. The binary sequential formate of the DATA signal when representing a block of machine part instructions is illustrated in FIGS. 4A-B. The block of instructions generally follows a conventional format for numerically controlled machine tools, with certain differences as will be apparent to those skilled in the art. As many bytes form the block as is necessary for the amount of information necessary to control all axes of the machine tool and related functions.

As can be seen in FIGS. 4A-B, for NCMT-A illustrated in FIG. 2, the first group of bytes 1 and 2 identify the sequence number of the block. Bytes 3 and 4 contain the feedrate number, with certain of the bits extending over more than one byte and being arranged in a straight binary numbering system. The leftmost bit, in the 0 position, is used to indicate computer feedrate override, which will effectively disable the OPERATOR FEEDRATE OVERRIDE control on OPERATOR CONSOLE A, FIG. 2.

The next group of bytes are reserved for the direction and distance of movement along each axis, the X and C axis being illustrated. In the case of five-axes machine tool, three additional sets of two bytes each would be provided for the other axes. Should any axis not have movement, all 0's are entered for the distance bits. Following the axes bytes, a group of two bytes is provided for spindle speed, followed by a group of three bytes for tool changer information. The final or 14th byte in the illustrated block contains coolant and clamp information, and also bits to indicate PROGRAM END, OPTIONAL STOP, and PROGRAM STOP.

Certain bytes in the block may be modal, that is, the information contained in these bytes should be entered for maching control only when the information has changed, as indicated by a modal enter bit. As illustrated, the bytes for the sequence number, spindle, and tool changer are modal, with the most lefthand or 0 position bit being reserved for a logic "1" to indicate the modal enter bit.

Each block of machine part instructions has the binary sequential format illustrated in FIGS. 4A–B, i.e., contains up to fourteen bytes of information. A single part instruction in programming language, also called a source instruction, may generate one or more blocks of machine part instructions having the format illustrated in FIGS. 4A–B. For example, if the source instruction indicates a contour operation, the language TRANSLATOR program automatically compiles a great number of blocks of machine part instructions, sufficient to perform the contouring operation. However, each block is individually transmitted to the machine control.

The SENSE signal, which originates at the machine control and is transmitted to the computer, has the multiple byte binary sequential format illustrated in FIG. 5. The first group of two bytes includes the DESIRED SEQUENCE NO. signal entered from the DESIRED SEQUENCE NUMBER control of OPERATOR CONSOLE A, FIG. 2. When this signal is to be utilized in a sequence jump operation, the operator will actuate the SEARCH control on OPERATOR CONSOLE A, as previously described. This generates a SEQUENCE NO. SEARCH signal, which is entered in the position 0 bit of byte 1 as a logical "1." The position 1 bit holds the RETRACT STOP signal, and the following position 2 bit holds the PROGRAM STOP signal, both generated when these conditions occur. The position 3 bit is a spare for any desired future use. Finally bits in positions 4–15 hold the DESIRED SEQUENCE NO., and have the same format as used for the sequence number, bytes 1 and 2, in the machine block, FIG. 4A.

The remaining bytes in the SENSE signal, two bytes being illustrated, contain the SERVICE CONDITIONS signals from the sensors 108, FIG. 2, at NCMT–A. The format of these bytes is in accordance with the requirements of the particular sensors being utilized. As previously noted, the SERVICE CONDITIONS may include adaptive information from adaptive sensors.

The remaining multi-bit signals in the control system are each a signal byte, and include the ADDRESS signal on the ADDRESS BUS, the STATUS signal on the DATA BUS IN, and the COMMAND signal on the COMMAND BUS, all of CABLE TWO. The ADDRESS signal or byte, not illustrated, has a straight binary format which identifies in binary form the unique number assigned to each of the DEVICE LOGIC units 81.

The STATUS signal or byte has eight bits, each bit identified as indicated in FIG. 6. Since the STATUS byte is read by the computer, it has a format and nomenclature dictated by the requirements of the particular computer being utilized, except where special meanings are assigned, as indicated. For convenience, the meaning assigned the bits, for the computer used herein, is set out below.

The Attention bit in the present system has a special meaning, and is include when a machine tool is stopped, to log down time during production. In the present control system, the signal bit is a spare, and the Control Unit End bit (generated in the CUB) has significance only in installations using multiple CU MTs. The Busy bit indicates the device, i.e., machine control, cannot accept a Write COMMAND at this time. The Channel End bit, generated in the CUB, indicates end of transmission of DATA either from the computer to the machine control or from the machine control to the computer. The Device End bit is set when the machine control utilizes a block of data, and is ready to receive another block of data. The Unit Check bit is set automatically when the SENSE signal has been stored in DEVICE LOGIC A and is ready for transmission to the computer. The storage of the SENSE signal by DEVICE LOGIC A may have occurred due to certain failures, or in response to an operator manually actuating the OPERATOR ATTENTION control on OPERATOR CONSOLE A. All of the above bits, other than the ones generated by the CUB, are generated by DEVICE LOGIC A.

The final bit, Unit Exception, indicates that data transfer has failed. This bit may be set either by the CUB in response to a parity error, or by DEVICE LOGIC A in response to receipt of a wrong length machine block or an insertion error, to be explained later. This bit requests the computer to clear the storage areas at DEVICE LOGIC A and retransmit the prior retransmit machine block.

The format of the COMMAND signal or byte is shown in FIG. 7. This byte includes Test, Sense, Write and Read commands or signals having a standard meaning determined by the particular computer being utilized, and special Control signals having unique meanings determined by the requirements of the control system. More than one bit may be set by the computer to identify a particular command signal. The CUC decodes the bit having a standard meaning and energizes only one line of the COMMAND BUS of CABLE TWO.

The Test command forces a machine control to transmit its STATUS byte, to insure that the machine control is operational before transmitting data thereto. The Sense command forces the machine control to transmit the SENSE signal to the computer. The Write command indicates that the signal to follow will be DATA, which should be entered into the storage areas at the DEVICE LOGIC unit. The Read signal is a spare in the instant control system, and does not energize any line of the COMMAND BUS.

The Special Control commands are carried in coded form over the COMMAND BUS. The commands identified as Clear Active and Clear Buffer cause the storage areas at the DEVICE LOGIC unit to be cleared, as will appear. The Stop command causes the machine control to instantaneously stop, regardless of the state of completion of the operation being performed. The Auto Override command and the OP (Operator) Override Command are spare commands for the override mode.

DEVICE LOGIC And Related Units

The DEVICE LOGIC unit 81, shown in intermediate detail in FIG 3, performs two major functions. The first is to communicate with CU MT over CABLE TWO, and to control the flow of data and other signals internally within DEVICE LOGIC A. The units labeled ASA ASB and ASC are mainly concerned with these functions.

The second major function of DEVICE LOGIC A is to store and then interpret or convert the block of machine part instructions on DATA BUS OUT of CABLE TWO into a form which can be communicated substantial distances over CABLE THREE to the machine tool location. Associated with this function is the storage and conversion of the SENSE signal, coming from the machine location via CABLE THREE, into a form suitable for transmission to the computer via DATA BUS IN of CABLE TWO. The lines schematically illustrated within DEVICE LOGIC A generally show the signal flow paths for the above DATA signals. The units generally associated with data storage are labeled ABS and 4BS, and the units for conversion and transmission of data are labeled VC, RDC, CP and BTC MASTER.

As previously noted, either the computer or the machine control may initiate communications when the computer is off-line. When the computer initiates communications, the address of the DEVICE LOGIC unit 81 is placed on DATA BUS OUT of CABLE ONE, along with raising of an address indicating tag. As previously described, the address counter in the CUA is stopped, and the address on DATA BUS OUT is placed onto the ADDRESS BUS of CABLE TWO and onto DATA BUS IN of CABLE ONE.

The ADDRESS BUS of CABLE TWO is connected with the ASB unit in each DEVICE LOGIC unit 81. Each ASB has a device identity circuit which permanently stores the address assigned to that DEVICE LOGIC unit. When an ASB recognizes an address on the ADDRESS BUS as its own, it generates an ADDRESS COMPARED signal and raises the ADR COMPARED tag of CABLE TWO. The CUB of CU MT, in response to the raising of the ADR COMPARED tag, places the address thereon the ADDRESS BUS onto DATA BUS IN, to identify the DEVICE LOGIC unit 81 which has recognized and answered the address. In the examples described herein, it will be assumed that DEVICE LOGIC A has been addressed.

Thereafter, a COMMAND byte is placed on DATA BUS OUT of CABLE ONE and is interpreted by the CUC to energize one of the lines of the COMMAND BUS of CABLE TWO. First it will be assumed the CUC has decoded a Write command and has raised the corresponding line of the COMMAND BUS, thereby indicating that the computer wishes to transmit a DATA signal to DEVICE LOGIC A.

Before transmitting DATA, the STATUS byte of DEVICE LOGIC A is checked to insure that the machine control is ready to receive and store data. Following decoding of the Write command, the CUB generates a STATUS IN signal which raises the STATUS IN tags of CABLE ONE and CABLE TWO. The STATUS IN tag of CABLE TWO is connected to the ASC and gates the current STATUS byte stored therein onto DATA BUS IN of CABLE TWO. The part of the STATUS byte formed in the CUB is also coupled over DATA BUS IN, to form a complete STATUS signal. The CUB maintains up the STATUS IN tag of CABLE ONE.

Normally at this time, the machine control is ready to receive new data, and the STATUS byte, see FIG. 6, has all zero bits. Upon receiving the STATUS byte, the computer raises a tag on CABLE ONE indicating the STATUS signal is accepted. The CUB interprets the tag as an acceptance of status, clears the STATUS bits formed in the CU MT, and raises the STATUS TRANSFERRED tag of CABLE TWO to clear the STATUS bits stored in the ASC.

The computer, upon decoding the STATUS byte as having all zero bits, couples the first block of machine part instructions, having the format illustrated in FIG. 4, onto DATA BUS OUT of CABLE ONE, which as noted is directly logically connected with DATA BUS OUT of CABLE TWO. The block of instructions is sent a byte at a time to DEVICE LOGIC A, as will be explained, until all 14 bytes which compose the block of instructions have been transmitted. Each byte is accompanied by raising of the TIMING tag of CABLE TWO, followed by the CU MT raising an appropriate tag of CABLE ONE to indicate that the byte has been passed onto DATA BUS OUT of CABLE TWO along with the raised TIMING tag.

The bytes of data on DATA BUS OUT of CABLE TWO are accepted by only that DEVICE LOGIC unit 81 which has maintained raised the ADR COMPARED tag. In response to the TIMING tag going up at DEVICE LOGIC A, the ASB proceeds to gate the byte of data then on DATA BUS OUT of CABLE TWO to the proper storage area in either the ABS or 4BS units, as will be explained later.

The computer transmits as many bytes of data to DEVICE LOGIC A as are a part of the block, up to the maximum 14 bytes illustrated in FIG. 4. After the last byte has been transmitted, the computer raises a tag on CABLE ONE which is interpreted by the CUB as stop, or end of transmission. In response thereto, the CUC sets the Channel End bit in the STATUS byte and then the CUB raises the STATUS IN tag of CABLES ONE and TWO. The STATUS byte partly stored in the CUC and connected to gates in the CUB, and partly stored in the ASC, is gated onto DATA BUS IN. Upon receiving the STATUS byte, carrying the Channel End bit, the computer raises a tag indicating that status has been accepted. The CUB decodes this tag, clears the STATUS bits stored in the CUC, and raises the STATUS TRANSFERRED tag, CABLE TWO, thereby clearing the STATUS storage area in the ASC. The address counter in the CUA is also enabled, and continues to cycle from the point it had previously been stopped when the computer originally initiated communications. The computer now goes off-line with respect to NCMT-A, recognizing that the block of machine part instructions has been successfully transmitted to and received by DEVICE LOGIC A, and that the system is returned to its rest condition, i.e., the condition of the control system when not communicating with the computer.

As previously mentioned, the computer may transmit up to the maximum of 14 bytes to DEVICE LOGIC A, before stopping transmission and initiating the ending sequence. If more than 14 bytes were transmitted, the ASB would generate a wrong length signal which would set the Unit Exception bit in the STATUS byte in ASC. Similarly, the Unit Exception bit would be set should the ASB attempt to place the same byte of information in more than one storage location. If a parity error occurred during transmission of any byte, the Unit Exception bit would be set in the CUC, as previously explained. Finally, during DATA transmission, a condition may have occurred at NCMT-A which resulted in the Unit Check bit being set in the ASC, thereby requesting a SENSE operation.

The STATUS byte, transmitted after the stop transmission sequence, may contain any of the above described bits in addition to the Channel End bit previously described. The subsequent operation now depends upon the particular bit set in the STATUS byte. Briefly, if the Unit Check bit is set, the computer initiates a sequence, to be described later, which causes transmission of the SENSE signal to the computer, or if the Unit Exception bit is set, the computer issues new COMMAND signals over DATA BUS OUT of CABLE ONE, which the CUC interprets and places on the COMMAND BUS of CABLE TWO. These signals clear the storage areas at DEVICE LOGIC A, followed by a computer initiated sequence which retransmits the whole block of machine part instructions previously sent to DEVICE LOGIC A.

The STATUS byte is thus transmitted at the beginning and end of each computer initiated sequence. The initial transmission of STATUS insures that the DEVICE LOGIC unit 81 is ready to receive the transmission, and the final transmission of STATUS insures that the transmission was successful; or may indicate that other intervening conditions have occurred which require immediate attention.

DEVICE LOGIC A, rather than the computer, may initiate communications when the computer is off-line. As previously noted, this is indicated by the raising of the UNIT REQUEST tag on CABLE TWO. The ASA raises the UNIT REQUEST tag in response to several conditions, as when the machine control is ready to receive another block of instructions, or when the SENSE signal is to be transmitted to the computer. These conditions, as previously noted, also set an appropriate bit in the STATUS byte stored in the ASC.

When the address counter in the CUA cycles to the address of DEVICE LOGIC A, the ASB raises the ADR COMPARED tag. Since the UNIT REQUEST tag is also raised, the ASA raises the ADR COMPARED AND UNIT REQUEST tag of CABLE TWO, stopping the address counter in the CUA. The address maintained by the CUA over the ADDRESS BUS is also gated onto DATA BUS IN of CABLE ONE, along with an address indicating tag, raised by the CUB. The computer indicates that communications should proceed by raising a tag which is recognized by the CUB as a request for the STATUS byte.

The CUB drops the address indicating tag of CABLE ONE, thereby blocking the address gated by the CUA onto DATA BUS IN of CABLE ONE, and raises the STATUS IN tags on both CABLES ONE and TWO. In response to raising of the STATUS IN tag of CABLE TWO, the ASC gates the STATUS byte stored therein onto DATA BUS IN of CABLE TWO. This signal is shunted onto DATA BUS IN of CABLE ONE, which has the STATUS IN tag raised at this time.

The STATUS byte, as shown in FIG. 6, carries a bit corresponding to the present status of the control system. For example, whenever the control system has utilized a block of machine part instructions, and is ready to receive another block of instructions, the Device End bit is set, as will be explained in more detail later. Or, the Unit Check bit may be set, indicating that SENSE information is now contained in the 4BS SENSE at DEVICE LOGIC A, and is ready for transmission to the computer.

In response to transmission of the STATUS signal, SELECTOR CHANNEL 1 signals receipt of the signal, causing the address counter in CUA to be released, and the system returned to the computer off-line condition. SELECTOR CHANNEL 1 may, or may not, also signal acceptance of the status. Briefly, if the computer accepts at this time the STATUS byte, a tag is raised and decoded by the CUB which causes the STATUS TRANSFERRED tag of CABLE TWO to be raised. As previously described, this clears the STATUS storage area of the ASC. However, depending upon the programming of the computer, and particularly the SUPERVISOR program, a testing sequence may be generated to check the STATUS byte again, rather than accept STATUS and cause its immediate clearing.

If a testing sequence is generated, the computer responds to receipt of the STATUS byte as before, but does not raise the acceptance tag. The address counter in CUA is released, as before, and the CU MT returns to the computer off-line condition. The computer thereafter initiates a STATUS test sequence, coupling the address of DEVICE LOGIC A onto DATA BUS OUT of CABLE ONE, and raising an address tag. The address counter in CUA is stopped, the address on DATA BUS OUT of CABLE ONE is stored in the CUA, and then gated onto the ADDRESS BUS of CABLE TWO. In response to the ADR COMPARED tag of CABLE TWO being raised by the ASB, the CUA gates the stored address onto DATA BUS IN and the CUB raises a tag indicating that the machine corresponding to the address on DATA BUS IN is operational.

The computer now couples the COMMAND byte onto DATA BUS OUT, carrying the Test signal illustrated in FIG. 7. In response thereto, CUB raises the STATUS IN tags of CABLE TWO and CABLE ONE, causing the STATUS byte in the ASC to be gated onto DATA BUS IN of CABLE TWO, and thence onto DATA BUS IN of CABLE ONE. The STATUS byte contains the same bits previously transmitted to the computer when the DEVICE LOGIC A had initiated the communications sequence. Upon receipt of the STATUS byte, the computer now raises a tag on CABLE ONE which is decoded by the CUB as acceptance of STATUS, causing the STATUS TRANSFERRED tag to be raised, hence clearing the STATUS storage area in the ASC. The address counter in CUA is also released from its stopped state, returning CU MT to its off-line condition.

Whether or not a testing sequence is programmed, the final step of either sequence is acceptance of STATUS, followed by clearing of the STATUS byte. Thereafter, the response of the computer depends upon the information which was contained in the STATUS byte transmitted to the computer. If the STATUS byte had the Device End bit, another computer initiated sequence is begun which transmits a block of machine part instructions to DEVICE LOGIC A. This sequence follows the same steps previously described for the computer initiated communications sequence.

If the Unit Check bit was set in the STATUS byte, a SENSE operation is initiated by the computer. Similar to all computer initiated sequences, the computer couples the address of DEVICE LOGIC A onto DATA BUS OUT of CABLE ONE, causing the same address to appear on the ADDRESS BUS of CABLE TWO When the ADR COMPARED tag is raised by the ASB, the address stored in CUA is retransmitted back to the computer via DATA BUS IN, while the CUB raises a tag to indicate that DEVICE LOGIC A is operational. The computer now couples a COMMAND byte to DATA BUS OUT of CABLE ONE, along with raising a command indicating tag. At this time, the COMMAND byte contains the SENSE signal shown in FIG. 7, causing the CUC to energize a corresponding line of the COMMAND BUS of CABLE TWO. As will appear, the SENSE bytes are at this time stored in the 4BS SENSE of DEVICE LOGIC A.

The CUB decodes the command indicating tag and determines that the STATUS byte should be transmitted to the computer. Accordingly, the STATUS IN tag of CABLES ONE and TWO is raised, causing the ASC to gate the STATUS signal onto DATA BUS IN. The STATUS byte, previously cleared, should now contain all zero bits, indicating that valid SENSE information is ready to be transmitted to the computer. The computer accepts STATUS by raising a tag, causing the CUB to raise the STATUS TRANSFERRED tag of CABLE TWO, again clearing the STATUS storage area at the ASC.

At the CU MT, the CUB now generates a SERVICE IN signal which raises a tag IN to indicate that the previously stored STATUS has been cleared. This signal also causes CUC to raise the TIMING tag of CABLE TWO. The ASB, in response to raising of the TIMING tag when a SENSE indicating line of the COMMAND BUS is energized, actuates the ASC which begins the SENSE transmission sequence which serially transmits each byte of the SENSE signal, having the format illustrated in FIG. 5, to the computer.

When the first TIMING signal is received, the ASB and ASC gate the first byte stored in the 4BS SENSE onto DATA BUS IN of CABLES TWO and ONE. This byte remains on the DATA BUS IN cables until the computers ready to accept the DATA. When the computer accepts the byte, it raises a tag on CABLE ONE which is decoded by the CUC as receipt of the byte, resulting in dropping of the TIMING tag. When the TIMING tag drops, the ASB and ASC cease to gate the 4BS SENSE, thus completing transmission of the first byte of the sense signal.

The above described steps are now repeated for each byte of the SENSE signal. That is, the CUB decodes acceptance by the computer of the prior byte, and generates the SERVICE IN signal. As previously described, this causes the CUC to raise the TIMING tag of CABLE TWO.

The computer is programmed to stop the SENSE operation when the last byte of the SENSE signal is received. As exemplary described, after receipt of the fourth SENSE byte, the computer raises a tag indicating a stop operation, rather than byte acceptance which requests another byte. In generally the same manner as for a stop operation during the computer initiated sequence and DATA transfer, the CUC drops the TIMING tag, thereby causing the ASB and ASC to block the 4BS SENSE, and generates a Channel End bit. Thereafter, the CUC raises the STATUS IN tag of CABLES ONE and TWO. The CUB and ASC, in response thereto, gate the current STATUS byte onto DATA BUS IN of CABLES TWO and ONE.

The STATUS byte normally has only the Channel End bit set, indicating that the end of transmission was decoded. Upon receipt of STATUS, the computer indicates acceptance by raising a tag decoded in the CUB. As a result, the STATUS IN tag is dropped, and the STATUS TRANSFERRED tag of CABLE TWO is raised, clearing the STATUS storage areas in the CUC and the ASC. Also, the address counter in CUA is released, returning the control system to its off-line state.

The subsequent operation depends upon the bit set in the STATUS byte. If the Channel End bit was set, and the computer check of parity showed an odd number of bits, the computer accepts the bytes of the SENSE signal as valid information and proceeds to decode the information contained therein. If the first bit of byte 1 of SENSE, see FIG. 5, has a logical "1," the computer initiates a sequence number search, previously described. Or bytes 3 and 4 may contain SERVICE CONDITIONS information from the machine tool sensors, which information is handled in accordance with prior programming.

The computer check of parity may indicate a transmission error, in which event the bytes of SENSE are not accepted as valid information. As previously explained, the PLCR/D used as a driver in CU MT generates a parity bit coupled to the parity line of DATA BUS IN each time DATA, herein a SENSE byte, is present which has an even number of bits. If the computer receives an even number of bits over the lines of DATA BUS IN including the parity line, a parity error is generated which causes the computer to initiate a new SENSE operation. DEVICE LOGIC A is again addressed, followed by transmission of the Sense COMMAND. The resulting retransmission of the SENSE signal is identical to the prior SENSE operation. Upon successful transmission, the computer goes off-line as previously described.

Thus, the transmission of DATA in the form of SENSE information is preceded and followed by the STATUS byte. As previously noted, when the operator wishes to communicate with the computer, he may actuate the OPERATOR ATTENTION control at OPERATOR CONSOLE A, FIG. 2. This may be used, for example, should the machine control finish utilizing a block of machine part instructions, and the computer does not return with another machine block.

The actuation of OPERATOR ATTENTION causes the SENSE operation to be initiated. However, at this time, the important information is contained in the STATUS byte, and transmission of the SENSE bytes to DEVICE LOGIC A is only the means utilized to force the transmission of the STATUS byte to the computer. The STATUS byte may contain a Device End bit, in addition to the Unit Check bit. This informs the computer that the machine tool has utilized the previous block and needs the next block of machine part instructions. The subsequent transmission of SENSE in this case, is disregarded by the computer in determining its next operations. Thus, the machine control may initiate communications, either by itself or due to manual actuation, whenever information, either in the form of SENSE and/or STATUS signals, is to be transmitted to the computer.

The other major function of DEVICE LOGIC A is interpolation, i.e., to store and then convert the block of machine part instructions in binary form, on DATA BUS OUT of CABLE TWO, into a serially form which can be communicated substantial distances over CABLE THREE to the machine tool location. Associated with this function is the storage of the SENSE signal, coming from the machine location via CABLE THREE, for subsequent transmission to the computer during a SENSE operation. These functions will now be described, along with certain functions concerned with communications between DEVICE LOGIC A and the computer.

The ABS units, and 4BS MISC-1 and 4BS MISC-2 units serve to store the bytes of DATA forming a single block of machine part instructions. Each ABS (Active-BUffer Store) unit is composed of an active store section and a buffer store section, each section storing two bytes of data. The bytes, for the ABS used for feedrate (FR), correspond to Bytes 3 and 4 of the format, FIG. 4A, and for the ABS used for axis control, correspond to the pair of bytes for that axis, i.e., either Bytes 5 and 6 or Bytes 7 and 8 in FIG. 4A. The 4BS (4 byte storage) units labeled MISC-1 and MISC-2 serve as buffer store for the remaining eight bytes of the machine block which are not stored in the ABS units.

The TIMING contains a byte counter which gates each byte on DATA BUS OUT of CABLE TWO into its proper storage location in either an ABS or 4BS unit. More particularly, as the TIMING tag is first raised on CABLE TWO, the ASB gates open the first of four byte storage areas in the 4BS MISC-1, allowing the byte then on DATA BUS OUT of CABLE TWO to set a memory. As the TIMING tag drops, the ASB blocks the memory input from DATA BUS OUT, thus completing the storing of Byte 1 of the machine block.

When the RIMING tag is again raised, the second byte storage area in 4BS MISC-1 is gated open by the ASB. Thereafter, in response to raising of the TIMING tag, the ASB gates Bytes 3 and 4 into the buffer area of the ABS FR, Bytes 5 and 6 into the buffer area of the ABS X-AXIS, Bytes 7 and 8 into the buffer area of the ABS C-AXIS, Bytes 9 and 10 into the two remaining byte storage areas of the 4BS MISC-1 and Bytes 11, 12, 13 and 14 into the four separate byte storage areas in the 4BS MISC-2. The placement of bytes in storage is determined by the function signified by the byte, and herein follows the format illustrated in FIGS. 4A-B.

After all bytes have been placed into buffer storage, an Interpolator Cycle Control ICC in the ASA is enabled to be actuated. When the prior instruction block completes running, the ICC initiates a four step sequence which serves to replace the DATA then in active with the new machine block to be run, now stored in the buffer area. The actuation of ICC also generates a signal to insure that the pulse forming means, to be described hereafter, has stopped generating axes control pulses.

The first step of the ICC sequence generates a CLEAR ACTIVE signal which erases all information previously stored in the active storage areas of the ABS units. Next, a TRANSFER signal is generated which transfers all bytes now in buffer areas to the active storage areas of the machine control. In the ABS units, the TRANSFER signal gates the byte stored in the buffer storage section into the active storage section, which is connected in circuit with the digital pulse forming means. The 4BS MISC-1 and 4BS MISC-2 serve only as buffer storage. Upon generation of the TRANSFER signal, the bytes stored therein are serially transmitted by the BTC, as will appear, over the DATA BUS of CABLE THREE to active storage areas in CONSOLE LOGIC A, FIG. 2, for direct control over miscellaneous functions of NCMT-A.

The third step generates a CLEAR BUFFER signal which erases the bytes in the buffer storage sections of the ABS units. During the fourth step, the Interpolator Cycle Control resets itself, automatically activating the digital pulse forming means for immediate control of the machine tool, unless disabled by special circuits to be explained.

The CLEAR BUFFER signal also sets a LOAD BUFFER memory in the ASA. This memory in turn causes the UNIT REQUEST tag to be raised by the ASA, and sets the Device End bit in the STATUS storage area in the ASC. Thus, the Device End bit indicates that the machine control has finished executing the machine part instruction block in active storage, and the machine block last sent to DEVICE LOGIC A has been transferred to active storage. Although the transferred block might not yet be controlling machine movement, as will appear later, the completion of the four step sequence of the Interpolator Cycle Control has readied the machine control for receipt of another machine block. In response to raising of the UNIT REQUEST tag, the DEVICE LOGIC initiated communications sequence is begun, and as previously described, will cause the STATUS byte, herein with the Device End bit, to be transmitted to the computer so that another machine block can be coupled to the empty buffer storage areas in DEVICE LOGIC A, prior to the machine block now in active store having completed the axes movement indicated thereby.

The TRANSFER signal initiates the serial flow of bytes on the DATA BUS of CABLE THREE, under control of a pair of BTC (Byte Transfer Control) units, one of which is located in DEVICE LOGIC A, FIG. 3, and the other of which is located in CONSOLE LOGIC A, FIG. 2. The BTC in DEVICE LOGIC A serves as a MASTER, while the BTC in CONSOLE LOGIC A serves as a SLAVE. Responsive to the TRANSFER signal, the BTC MASTER is activated and serially gates each byte stored in the 4BS MISC-1 and 4BS MISC-2 onto DATA BUS of CABLE THREE. At the same time, the BTC MASTER generates INTERLOCK signals transmitted over CABLE THREE, which control the BTC SLAVE in order to place each byte, as received, in the proper active storage location in CONSOLE LOGIC A.

Machine tool movement along each axis is controlled by the bytes transferred to the active storage section of the ABS units in DEVICE LOGIC A. These active storage sections are connected in circuit with a VC (Variable Counter) and an RDC (Reversible Distance Counter) to form increment pulses in accordance with conventional numerical control principles. The increment pulses are transmitted to a CP (Command Phase) having separate convertors for each axis, with square wave outputs shifted in phase with respect to a reference square wave also generated by the CP. The amount and direction of phase shift is directly proportional to the distance and direction of axes movement, respectively. The phase shifted square waves are transmitted over PHASE CMD lines of CABLE THREE to servomechanisms in CONSOLE LOGIC A and NCMT-A, for direct control of axes movement.

The digital pulse forming portion of DEVICE LOGIC A includes the VC and ABS FR for generating continuously occurring feedrate pulses, coupled to the RDC and then to both the ABS XdAXIS and the ABS C-AXIS for generating distance pulses therefrom. The VC consists of a multi-stage binary counter, each stage having an output line carrying a pulse thereon when the stage corresponding thereto is set. As exemplary illustrated, a 15 stage binary counter is used, having 15 output lines labeled F0–F14. The input to the VC is CLOCK pulses on the CLOCK lines of CABLE TWO. When the 15 stage counter in the VC has counted through all stages, it automatically resets and begins counting over again.

The ABS FR includes a series of AND acting gates, each AND having one input connected to the active storage section of the ABS FR, and the other input connected to a particular one of the feedrate lines F0–F14. Depending upon the feedrate number stored in binary form in the active storage section, the AND gates each pass various ones of the feedrate pulses from the VC to a common output line 200. The feedrate number FR stored in the ABS FR is calculated using the known repetition rate of the master oscillator CLOCK pulses. As is conventional, the AND gates block certain CLOCK pulses so that line 200 carries feedrate pulses in which the spacing between pulses represents the maximum velocity of movement of the machine tool. Furthermore, the feedrate pulses on line 200 are generally evenly spaced apart.

Feedrate pulse line 200 is coupled to a second multi-stage binary counter, which forms the RDC unit. Similar to the VC, the RDC contains a fifteen stage binary counter, each stage having a separate output line D0–D14. Each output line is coupled to certain AND acting gates in both the ABS X-AXIS and ABS C-AXIS. As each stage of the counter in the RDC is set, a distance pulse is generated on the corresponding one of lines D0–D14, and is coupled to the corresponding AND gate in the ABS units.

When the RDC has set all stages, and END CARRY signal is generated which is coupled to the Interpolator Cycle Control in the ASA, initiating the four step sequence previously described. A circuit associated with the ICC also generates a STOP COUNTER signal which is coupled to the RDC and prevents the counter from resetting, thus preventing any further distance pulses from being gated onto the lines D0–D14. As a result, the total pulses on lines D0–D14 in sum represent a predetermined "block size," which determines the maximum distance of movement along each axis.

The ABS X-AXIS and ABS C-AXIS each pass certain pulses of the block size to its corresponding output line 202. The number of pulses gated through the ABS is determined by the distance multipler number, stored in binary form in the active storage section of the ABS. Thus, the number of increment pulses on line 202 in sum equal the distance to be travelled. For distances in excess of the maximum set by the block size, one or more blocks of machine part instructions are utilized, as is conventional. If desired, the bytes carrying the distance multipler may include multiplication factors for expanding the maximum distance which can be travelled under control of a single machine block. Such a factor would automatically reset the RDC upon the occurrence of an END CARRY pulse, for a given number of times.

For conversion to a form suitable for transmission over CABLE THREE, the increment pulses on lines 202 are converted in the CP into phase shifted square waves on the order of 1 kilocycle or so. The CP includes a section for the X-AXIS, having an input connected to line 202 from the ABS X-AXIS, a section for the C-AXIS having an input connected to line 202 from the ABS C-AXIS, and a reference section having an input connected to the master oscillator CLOCK pulses. Each section of the CP divides the input pulses thereto by 1,000, producing a square wave output coupled to a corresponding one of three PHASE CMD lines of CABLE THREE.

The pair of bytes carrying distance information for each axis, include a bit set to indicate whether the direction of movement is to be plus or minus. As seen in FIG. 4A, the last bit of the second distance byte, stored in the corresponding ABS AXIS, is set with a "1" to indicate minus direction movement. This bit position is coupled to an Add or Subtract circuit in the CP, and causes the square waves generated thereby to be shifted forward or backward with respect to the reference square wave, depending whether the movement is in a plus or minus direction, respectively.

The square waves on the PHASE CMD lines are coupled to servomechanisms in CONSOLE LOGIC A, which compare the axis square waves with the reference square wave. Each axis is then driven a distance determined by the relative difference between the square waves, and at rate determined by the rate of change of the phase shift.

While the CP is transmitting axes control information, the BTC MASTER, initially actuated by the TRANSFER signal, is gating each byte stored in the 4BS MISC-1 and 4BS MISC-2 serially in turn onto the DATA BUS of CABLE THREE. The transmission over the DATA BUS occurs at a relatively slow transmission rate, such as 50,000 bits per second per line. Since the DATA BUS is composed of eight lines, a byte at a time is transmitted to CONSOLE LOGIC A. The BTC MASTER generates a CLEAR signal after gating all bytes onto the DATA BUS. The CLEAR signal is coupled to the byte storage areas in the 4BS, and clears all areas after the bytes stored therein have been gated onto the DATA BUS.

The bytes of miscellaneous control information which are necessary before the axes begin to move are conventionally programmed in the block of machine part instructions which occurs prior to the machine block which contains the axes movement information. Should any essential miscellaneous control information be contained in the same machine block as the axes movement information, the machine tool generates a conventional inhibit signal which herein may be used to inhibit actuation of the counter in the RDC, thus preventing increment pulses from being generated until the necessary miscellaneous functions have been transmitted by the BTC to CONSOLE LOGIC A and have energized the control relays 106, FIG. 2.

After the RDC has completed generating the block size, the END CARRY pulse is generated and actuates the Interpolator Cycle Control in the ASA, resulting in the chain of events previously described. In part, another four step sequence is initiated, and the RDC is stopped from counting, preventing further increment pulses from being generated. The CLEAR ACTIVE signal clears the bytes stored in the active storage locations in the ABS units. Thereafter, in response to the TRANSFER signal, the block of machine part instructions now in the buffer storage areas are transferred into the active storage areas, followed by the CLEAR BUFFER signal.

It will be recalled that when the machine block just cleared from active storage was transferred to active, the UNIT REQUEST tag was raised and a Device End bit set. Thus, by this time the computer will have sent a new machine block to the buffer storage areas in DEVICE LOGIC A. If the block of machine part instructions had not yet been transmitted to DEVICE LOGIC A, the LOAD BUFFER memory in the ASA is not reset, thereby inhibiting the Interpolator Cycle Control and preventing generation of the CLEAR ACTIVE, TRANSFER and CLEAR BUFFER signals until the LOAD BUFFER memory is reset.

Certain conditions prevent the ASA from automatically generating a START CTR (COUNTER) FORWARD signal which actuates the RDC, after the Interpolator Cycle Control has completed the four step sequence. These conditions cause the machine tool to stop or pause at the completion of the machine block previously controlling movement (although the next machine block has been transferred to the active storage areas). To run the next machine block, the operator must actuate the START control at OPERATOR CONSOLE A, FIG. 2. The START control energizes the START line of CABLE THREE, which is coupled to the ASA and causes the generation of the START CTR FORWARD signal, which then starts the RDC counting.

Some of the conditions which inhibit automatic generation of the START CTR FORWARD signal are as follows. The machine block may contain a PROGRAM STOP bit, see Byte 14 in FIG. 4B, which is stored in the 4BS MISC-2. When the BTC MASTER gates Byte 14 onto DATA BUS of CABLE THREE, the line carrying the PROGRAM STOP bit is allowed to set a PROGRAM STOP memory in the ASA. This memory inhibits automatic generation of the START CTR FORWARD upon completion of the four step Interpolator Cycle Control sequence.

Another pause condition may occur when the machine block contains an OPTIONAL STOP bit. The OPTIONAL STOP bit may be set in Byte 14, and like the PROGRAM STOP bit, is stored in the 4BS MISC-2 and is similarly gated to the ASA when the last byte is gated onto the DATA BUS of CABLE THREE. If the operator wishes to stop at the end of the machine block, he actuates the OP STOP control of OPERATOR CONSOLE A, which control remains actuated until the operator subsequently manually releases it, thereby energizing an OP (OPTIONAL) STOP line of the OPERATOR INTERVENTION lines of CABLE THREE. The line corresponding to OP STOP is coupled to the ASA unit. If the ASA registers actuation of the OP STOP line when the OPTIONAL STOP bit is gated to the ASA, the PROGRAM STOP memory is set.

The above described operations of DEVICE LOGIC A ate those normally occurring without a program departure. Certain of the internally generated signals may also be controlled outside of DEVICE LOGIC A, as by the computer or by OPERATOR CONSOLE A. Those associated with the START control and the OP STOP control of OPERATOR CONSOLE A have been described above. However, other means of controlling DEVICE LOGIC A by the computer or by the OPERATOR CONSOLE A, which may cause program departure, are described below.

The Interpolator Cycle Control in the ASA may be controlled directly by the computer. For this purpose, the coded control lines of the COMMAND BUS of CABLE TWO are coupled to decoding means in the ASA The computer may initiate a sequence whereby only a COMMAND byte is transmitted to the machine control. The CUC, as previously explained, stores the COMMAND and, in the case of a control COMMAND, energizes the coded lines of the COMMAND BUS of CABLE TWO corresponding to the signal contained in the COMMAND byte. If the COMMAND is Clear Active, the decoding means in the ASA causes CLEAR ACTIVE signal to be generated, causing the active storage areas in the ABS units to be cleared. Similarly, the COMMAND byte may cause the ASA to generate the CLEAR BUFFER signal (but when computer initiated, the CLEAR BUFFER signal does not set the LOAD BUFFER flip-flop in ASA, thus no UNIT REQUEST or Device End bit are generated). The direct control of the Interpolator Cycle Control in ASA by signals on the COMMAND BUS of CABLE TWO allows complete versatility in making changes whenever desired. For example, the computer may clear the machine block presently stored at DEVICE LOGIC A and transmit a new machine block for immediately controlling the machine tool, as during a SEQUENCE NO. SEARCH.

Certain of the units within DEVICE LOGIC A may also be controlled by OPERATOR CONSOLE A, to cause a program departure. During axes movement, the operator may wish to slow down the rate of traverse, by overriding the programmed feedrate number now stored in the active section of the ABS FR of DEVICE LOGIC A. To change the feedrate, without making a change in the programmed feedrate number, the operator adjusts the continuously variable OPERATOR FEEDRATE OVERRIDE control at OPERATOR CONSOLE A, FIG. 2, which is connected to the VC unit, FIG. 3, by the OPERATOR FEEDRATE OVERRIDE line of CABLE THREE. As the control is varied, an oscillator in the VC is varied from its preset frequency when no override is present. The oscillator generates pulses gated to the multi-stage counter of the VC, thereby producing feedrate pulses on lines F0–F14 having a rate determined by the feedrate selected by the operator.

In certain circumstances, such as a tapping operation, the computer overrides the operator override of the feedrate, to prevent a change in the programmed feedrate number. When computer override is to be effective, the leftmost bit of Byte 3, see FIG. 4A, is set to indicate that operator feedrate override should be prevented. Byte 3 is stored in the ABS FR, and the leftmost bit position is coupled to the VC to prevent the OPERATOR FEEDRATE OVERRIDE control, when a 1 is set, from varying the frequency of oscillations coupled to the multi-stage counter in the VC.

During axes movement, the operator may wish to stop instantaneously, without completing the remaining axes movement programmed in the machine block then controlling movement. To accomplish this result, the operator actuates the STOP control on OPERATOR CONSOLE A, FIG. 2, coupling a STOP signal to the STOP line of CABLE THREE, which is coupled to the STOP CTR input of the RDC of DEVICE LOGIC A. The STOP signal immediately disconnects line 200 from the multistage counter in the RDC, thus precluding the further generation of distance pulses. Upon actuating the START control at OPERATOR CONSOLE A, line 200 is effectively connected to the RDC and the machine control continues from the exact point at which it stopped, completing the machine block instruction. Or, the operator could initiate other options rather than continue from the prior stopping point.

During axes movement, the operator may wish to initiate a RETRACT operation, as when a tool breaks. Upon actuating the RETRACT control at OPERATOR CONSOLE A, the RETRACT line of CABLE THREE is energized to couple a RETRACT signal to the ASA at DEVICE LOGIC A, which generates a START CTR (COUNTER) REVERSE signal coupled to the RDC. Upon receipt, the RDC initiates a multi-step sequence which first stops the counter without loss of information, by effectively disconnecting line 200 from the input to the counter. The instantaneous binary state of all stages of the counter is then complemented, creating a complementary number in the RDC, and a MIRROR signal is generated. Thereafter, line 200 is again coupled to the input of the counter, and the counter operates in a normal manner to count until all stages are set, at which time the END CARRY signal is generated, which stops the counter.

By completing the pulse block size, but with a complementary number set in the RDC, the number of pulses over lines D0–D14 after initiation of RETRACT exactly equals the number of pulses coupled over those lines under control of the block of machine part instructions prior to the RETRACT signal being generated. The distance of movement is thus equal to movement prior to RETRACT. The MIRROR signal generated by the RDC is coupled to the CP and changes the instantaneous instantaneous of the Add or Subtract circuit, so that the square waves are shifted in the opposite direction. Thus, all axes of the machine tool retract along the same path in which the tool entered the part, back to the exact starting point of the machine block then in active store.

After the RETRACT is completed, the RETRACT STOP indicator is energized and a BEGIN OF BLOCK bit is coupled to the 4BS SENSE at CONSOLE LOGIC A, to be entered in the SENSE signal. After RETRACT, if the operator wishes to rerun the same block of machine part instructions which was controlling the machine tool, as for example, after replacing a broken tool, he actuates the START control at OPERATOR CONSOLE A. The ABS units still retain the same axes distance bytes which were controlling the machine tool when the RETRACT occurred. Upon receiving the START signal, the ASA generates the START CTR FORWARD signal which actuates the RDC and generates distance pulses in accordance with the axes distance bytes retained in the active storage areas of the ABS units. Or, if the operator desires, he could initiate a jump sequence, previously described. At this time, the SENSE signal contains the BEGIN OF BLOCK bit, so that upon transmission of the SENSE signal in order to initiate the jump, the computer is informed that a RETRACT had occurred.

The operator may make a program departure by actuating the JOG controls on OPERATOR CONSOLE A. These controls energize the JOG lines of CABLE THREE, which are connected to DEVICE LOGIC A. To make a jog, the operator selects the desired direction and rate of jog on the JOG controls, and then actuates the control for the desired axis of movement. The RATE control is coupled to the VC and controls a separate circuit which passes certain F pulses, generating JOG pulses which are coupled via an OR circuit in the ABS units to the CP. The AXIS control energizes the corresponding axis section of the CP. Finally, the DIRECTION control is coupled to the Add Or Subtract circuits in the CP and control the direction of phase shift, as previously explained. Movement at the selected rate and direction is terminated by the operator releasing the AXIS control when the machine tool has travelled the desired distance, as indicated by conventional counters (not illustrated) having a read out displayed at OPERATOR CONSOLE A. Upon actuating JOG, the computer loses track of machine tool position. After finishing a JOG, the axes must be returned to their prior position before JOG, in a conventional manner, during which the operator may actuate a SYNC control at OPERATOR CONSOLE A, which causes the axes to return to the reference square wave generated by the CP.

When the SENSE signal is to be transmitted from CONSOLE LOGIC A, FIG. 2, to the 4BS SENSE in DEVICE LOGIC A, FIG. 3, the BTC SLAVE assumes a TRANS (transmit) mode which forces the BTC MASTER to assume a REC (receive) mode. When signals on the INTERLOCK lines indicate that a SENSE byte is now valid on the DATA BUS of CABLE THREE, the BTC MASTER gates open the first byte storage area in the 4BS SENSE, allowing the byte to be loaded therein. Similarly, as the next byte is received, the BTC MASTER gates open the next byte storage area, and so on until all four bytes of the SENSE signal are stored in the 4BS SENSE.

In response to the BTC MASTER returning to a clear state after being in a REC mode, indicating that the 4BS SENSE has completed storing the bytes, the ASA raises the UNIT REQUEST tag. Also, the Unit Check bit is set in the STATUS storage area in the ASC. As previously explained, these conditions cause DEVICE LOGIC A to initiate a request for communications with the computer, which will result in a computer initiated SENSE sequence. In response thereto, the ASB and ASC serially gate each byte in the 4BS SENSE onto DATA BUS IN of CABLE TWO, when the TIMING tag is raised.

CONSOLE LOGIC And Related Units

CONSOLE LOGIC A, Fig. 2, performs two major functions. First, digital-to-analog conversion is performed by DISC (Discriminator) units for each axis. Responsive to the square waves on the PHASE CMD lines of CABLE THREE, the DISC units generate individual axis MOTOR DRIVE signals which directly control the analog MOTOR CONTROL units 102 in NCMT-A. The other major function concerns the receipt, storage and transmission of bytes of DATA over the DATA BUS of CABLE THREE. The BTC SLAVE, MBS, 4BS and SED SENSE units receive and store the miscellaneous bytes for controlling RELAYS 106 in NCMT-A, and store and transmit the bytes forming the SENSE signal.

POWER SUPPLIES for the control system, and for NCMT-A may also be located in CONSOLE LOGIC A. Such power supply units may take any conventional form for producing voltages necessary for operating any of the components in the system, and will not be described further.

Each DISC unit has a pair of inputs, one coupled to the PHASE CMD lines carrying the square wave for controlling axis movement, and the other coupled to a FEEDBACK line from NCMT-A. The FEEDBACK line carries a phase shifted signal from the feedback unit 104, either a RESOLVER for translational axes or an INDUCTOSYN for rotational axes.

The reference PHASE CMD is coupled to each feedback device 104 by lines (not illustrated) between CONSOLE LOGIC A and NCMT-A for providing an input reference square wave. As motors 100 drive each axis, the feedback device 104 corresponding thereto is moved a corresponding amount, shifting the signal output, coupled to the FEEDBACK line of CABLE FOUR, with respect to the reference square wave.

Each DISC is responsive to the phase difference between the signal inputs thereto, representing the difference between the desired position and actual position of the axis, to generate an analog drive signal coupled to the MOTOR DRIVE line of CABLE FOUR. This signal in turn drives MOTOR CONTROL 102, which may be any suitable motor control for converting an analog drive signal into a signal suitable for controlling motor 100. By way of example, MOTOR CONTROL 102 may take the form illustrated in an application of Donald G. Fair and Bertil T. Anderson, entitled "Circuit for Controlling Energization of a Motor," Ser. No. 478,701, filed Aug. 10, 1965, and assigned to the assignee of this application. For each axis, the DISC, analog MOTOR CONTROL 102, motor 100 and feedback device 104 form a closed loop servomechanism.

The BTC SLAVE controls the transfer of miscellaneous bytes within CONSOLE LOGIC A and to the DATA BUS of CABLE THREE. When the BTC SLAVE is in a REC (Receive) mode, the miscellaneous bytes stored in the 4BS MISC-1 and 4BS MISC-2 in DEVICE LOGIC A, Fig. 3, are transferred to active storage locations in three MBS units in CONSOLE LOGIC A, Fig. 2.

Each MBS (Miscellaneous Byte Storage) unit has three separate active storage sections, each section capable of storing one byte therein. Each storage section has an input connected to the DATA BUS of CABLE THREE, and is gated open when the BTC SLAVE generates an INSERT signal coupled to that storage section. The outputs of each MBS consist of 24 lines, one line for each bit of the three bytes stored therein. Certain of the lines may not be used. When a byte is entered into the storage section of an MBS, the eight output lines corresponding thereto are energized and remain energized until the byte is cleared from storage.

The BTC MASTER and BTC SLAVE units generate signals transmitted over the INTERLOCK lines of CABLE THREE, which indicate when one unit places a byte on the DATA BUS and when the opposite unit has received the byte, thereby gating the next byte onto the DATA BUS. When the BTC MASTER steps the first two bytes out of 4BS MISC-1, FIG. 3, the BTC SLAVE, FIG. 2, enters these two bytes in the MBS SEQUENCE NO. As can be seen with reference to FIG. 4A, bytes 1 and 2 correspond to the sequence number of the machine blocks now in the active storage areas of the machine control. The output lines of the MBS SEQUENCE NO., called PRESENT SEQUENCE NO. lines, CABLE FOUR, energizes the PRESENT SEQUENCE NO. visual indicator in OPERATOR CONSOLE A. The third byte storage section in the MBS SEQUENCE NO. is not used.

The remaining six bytes of miscellaneous DATA stored in the 4BS MISC-1 and 4BS MISC-2, FIG. 3, are transmitted and entered by the BTC SLAVE into the MBS MISC-1 and MBS MISC-2. The output lines of the MBS MISC units, called MISCELLANEOUS DRIVE lines of CABLE FOUR, are connected with conventional MISC CONTROL RELAYS 106 in NCMT-A for controlling miscellaneous functions of NCMT-A. The function of each line and its connected RELAY are indicated by the format of the bytes, as seen in FIGS. 4A-B, and will not be described further.

The BTC SLAVE also controls the transfer of the SENSE signal to DEVICE LOGIC A. The four bytes of SENSE are stored in a 4BS SENSE unit in CONSOLE LOGIC A, for transmission onto the DATA BUS. The 4BS SENSE is generally similar to the 4BS units previously described in DEVICE LOGIC A, FIG. 3.

The input lines to the 4BS SENSE supply the information contained in the SENSE format, as seen in FIG. 5. A plurality of input lines, called DESIRED SEQUENCE NO. lines, are connected to OPERATOR CONSOLE A. The first of these lines is connected to the SEARCH control, to enter the SEQUENCE NO. SEARCH bit, previously described. The remaining lines are connected with the DESIRED SEQUENCE NUMBER control, to enter in binary form the sequence number selected by the operator.

Another input line, called the BEGIN OF BLOCK line, enters the RETRACT STOP bit when the RETRACT STOP indicator of OPERATOR CONSOLE A is energized. Conversely, when the PROGRAM STOP indicator of OPERATOR CONSOLE A is energized, an input line called the END OF BLOCK line is energized to enter a PROGRAM STOP bit. The remaining input lines to the 4BS SENSE consist of SERVICE CONDITION lines from the sensors 108 in NCMT-A, and set bits in accordance with the type and number of signals provided by the sensors.

All of the input information to the 4BS SENSE is not entered in storage until ENTER signals are generated by a unit called SED SENSE (Servo Error Detector and SENSE circuit). When the inputs to the 4BS SENSE are to be loaded, the operator at OPERATOR CONSOLE A actuates the OPERATOR ATTENTION control, generating a signal on the ATTENTION line of CABLE FOUR which energizes the SED SENSE. In response thereto, the SED SENSE sequentially generates four ENTER signals which sequentially gate open the four byte storage areas in the 4BS SENSE.

After generation of the last ENTER signal, a GONE signal is generated by the SED SENSE and coupled to the BTC SLAVE to force it into the TRANS (Transmit) mode, initiating the SENSE operation. By means of the INTERLOCK lines, the BTC SLAVE causes the BTC MASTER, FIG. 3, to assume a REC mode. The BTC SLAVE now generates the first of four DRIVE signals, gating the first byte in the 4BS SENSE onto the DATA BUS of CABLE THREE. At the same time, signals are transmitted over the INTERLOCK OF CABLE THREE to the BTC MASTER, FIG. 3. When the INTERLOCK signal indicates that the byte is now valid on the DATA BUS, the BTC MASTER generates an INSERT signal which inputs on an ENTER line and gates open the first byte storage area in the 4BS SENSE, causing the byte to be stored therein. The BTC MASTER then generates an INTERLOCK signal which indicates that the byte was received, causing the BTC SLAVE to generate the next DRIVE signal. This sequence is continued until all bytes have been transmitted to and stored in the 4BS SENSE in DEVICE LOGIC A.

After transmission is completed, the BTC SLAVE clears its TRANS mode, which causes the BTC MASTER to clear the REC mode. This generates a signal coupled to the ASC to set the Unit Check bit in the stored STATUS byte, after which the STATUS byte is sent to the computer as previously described.

DETAILED DESCRIPTION

Conventions

In the following sections, a detailed description is presented of the units forming the control system, and the programs which control the computer. Each unit of the system is generally described in a single section with associated drawings, although circuits from other units may also be described and shown with respect to that unit. The interconnections between units will be apparent from FIGS. 1–3 and the interrelations previously described.

Each unit generates and utilizes a plurality of signals identified by names associated with the lines which carry the signals. Most signals are in binary form, and have potentials representing either a logical "1" bit or a logical "0" bit. Negated, inverted or NOTed signals are indicated by a conventional bar over the signal name, as signal. All lines carrying the same signals thereon are directly connected together by any suitable, conventional means (not illustrated between different units and sometimes within a unit). The signals may be indicated by either the full name or the abbreviation thereof. Where appropriate, arrows indicate the direction of information flow over a line.

Certain units extend over more than one sheet of drawings, each such unit being identified by the same figure number followed by a letter designation corresponding to that sheet of drawings. Where lines extend between the sheets of drawings, a broken line is illustrated on each sheet, at which the figures should be joined together for purposes of tracing the lines between the drawings.

In order to simplify the drawings, certain elements in addition to the interconnecting lines between different units are also not illustrated. Generally omitted are NOT gates which invert signals transmitted to a different unit, driver amplifiers which change the signal level to correspond with the requirements of a different unit, and Delay circuits for delaying a signal by an amount indicated expressly or by the signal time chart, FIG. 17. Thus, a signal in the true state and outputting from one unit, and the identical signal but NOTed, inputting at another unit, indicates that the interconnection therebetween is made through a NOT gate, not illustrated in the drawings.

Figure 8:
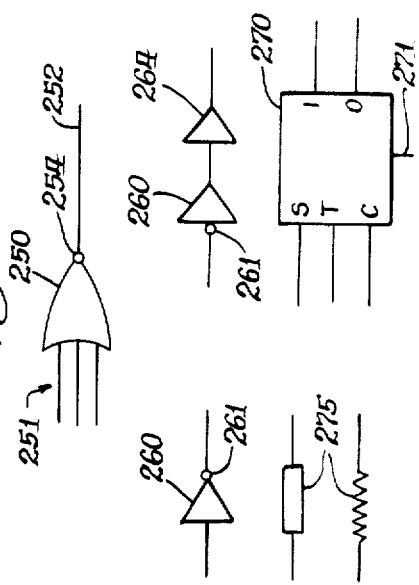
FIG. 8 is a diagram illustrating certain of the circuit elements used in the units forming the control system.

Certain of the circuit elements used in the drawings are shown in FIG. 8. All logical gates are NOR gates, such as shown at 250, having a plurality of input lines 251 and a single output line 252. A small circle or zero 254 between the gate and either the input or output lines thereof indicates that negation occurs in the gate. When only a single input line 251 is utilized, the NOR gate functions as a NOT gate or inverter, and has the triangle symbol shown at 260. The small zero 261 by gate 260 herein indicates that negation occurs in the gate. In some cases, a gate may be an amplifier which does not cause negation or inversion of a signal. Such gates are illustrated without the small zero between the gate and either the input or output lines, as shown for example at 264. Thus, the pair of cascaded gates 260 and 264 in FIG. 8 produce a single inversion or negation of a signal.

Flip-flops used to store signals may be the RS type, formed by cross coupling a pair of NOR gates, or the JK type, indicated by a generally rectangular or square symbol 270. All JK type flip-flops 270 include a set input S, a trigger or toggle input T, and a clear input C. A pair of input lines labeled 1 and 0 are available, the 1 output line indicating that a logical 1 bit is carried thereon when the flip-flop is set. Conversely, the 0 output line indicates that a logical 1 bit is carried thereon when the flip-flop is in the opposite, or clear state. The 1 and 0 output lines are always of instantaneously opposite binary states. A preclear line 271, which carries no letter designation, extends from either the top or bottom of flip-flop 270.

The JK flip-flops 270 operate in a conventional manner. Briefly, each flip-flop 270 responds to only negative going pulses at the toggle T, that is, changes its instantaneous state only on the negative going edge of a pulse. In order to be enabled to change states, the set S or clear C inputs must be grounded. If only the set S input is grounded, the clear C input being held positive, the flip-flop changes state only once, upon the first occurrence of a negative going toggle pulse. The flip-flop will not reset to the clear state until either the preclear line 271 is made positive or the clear C input is grounded. With both the set S and clear C held grounded, the flip-flop 270 alternately changes state with each negative going toggle pulse, and hence becomes a divide by two circuit. Whenever the preclear line 271 goes positive, which is referred to as a preclear operation, the flip-flop assumes a clear state.

All gates and flip-flops may be formed by any conventional circuit elements connected to perform the above indicated logical operations. In the embodiment which was constructed, all gates and flip-flops were integrated circuits, type RTL from Motorola. Other conventional circuit elements such as transistors, resistors, capacitors and the like were also used. In the drawings, resistors are indicated by either of the symbols 275 shown in FIG. 8. For completeness, the values for resistors and capacitors are given for some circuits. It should be understood that such values are exemplary only and are not to be taken as limiting.

Certain individual units are used in several places in the system, such as the ABS and 4BS storage units, and the circuit therefore is universal in nature. Some individual units, such as the BTC, serve slightly different purposes in different parts of the system. To provide maximum interchangeability and standardization, a single individual unit having all circuits necessary for all parts of the system is provided. Thus, some circuits on these units are not used in certain portions of the system, but are used in other portions of the system.

Some units, such as those serving merely storage purposes, may be formed by any conventional circuit arrangement. Such units are shown in simplified schematic form in the drawings, and the known type of circuit arrangements represented thereby will be apparent from the description of the circuit given in the appropriate section.

The power requirements of the system may be supplied by conventional power supplies, and, if desired, additional regulators may be associated with each individual unit in the system. Exemplary positive and negative voltages for the illustrated circuits are indicated directly on the drawings.

The computer or data processing machine 60 may be any high speed, general purpose, digital computer or the equivalent thereof. The control units and other peripheral equipment are of a type compatible with the computer being utilized. In the exemplary embodiment disclosed herein, the computer and related units were the following commercial units. It is to be understood that this information is given for completeness only, and in no way represents the only or the preferred apparatus. Computer 60 was an IBM (International Business Machines) System 360/Model 30, equipped with one Multiplex Channel and two Selector Channels. The following units of IBM were also used. COMMUNICATIONS TERMINAL 84, FIG. 1, was a Model 2740, connected to CU COMMUNICATIONS TERMINAL 86, a Model 2701. CARD READ/PUNCH unit 70 was a Model 2540, PRINT unit 71 a Model 1403, and KEY BOARD 72 a Model 1052, all connected to Multiplex Channel 1. The CU AUX STORAGE unit 75 was a Model 2841, connected to several DISK storage units 74, each a Model 2311. The MAIN STORAGE core of computer 60 stores 65,536 bytes, and has in the CPU about 4,000 bytes of fixed array logic, called read-only storage (ROS), and an arithmetic and logic unit (ALU). The computer operates at a clock rate of approximately 666 kilohertz.

The BUS and TAG lines from the computer have a form determined by the type of computer being utilized. In the disclosed embodiment, the nomenclature of the lines may be seen with reference to FIGS. 17A and B, which shows a chart of the time sequence of certain signals which occur over the lines. For requirements and system specifications concerning channel to control unit communications, which the system units disclosed herein must follow in order to be compatible with the type of computer being utilized, reference should be made to the appropriate manuals of the manufacturer of the computer, such as the IBM Original Equipment Manufacturers Information (OEMI) manual for the computer disclosed above.

Various lines including the BUS and TAG lines carry valid information only after the lapse of a time sufficient for the potential on the line to have changed states. In the case of relatively short lines, potentials are valid at the opposite end a short time after being placed at one end, whereas for relatively long lines a longer lapse of time is necessary before the information on the line is valid. Some circuits described herein are not effective until the lapse of a time sufficient for valid information to have appeared.

Throughout the drawings, lines forming DATA BUS IN and DATA BUS OUT are also designated by the position number of the line and the designation BUS IN or BUS OUT respectively.

Other conventions used in the drawings will be described in the section most applicable to the convention.

Control Programs

Internal operations of computer 60 are under control of various control programs, as distinguished from the part programs which control operations to be performed by a machine tool on a part. Such part programs take a conventional form, following the format of FIG. 4, and will not be described further in this section.

Certain basic internal operations of the computer, and filling of the BUFFERS for the machine tools, are under control of a SUPERVISOR program. To control many Input/Output (I/O) functions, including communications with the COMMUNICATIONS TERMINAL, and performing a sequence number search operation, a MONITOR program is utilized. Finally, for conversion of part programs in programming language into part programs in machine language form, a language TRANSLATOR program is utilized.

Generally, the computer is also under control of additional programs of a conventional nature (not illustrated), such as background accounting programs and the like. For clarity, the drawings generally illustrate only modifications and additions to be made to known programs, the complete operation of the system being thereby apparent to one skilled in the art.

For the disclosed system, the SUPERVISOR program may be a standard IBM 16 K DOS (Disk Operator System) Supervisor, modified with the additions illustrated in FIG. 10. Control of I/O functions, such as communications with the COMMUNICATIONS TERMINAL, is accomplished by known I/O programs and subroutines, modified by the addition of the MONITOR program, shown in FIG. 11. The language TRANSLATOR used in the RUN mode may be a known translator capable of converting, in a single pass, a part program in programming language form into a part program in machine language form, as for example SPLIT (Sundstrand Program Language Internally Translated). In the CONVERSATIONAL mode, where each source or language part instruction is individually translated into machine language form, the TRANSLATOR program is modified by the additions shown in FIG. 12.

The control programs place minimum demands upon the computer, allowing the computer to run other background programs for a majority of the available computing time. In an embodiment of the invention which was constructed, the operation of plural machine tools required a small percentage of core time, the majority of core time being utilized to run, in an interleaved manner, background accounting programs.

Figure 9:
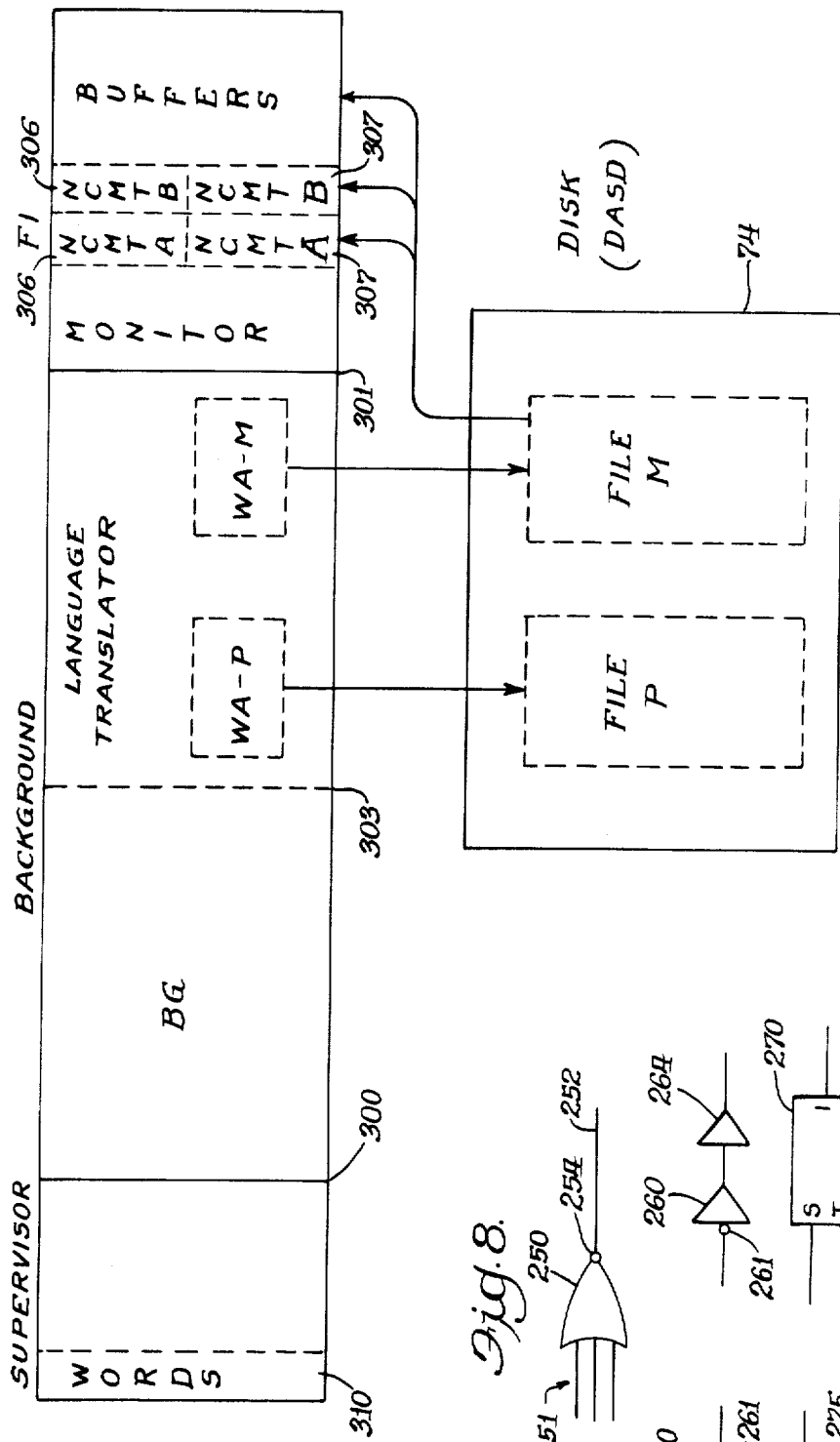
FIG. 9 is a diagrammatic representation illustrating the location of data within the MAIN STORAGE core of the data processing machine.

The illustrated programs, when active, are located in the MAIN STORAGE core of the computer, and have core locations illustrated in FIG. 9. The MAIN STORAGE core is divided into three partitions. The first partition, for the SUPERVISOR program, extends from low core (illustrated to the left in FIG. 9), to an origin 300 of Background (BG). The next partition, for Background, extends from origin 300 to an origin 301 or Foreground 1(F1). The final partition, for the MONITOR program and the machine tool BUFFERS, extends from origin 301 through the remaining portion of high core. As is conventional, the partitions are protected by storage keys which prevent data in partition from being written onto another partition.

When not active, the language TRANSLATOR program is stored on DISK 74, or any other suitable direct access storage device (DASD). When a part program is to be converted into machine language form, or statements from the COMMUNICATIONS TERMINAL are to be interpreted, the TRANSLATOR program is rolled into an upper portion of background, and occupies the space diagrammatically illustrated to the right of a dashed line 303, FIG. 9. At this time, the Foreground 1 storage keys are modified and the origin 301 of Foreground 1 is expanded to location 303, allowing the language TRANSLATOR to have Foreground 1 program priority.

Only one partition of the MAIN STORAGE core is operative at any one time. Thus, for example, only the SUPERVISOR, or the MONITOR, are operative at any one time. During the running of any one machine tool, control of the computer is initially by the SUPERVISOR program, and thereafter control transfers between various of the programs, depending upon the operations to be performed.

Also located in Foreground 1, adjacent the MONITOR, are the separate BUFFER storage areas associated with each machine tool in the control system. The BUFFER areas for NCMT-A and NCMT-B are particularly specified, with the remaining areas being reserved for the other machine tools in the system. Each machine tool BUFFER has a pair of storage areas 306 and 307, one being active and the other being reserve. When the active area, which could be either 306 or 307, becomes empty, control is automatically switched to the opposite or previously reserve area, and a buffer filling routine in the SUPERVISOR is automatically initiated to fill the just emptied active buffer, which now serves as the reserve buffer. In a specific embodiment, each BUFFER area 306 and 307 stored 41 blocks of 20 byte length machine part instructions, having the format generally illustrated in FIGS. 4A–4B. Each block consisting of 20 bytes since all machine tools were five axes models, and thus each block consisting of the 14 bytes illustrated in FIG. 4 plus an additional six bytes for the three axes not illustrated.

In addition to BUFFER areas 306 and 307 for each machine tool, a conventional F1 area (not illustrated), which herein immediately preceded the corresponding BUFFER areas for each machine tool, is provided to store the STATUS and SENSE byte for each machine tool device. As is known, the channel electronics for SELECTOR CHANNEL 1 converts the signals on the BUS and TAG lines into interrupts and other signal forms which are then stored in these known F1 areas, in order to make the information available in a form readable by the programs. This and other conventional operations by which DATA on the various computer CHANNELS is converted into conventional type signals and interrupts internally used within the computer will not be further described, forming no part of the present invention.

The operation and advantages of the illustrated programs will now be briefly described. The SUPERVISOR program oversees the running of the other programs, and controls many functions associated with communication between the computer and the machine tools. The SUPERVISOR controls the transmission of all types of data to the machine tool, such as the the transmission of a block of machine part instructions from the BUFFER area, and the generation of the COMMAND signal which proceeds the transmission of DATA. When the active BUFFER area 306 or 307 becomes empty, the SUPERVISOR automatically sets the active buffer as reserve, sets the reserve buffer active, and initiates a buffer filling routine which transfers DATA from DISK 74 to the new reserve buffer. The SUPERVISOR also services requests for communications with the computer, as indicated by interrupts appearing in the F1 area. For example, the computer may be working on a background accounting program when a machine tool initiates a request for communications. This request generates a CHANNEL 1 interrupt which causes the running of the background program to be suspended, and the machine request is thereafter immediately serviced. During the servicing of interrupts, an analysis is made of certain bits of the STATUS and SENSE bytes.

The MONITOR program generally controls I/O bound operations, as communications with the COMMUNICATIONS TERMINAL, and control of the sequence number search operation which requires access to DATA stored on DISK. When a program is initially to be run, the MONITOR via the COMMUNICATIONS TERMINAL requests the operator to select either the RUN or CONVERSATIONAL mode of operation. In response to the operator's selection, the language TRANSLATOR program is rolled into the expanded F1 area for interpreting subsequent operator responses to computer initiated requests for information.

Another function of the MONITOR is to activate the COMMUNICATIONS TERMINAL when a Unit Check bit in the STATUS byte is received from a machine control, without the presence of a SEQUENCE NUMBER SEARCH bit in the SENSE signal. These bits of the STATUS and SENSE signals are generated when an operator actuates the OPERATOR ATTENTION control at OPERATOR CONSOLE A, FIG 2, without simultaneously selecting a SEQUENCE SEARCH, thus indicating that the operator desires to communicate with the computer. The final function of the MONITOR is to fill the BUFFERS each time a program is initially started, with subsequent filling of the BUFFERS thereafter being under control of the buffer filling routine in the SUPERVISOR program.

When in the RUN mode, a standard language TRANSLATOR program is rolled into the expanded F1 area by the MONITOR, whereas when the CONVERSATIONAL mode, the modified language TRANSLATOR program is rolled into the expanded F1 area. Either TRANSLATOR program converts part instructions in programming language into machine language form, and writes the converted machine language part instructions onto DISK for subsequent transmission to the buffer storage area in F1 and eventual transmission to the machine tool. In the CONVERSATIONAL mode, the part instructions may be presented in the modified TRANSLATOR either from an existing program of DISK, or from an operator supplied statement made via the COMMUNICATIONS TERMINAL.

The above described programs allow the computer to operate with maximum efficiency, and place minimum demands upon computer time. Several important features of the programs contribute to this result, only some of which are briefly described at this time. The functions performed by the monitor are I/O bound, and while waiting for a response from the COMMUNICATIONS TERMINAL or from DISK, no other functions of that program can proceed. However, because the MONITOR is separate and apart from the supervisor other programs can run while a response is awaited, which could not occur if the MONITOR was a part of the SUPERVISOR.

Another important feature is that the SUPERVISOR will permit an interrupt within an interrupt, that is, all SELECTOR CHANNEL 1 interrupts are given priority over all other types of interrupts. For example, if a message concerning NCMT-A is being prepared for transmission to the COMMUNICATIONS TERMINAL, the occurrence of any machine control initiated request for communications with the computer (for example by NCMT-B or even NCMT-A) would take precedence and stop the preparation of the message. The computer now services the interrupt from SELECTOR CHANNEL 1, and only upon completion thereof will it return to finish preparing the message for the COMMUNICATIONS TERMINAL. Such operation is advantageous because the machine tools, although using a relatively small amount of computer time, must be serviced as soon as possible when information is required. The interrupt of an interrupt routine causes all machine tool controls to have the highest priority overall other jobs the computer is to run.

Another feature is that the BUFFERS in F1 are filled by the SUPERVISOR (after initial loading) rather than the MONITOR, allowing a buffer filling routine to have priority over other types of interrupt requests occurring over SELECTOR CHANNEL 2. Also, while data in the active BUFFER of a machine tool is being transmitted to the machine control, the reserve BUFFER therefore may at the same time be filled from DISK. Other advantages will be apparent from the detailed description of the programs.

In the following sections, a detailed description of the logic flow charts for the illustrated programs will be presented. The shape of the logic blocks generally defines the type of logical function being performed. Usually, a rectangular block indicates a processing function or step, while a diamond shaped block indicates a decision making function. A hexagon shaped block indicates a previously defined function, and as used herein may indicate a function defined by a standard or known program not illustrated, such as the standard SUPERVISOR program previously identified. A trapezoidal shaped block indicates an I/O function.

The flow path between different sheets of drawings are indicated by the pointed block or arrow, which carry a three code designation. The first letter of the code indicates the letter sheet designation of the same figure number, at which the flow chart continues. The last part of the code is the letter and number designation of the location on that sheet at which the chart continues. For this purpose, the blocks within a sheet of drawings are divided into columns and rows, the columns being identified by numbers and the rows being identified by letters. For example, a code DC3, used in FIG. 10, indicates that the flow chart continues on FIG. 10D at block location C3, i.e., column 3, row C, at which an input arrow labeled DC3 is found for continuing the logic path.

For clarity, only certain of the logical flow paths will be described in detail, the other alternatives and possibilities in the program being apparent by following the various possible branches through the flow chart. Certain standard nomenclature is used throughout the flow charts. Tasks or interrupts which are to be performed are characterized and placed in a corresponding task or queue. When the task is performed, the queue pointer is moved to the next task in the queue in order to advise the program of the next step to be performed. When a task is de-queued, it is removed from the table.

SUPERVISOR program

Logical flow charts of modifications and additions to the standard SUPERVISOR are illustrated in FIGS. 10A–I. A number of standard words, which generally contain control information necessary for the SUPERVISOR to interrupt programs and retrieve data, are stored in a low core section or area 310, FIG. 9 of the MAIN STORAGE core. Word location area 310 also contains areas for saving old words and areas for the active words. The words, as is well known, are loaded in the Word location area 310 by existing software and/or hardware programming for the computer being utilized. For the modified SUPERVISOR, the following standard words and abbreviations will be used, which have conventional meanings briefly defined for convenience as indicated:

| Abbreviation | Word | Definition |
|---|---|---|
| CAW | Channel Address Word | Address to CCW. |
| CCW | Channel Command Word | Includes COMMAND byte, the number of bytes of data to be transferred, the location of this data in the computer. |
| CSW | Channel Status Word | Includes the STATUS byte. |
| PUB | Physical Unit Block | Table containing physical information about the devices external to the computer. |
| PSW | Program Status Word | There are many PSWs; the I/O PSW includes the system mask, storage protection key, interrupt code, and the address of the next instruction to occur. |

Figure 10A:
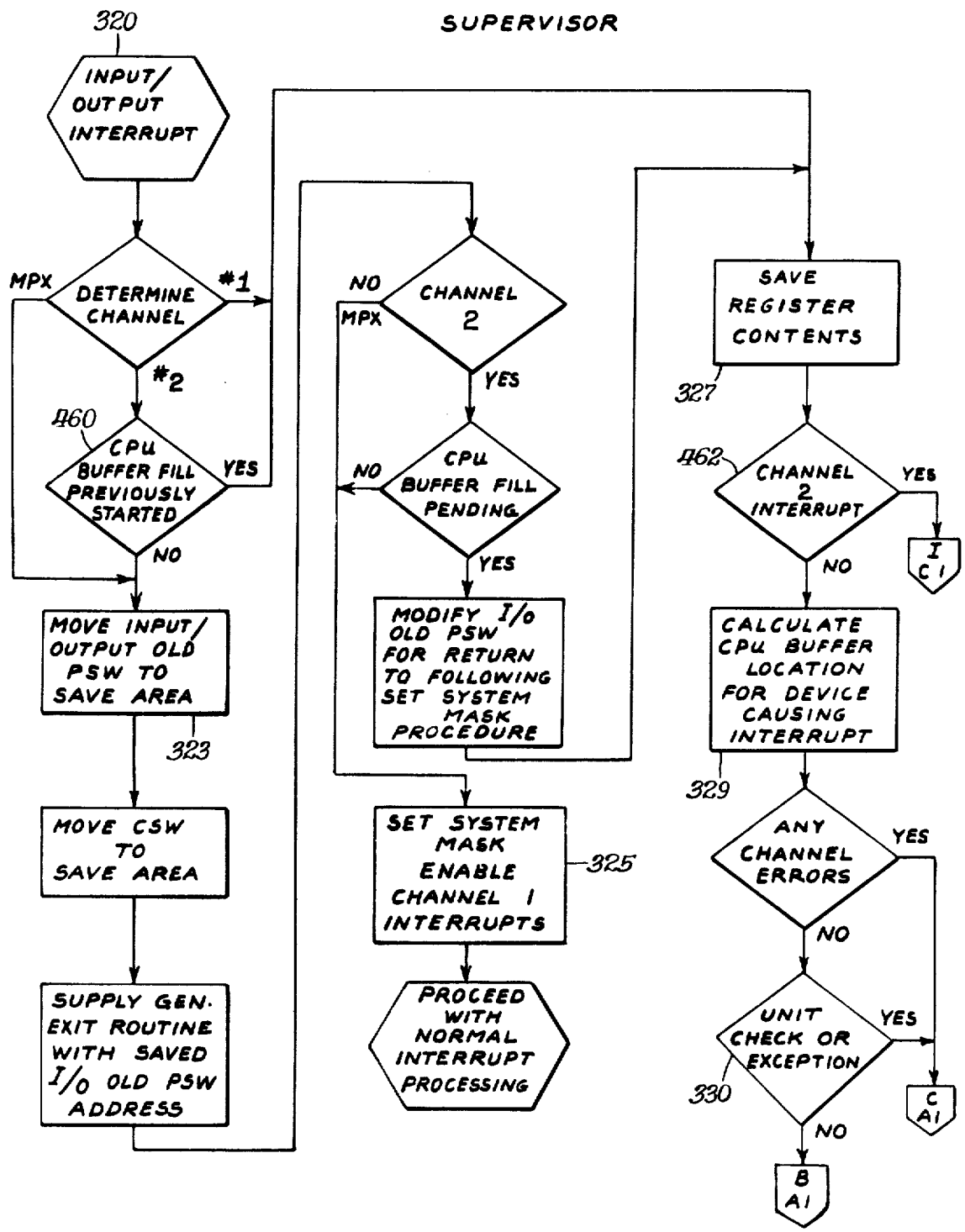
Figure 10B:
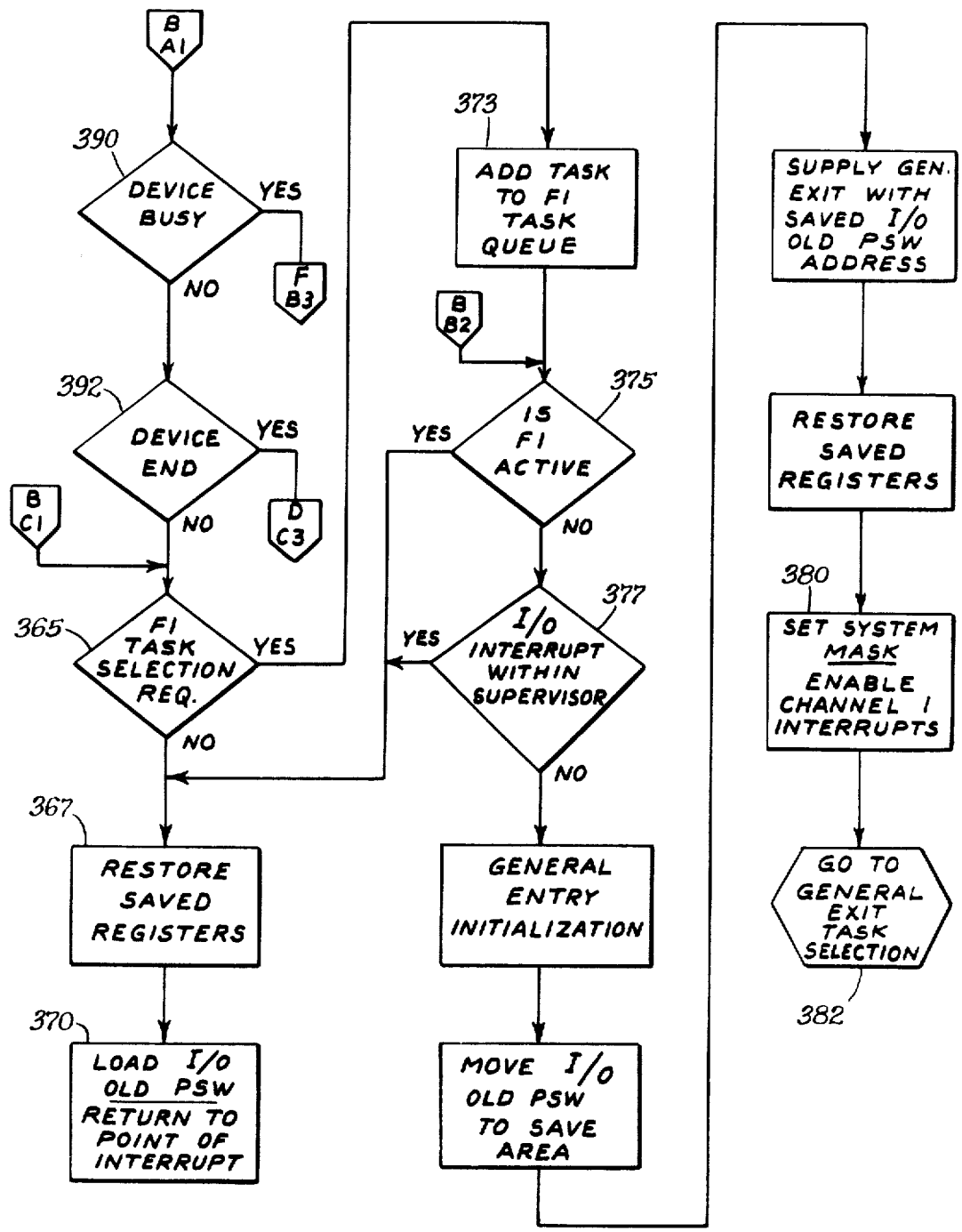

Turning to FIG. 10A, an Input/Output interrupt, generated by the Channel Electronics, is presented to the SUPERVISOR at a process step or block 320. Upon receipt of an interrupt, the system mask is set to disable or block the passage of all subsequent interrupts to block 320. The interrupt is then analyzed to determine which channel caused the interrupt. If the interrupt was on CHANNEL 2 (SELECTOR CHANNEL 2, FIG. 1) and CPU BUFFER fill was not previously started, or on the MPX (MULTIPLEX CHANNEL 1, FIG. 1), then a block 323 moves the I/O old PSW to save area, after which the CSW is moved to a save area. This insures that the SUPERVISOR can return to the point at which it is not exiting, after servicing the present interrupt. For the above causes of an interrupt, control proceeds to a block 325 at which the system mask, previously set in block 320, is modified to enable CHANNEL 1 interrupts. Then the SUPERVISOR proceeds to pass control to standard interrupt processing procedure defined by the standard SUPERVISOR program, not illustrated.

Process block 325 enables the interrupt of an interrupt feature, giving CHANNEL 1 interrupts priority over the processing of the interrupts from other channels. For example, should a CHANNEL 1 interrupt occur while the SUPERVISOR is processing a MULTIPLEX interrupt, block 320 will pass this interrupt and immediately begin to process it. This insures that all machine tools will be serviced whenever data is needed.

By way of example, the processing of an interrupt caused by a machine tool request for a SENSE operation will be described in detail. For this example, it will be assumed that the SENSE request occurred because an operator at OPERATOR CONSOLE A, FIG. 2, during a RUN mode, initiated a sequence number jump operation. As previously described, the operator selects on the DESIRED SEQUENCE NUMBER control of OPERATOR CONSOLE A, a sequence number to which the program is to jump, and actuates the RETRACT control. After RETRACT, the operator simultaneously actuates the OPERATOR ATTENTION control and the SEARCH control. This causes the SED SENSE of CONSOLE LOGIC A to load and then causes the SENSE byte to be transmitted to DEVICE LOGIC A, FIG. 3.

The SENSE byte, now stored by the 4BS SENSE, contains the SEQUENCE NUMBER SEARCH bit, the DESIRED SEQUENCE NUMBER bits, and RETRACT STOP bit, as seen in FIG. 5. Upon storage in the 4BS SENSE, DEVICE LOGIC A raises the Unit Request tag, thus initiating a device request for communications with the computer. In response to raising of the Unit Request tag, the STATUS byte is transmitted to the computer. It should be noted that the SENSE bytes have not yet been transmitted to the computer. Acceptance of STATUS causes a CHANNEL 1 interrupt to be generated, and the STATUS byte with the set Unit Check bit is stored in the CSW.

The CHANNEL 1 interrupt is is received by block 320, FIG. 10A, and determined to be a CHANNEL 1 interrupt, causing control to branch to a block 327. The contents of the standard, general purpose CPU register are now saved, so that processing of the CHANNEL 1 interrupt can continue. A block 329 now determines the location of the BUFFER areas 306 and 307, FIG. 9, for the machine tool which caused the interrupt, herein the active and reserve areas for NCMT–A. This step also determines the areas immediately preceding the BUFFERS, which have storage locations (presently empty) for the NCMT–A status and SENSE bytes.

Figure 10C:
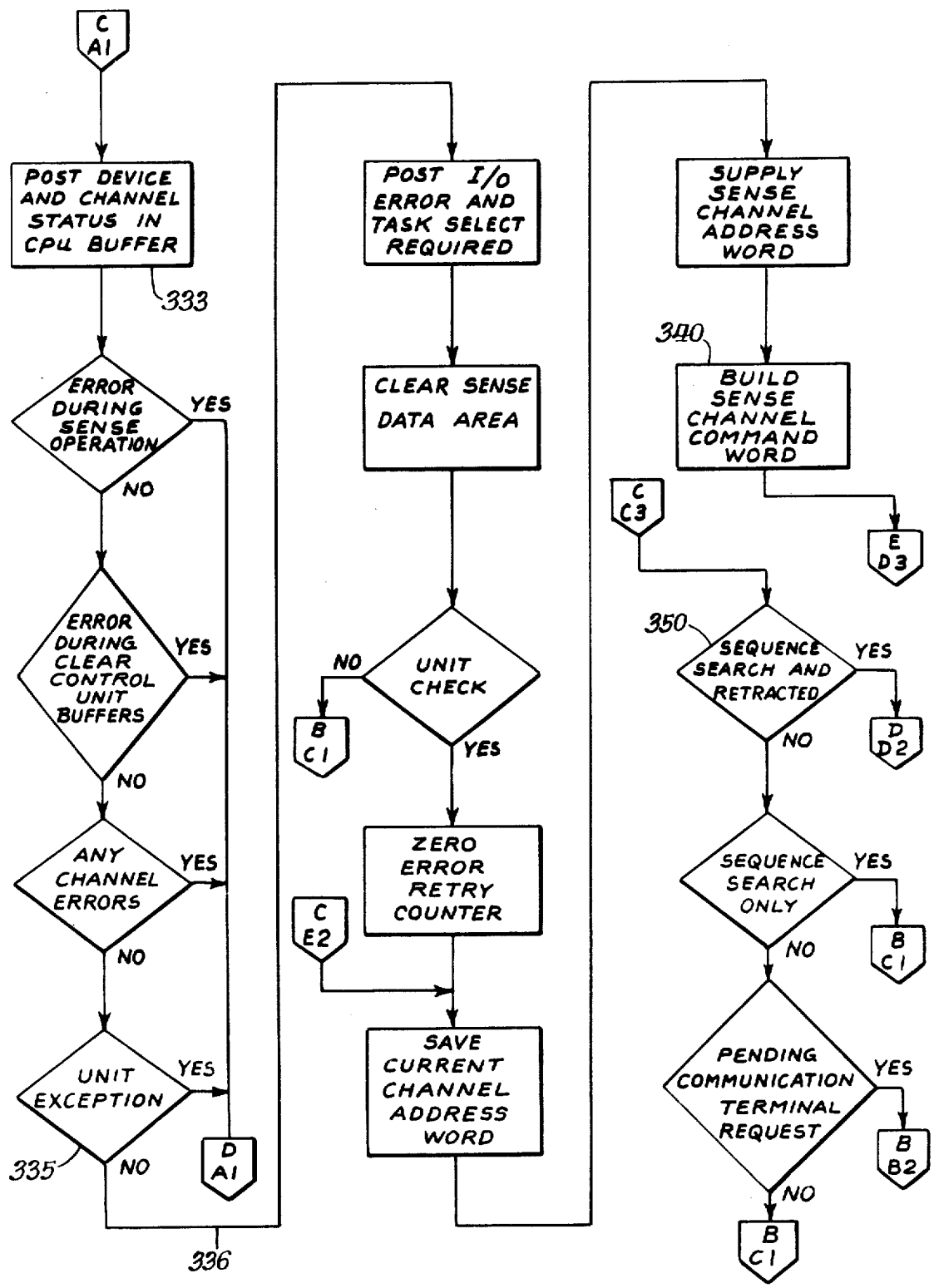

The reason for transmission of the STATUS byte, presently stored as a part of the CSW, is now determined by analyzing the bits set in the STATUS byte. At a block 330, FIG. 10A, a decision is made whether the STATUS byte contains the Unit Check or Unit Exception bits. Since it does, control branches via output CA1 to input CA1, FIG. 10C, and a block 333. Turning to FIG. 10C, the STATUS byte, containing the status of both the device (NCMT–A) and channel, is now posted or stored in the BUFFER location associated with NCMT–A, as determined previously by block 329, FIG. 10A. Block 333 allows the MONITOR to check this Foreground 1 location and determine what STATUS bits have been set, because the word storage location area in the SUPERVISOR may have been altered in the meantime, by another interrupt.

After posting STATUS, several error indicating decisions are made, such as whether a parity error occurred in receiving the status byte. Assuming no errors, and a decision at a block 335, that the STATUS byte does not contain a set Unit Exception bit, an output no path or branch 336 is taken, indicating that the set bit is Unit Check, and hence a SENSE operation must be initiated. The F1 areas immediately preceding the NCMT–A BUFFERS are now readied and other necessary functions are performed, in anticipation of a computer initiated SENSE operation.

In a block 340, FIG. 10C, the COMMAND byte is built, containing the SENSE bit. Thereafter, via ED3, a block 342, FIG. 10E, starts the I/O sequence for CHANNEL 1. Block 342 is general in nature, and may start various computer initiated sequences depending upon the bit set in the COMMAND byte of the CCW, such as the SENSE sequence described herein, a transmission of DATA to a machine tool, or a CLEAR BUFFER operation.

In response to starting I/O at block 342, the computer now transmits over DATA BUS OUT the address of NCMT-A. Upon receipt of the same address over DATA BUS IN, the COMMAND byte is then transmitted. The COMMAND byte, with the SENSE bit, causes DEVICE LOGIC A to transmit the SENSE bytes to the computer, which bytes are stored in the before identified F1 storage area associated with NCMT-A. After all SENSE bytes are transferred, the STATUS byte is again transmitted, and, if transmission has been normal, contains the Channel End bit. This completes the Sense transmission.

While the Sense transmission is occurring, the program continues from block 342. The saved CAW is restored at block 344. Via FA1, FIG. 10F, a decision is made at a block 346, once transmission is complete whether I/O was normal. Assuming it was, control branches to a decision block 347 which determines that the SENSE operation was being performed, thereby outputting to CC3.

At input CC3, FIG. 10C, an analysis is begun of the SENSE byte now stored in the F1 area for NCMT-A. The SENSE byte could contain any of the bits available in the format illustrated in FIG. 5. In the present example, a block 350 determines that the SENSE bytes do contain both the SEQUENCE NUMBER SEARCH bit and the RETRACT STOP bit. A yes decision causes a branch via DD2 to a block 353, FIG. 10D, which zeroes an error retry counter in preparation for an impending I/O sequence.

Should an error occur during an I/O operation, an attempt to correct the error is made by repeatedly retransmitting the same information until either the error does not occur or it is determined that repeated attempts will probably not be successful. The error retry counter posts the number of times an error is registered during these repeated I/O transmissions. In the present program, up to eight retrys are attempted before a given I/O operation is considered an unrecoverable error. Each time I/O is successful, block 353 cancels the count in the retry counter, in preparation for counting subsequent errors that may occur in the next I/O operation.

Figure 10D:
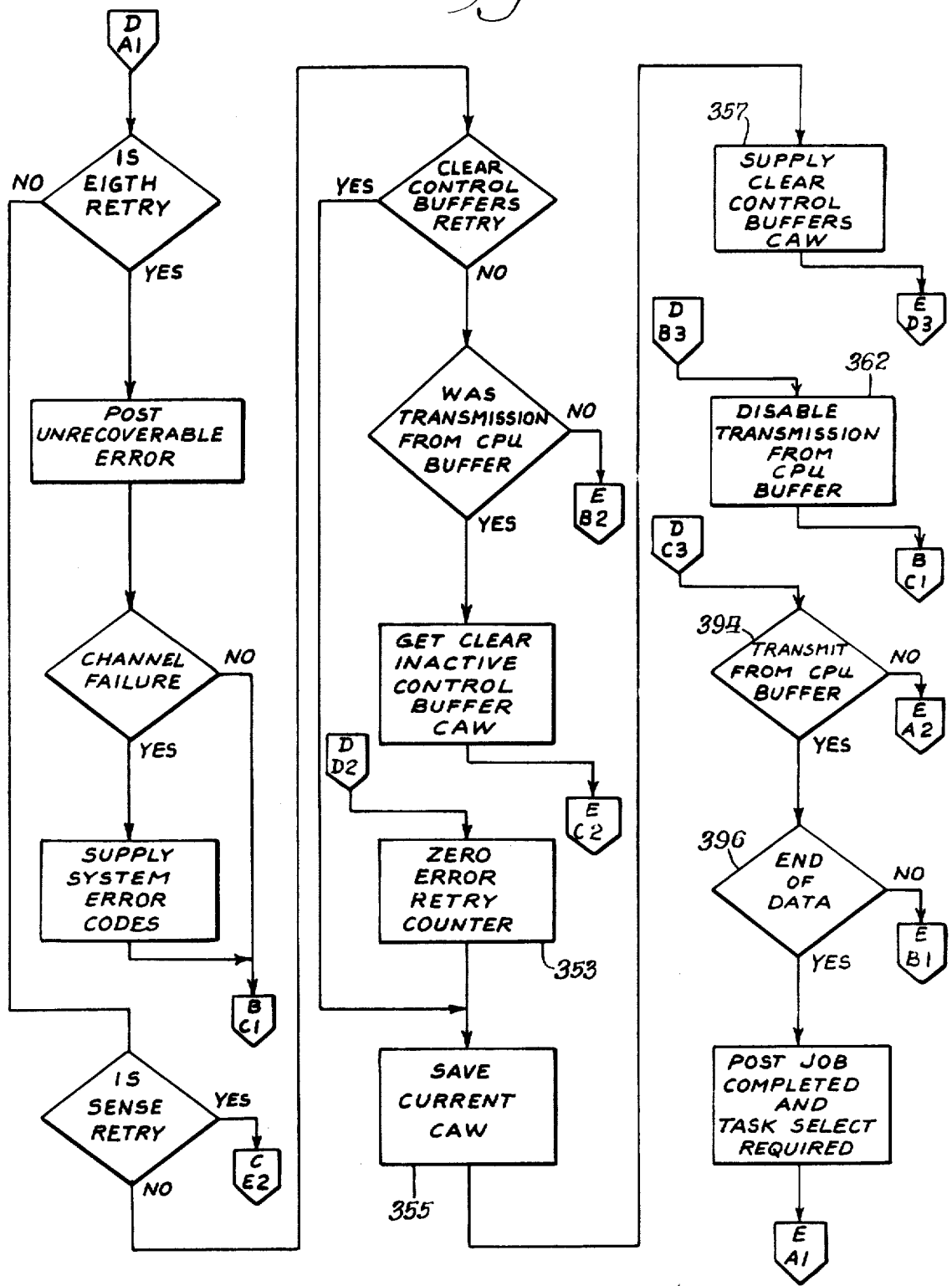

Following block 353, the current CAW is saved at a block 355, FIG. 10D, and then a block 357 supplies a clear control buffer CAW. This CAW contains the address of the clear control buffers CCW, which contain both the CLEAR BUFFER and CLEAR ACTIVE commands. Thus, the "control buffers" indicated by the CAW and CCW are the storage units at DEVICE LOGIC A, not the CPU BUFFERS in F1. It will be recalled that, because the operator had actuated a RETRACT operation, the four step sequence of the Interpolator Cycle Control in the ASA, FIG. 3, was inhibited, hence no CLEAR ACTIVE AND CLEAR BUFFER signals were generated, and the storage units in DEVICE LOGIC A still store DATA. The commands generated by block 357, and which are command chained, cause the buffer storage areas at DEVICE LOGIC A to be cleared, followed by clearing of the active storage areas, in preparation for new information necessary to carry out the sequence number jump operation.

Figure 10E:
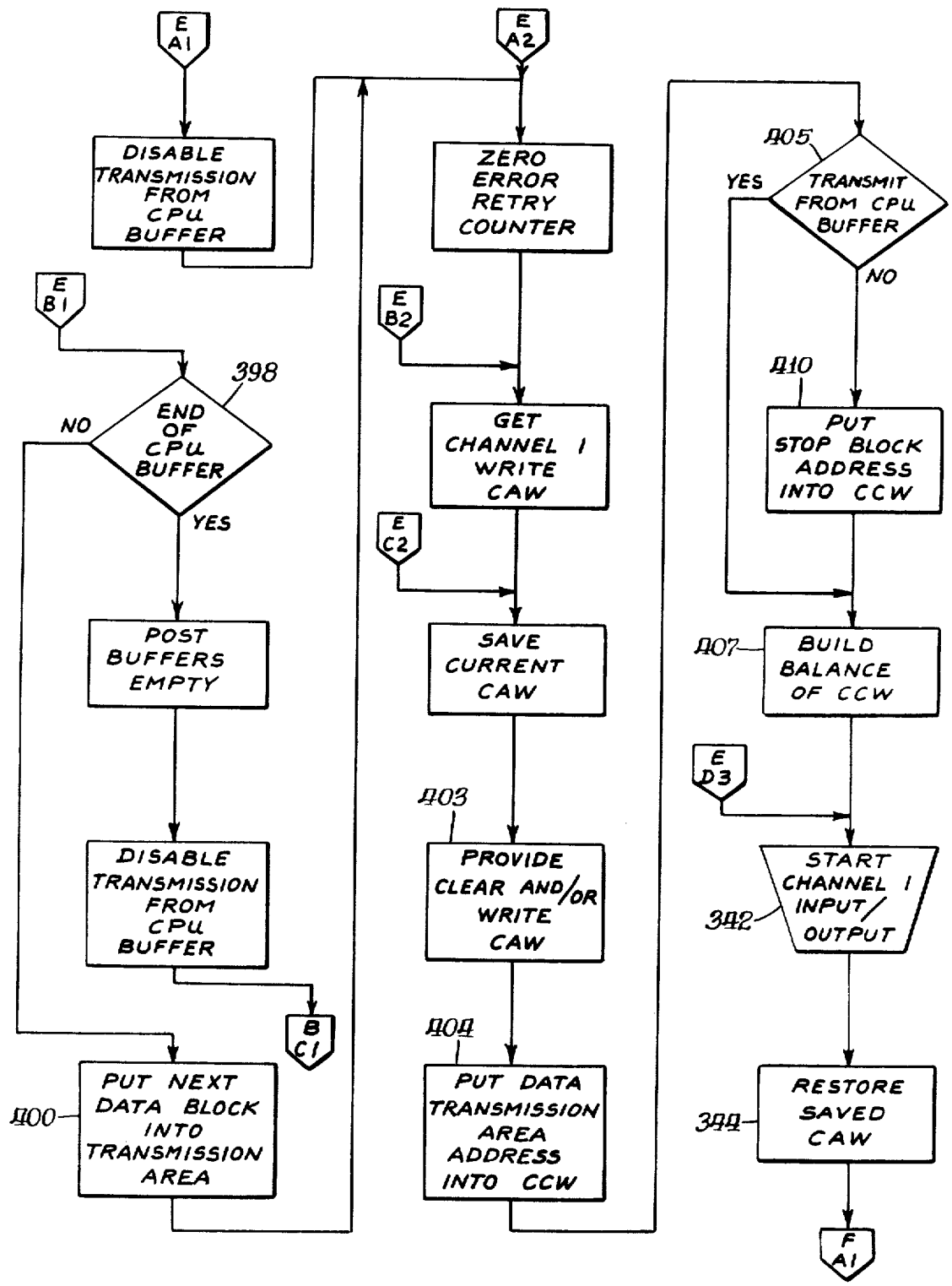

From block 357, the program now exits via ED3, to the start CHANNEL 1 I/O block 342, FIG. 10E. Another computer initiated sequence is begun, as previously described, which herein causes the CLEAR BUFFER and CLEAR ACTIVE commands to be transmitted to NCMT-A. This causes the data storage areas at DEVICE LOGIC A, FIG. 3, to be cleared.

Figure 10F:
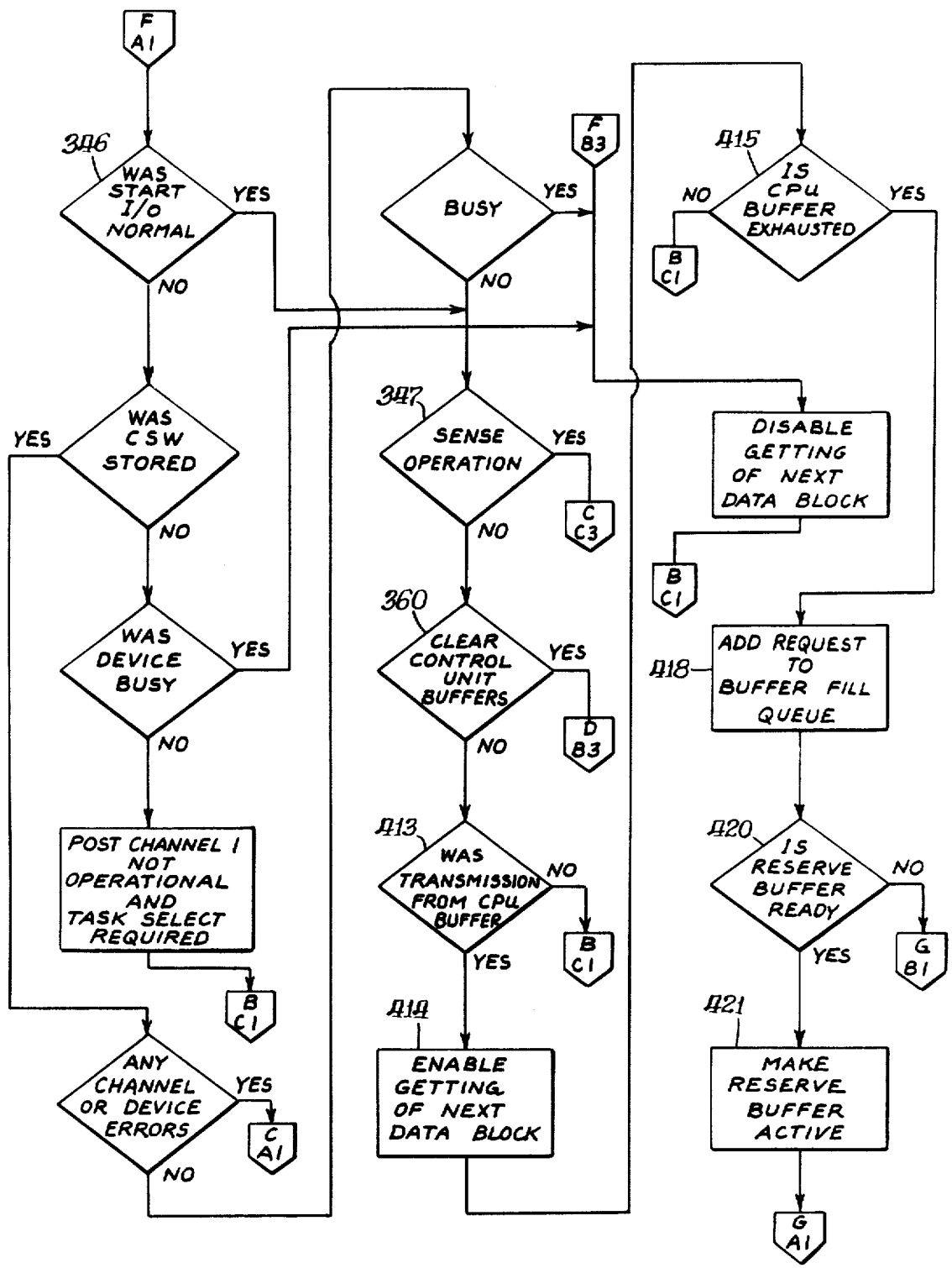

While I/O is occurring, the program continues as previously described, until block 347, FIG. 10F, is reached. At this time, the No branch is chosen because a SENSE operation is not occurring. The No branch inputs to a block 360 which determines whether a clear control unit buffers operation is occurring. Since it is, a Yes branch outputs via DB3, to a block 362, FIG. 10D, which disables transmission from the CPU BUFFER. This also cancels all blocks of machine part instructions stored in NCMT-A BUFFER areas 306 and 307. This completes clearing of all storage areas for NCMT-A, both at DEVICE LOGIC A and at the computer, in preparation for the sequence jump.

Block 362 now outputs to BC1, which is the general exit procedure routine for the modified SUPERVISOR. That is, input C1 and subsequent blocks, FIG. 10B, serve as a general exit for many branches of the modified SUPERVISOR, and causes either a return to the point of prior interrupt in the running of a program, or an exit to a higher priority program waiting to be run. Input connects to a block 365 which determines whether an F1 task selection is required. Since a sequence number search is being performed, the MONITOR program must be activated in order to control a special sequence jump routine contained therein, as will appear later. Because the MONITOR is located in Foreground 1, it is an F1 task, and hence block 365 makes a Yes decision which exists to the Yes BRANCH.

However, should no F1 task have been required, the No branch of block 365 would be taken, passing control to a block 367. This block restores the contents of the registers, which contents were originally saved at block 327, FIG. 10A. Thereafter, a block 370 loads the I/O old PSW, causing the program to return to the point of original interrupt. This restores the prior interrupted program and allows it to continue from the point at which it was originally interrupted.

Since an F1 task is to be performed, the Yes branch of block 365 causes control to pass to a block 373, which adds the task needed (call up MONITOR) to an F1 task queue. As will appear, whenever an exit is made from a program, the task queue is searched in order to determine the next task to be performed. The task posted by block 373 also indicates to the MONITOR the reason for posting the task, so that the MONITOR when activated can proceed through the appropriate portion of its flow chart. Control now passes to a block 375, which determines whether F1 is already active. If the decision is Yes, block 375 branches to blocks 367 and 370 to the point of prior interrupt, since F1 is already busy and cannot at this time perform the task just posted. When F1 goes inactive, the program will again look at the F1 task queue.

When F1 is not active, a No branch from block 375 passes control to a block 377 which determines whether an I/O interrupt within the SUPERVISOR has occurred. A Yes decision, which returns control to blocks 367 and 370, indicates that an interrupt of an interrupt has occurred. As previously explained, CHANNEL 1 interrupts have priority over other type of interrupts, and thus, if a CHANNEL 2 interrupt was being executed, the occurrence of a CHANNEL 1 interrupt would cause processing of the CHANNEL 2 interrupt to be interrupted.

Should block 377 determine a No decision, indicating the interrupt is during background execution, and hence may proceed, a number of steps are performed in preparation for returning control to the standard general exit task selection routine of the SUPERVISOR. Included in these steps is the setting of the system mask at a block 380, but with CHANNEL 1 interrupts enabled. Thus, block 380 serves the same purpose as block 325, FIG. 10A, allowing CHANNEL 1 interrupts to have priority.

After setting the mask, control passes to a block 382, the general exit task selection procedure of the standard SUPERVISOR. Control is now given to the task which has the highest priority, since processing has temporarily been completed in the modified SUPERVISOR. Because the block 373 added a task to the F1 task queue, the general exit task selection now gives control to the MONITOR program, located in F1. The remaining steps of the sequence number search operation will be described in the section on the MONITOR program.

The SUPERVISOR also performs other operations, several of which are described below. The SUPERVISOR controls the transmission of blocks of machine part instructions from whichever F1 BUFFER area 306 or 307, FIG. 9, is active. When the transmission of a DATA block empties the active BUFFER area, the Supervisor automatically switches control to the reserve BUFFER, and thereafter activates a buffer filling routine to refill the empty BUFFER areas. By way of example, the transmission of a DATA block to a machine tool will be described. It will be assumed that this block is the last block stored in the active BUFFER area, hence emptying the active area upon transmission. This occurrence is recognized by the SUPERVISOR, and activates the buffer filling routine, thereby switching control to the reserve area, and filling the empty area with new DATA blocks.

The transmission of a machine block to a machine control occurs in response to receipt of the STATUS byte with the Device End bit set. As previously explained, such a STATUS byte is automatically transmitted to the computer when the machine control completes using the DATA which had previously been sent thereto.

Receipt of the STATUS byte with the Device End bit causes an I/O interrupt to appear at block 320, FIG. 10A. The interrupt follows the same path previously described for other CHANNEL 1 interrupts, until reaching block 330, FIG. 10A, which decides whether a Unit Check of Unit Exception bit is set. Since the bit is Device End, the No branch is followed, which outputs to input BAL, FIG. 10B. Next, a decision at a block 390 is made whether the STATUS byte contains Device Busy. Since it does not, the No branch is followed to a block 392 which decides whether the STATUS byte contains the Device End bit. Since the answer is Yes, the Yes branch outputting to DC3 is followed. It should be noted that the No branch from block 392 would be followed if the interrupt was caused by a Channel End bit.

Since the interrupt is Device End, input DC3, FIG. 10D, goes to a block 394 which decides that transmission is to occur from the CPU BUFFER and hence passes control to a block 396 which decides whether end of data has been reached. A Yes decision means that all machine part blocks in a program have already been transmitted to the machine control, and that the program is now at an end. In the present example, the program is not yet completed, so the No branch inputs via ED1 to a block 398, FIG. 10E, which determines whether the end of the CPU BUFFER has been reached. Since the BUFFER area is not at the end of data, i.e., the last DATA block still remains in the active area, the CPU BUFFER is ready for transmission, and the No branch of block 398 is taken.

Control now inputs to a block 400, which puts the next DATA block from the F1 active BUFFER area into the channel electronics transmission area. Thereafter, several preliminary steps are taken in preparation for the transmission of this DATA block to the machine control. At a block 403, a write CAW is provided, to identify the write CCW. Thereafter, a block 404 puts the address of the transmission area selected by block 400 into the CCW selected by block 403, herein the write CCW. A block 405, determining that this transmission has originated from the CPU BUFFER, passes control to a block 407, which builds the balance of the write CCW. This includes information as to the length of the data block which is to be transmitted to the machine control, typically being 20 bytes (the 14 bytes illustrated in FIG. 4 plus an additional six bytes for the three axes not illustrated in the drawings). Because block 403, FIG. 10E, selected the write CAW, the CCW now contains a Write command. This completes the building of information necessary for transmission of the part instruction block.

It should be noted that transmission to the machine control does not necessarily occur from the CPU BUFFER. When the machine tool is to stop, a PROGRAM STOP block is built and sent to the machine control, typically being 20 sent to the machine control in place of the normal DATA block. In such a case, block 405 would decide that transmission was not to occur from the CPU BUFFER, and would pass control to a block 410 which would put the address of the standard, prestored STOP block into the CCW before passing control to block 407 in order to build the balance of the CCW.

Since all information is now ready for transmission, control passes from block 407 to the start CHANNEL 1 I/O block 342, thereby causing the DATA in the transmission area to be transmitted over DATA BUS OUT to the machine control, as previously described. The flow chart now follows the path previously described for normal I/O, until block 360, FIG. 10F is reached. At this time, the No branch is selected, since a clear control unit buffer operation is not occurring. A block 413 determines that transmission was from the CPU BUFFER, and the following block 414 then enables the obtaining of the next DATA block which will be transmitted to NCMT–A when the next Device End bit is received. To perform this function, a block 415 decides whether the CPU BUFFER is now exhausted. In the present example, the Yes branch is followed since the active BUFFER is now empty.

In order for block 415 to determine when an active BUFFER area is empty, the SUPERVISOR fills each BUFFER area in the following manner. As previously described, each BUFFER area 306 and 307, see FIG. 9, holds up to 41 blocks of DATA, each block being up to 20 bytes in length. When the last DATA byte is placed in one of the areas 306 or 307, an empty standard unique character is loaded immediately after the last byte, to indicate the end of storage of DATA. When in the RUN mode, each BUFFER area is completely filled, with the last storage position being reserved for the empty unique character which is then loaded therein. When in the CONVERSATIONAL mode, each source statement is individually translated into one or more machine blocks which are placed in the BUFFER area. Usually these machine blocks will not fill the complete BUFFER area, hence the empty unique character is placed immediately adjacent the last machine block, with the remainder of the BUFFER area being empty.

As each machine block is individually transmitted from the BUFFER area to the transmission area, a queue in the SUPERVISOR points to the next storage position in the BUFFER area which should contain the next block to be transmitted. When the pointer falls on the empty unique character, the end of that BUFFER is indicated, and block 415, FIG. 10F, is informed that the BUFFER is exhausted.

Returning to FIG. 10F, the Yes branch from block 415 causes a request for the call up of the buffer filling routine to be added to a buffer fill queue, at block 418. The buffer fill queue has a separate table for each F1 area 306 and 307 for each machine tool BUFFER. Thus, requests could be pending to fill other empty BUFFERS, although this would seldom happen except in systems controlling a large plurality of machine tools. Having added the request to the queue, a decision at block 420 is made as to whether the reserve buffer is ready. For this example, it will be assumed that area 306 of NCMT–A had been the active BUFFER which just became exhausted, and that BUFFER area 307 of NCMT–A had been the reserve BUFFER, which was filled and ready to control machine motion. Accordingly, the Yes branch from block 420 inputs to a block 421 and causes the reserve area 307 to become the active area. Then, via input GA1 of FIG. 10G, a block 422 indicates that the new reserve area, i.e., area 306 is not ready, having just been exhausted. This indicates that the new reserve area 306 must be filled.

Figure 10G:
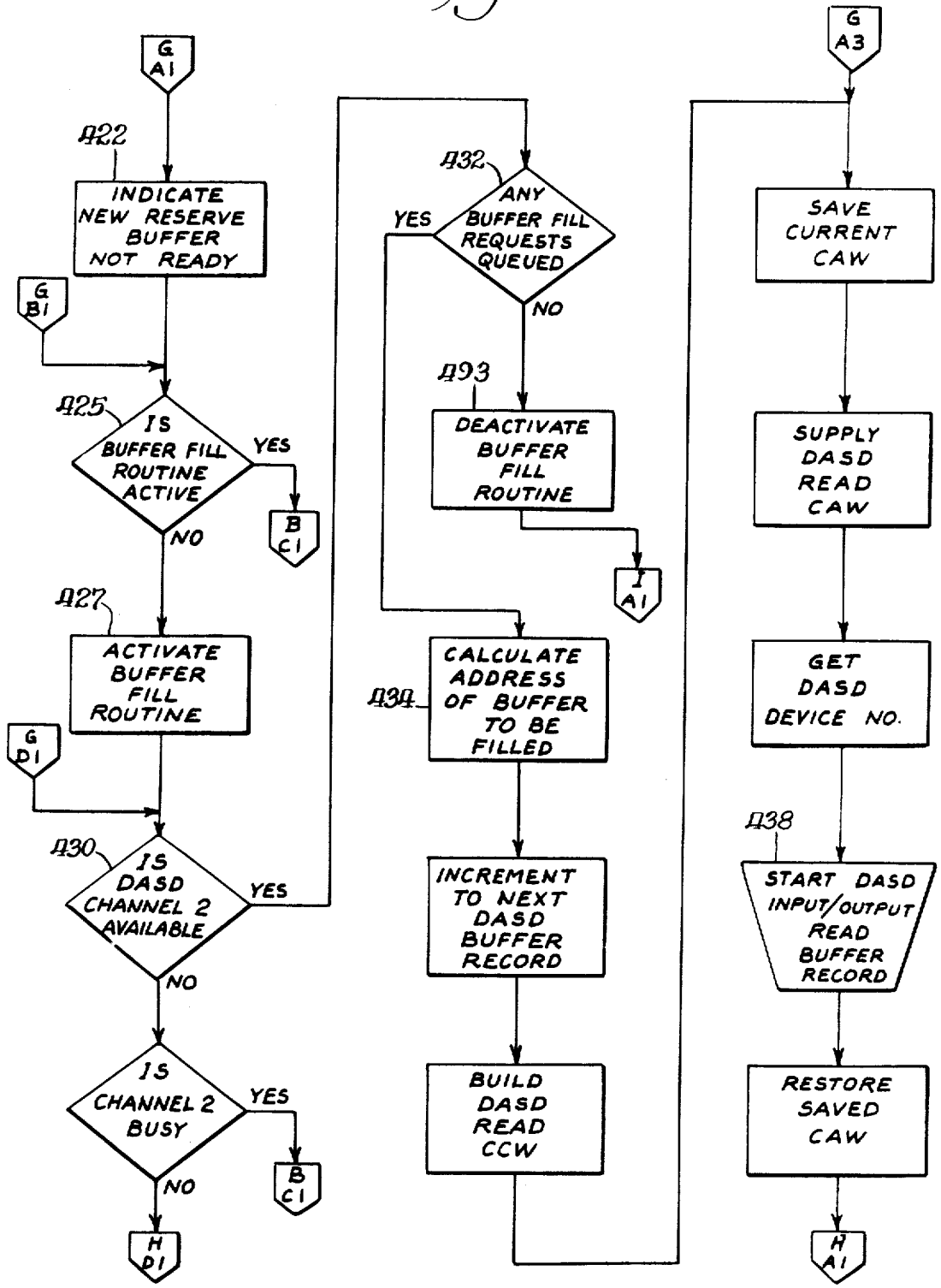

Since the buffer fill routine is not now active, as determined by a block 425, FIG. 10G, the buffer fill routine is activated at a block 427. Most of the remaining blocks of FIG. 10 are concerned with the buffer fill routine. The buffer fill is an I/O operation in which DATA bytes are taken from DISK, via SELECTOR CHANNEL 2, and placed in the F1 BUFFER area in the MAIN STORAGE core. Because this routine is a part of the SUPERVISOR, any machine tool buffer fill takes priority over all other I/O requests, including of course other requests on SELECTOR CHANNEL 2.

Such priority insures that a reserve BUFFER will usually be ready when an active BUFFER nears empty, in order to keep the machine tools continuously operating. Should the buffer fill routine already be active, as indicated at block 425, the program would continue to input BC1, the general exit routine already described. However, because block 422 had posted that another buffer was not ready, the SUPERVISOR would proceed to service this buffer request, as soon as possible, that is, as soon as the buffer fill request now being run is completed.

The buffer fill routine, activated by block 427, first checks at a block 420 whether DASD, i.e., DISK, CHANNEL 2 is available. Assuming it is available, a block 432 then determines whether any buffer fill requests are queued. Since block 422 has just posted a request in the queue, the Yes branch is taken to a block 434 which then calculates the address of the BUFFER area to be filled. This address, in the present example, corresponds to the core address for F1 BUFFER 306 of NCMT-A, see FIG. 9.

The following steps then prepare to retrieve the machine blocks stored on DASD. A block 438 then starts the DASD I/O read buffer routine. This routine is the standard I/O read buffer record routine of the standard SUPERVISOR. Once having started I/O, SELECTOR CHANNEL 2 electronics takes over, as is conventional, and completes transmission of the next machine blocks from DASD to the F1 buffer area 306.

Figure 10H:
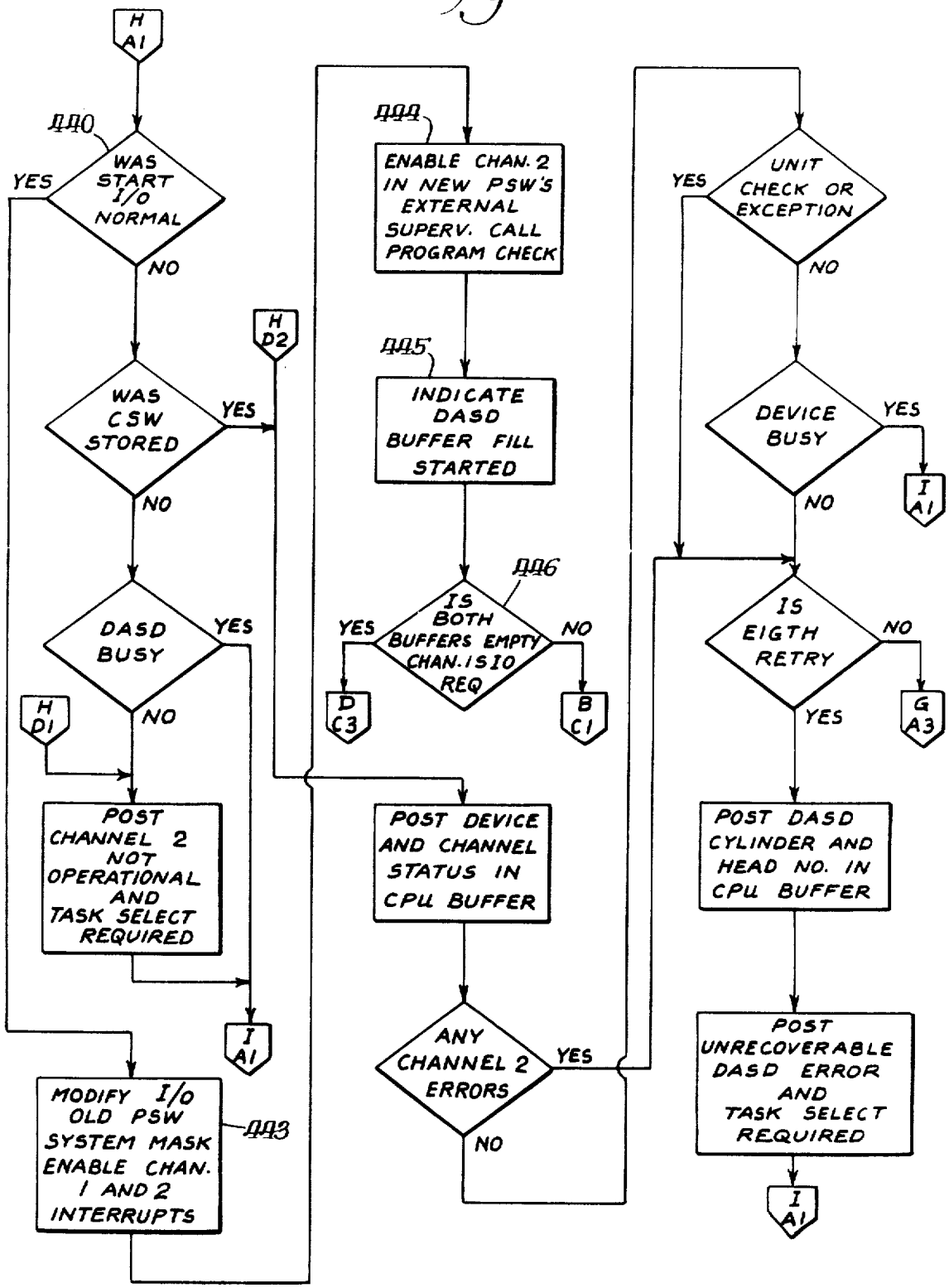
Figure 101:
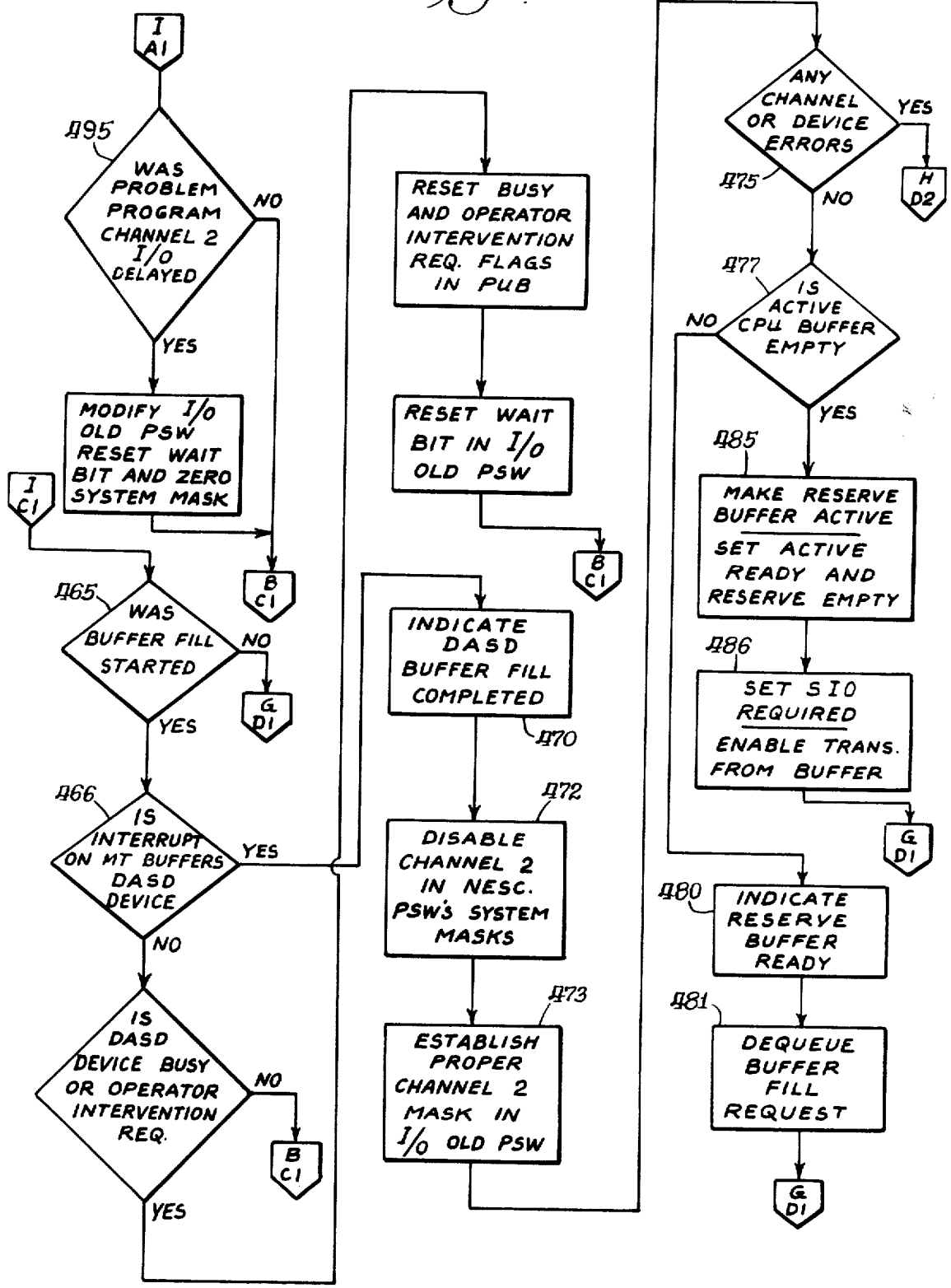

After starting I/O by block 438, and via input HA1 a block 440, FIG. 10H, determines whether the start I/O was normal. Assuming it was, a block 443 modifies the I/O old PSW system mask, by enabling CHANNEL 1 and 2 interrupts. Thus, when the I/O old PSW is loaded, both CHANNEL 1 and CHANNEL 2 interrupts will interrupt the program execution this occurring. A block 444 also enables certain CHANNEL 2 interrupts in the new PSWs system masks, namely the external, supervisor call, and program check interrupts. Essentially, this allows one of these CHANNEL 2 interrupts to be serviced while a buffer fill is occurring.

A block 445 now indicates that the DASD buffer fill has started, after which a decision block 446 determines whether both buffers are empty, and hence a CHANNEL 1 start I/O would be required. Normally, this condition will not have occurred, and the No branch is taken to input BC1, the general exit procedure previously described. The Yes branch from block 446 occurs when I/O is not normal, as when the start DASD I/O read buffer record was initiated at block 438, FIG. 10G, but the empty BUFFER area was not filled because, for example, the DASD unit was inoperative. If DASD was inoperative, I/O on CHANNEL 2 would not be normal, and several retrys to send successful I/O would be attempted, as previously described. However, it is possible that the new active BUFFER area may be depleted before the new reserve BUFFER area can get filled. If this occurs, both active and reserve buffer areas can be emptied, and thus a double buffer fill routine must be initiated. Another condition which might cause both the active and reserve buffers areas to be simultaneously emptied is when several BUFFER areas for each machine tool are emptied at about the same time, generating several interrupts within a short period of time. The first interrupt for NCMT-A, for example, will cause the buffer fill routine to become active and begin to fill the NCMT-A BUFFER area. However, if a buffer fill routine for NCMT-B is now requested while the buffer fill routine is active for NCMT-A, it will be recalled that the subsequent buffer fill request of NCMT-B is merely queued, after which the reserve buffer area for NCMT-B is made active. In such a case, it is possible that the new active buffer for NCMT-B may be depleted before the SUPERVISOR returns to fill the reserve buffer for NCMT-B. This similarly requires a double fill buffer routine as soon as buffer filling for NCMT-A is complete, and initiates a special handling procedure to be described later.

Assuming normal conditions, the No branch of block 446 is taken because a double buffer fill is not required, thus returning to the input BC1 which is the general exit procedure. Channel 2 electronics is at this time controlling filling of the BUFFER area, allowing the SUPERVISOR to exit and free the MAIN STORAGE core for running of another program.

When the Channel 2 electronics completes filling the BUFFER area, a Device End bit is set in the STATUS byte for SELECTOR CHANNEL 2, thereby generating an interrupt which appears at the general I/O interrupt block 320, FIG. 10A. From block 320, a determination that the interrupt is on CHANNEL 2 leads to a decision block 460, which determines whether a CPU BUFFER fill was previously started. Since it was previously started, the Yes branch leads via block 327 to a block 462 which determines whether the interrupt is a CHANNEL 2 interrupt. Because it is, the Yes branch leads to input IC1, FIG. 10I.

At input IC1, a block 465 decides that the buffer fill was started, and leads via the Yes branch to a block 466, to determine whether the interrupt is on a DASD device which stores machine part programs, and hence fills the F1 BUFFER areas for the machine tools. The No branch indicates a different DASD device, such as may store a background program.

From block 466, the Yes branch is taken to a block 470 which indicates that the buffer fill is now completed. Thereafter, a block 472 disables CHANNEL 2 interrupts in the necessary PSW system masks, i.e., the system masks which had been modified in block 444, FIG. 10H, to enable certain CHANNEL 2 interrupts. Thus, block 472 prevents the external, supervisor call, and program check CHANNEL 2 interrupts from being immediately serviced when the system mask is enabled. A block 473 then enables the standard CHANNEL 2 mask in the I/O old PSW.

A block 475 then determines whether there was any channel or device errors during the buffer filling routine just completed. Assuming no errors, the No branch leads to a block 477 which determines whether the active CPU BUFFER is empty. During normal operation, this BUFFER area should not be empty. Assuming normal operation, the No branch is taken from block 477 because the active CPU BUFFER is not empty. A block 480 indicates that the reserve BUFFER is now ready, i.e., the buffer filling routine has been completed, and thereafter a block 481 dequeues the buffer fill request, after which the routine exits via GD1.

However, it should be recalled that under certain abnormal conditions, both the active and reserve BUFFER areas may be empty, hence no DATA could be sent to the machine control even though DATA is needed. In such a case, once the first of the two empty BUFFER areas is filled, it must immediately be made active in order that the machine control can continue operating. This condition is recognized at block 477, causing the Yes branch to be taken. A block 485 makes the just filled reserve BUFFER active, then sets the new active BUFFER as ready and the new reserve BUFFER as empty. Then, a block 486 sets the start I/O to enable transmission from the new active BUFFER, after which the routine exits via the same GD1 described above. The Yes branch from block 477 does not contain any de-queue of the buffer fill request, as occurred in the No branch from block 477. Thus when the active CPU BUFFER is empty, the buffer fill request is not de-queued, so that the new reserve BUFFER can next be filled, thus completing the double buffer fill routine.

Both the Yes and No branch from block 477 finally exit to input GD1, FIG. 10G, at which the block 430 checks whether DASD CHANNEL 2 is available. Since buffer filling has just been completed, CHANNEL 2 is now available and the Yes branch is taken to block 432, which searches whether any buffer fill requests are queued. If no buffer fill request is queued, i.e., all BUFFER areas are now filled, the No branch is taken from block 432 to a block 493, at which the buffer fill routine is deactivated. Then, via input IA1, a block 495, FIG. 10I, determines whether the CHANNEL 2 I/O was delayed. Assuming it was not, the No branch exits to input BC1, the general exit routine previously described. This causes the SUPERVISOR to thereafter either return to the point of prior interrupt, or service any F1 tasks which might be pending. Since no buffer fill request is now queued, these F1 tasks would be other programs which have F1 priority.

The modified SUPERVISOR also contains additional process blocks or steps, not illustrated in FIG. 10, such as certain SUPERVISOR calls which are not activated except in connection with the running of other programs, such as the MONITOR. These SUPERVISOR calls, which are a part of the SUPERVISOR, are illustrated and described in the following section most closely connected with the task being performed thereby.

MONITOR Program

In FIGS. 11A–G, the MONITOR program is illustrated in detail. This program, located in the F1 partition of the MAIN STORAGE core, controls several I/O bound operations. Whenever programming language instructions are to be converted into machine language form, the MONITOR rolls out the program then being run in background, expands the F1 area to include the prior background area, and rolls in the language TRANSLATOR. The programming language instructions may come from the operator via the COMMUNICATIONS TERMINAL. Or, when a program is to be run, the programming language instructions on DISK must be converted into machine language form before being transmitted to the BUFFER areas in F1. Another I/O bound operation which the MONITOR controls is the SEQUENCE NUMBER SEARCH, which requires a search through information stored on DISK.

Initially, parameters and other information about the MONITOR program must be entered in the SUPERVISOR, as is conventional for new programs. For these purposes, the SUPERVISOR is entered at a block 500, FIG. 11A, via a standard SUPERVISOR CALL, labeled SVC. The particular SVC being used at this time is arbitrarily identified by the number 41. SVC 41 includes a block 501 which transfers the F1 MONITOR parameters to the SUPERVISOR. Such parameters include information on the origin points 301 and 303, FIG. 9, for F1 and expanded F1, the number and addresses of machine tools being controlled, the core location of the BUFFER areas 306 and 307, FIG. 9, for each machine tool, and the like. Having initially entered all necessary information, the program exits at output 502, also indicated by input AC1.

Input AC1 now again enters the SUPERVISOR via an SVC 40. As will appear later, SVC 40 also serves as the general exit task routine for the MONITOR. SVC 40 includes a block 506, FIG. 11A, which disables all interrupts, and then checks at a block 507 whether any F1 tasks are pending. Block 507 checks the F1 task queue, which is set by block 373, FIG. 10B, whenever an F1 task is to be performed, as previously described. When no F1 tasks are pending, the MONITOR is deactivated and, at a block 509, the SVC old PSW is modified to reissue SVC 40, rather than SVC 41, in order that the next time the MONITOR is activated, it will enter at input AC1, rather than at block 500. Thereafter, CHANNEL 1 interrupts are enabled and the standard SUPERVISOR exit task selection routine is taken. The computer will now run the queued task which has the next highest priority, as is conventional.

By way of explaining the MONITOR, it will be assumed that an operator retracted NCMT-A and initiated a SEQUENCE NUMBER SEARCH operation. As will be recalled, this generates the STATUS byte, containing the Unit Check bit, and the SENSE signal, containing the SEQUENCE NO. SEARCH bit, the RETRACT STOP bit, and the bits of the DESIRED SEQUENCE NO. Upon receiving the Unit Check bit, the computer generates a CHANNEL 1 interrupt, and thereby causes an F1 task to be queued at block 373, FIG. 10B.

Because an F1 task is now queued, the Yes branch from block 507, FIG. 11A, is taken in SVC 40 to a block 512, which causes the queue entry to be transferred to the MONITOR task table. This entry includes the number of the device causing the interrupt, herein the address of NCMT-A, and other task information. Then, the entry is de-queued and CHANNEL 1 interrupts are enabled, followed by an exit at a block 513 to the general SUPERVISOR exit task selection routine. Block 513 marks the end of SVC 40.

Control now switches from the SUPERVISOR to the next highest priority task. Since the MONITOR is activated (by the Yes branch of block 507) and has F1 priority control passes to the MONITOR, and enters at a block 515, FIG. 11A. Block 515 calculates the CPU BUFFER location for this device, namely, the location of BUFFER areas 306 and 307 for NCMT-A. Thereafter, a block 516 tags output messages with the address of NCMT-A, and then a block 517 determines whether it was a CHANNEL 1 task which caused the MONITOR to be entered. Because Unit Check is a CHANNEL 1 task, the Yes branch is taken, causing an output to BC1.

At input BC1, FIG. 11B, a block 520 determines if CHANNEL 1 is not operational at this time. The Yes branch indicates an error, which outputs an error message at the COMMUNICATIONS TERMINAL and at the syslog (system log), such as Print Unit 71, FIG. 1. However, assuming CHANNEL 1 is operational the No branch is taken, passing control to several blocks which analyze the information in the STATUS byte and the SENSE signal. It will be recalled that these signals are presently stored in the F1 area preceding the BUFFERS for NCMT-A, and hence are available to the MONITOR.

First, a block 523 determines whether there has been an unrecoverable error in receiving the STATUS and SENSE bytes. If not, a block 524 determines whether the Unit Check bit is set in the STATUS byte. Because the Unit Check bit is set, the Yes branch is taken to a block 525 which determines if a SEQUENCE NUMBER SEARCH has been requested, as indicated by the SEQUENCE NUMBER SEARCH bit in the SENSE signal. Because it has, the Yes branch goes to input FA1, FIG. 11F, and to a block 530 which determines whether the machine tool is retracted, as indicated by the RETRACT STOP bit in the SENSE signal. As a safety check, the SEQUENCE SEARCH operation is available only when the machine is retracted. Of course, the program may be modified to allow the SEQUENCE SEARCH operation when a normal program stop occurs, should this be desired.

Figure 11C:
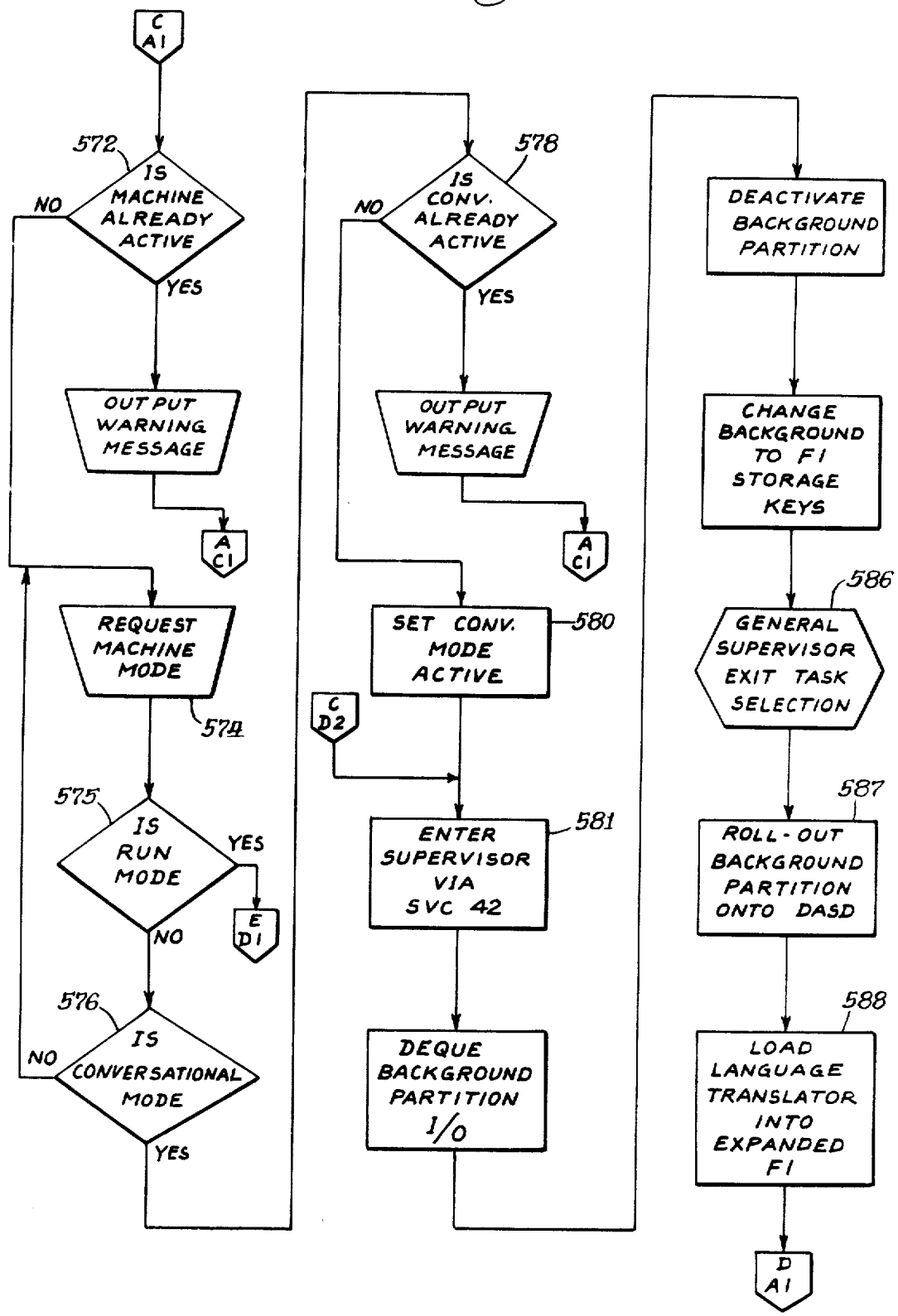
Figure 11D:
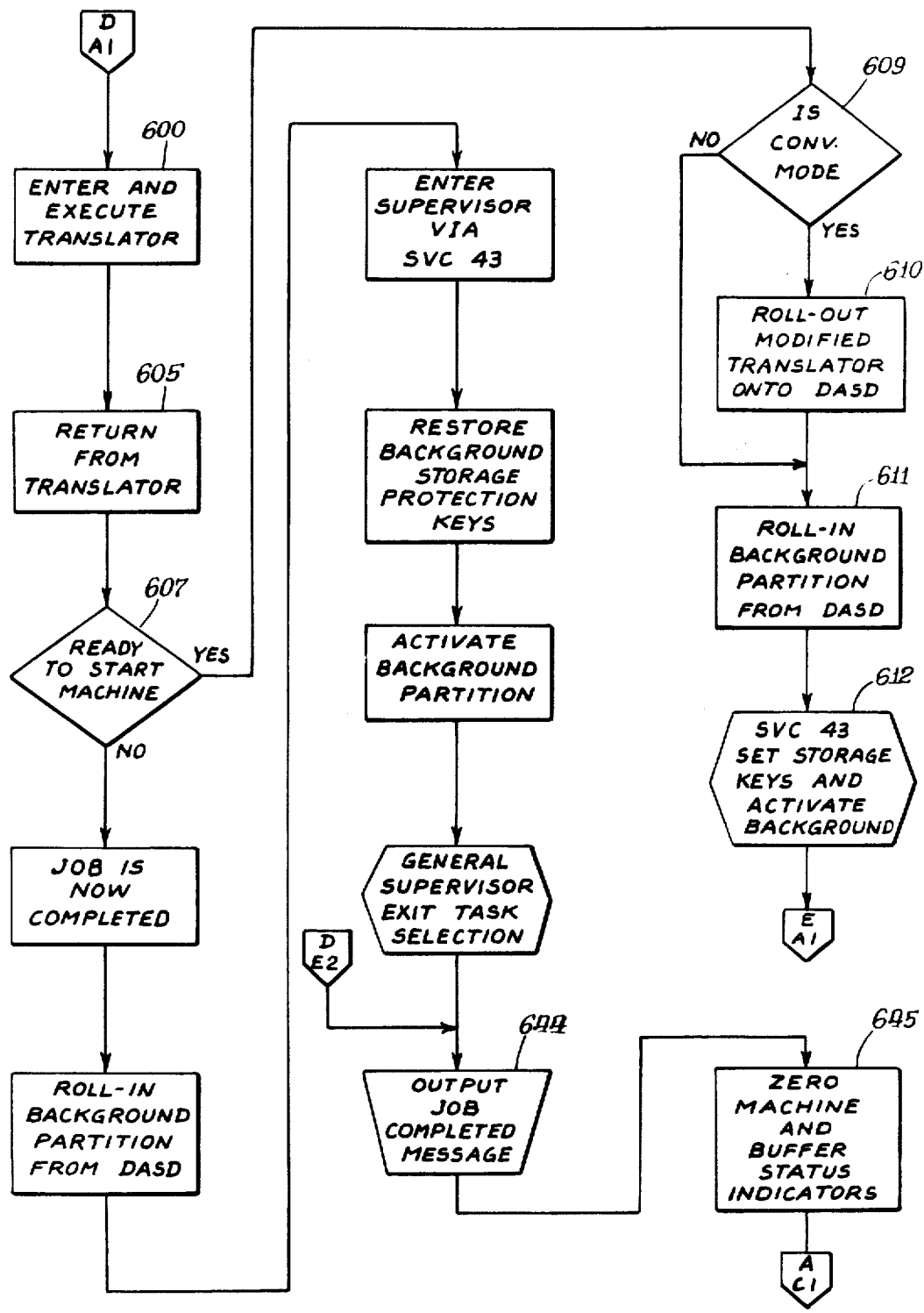
Figure 11E:
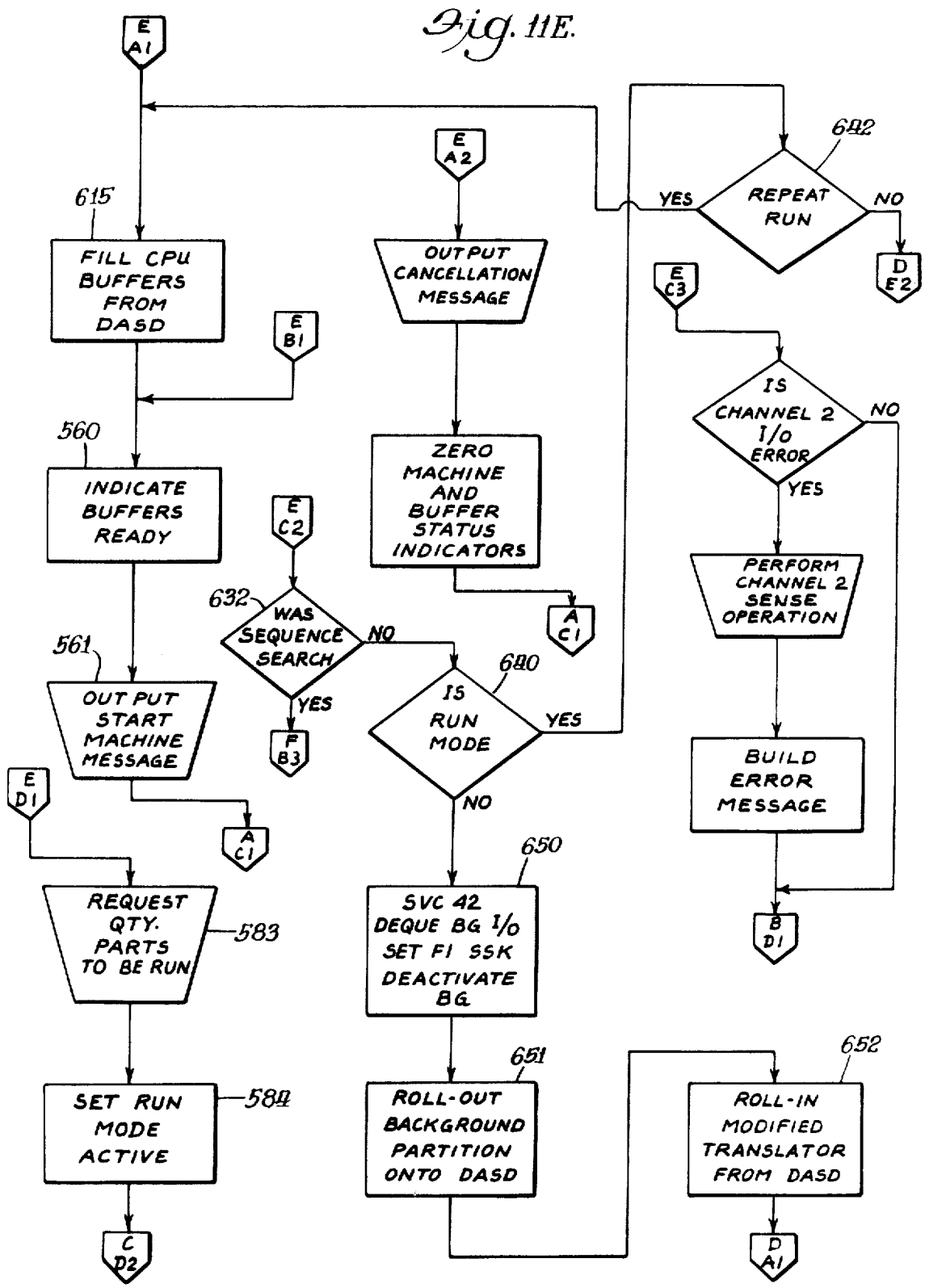
Figure 11F:
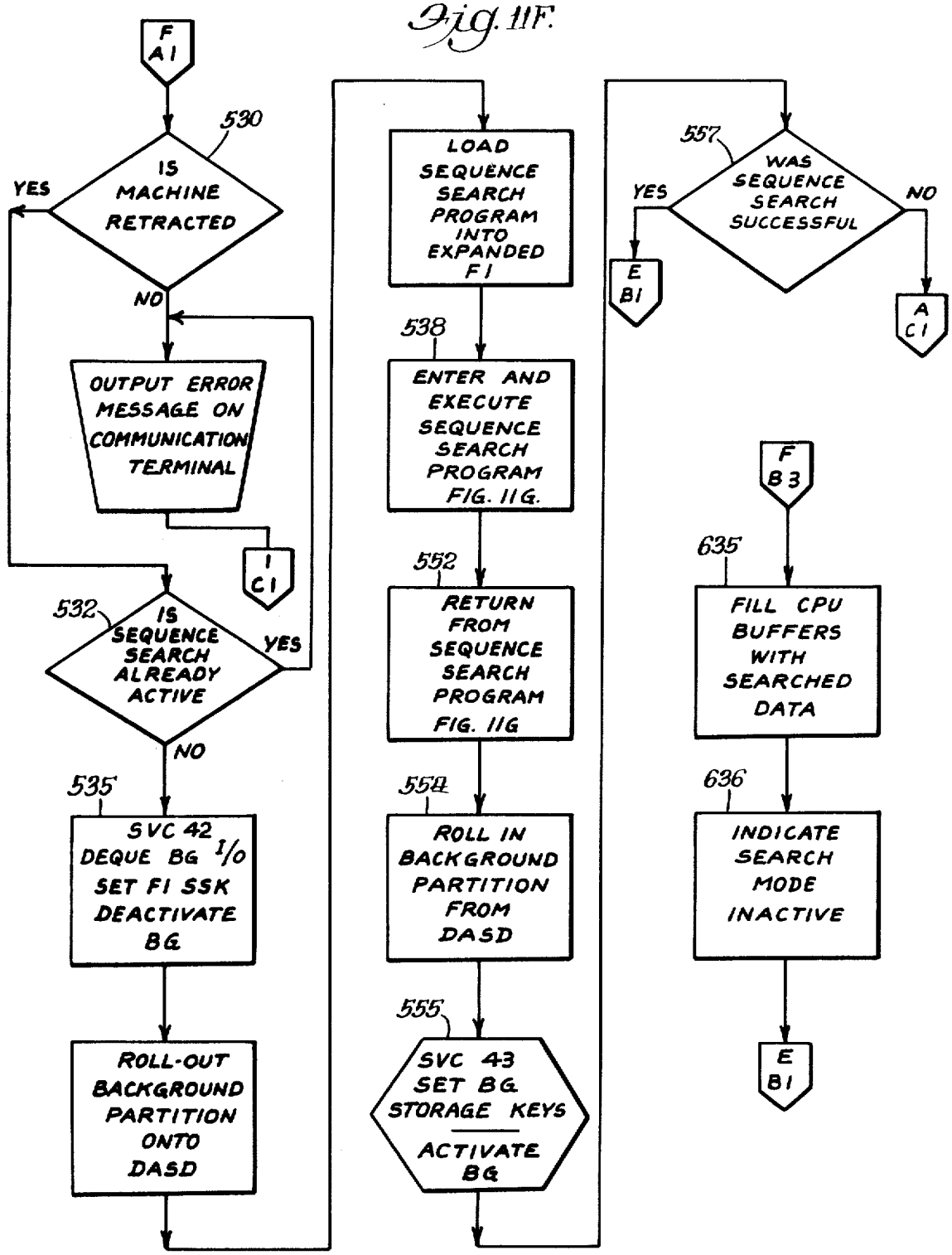

Since the RETRACT STOP bit is set, the Yes branch of block 530, FIG. 11F, passes control to a block 532, which determines whether the SEQUENCE SEARCH program or routine is already active. Assuming it is not, control passes to a routine which rolls out a given amount of background, and rolls into that area the special SEQUENCE SEARCH routine, FIG. 11G. After the SEQUENCE SEARCH is completed, the special program is rolled out to its storage location on DASD, and the prior background program is rolled in and reinstated.

Figure 11G:
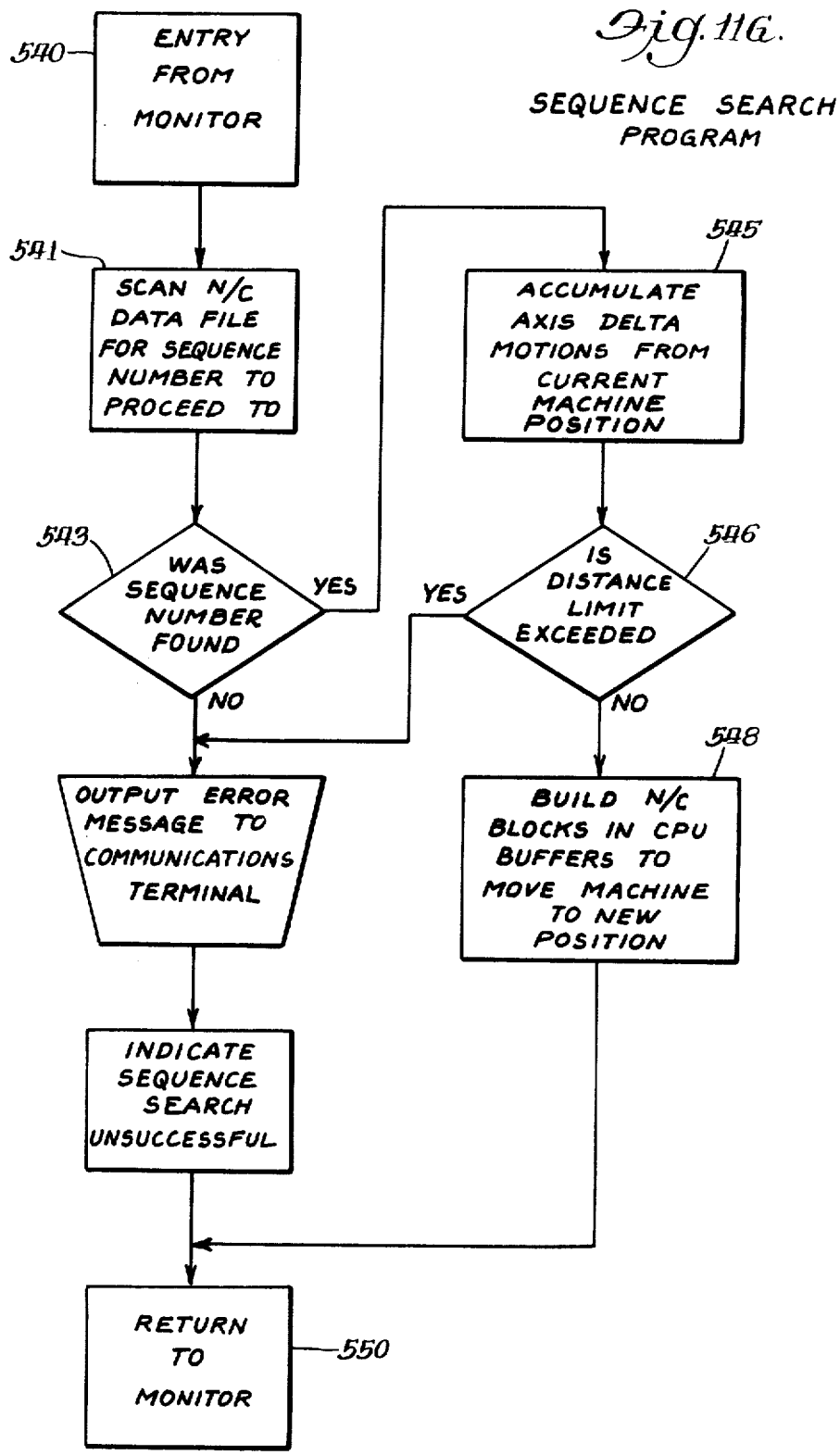

More particularly, a block 535 actuates SVC 42, dequeueing background I/O, setting F1 SSK (Set Storage Keys), and deactivating background. Then, the background partition is rolled out onto DASD, and the SEQUENCE SEARCH program, FIG. 11G, is rolled into the expanded F1 area, similar to the area for the language TRANSLATOR. Then, a block 538 causes control to be directed to the SEQUENCE SEARCH program, FIG. 11G.

The SEQUENCE SEARCH program is entered at a block 540, FIG. 11G. Then, a block 541 scans the data file of the part program being run, searching for the desired sequence number identified in the SENSE signal. A block 543 determines whether the sequence number was found. If not, an output error message is transmitted to the COMMUNICATIONS TERMINAL. If the sequence number is found, the Yes branch is taken which passes control to a block 545. At this step, the delta motions of each instruction, from the current instruction to the instruction identified by the DESIRED SEQUENCE NUMBER, are accumulated. This calculation determines the total distance that the machine tool must travel to be properly located for running the instruction identified by the DESIRED SEQUENCE NUMBER.

A block 546 then checks that the accumulated delta motions do not exceed the distance limitations of the machine tool, and thereafter a block 548 builds, in the CPU BUFFERS for NCMT-A, a machine part instruction block which will move the machine tool an amount equal to the accumulated delta potions calculated in block 545. Having built the new instruction, control is returned, via a block 550, to the MONITOR.

The MONITOR now regains control at a block 552, FIG. 11F, and rolls the SEQUENCE SEARCH program out to its original location on DASD. Then, a block 554 rolls in the background partition from DASD. SVC 43 is now entered at a block 555, which also resets the background storage keys and activates background so that it may be run when higher priority programs are completed. Thereafter, a block 557 determines whether the SEQUENCE SEARCH was successful. If it was, the Yes branch is taken, which goes via ED1 to a block 560, FIG. 11E, which sets the buffers ready indicator in the SUPERVISOR, to enable transmission from the CPU BUFFERS to the machine tool, in the following manner.

From block 560, an I/O block 561 outputs a message to the COMMUNICATIONS TERMINAL which indicates to the operator that the machine tool may be started. The operator now actuates the START control, FIG. 2, to cause the first block in the CPU BUFFER to be transmitted to DEVICE LOGIC A and immediately be transferred into the active storage areas thereof, in the manner explained below. It should be noted that DATA is presently in the CPU BUFFERS, rather than in the active storage areas of DEVICE LOGIC A as during normal running of the machine tool, when the operator actuates the START control.

Upon actuating START, the machine control generates a STATUS byte with the Device End bit set. This is communicated to the computer and causes a CHANNEL 1 interrupt to be posted, but not yet processed. While this is occurring, the MONITOR program outputs from block 561 to AC1, the general exit routine, and proceeds to block 507, FIG. 11A, which again determines if any F1 tasks are remaining to be filled. Since no tasks remain at this time, the No branch is taken which deactivates the MONITOR, enables CHANNEL 1 interrupts, and outputs to the general supervisor exit task selection.

At this time, because a CHANNEL 1 interrupt is posted, the SUPERVISOR is entered and proceeds to process the STATUS byte with the Device End bit. Since the buffers ready indicator has already been set by block 560 of FIG. 11E, and the Device End bit indicates new DATA should be sent to NCMT-A, the SUPERVISOR proceeds to transmit the DATA in the CPU BUFFERS to the machine control.

Upon receipt, DEVICE LOGIC A stores the received DATA in its BUFFER areas, and, as will be explained, immediately transfers the DATA to its active areas, causing NCMT-A to move to the location where the DESIRED SEQUENCE NUMBER instruction starts. Each time DATA is transferred from the buffer to the active storage areas, the DEVICE LOGIC unit sets the Device End bit in the STATUS byte, and transmits the STATUS byte to the computer. If the accumulated delta motion instruction consists of several blocks, each occurrence of Device End raises an interrupt which causes the succeeding block to be transmitted to NCMT-A, so that all blocks are transmitted to and performed by the machine tool.

When the accumulated delta motion instruction is built in the CPU BUFFERS by block 548, FIG. 11G, an END-OF-DATA character is entered immediately after the last block of the instruction. This character is also placed at the end of a complete program, and at the end of the last machine block of each instruction when in the CONVERSATIONAL mode. When the Channel Electronics is transmitting DATA in the CPU BUFFERS to the machine location, the last character read after all blocks have been transmitted, is the END-OF-DATA character, which causes an F1 task to be queued.

The F1 task so posted causes the MONITOR to be entered at SVC 40, FIG. 11A, and proceeds to block 507 which again analyzes whether any F1 tasks are pending. Because an F1 task is pending, as queued by the END-OF-DATA character, the Yes branch is taken which leads to block 517, FIG. 11A, which determines whether the F1 task is a CHANNEL 1 task. At this time, it is not a CHANNEL 1 task, so the No branch is taken to input BA1, FIG. 11B, leading to a block 630 which determines whether the F1 task now queued is a run completed task. Because the END-OF-DATA character has been posted, block 630 interprets this as a run completed, and the Yes branch is taken to input EC2, FIG. 11E.

Whenever an END-OF-DATA character is received, block 630 causes the Yes branch to be taken. However, as previously described, the END-OF-DATA character does not always indicate it is a run completed, so several tests are made to determine the actual reason for the END-OF-DATA character. This test begins at input EC2, which leads to a block 632, FIG. 11E, which determines whether a SEQUENCE SEARCH was being run. Since it was, this indicates that the END-OF-DATA character means the machine tool has been moved to its new location and can run the instruction corresponding to the DESIRED SEQUENCE NUMBER, so the Yes branch is taken to input FB3, FIG. 11F, and a block 635.

At block 635, the CPU BUFFERS are filled with the searched data, that is, the DESIRED SEQUENCE NUMBER instruction found by the sequence search program, FIG. 11G, and all subsequent instructions in the program, until the CPU BUFFERS are filled. These machine part instruction blocks are serially located on DASD, it being noted that when in the RUN mode, all source instructions have previously been converted by the language TRANSLATOR and stored in machine language form on DASD. Thereafter, a block 636, FIG. 11F, posts that the search mode is now inactive, and outputs to ED1 and block 560, FIG. 11E, which causes the first instruction now in the CPU BUFFERS to be executed.

As previously explained, block 560 posts in the SUPERVISOR that the buffers are ready, after which block 561 outputs a START message. The operator now activates the START control on OPERATOR CONSOLE A, generating the Device End bit in the STATUS signal, and causing a CHANNEL 1 interrupt which subsequently causes the instruction in the CPU BUFFER to be transmitted to the buffer areas at the machine control. The machine control immediately transfers this information into its active area for control of NCMT-A, and generates another Device End bit in response to transferring information from the buffer to the active storage areas. This second Device End bit is communicated by the STATUS byte to the computer, and causes a CHANNEL 1 interrupt to be posted.

While this occurs, the program exits to the general exit routine AC1 and SVC 40, FIG. 11A. Since no machine block of the DESIRED SEQUENCE NUMBER instruction contains an END-OF-DATA character, block 507 in SVC 40 now indicates that no F1 tasks are pending, so the MONITOR is deactivated and the general supervisor exit task selection routine is taken. This routine enables CHANNEL 1 interrupts, so the SUPERVISOR proceeds to process the posted Device End bit. The next block in the CPU BUFFER is transmitted to NCMT-A. Thereafter, the program continues in the normal manner for the RUN mode.

Next, an example is given of running an entirely new program. The operator actuates only the OPERATOR ATTENTION control on OPERATOR CONSOLE A, FIG. 2 (and not also the SEARCH control), causing the STATUS and SENSE bytes to be transmitted to the computer. As previously explained, in this special situation the generation of the SENSE signal is only used as a means of generating the STATUS byte with the Unit Check bit. Upon receipt of these signals, an interrupt is generated and the SUPERVISOR analyzes the interrupt, posting an F1 task as previously described.

The MONITOR is entered and proceeds as before described to block 524, FIG. 11B, which checks whether a Unit Check bit is set in the STATUS byte. Because it is set, control passes to block 525, which determines whether a SEQUENCE SEARCH bit is set in the SENSE signal. Because it is not set (the SEARCH control not having been actuated), this indicates that ATTENTION was actuated for the purpose of gaining the attention of the computer, and not for the purpose of sending SENSE information. Accordingly, the No branch is taken from block 525 which will activate the COMMUNICATIONS TERMINAL in order to allow the operator to communicate his request to the computer.

More particularly, the No branch leads to a block 565 which sets, in the area which precedes the NCMT-A BUFFER area 306 and 307, a communications terminal attention not pending indication. This effectively prevents the storage of future Unit Checks from NCMT-A which occur before the computer has serviced the first Unit Check, as may occur if the operator actuates the ATTENTION control plural times while waiting for the computer to return to him. Control then passes to a block 567, which outputs a request action desired message to the COMMUNICATIONS TERMINAL.

The program now waits for a response from the operator, which he types on the COMMUNICATIONS TERMINAL. In the present example, the operator types that a job is to start-up. After typing the message, the operator actuates a standard key which indicates that the message is completed, such as an End-Of-Transmission or EOT key.

Upon receiving EOT, the program continues and control passes to a series of blocks which analyze the operator message. Since the message was a job start-up, the Yes branch from a block 570 is taken to input CA1, FIG. 11C, which then determines at a block 572 whether the machine is already active. Since it is not, control passes to another I/O block 574 which outputs to the COMMUNICATIONS TERMINAL a request for the desired machine mode for the new job. Again, the program waits for the operator's response. Upon receipt of EOT, a block 575 determines whether the RUN mode has been selected. If not selected, a block 576 then determines whether the CONVERSATIONAL mode was selected.

Generally, when the CONVERSATIONAL mode is selected, a block 578, FIG. 11C, determines whether the CONVERSATIONAL mode is already active. In the present embodiment, only one modified language TRANSLATOR was provided on DISK, hence only one machine tool at a time could run in the CONVERSATIONAL mode. Thus, if the CONVERSATIONAL mode was already active, an error message is generated. Of course, as many modified language TRANSLATORS could be provided as desired, in which case that same number of machine tools could be run simultaneously in the CONVERSATIONAL mode. Assuming the CONVERSATIONAL mode is not active, a block 580 sets the conversational mode active, and thereafter a block 581 proceeds to enter the SUPERVISOR via SVC 42.

When the RUN mode is selected, the Yes branch of block 575 is taken, which via ED1 inputs to a block 583, FIG. 11E. At block 583, an I/O operation occurs in which the COMMUNICATIONS TERMINAL requests the quantity of parts to be run, i.e., how many times the program to be selected should be repeated. Thereafter, a block 584 sets the RUN mode active, and via input CD2, FIG. 11C, returns control to a block 581 which enters the SUPERVISOR via SVC 42.

Both the RUN and CONVERSATIONAL modes converge at SVC 42. The SUPERVISOR now dequeues the background partition I/O, which allows the current I/O to finish. Then, the background partition is deactivated, and the F1 storage keys are changed from location 301, FIG. 9, to location 303, in preparation for loading of the language TRANSLATOR. SVC 42 terminates at a block 586, returning control to a block 587 in the MONITOR. Block 587 now rolls out the background partition onto DASD, after which a block 588 loads either the standard or modified language TRANSLATOR into the expanded F1 partition.

The operations performed by block 588 are seen in detail in FIG. 12A, in which a block 590 determines the mode previously selected, as indicated by the prior outputs of blocks 575 and 576, FIG. 11C. If the RUN mode was selected, block 590 passes control to a block 592 which loads the standard language TRANSLATOR into the expanded F1 partition. As previously explained, the standard language TRANSLATOR, not illustrated in the drawings, is any suitable single pass translator for converting programming language instructions directly into machine language instructions.

If the CONVERSATIONAL mode was selected, block 590 passes control to a bock 594 which loads the modified language TRANSLATOR into the expanded F1 partition. The modified language TRANSLATOR consists of the standard language translator with the additions and modifications illustrated in FIGS. 12A-E. Having loaded the correct TRANSLATOR, the operations described by block 588, FIG. 11C, are completed.

Control now passes via input DA1 to block 600, FIG. 11D, which causes the TRANSLATOR program to be entered and executed. Briefly, in the RUN mode, the standard language TRANSLATOR requests a part number, which identifies the program to be run on that part. In response, the operator types the part number and the number of times he wishes the part number to be run. Then, the program identified by that part number is brought from DASD into the expanded F1 area, where the standard language TRANSLATOR converts all instructions in the program into machine part instruction blocks, which are then stored on DASD. All operator comments are typed out during the single pass conversion. Control then transfers back to the MONITOR, which returns from the TRANSLATOR at a block 605, FIG. 11D.

In the CONVERSATIONAL mode, however, different operations occur, as briefly set out below. These operations are explained in detail on the section on the modified language TRANSLATOR. First, an I/O operation requests the part number to be run. Since the CONVERSATIONAL mode can be used both to run existing programs and form new programs, the operator may either enter response with the message NEW, or a part number of an existing program. If a part number is entered, the language TRANSLATOR obtains from DASD the first instruction of that program, and translates it into machine language form. The machine part instruction is then stored on DASD, after which control returns to the TRANSLATOR, at block 605, FIG. 11D.

Or, if NEW is entered, the computer requests a part number, supplied by the operator, which will in the future identify the program about to be formed. Thereafter, the computer requests the first instruction in programming language form from the operator. When the operator supplies it, via the COMMUNICATIONS TERMINAL, the individual instruction is translated by the modified language TRANSLATOR, in much the same manner as an instruction supplied by DASD. The resulting machine part instruction is placed on DASD, after which control returns to the MONITOR; at block 605, FIG. 11D. In the CONVERSATIONAL mode, only one source or part instruction is translated, rather than the whole program, when control returns to the MONITOR.

Block 605, FIG. 11D, whether in the RUN or CONVERSATIONAL modes, passes control to a block 607, which determines whether the machine may be started. Assuming job end has not been reached, the Yes branch to a block 609 determines if the CONVERSATIONAL mode has been set. If it has, a block 610 rolls out onto DASD the modified language TRANSLATOR. Control now passes, whether in the RUN or CONVERSATIONAL mode, to a block 611, which rolls in the background partition, previously stored on DASD. Thereafter, SVC 43 is activated at block 612, setting the proper storage keys and activating the background program, after which the SUPERVISOR exits. Because the MONITOR has F1 priority, control returns from the SVC to the MONITOR and passes to input EA1, FIG. 11E.

A block 615, FIG. 11E, now fills the CPU BUFFERS with the machine part instructions which have just been translated and stored on DASD. For example, in the RUN mode, block 615 causes the first 41 blocks of machine part instructions to be entered in BUFFER area 306, FIG. 9, for NCMT-A. Then, the next 41 blocks of machine part instructions are entered in BUFFER area 307 for NCMT-A, and areas 306 and 307 are designated active and reserve, respectively. It should be noted that the MONITOR controlled buffer fill by blocks 615 is only for the initial loading of the BUFFERS, subsequent buffer filling routines being controlled by the SUPERVISOR, as previously described.

Since the BUFFERS are now filled, block 560 indicates to the SUPERVISOR that the BUFFERS are ready and block 561 outputs a machine start message. The operator may now actuate the START control, causing the DATA to be transmitted to NCMT-A in the manner previously described. Control then returns to the general exit routine at input AC1.

In the RUN mode, all machine part instructions in the program are now run, at least up to a program stop, after which the operator checks the reason for stopping and then actuates the START control to continue to run the program. As the BUFFERS are emptied, the buffer filling routine in the SUPERVISOR automatically fills the empty BUFFER, and the program continues until the END-OF-DATA character is reached.

In the CONVERSATIONAL mode, each source statement in programming language, from the COMMUNICATIONS TERMINAL, is translated by the modified TRANSLATOR into as many blocks of machine part instructions as are necessary to perform the indicated operation. At the end of all such machine blocks, an END-OF-DATA character is placed. Thus, in the CONVERSATIONAL mode, the END-OF-DATA character is reached after each individual instruction is executed.

Whenever the END-OF-DATA character is reached, thereby causing the SUPERVISOR to post an F1 task, the SUPERVISOR enters via SVC 40 and block 507, FIG. 11A, to determine if an F1 task is pending. The before described route is taken to block 630, FIG. 11B, which determines if it is a run completed task. Since it is, the Yes branch is taken to input EC2, FIG. 11E, and block 632 determines whether the END-OF-DATA character was caused because of a SEQUENCE SEARCH. In the present example, it was caused for a different reason, so the No branch is taken to a block 640, which determines whether the program is being executed in the RUN mode.

If in the RUN mode, the END-OF-DATA character indicates that the entire program has been run and program end has been reached. The Yes branch leads to a block 642 which determines whether another run of the same program is to be repeated. A repeat is indicated whenever the quantity of parts to be run, originally entered in response to the message sent by block 583, FIG. 11E, was greater than one. Each time a program is completed, one repeat is de-queued from the total quantity to be run. The Yes branch from block 642, FIG. 11E, indicating a program repeat, goes to block 615 which fills the CPU BUFFERS with the first machine blocks of the program already translated into machine language form. Thereafter, block 560 indicates the BUFFERS are ready and block 561 outputs a start message. This allows the same program to be repeated by the operator on actuating the START control.

After the last program repeat is run, the No branch of block 642 is taken, which via DE2, goes to a block 644, FIG. 11D, which outputs a job completed message. Thereafter, a block 645 zeroes the machine and buffer status indicators, after which the AC1 general exit routine is taken.

If in the CONVERSATIONAL mode, the No branch is taken from block 640, FIG. 11E. The END-OF-DATA character now indicates that the last instruction has been executed, and another instruction must be supplied. The No branch from block 640 activates SVC 42, and thereafter a block 651 rolls out the background partition onto DASD, after which a block 652 rolls in the modified TRANSLATOR from DASD. Thereafter, control passes to input DA1, FIG. 11D, which leads to block 600 and causes entry and execution of the TRANSLATOR program. The next instruction is now supplied, as will be explained in the section on the modified TRANSLATOR. Control now returns at block 605 and the instruction is executed as just described.

After the operator has supplied the last instruction he wishes to perform in the CONVERSATIONAL mode, the TRANSLATOR will again be entered. At that time, the operator may enter a PROGRAM END, which causes the program just formed to be permanently stored on DASD, after which the general exit routine is taken.

Modified Language TRANSLATOR Program

The modified language TRANSLATOR program consists of a standard single pass language TRANSLATOR, modified by the additions and changes illustrated in FIGS. 12A–E. When running a program in the CONVERSATIONAL mode, the modified language TRANSLATOR is rolled into the expanded F1 area between origins 301 and 303, as seen in FIG. 9. A part instruction in programming language form, either from an existing program stored on DISK or from the COMMUNICATIONS TERMINAL, and which is to be translated, is placed in a temporary work area designated WA-P, illustrated within the dashed lines in FIG. 9. The modified TRANSLATOR converts the instruction in WA-P into machine language form and places the converted instruction in another work area, designated WA-M, and similarly illustrated within dashed lines in FIG. 9.

The machine part instruction in WA-M is also placed into a temporary storage area on DISK 74, designated FILE M. When the machine part instruction in FILE M is to cause machine movement, as determined by alternatives in the CONVERSATIONAL mode, the modified MONITOR transmits the machine part instruction from FILE M to the corresponding F1 BUFFER area 306 or 307 for the machine tool to be moved, and thereafter controls transmission of machine part blocks to the machine tool.

By other alternatives in the CONVERSATIONAL mode, the operator may determine whether the part instruction which caused machine movement should be added to the program being formed, or should be discarded. If the operator accepts the instruction, the contents of WA-P are added to an area within DISK 74 which stores the new program being formed. This area, designated FILE P, contains all part instructions in programming language form which have been accepted by the operator. Having completed forming an entirely new program or reprogramming an existing program, the operator may cause the contents of FILE P to be transmitted to a permanent storage area (not illustrated) within DISK 74, and become a part of the library of programs available for future use.

When in the CONVERSATIONAL mode, several groups of alternatives are available to control different methods of handling each part instruction. All of the alternatives will be apparent from a description of the flow charts in FIGS. 12A–E. For convenience, certain of the alternatives are illustrated below in Chart A. All computer generated messages to an operator, and all operator generated messages to the computer, are communicated via the COMMUNICATIONS TERMINAL. As previously described, each alternative is given an arbitrary designation or code, to which the operator responds by one of several alternative answers, similarly identified by an arbitrary code. In some cases, the same code identifies different answers in response to different group of alternatives. Thus, Chart A is not a comprehensive listing of the meanings assigned to any given arbitrary code, but only indicates the meaning of the code in response to the indicated alternative. For this chart, computer generated instructions and messages to the operator are indicated by the designation (C) following the message. Those instructions and messages supplied by an operator are not followed by this designation.

CHART A

Partial List of Alternatives In CONVERSATIONAL Mode

| COMPUTER (C) or OPERATOR supplies | Meaning of operator response | | Next operation is |
|---|---|---|---|
| PUT (C): | Prior instruction: | Get next instruction from: | |
| Y | Accept | DASD | INSTRUCTION TYPED (C). |
| I | Delete | DASD | OK (C). |
| A | Accept | COM. TER | STATE (C). |
| N | Delete | COM. TER | |
| OK (C): | | | |
| Y | Yes proceed with machine motion | | Actuate START control. |
| | | | {PROCEED THRU XXXX (C). |
| P | Proceed uninterrupted thru XXXX | | {XXXX. |
| | | | {Actuate START control. |
| I | Ignore and get next instruction from DASD | | {INSTRUCTION TYPED (C). |
| | | | {OK (C). |
| N | Ignore and get next instruction from COM. TER | | STATE (C). |
| STATE (C): | | | |
| SAVE | Save new program being formed | | |
| COPY | Copy remaining existing program | | See Fig. 12E. |
| CANCEL | Cancel program | | |
| MOVEBACK | Move to last instruction position | | |
| PART INSTRUCTION | Operator supplies | | {INSTRUCTION TYPED (C). |
| | | | {OK (C). |

Referring to Chart A, the PUT alternative asks whether a prior instruction stored in WA-P, FIG. 9, should be accepted and placed in FILE P, or deleted by failure to place the instruction in FILE P. When the next instruction is placed in WA-P, the prior instruction stored therein is destroyed. The answer to the PUT alternative also indicates whether the next instruction should be obtained from DASD or from the COMMUNICATIONS TERMINAL.

The OK alternative generally asks whether machine motion may proceed. If it may, the information in FILE M, FIG. 9, is placed in the F1 BUFFER areas 36 and 307 by the MONITOR. However, if the answer to OK indicates the prior instruction should be ignored, the instruction in FILE M is not transmitted to the BUFFER areas. When the next machine part instruction from WA-M is written in FILE M, the previous machine part instruction is destroyed.

Whenever one of the answers to the PUT or OK alternatives indicates that the next instruction is to come from the COMMUNICATIONS TERMINAL, the computer responds by the STATE alternative. Usually, the operator responds to STATE by typing in programming language a part instruction to now be performed. The computer retypes the instruction or its equivalents, followed by the OK alternatives. Preferably, the retyped instruction is not the same instruction as the operator typed, but rather the absolutes and machine movement which the instruction will produce, so that the operator may check whether the machine movement will be what he had intended.

Figure 12B:
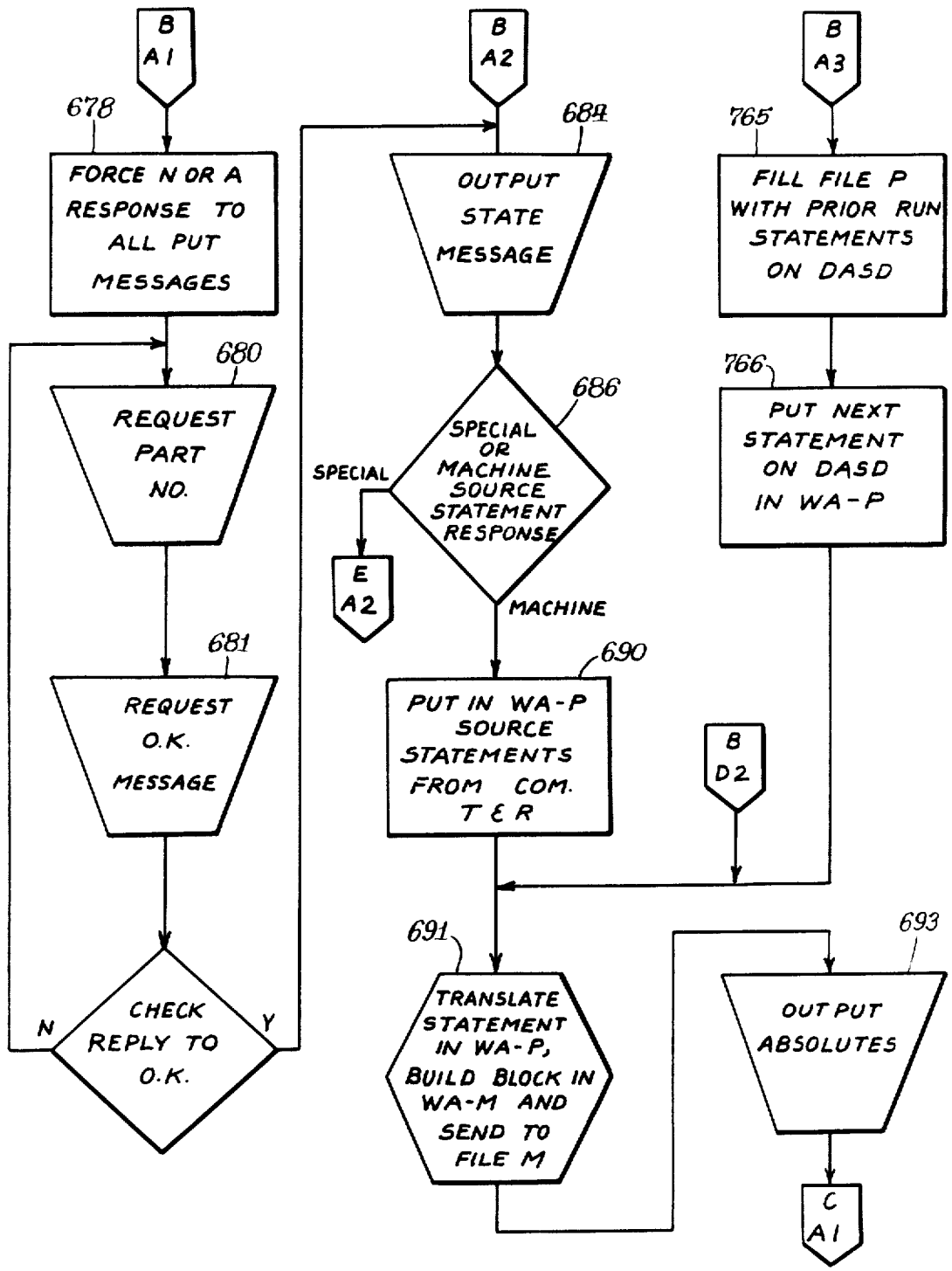

The details of the modified language TRANSLATOR program are illustrated in FIGS. 12A-E. Referring to FIG. 12A, it will be recalled that block 590 determines the mode set by the MONITOR, and in the case of the CONVERSATIONAL mode, loads the modified language TRANSLATOR into expanded F1, via block 594. This causes control to pass to the modified TRANSLATOR, which begins at a block 670, FIG. 12A. Block 670 opens FILE P in DASD, and thereafter a block 671 opens FILE M, in preparation for storage of the part program.

Control then passes to an I/O block 673 which requests via the COMMUNICATIONS TERMINAL the part number to be run. If the operator wishes to run an existing program, he enters a part number, via the COMMUNICATIONS TERMINAL, whereas if he desires to form an entirely new program, he enters NEW. Then, an I/O block 674 requests the set up number for the part at the machine tool. Thereafter, a block 675 determines if NEW was entered as the part number.

By way of example, it will first be assumed that an entirely new program is being formed by an operator at NCMT-A. Thereafter, examples of several of the special options available in response to the STATE alternative will be presented.

Since an entirely new program is being formed, NEW is entered as the part number and the Yes branch of block 675 is taken. This leads, via BA1, to a block 678, FIG. 12B, which forces an N or A response to all PUT messages (see Chart A).

Thereafter, an I/O block 680 again prints a request for the part number. The operator now supplies the part number to be assigned to the program being formed, after which the computer causes the same part number to be retyped, followed by a request for OK, as initiated by an I/O block 681. At this time, the replies to OK are only No and Yes. The No response N repeats the request for a part number. The Yes response Y causes an I/O block 684 to output the STATE message.

The STATE message allows the operator to choose one of several alternative replies, see Chart A. In response to STATE, the operator may select one of several special responses such as SAVE, COPY, CANCEL or MOVEBACK. Normally, however, the operator supplies a part instruction in programming language, i.e., a machine source statement, which the machine tool is now to perform.

A block 687 analyzes the operator reply to STATE. If a machine source statement was supplied, the machine branch is taken to a block 690, which puts that source statement in WA-P. Thereafter, a block 691 causes the statement in WA-P to be translated into machine language form, placed in WA-M, and sent to FILE M. After translation, an I/O block 693 outputs the absolute position the machine tool will assume if it executes the instruction just supplied by the operator. Other information may also be supplied to inform the operator of the machine response that the source instruction will cause. These outputs are identified as INSTRUCTION TYPED in Chart A.

Figure 12C:
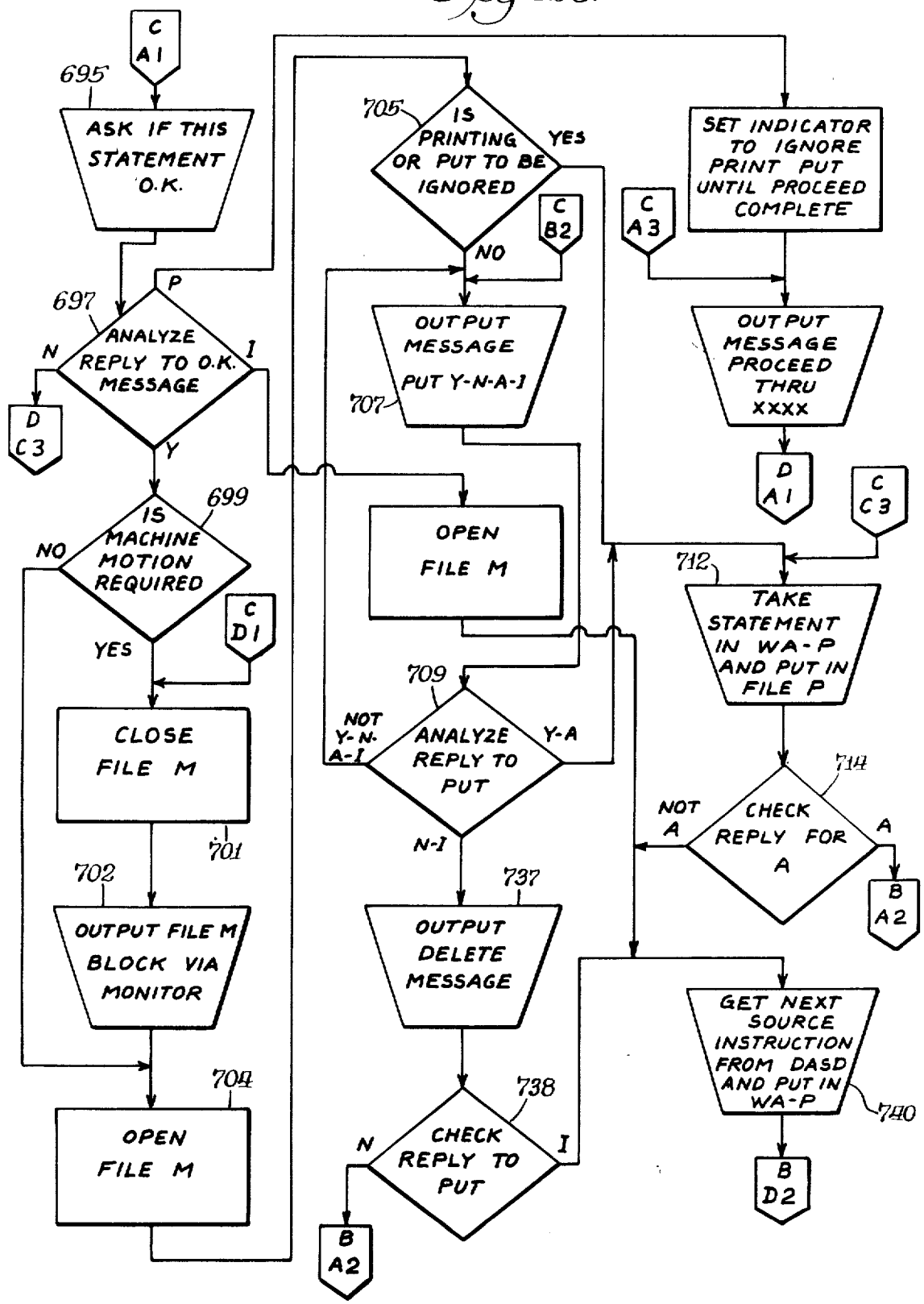
Figure 12D:
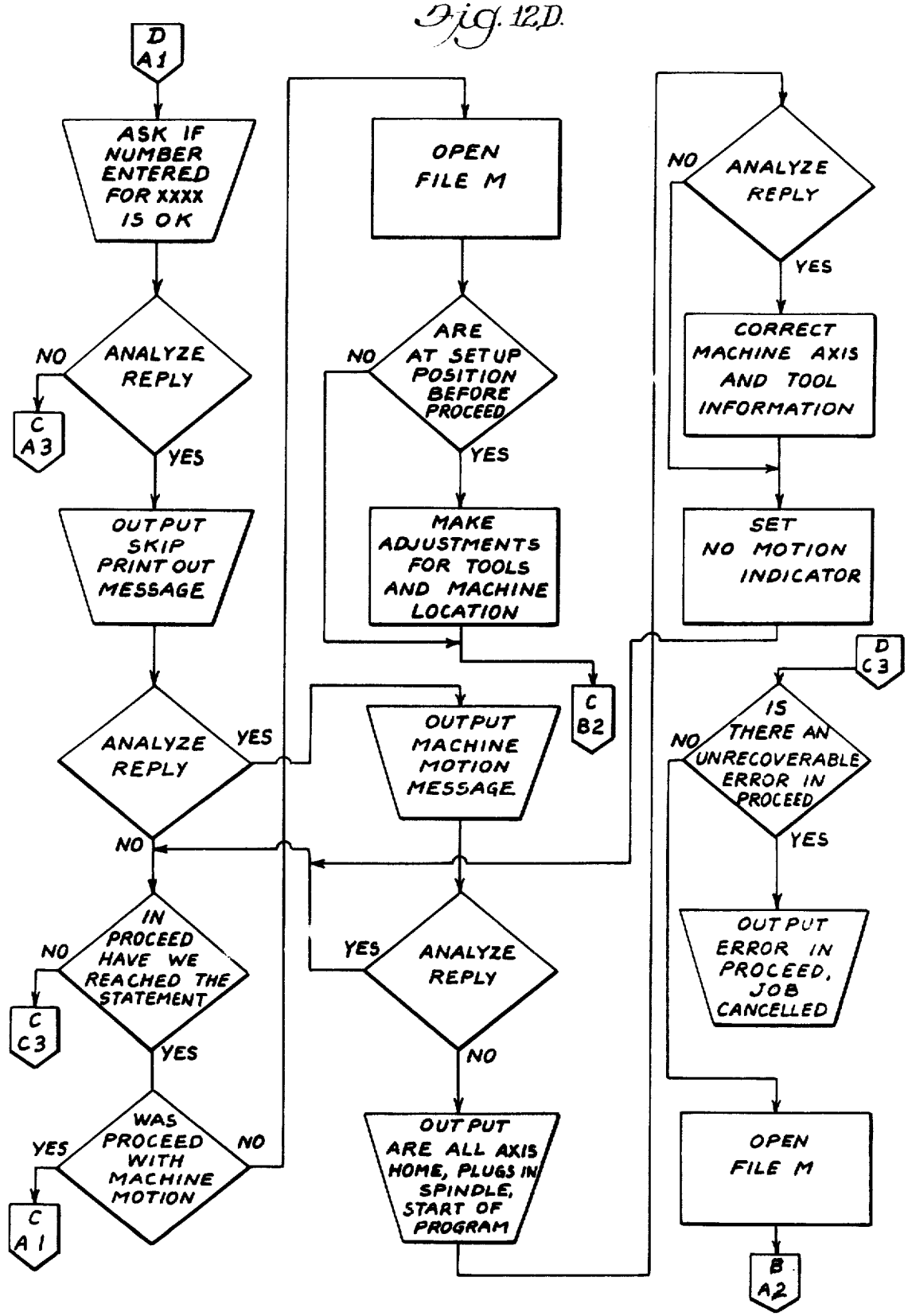

After outputting the absolutes and other messages, control passes via CA1 to an I/O block 695, FIG. 12C, which outputs the OK statement. The responses available to this OK message are shown in Chart A. Assuming, for example, that the statement is okay, the operator responds with Y in order to proceed with machine motion. The other responses to OK can be followed by tracing the flow diagram therefore. The response to OK is analyzed at a block 697. At this time, the Y branch is taken to a block 699 which determines whether machine motion is required. Since it is, the Yes branch is taken to a block 701 which closes FILE M, and thereafter passes control to an I/O block 702 which outputs the contents of FILE M via the MONITOR program.

As previously explained, the MONITOR causes the contents of FILE M to be placed in the NCMT-A F1 BUFFER area 306 or 307, and thereafter activates SELECTOR CHANNEL 1 electronics to cause the machine blocks to be transmitted via CU MT to DEVICE LOGIC A. The operator then actuates the START control at OPERATOR CONSOLE A, causing the machine block to be transferred to the active storage areas and produce machine movement.

Meanwhile, control passes to a block 704, FIG. 12C, which opens FILE M and destroys all DATA previously stored therein, after which control passes to a block 705 which determines whether printing of PUT, or the responses to PUT, are to be ignored. If not, control passes to an I/O block 707, which outputs the PUT message. The operator now supplies one of the responses shown in Chart A. That is, the operator may accept the part instruction which just caused machine movement, and add that part instruction to FILE P. Or, the operator can cause the part instruction to be deleted by not adding it to FILE P. This allows the operator to move and control NCMT-A without forming a permanent record thereof. In either case, the operator chooses whether the next instruction is to come from the COMMUNICATIONS TERMINAL or from DASD. In the case of a new program, as is being described, the only available alternatives at this time are to get the next instruction from the COMMUNICATIONS TERMINAL, as no existing program is being modified which would have instructions on DASD.

Assuming the operator decides to accept the prior instruction and get the next instruction from the COMMUNICATIONS TERMINAL, he selects the A response, see Chart A. After outputting the PUT message, control passes to a block 709, FIG. 12C, which analyzes the operator's reply to PUT. At this time, the Y-A branch is taken to an I/O block 712 which takes the statement in WA-P and puts it in FILE P, thus adding the part instruction in programming language form, to the new program being formed.

A block 714 now determines whether the A response was supplied by the operator. Since it was, control passes via the A branch and input BA2 to block 684, FIG. 12B, which again repeats the STATE message. The same sequence of operations now is repeated for each instruction supplied by the operator.

An example will now be given in which one of the special responses is selected by the operator. After proceeding to a given point in either a new or an existing program, the operator may select a special response, see Chart A, to the STATE message. Block 686, FIG. 12B, analyzes this response and causes the special branch to be taken and passes control via input EA2 to a block 720, FIG. 12E. Block 720 now analyzes the special response supplied by the operator.

If the response is CANCEL, control passes to a block 723 which cancels the contents of FILE P and FILE M, thus erasing the program so far formed in FILE P and the present machine part instruction in FILE M. Thereafter, an I/O block 724 outputs a CANCEL message to the operator, after which a general MONITOR exit routine is taken via block 725, returning control to block 605, FIG. 11D, in the MONITOR.

After response which may be chosen by the operator is MOVEBACK. This causes control to pass from block 720, FIG. 12E, to a block 730 which calculates the difference between the present absolute position of the machine tool, and the prior absolute position of the machine tool before performing the last source instruction. As previously explained, the MOVEBACK feature is different than a RETRACT operation, which only returns the machine tool to its prior position before performing the last machine block. One source statement in programming language may generate several machine blocks. MOVEBACK returns the machine tool to its prior position before performing the last source statement, and thus may return the machine tool through many machine blocks.

Block 730 searches a standard program record containing the absolute positions of the machine tool after performing each source instruction, to determine the present absolute position of the machine tool, and the prior absolute position before the last source instruction was performed. Then, block 730 calculates the difference between these absolute positions, and passes control to a block 731 which builds in WA-M a machine part instruction to produce this difference movement. A block 732 puts the instruction in WA-M into FILE M, after which a block 734 forces an N or I response to the next PUT message. As seen in Chart A, the N and I responses to PUT will cause the machine part instruction to be deleted, destroyed after producing movement, in order that the special difference calculation will not become a part of the program being formed.

Thereafter, control passes via input CD1 to block 701, FIG. 12C, which closes FILE M and outputs the contents, via the MONITOR, to the machine tool. The operator now actuates the START control, and causes the machine tool to move back. Then control passes to block 707 which outputs the PUT message, to which the operator selects the N or I response. This response is analyzed in block 709, causing the N-I branch to be taken to an I/O block 737 which outputs a DELETE message.

A block 738 now checks whether the N or I response to PUT was chosen. The N response, see Chart A, indicates that the next instruction is to come from the COMMUNICATIONS TERMINAL. Accordingly, the N branch of block 738 outputs via input BA2 to block 684, FIG. 12B, which outputs the STATE message, allowing the operator to supply the next part instruction.

Or, if the I response is selected, indicating that the next instruction is to come from DASD (when an existing program is being run), control passes to a block 740, FIG. 12C, which obtains the next source statement on DASD and places this statement in WA-P for translation. When the MOVEBACK operation is being performed, this statement is the one which was performed when the operator selected MOVEBACK, in order that the program will continue to run in the proper sequence. Then, control passes via BD2 to block 691, FIG. 12B, which translates this statement. Thus, upon completing the MOVEBACK operation, the special MOVEBACK calculation is deleted and control returns to the operator to an existing program.

Finally, the operator could select the SAVE or COPY responses to the STATE message. These responses are only available when running an existing program in the CONVERSATIONAL mode. Both the SAVE and COPY responses pass control from block 720, FIG. 12E, to a block 745 which copies the remaining portion of the existing program stored on DASD, by placing the same in FILE P, and thereafter closing FILE P. A block 746 then builds a standard program end, after which a block 748 determines whether the SAVE or COPY response was selected.

The COPY response is used when an operator has proceeded through an existing program up to a point at which no further changes are to be made. Rather than run through the remaining individual instructions, the COPY option adds the remaining part of the existing program to FILE P, in order to complete the program without machine movement. The COPY response causes control to pass from block 748 to block 725, namely the general MONITOR exit routine. Since a program end was built, the program just copied is handled in the same manner as any completed program, and is placed in permanent storage for future use.

If the operator desires machine movement, he may select the P response to the OK alternative. As seen in Chart A, this response initiates a procedure whereby the operator can cause the program to proceed uninterrupted through any existing sequence member, including through program end, with machine movement.

The SAVE response is a safety measure to insure that an operator's work will not be accidentally destroyed, and is especially useful whenever he has substantially changed an existing program. When running a program in the CONVERSATIONAL mode, the accepted instructions are stored in FILE P, which is temporary storage area. Should a computer failure occur, the contents of all temporary storage areas including FILE P, could be destroyed, thus destroying the program formed by the operator. Such a computer failure would not destroy programs stored in permanent storage areas in DASD.

To prevent possible destruction of a program being formed, the operator selects the SAVE routine. This routine copies the remaining portion of the existing program which the operator is changing, and places it in permanent storage as though it was completed. Then, a designated portion of this program is read and placed in FILE P (without destroying the read portion in the permanent storage area), allowing the operator to continue the program from that point. Should the contents of FILE P be accidentally destroyed, there is still available the permanent program which contains all of the operator's changes up to the point at which he initiated the SAVE routine. Thus, the substantial work already accomplished by the operator will not be inadvertently destroyed.

Figure 12E:
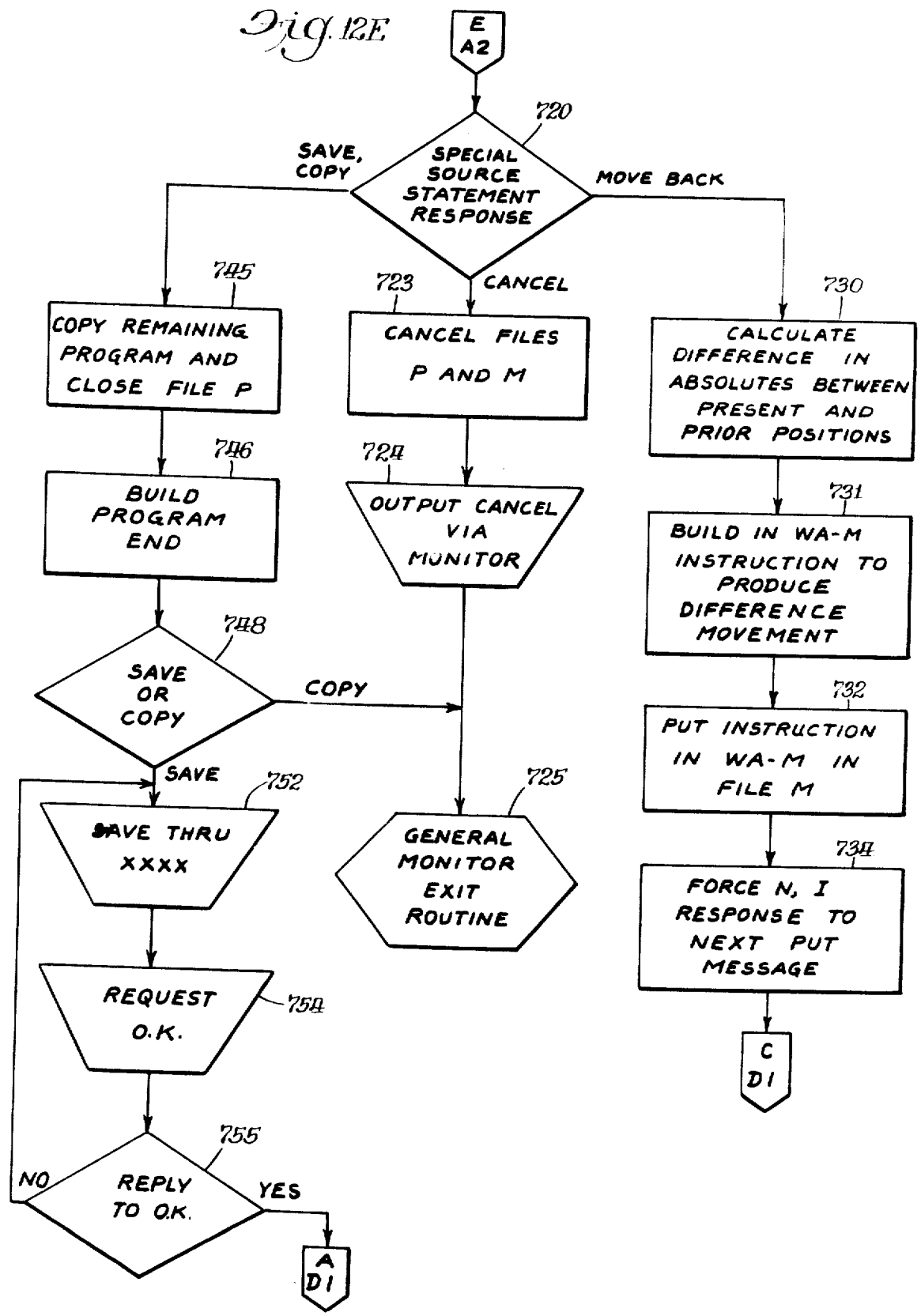

The SAVE routine proceeds in the same manner as COPY up to block 748, FIG. 12E. That is, the remaining portion of the existing program is copied, with PROGRAM END, causing the contents of FILE P to be placed in a permanent storage area in DASD. At block 748, control passes to an I/O block 752, which outputs a SAVE THROUGH XXXX message via the COMMUNICATIONS TERMINAL. The operator now types the sequence number at which the saved program is to be continued. It is not necessary for the operator to return to the same point at which he made the SAVE, and he could, for example, return to a point substantially after the SAVE.

Upon supplying the sequence number, the operator actuates EOT, and control passes to an I/O block 754 which then outputs the OK message. The operator responds by Yes or No, followed by EOT. Then control passes to a block 755 which analyzes the operator's reply to OK. The No response causes the SAVE THROUGH XXXX message to be repeated.

The Yes response passes control via input AD1 to the start of the TRANSLATOR program, at block 670, FIG. 12A. FILE P, the contents of which have already been placed in permanent storage, is opened to destroy the prior contents thereof. Then, FILE M is opened, after which block 673 requests the part number to be run. The operator responds by supplying the part number of the program which has been saved, and its number.

Control now passes to block 675 which determines whether NEW was entered as the part number. Since it was not, the NO branch is taken to a block 760, which obtains the first source statement from the permanent storage area, and places it in WA-P. Then, several standard statements are placed in FILE P, which for example, identify the first machine movement part instruction so that when multiple runs are made, requests for the part number and set up number are deleted.

After building the necessary preliminary statements, a block 763 determines if this is a SAVE routine. Since it is, control passes via the Yes branch and input BA3 to a block 765, FIG. 12B. FILE P is now filled with all source instructions through the sequence number entered by the operator in response to block 752, FIG. 12E. Normally, this sequence number is the last step performed by the operator, since the machine tool must continue its movement from that point. Then, a block 766 puts the next statement on DASD in WA-P. Block 766 branches to block 691 which translates the statement in WA-P, and thereafter the program continues in a normal manner.

CUA

Figure 13A:
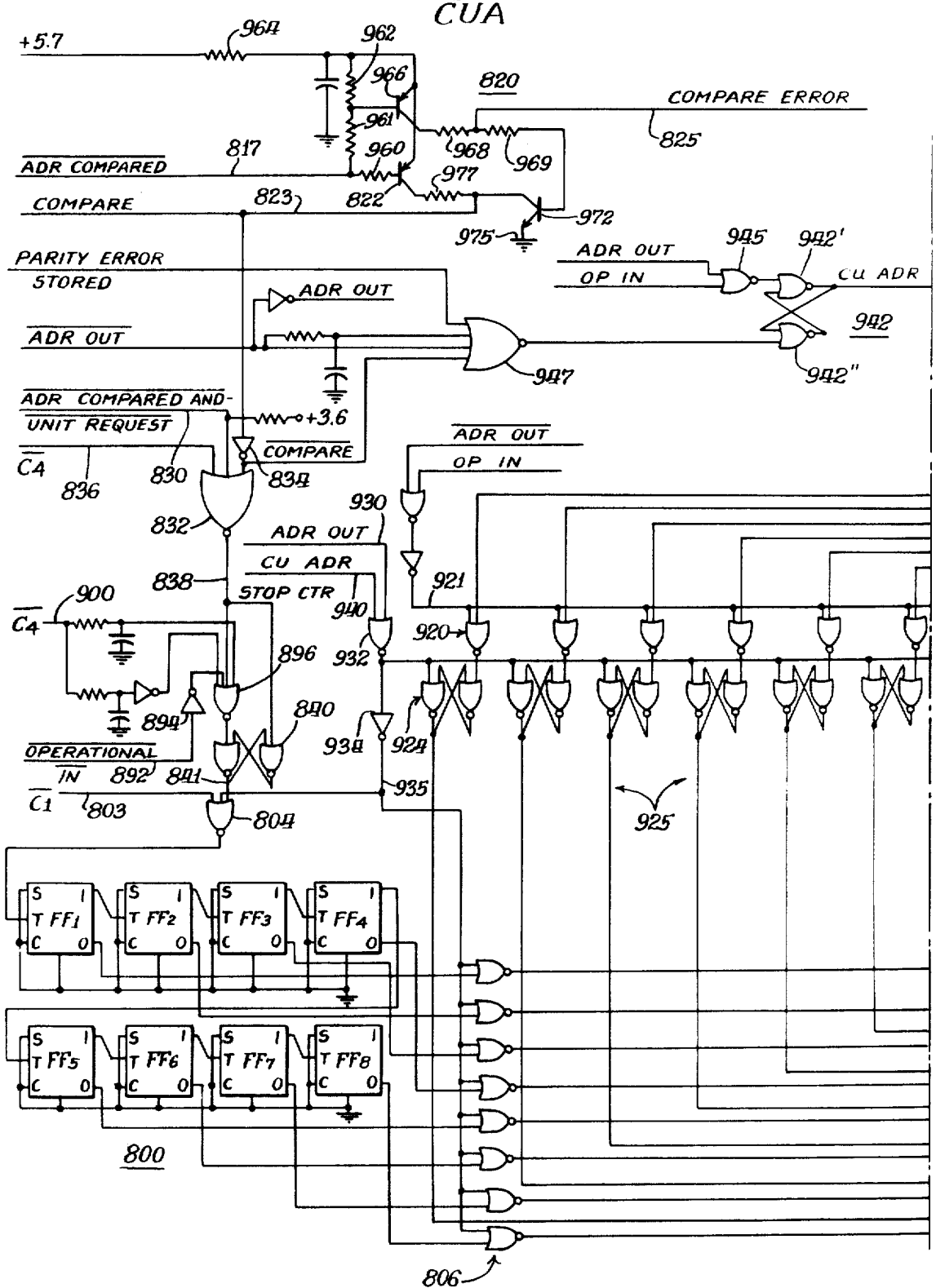
FIGS. 13A-B are a schematic diagram of the CUA.
Figure 13B:
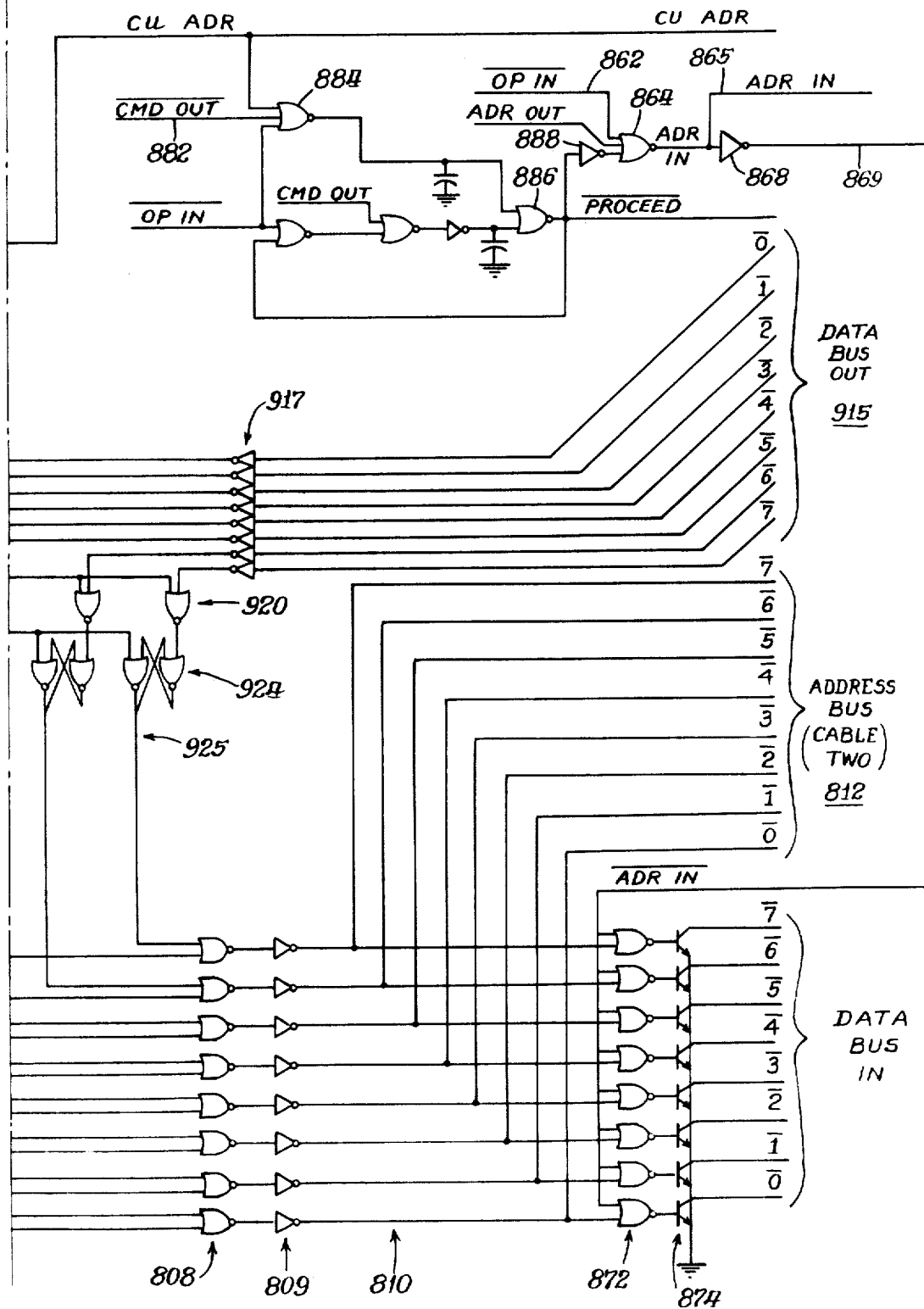

The CUA is illustrated in detail in FIGS. 13A and 13B. An address counter 800, FIG. 13A, formed from eight JK flip-flops $FF_1$ through $FF_8$, continuously cycles through the addresses of all of the DEVICE LOGIC units connected to CABLE TWO of that CU MT. When the computer is off-line, namely, no computer request for communications is pending, and no DEVICE LOGIC unit has a request pending, address counter 800 is triggered on the negative going edge of each clock pulse C1, which enters at a block 803 and is passed through a NOR gate 804. The output of NOR 804 is connected to the toggle input T of $FF_1$, and upon termination of C1 time, the counter is stepped to its next state.

The output of counter 800 is passed or blocked by NORs 806. The 0 output line of each $FF_1$–$FF_8$ is connected to a separate input of the two input NORs 806. At this time, NORs 806 are enabled and pass the count to individual NOR gates 808, FIG. 13B, which serve as separate AND gates for each bit of the binary count. The low going output is coupled through inverters or NOR gates 809 to output lines 810.

Connected in parallel with lines 810 is the ADDRESS BUS OF CABLE TWO, as seen at location 812 in FIG. 13B. As will appear, the clock cycle time is 1 megahertz, each cycle of the clock generating four equally spaced pulses C1 through C4. Thus, a C1 pulse occurs each microsecond, so that counter 800 is cycled through all 256 of its addresses every 256 microseconds, 1 microsecond for each address.

Counter 800 actually counts down negated addresses. In addition, the addresses stored on the CUA are not addresses in a true state, but negated addresses and the output lines of DATA BUS OUT, DATA BUS IN and the ADDRESS BUS, FIG. 13B, are the negated lines of those BUSes. The storing and generation of negated signals are utilized because the NOR gates, as is well known, generate a unique 1 output only when all inputs are not present, i.e., 0's.

For convenience in explaining the general operation of the CUA and other boards, signals which cause an operation when present will often be referred to in terms of their true state. Thus, if something happens at C1 time, the signal causing the operation may be $\overline{C1}$, which occurs when a logical 0 rather than a logical 1 is present. Similarly, references to addresses in the above description actually refers to the negation of the addresses, as is apparent from the drawings.

As each address is coupled to the ADDRESS BUS at 812, it is propagated along CABLE TWO to the DEVICE LOGIC units. The DEVICE LOGIC unit which recognizes the address as its own raises the ADR COMPARED tag of CABLE TWO, raising a line 817 at the CUA, FIG. 13A, in answer to the address placed on the ADDRESS BUS. The raising of ADR COMPARED line 817 occurs within the time span between the C1 and C4 clock pulses of the same clock cycle, that is, within 750 nanoseconds.

An error comparison circuit 820 determines whether more than one DEVICE LOGIC unit has answered by raising its ADR COMPARED line. Each DEVICE LOGIC unit draws 5 milliamps off of ADR COMPARED line 817, when placing an answering 0 thereon. With only 5 milliamps being drawn, only a PNP transistor 822 of circuit 820 is turned on, i.e., driven into saturation, generating a COMPARE signal at a line 823. This indicates no error occurred. However, should 10 or more milliamps be drawn on line 817, indicating that more than one DEVICE LOGIC unit has answered the same address, circuit 820 disables generation of the COMPARE signal on line 823, and instead generates a $\overline{\text{COMPARE ERROR}}$ signal at a line 825. The absence of a COMPARE on line 823 prevents the counter from stopping and hence servicing the DEVICE LOGIC units should a UNIT REQUEST be pending, since two or more DEVICE LOGIC units are incorrectly on line. COMPARE ERROR line 825 may go to any suitable indicator for recording the occurrence of the error.

Error comparison circuit 820 completes its operation before the occurrence of the next C1 clock pulse, which steps counter 800 to the next address. While counter 800 is continuously cycling through its addresses, either a computer initiated request, or a DEVICE LOGIC initiated request for communications may occur.

As a first example, it will be assumed that a DEVICE LOGIC unit has raised its UNIT REQUEST tag, indicating that it wishes to communicate with the computer. Counter 800 continues to cycle through its addresses, until it reaches the address of the DEVICE LOGIC unit which has raised Unit Request. After placing that address on the ADDRESS BUS, the DEVICE LOGIC unit raises the ADR COMPARED and UNIT REQUEST tag, generating a low going or 0 signal at a line 830, which is an enabling leg of a NOR gate 832. If only one DEVICE LOGIC unit has answered on ADR COMPARED, the COMPARE signal is generated on line 823 by error comparison circuit 820, which signal passes through a NOT gate 834 and enters NOR 832 as $\overline{\text{COMPARE}}$. Thus, if only one DEVICE LOGIC unit has answered, the $\overline{\text{COMPARE}}$ line goes to 0, also tending to enable NOR 832.

The delay time chosen to allow the signals to travel from the CUA to the DEVICE LOGIC unit and back again is approximately 750 nanoseconds, at which time $\overline{C4}$ appears at a line 836. Since all 0's now appear at NOR 832, a 1 output or STOP CTR (stop counter) signal is generated at a line 838. This actuates a stop counter flip-flop 840, having an output line 841 which now goes to 1 and blocks NOR 804, preventing future $\overline{C1}$ pulses at line 803 from triggering counter 800. Thus, counter 800 is stopped at the address which caused the ADR COMPARED AND UNIT REQUEST tag to be raised. The address of the counter is passed through NORs 806, 808 and 809 to lines 810 and appears on the ADDRESS BUS during the whole time that communications is occurring with the DEVICE LOGIC unit whose address is now maintained over the ADDRESS BUS.

The computer is now informed of the address of the DEVICE LOGIC unit which has been seized by holding the address thereof on the ADDRESS BUS. In FIG. 17A, a time chart illustrates the control unit initiated sequence now being explained. The raising of the UNIT REQUEST AND ADR COMPARED tag occurs at time 850. As will appear, the CUB in response thereto raises the REQUEST IN tag, at 852, informing the computer that it has a request pending at this time. When the computer is ready to service the request, it raises the HOLD OUT and the SELECT OUT tags, as seen at 853. This causes the CUB to raise OPERATIONAL IN at 854. As will now be explained, the CUA in response to the raising of OPERATIONAL IN raises the ADDRESS IN tag at 856, causing the ADDRESS BUS now being maintained over the ADDRESS BUS to be gated onto DATA BUS IN, as seen at 858.

Returning to the CUA and FIG. 13B, when OP IN (OPERATIONAL IN) is raised, a line 862 goes to 0, thereby enabling a NOR gate 864 and producing a 1 output on a line 865, which is the ADR IN tag. Thus, the CUA raises the ADR IN tag.

Line 865 is also coupled to a NOT gate 868 to produce ADR IN on line 869, enabling a plurality of NOR gates 872. NORs 872 now pass the address on line 810 to a plurality of NPN transistors 874. The presence of a bit drives the transistors 874 into saturation, thus gating the address maintained over the ADDRESS BUS onto DATA BUS IN.

Referring again to FIG. 17A, when the computer recognizes the address on DATA BUS IN as an address, and records the information therefrom, it raises the COMMAND OUT tag, as seen at 880. This causes the ADDRESS IN tag to drop, which in turn causes the address on DATA BUS IN to be dropped. Returning to the CUA, FIG. 13B, the CMD OUT (COMMAND OUT) signal enters at a line 882 and is one input leg of a NOR 884. When COMMAND OUT is raised, negated line 882 goes to 0, causing all 0's to input at NOR 884, generating a 1 which inputs to a NOR gate 886. This input forces the output of NOR 886, called $\overline{\text{PROCEED}}$, to go to 0, indicating that CUA operations may proceed. The 0 signal is inverted by a NOT 888 to produce a 1 input to NOR 864, thus disabling the NOR and producing a 0 on ADR IN tag 865. At the same time, NOT 868 negates the 0 to produce a 1 at line 869, which disables NORs 872 and blocks the counter address from passing to DATA BUS IN. Of course, the address is still maintained on the ADDRESS BUS of CABLE TWO.

When communications with the DEVICE LOGIC unit have been completed, as will be explained later, the CUB drops the OPERATIONAL IN tag. This causes the negation thereof at a line 892, FIG. 13A, to go to 1 and be inverted by a NOT 894 to form a 0 input to a NOR gate 896. At the same time, the ADR COMPARED AND UNIT REQUEST tag is dropped, causing the negation thereof at line 830 to go to 1, forcing NOR 832 to generate a 0 on STOP CTR line 838, which also forms another input to NOR 896. At $\overline{C4}$, a 0 on a line 900 is passed through delay networks to a pair of inputs to NOR 896, thereby enabling the NOR. The resulting 1 output is coupled to the reset input of flip-flop 840. This resets flip-flop 840 and causes a 0 output on line 841, thereby terminating the disabling 1 input to NOR 804. Thereafter, NOR 804 passes $\overline{C1}$ pulses to the counter, causing the counter to start to cycle from its previously stopped position. This returns the CUA to the computer off-line condition.

An example will now be given of a computer initiated request for communications with a particular DEVICE LOGIC unit. While the computer is off-line, address counter 800 continues to cycle through the addresses which are available. The computer initiates communications, as seen in FIG. 17B, by raising the ADDRESS OUT tag at 910, and also placing an address, as seen at 911, on DATA BUS OUT. Returning to FIG. 13B, this address enters on negated BUS lines at 915, and is passed through NOT gates 917 to a plurality of NOR gates 920, seen in FIGS. 13A and 13B. As will appear, NORs 920 are enabled at this time by a common input line 921 which carries a 0, causing the address bits to pass to a plurality of RS flip-flops 924, and be stored therein. Flip-flops 924 actually store the negated address, as is apparent from the drawing, and produce a 1 output on output lines 925 only if a bit is not present on the true (not negated) lines of DATA BUS OUT.

At the same time, as will appear, the raising of the ADR OUT tag stops the address counter 800 and blocks NORs 806, FIG. 13A, to prevent the address then being maintained by address counter 800 from being passed to the ADDRESS BUS. The AND acting NORs 808, which are coupled to output lines 925 in addition to the now blocked output lines from address counter 800, now pass only the address stored in flip-flops 924, thus substituting over the ADDRESS BUS the computer generated address for the address of the stopped address counter 800. The address counter 800 is stopped at this time to insure that no machine tools will be missed once the computer initiated sequence is completed, by allowing the CUA to continue servicing the machine tools from the point at which it had been interrupted.

The stopping of address counter 800 and the blocking of NORs 806, FIG. 13A, is initiated by the raising of ADR OUT on a line 930. As line 930 goes high, the output of a NOR gate 932 goes low, and is inverted by a NOT gate 934 to produce a 1 output on a line 935. Line 935 branches to both NOR 804 and NORs 806. The 1 output coupled to NOR 804 blocks the gate and prevents $\overline{C1}$ pulses at line 803 from being passed to counter 800. The 1 output coupled to NORs 806 blocks the gates and prevents the binary output of counter 800 from being passed to NORs 808, FIG. 13B, thereby causing only the address stored by flip-flops 924 to be passed to the ADDRESS BUS. When the DEVICE LOGIC unit which has been addressed recognizes its address, it will raise ADR COMPARED and actuate the error comparison circuit 820, FIG. 13A, as previously described.

Address counter 800 must be stopped and blocked during the total time that the computer is communicating with the addressed DEVICE LOGIC unit. The ADR OUT tag is raised for only a short time period, so to maintain a 1 input to NOR 932, in order to block NORs 804 and 806, an input line 940, called control unit addressed or CU ADR, is also provided to NOR 932. CU ADR is generated by a flip-flop 942, FIG. 13A, which is set throughout the time that the computer is communicating with the DEVICE LOGIC unit.

CU ADR flip-flop 942 is initially set as follows. A reset leg is coupled to a NOR 945 whose inputs are ADR OUT and OP IN. As ADR OUT is raised, the output of NOR 945 goes to 0, thus providing one activating input for NOR 942' which forms one side of flip-flop 942. The other side of flip-flop 942, formed by a NOR 942'', is coupled to a NOR 947, which at this time has a 1 output. The 1 output causes the output of NOR 942'' to be 0, thus causing both inputs of NOR 942' to be 0 and set flip-flop 942, generating a 1 on the line labeled CU ADR.

NOR 947 has a 1 output because all four inputs thereof now are 0's. One input is PARITY ERROR STORED, which is 0 whenever there has been no parity error during an exchange of DATA over CABLE ONE. The next two inputs of NOR 947 are connected to $\overline{\text{ADR OUT}}$, one input being directly connected thereto and the other input being connected through an RC network which delays $\overline{\text{ADR OUT}}$ by an amount to be explained. Finally, the fourth input to NOR 947 is $\overline{\text{COMPARE}}$. This input goes to 0 approximately 750 nanoseconds after the computer initiated address, stored in flip-flops 924, has been gated onto the ADDRESS BUS. If only one DEVICE LOGIC unit answers the address by raising ADR COMPARED, only transistor 822, FIG. 13A, of error compare circuit 820 is gated on, thereby generating the COMPARE signal at line 823. This signal is negated by NOT 834 and appears as a 0 input to NOR 947. The RC network delay on $\overline{\text{ADR OUT}}$ is chosen to allow sufficient time for $\overline{\text{COMPARE}}$ to appear. Thus, NOR 947 has a 1 output which sets CU ADR flip-flop 942.

When the computer finishes communications with the addressed DEVICE LOGIC unit, the CUB drops OP IN. Since ADR OUT exists for only a short time period, it is also 0 at this time, hence both inputs to NOR 945 are 0, generating a 1 output which resets CU ADR flip-flop 942, terminating the CU ADR signal. This causes line 940 to go to 0, and since ADR OUT is also 0, NOR 932 generates a 1 which is negated by NOT 934 to produce a 0 on line 935. As previously explained, this enables NOR 804 and NORs 806, thus releasing address counter 800 for further counting, and passing the output thereby to the ADDRESS BUS.

When the computer generated address is first stored in flip-flop 924 and passed to the ADDRESS BUS, the CUB raises OPERATIONAL IN, as seen at 955 in FIG. 17B. A short time thereafter, at 957, the CUA raises the ADDRESS IN tag and causes the same computer generated address to be gated onto DATA BUS IN, as seen at 958. This check insures that the DEVICE LOGIC unit which has been seized is the one that the computer had addressed.

Returning to the CUA, FIG. 13B, the ADR IN line 865 is raised, as previously described, when $\overline{\text{OP IN}}$ line 862 goes to 0. The other inputs to NOR 864 are also 0, that is, ADR OUT has by now been dropped, and the input to NOT 888 is 1. The latter occurs because both inputs to NOR 886 are 0, noting that NOR 884 is connected to CU ADR, which is a 1, forcing the output of NOR 884 to be 0.

Upon the raising of ADR IN, $\overline{\text{ADR IN}}$ on line 869 goes to 0 and hence enables NORs 872, thereby gating the address then on the ADDRESS BUS also onto DATA BUS IN. When ADR IN is dropped, NORs 872 are blocked by a 1. The above sequence completes the description of the CUAs operation during a computer initiated communications sequence.

The operation of compare error circuit 820 is as follows. ADR COMPARED line 817 is coupled through a 2.7 kilohm resistor 960 to transistor 822, and also through a pair of series connected 150 ohm resistors 961 and 962, and a 27 ohm resistor 964 to +5.7 volts. The junction of resistors 961 and 962 is coupled to the base of another PNP transistor 966. The collector of transistor 966 is coupled through a 680 resistor 968 and a 2.7 kilohm resistor 969 to the base of a NPN transistor 972, the emitter of which is coupled to a source of DC reference potential or ground 975. The collector of transistor 972 is coupled through a 680 ohm resistor 977 to the collector of transistor 822.

When only 5 milliamps are drawn off line 817, indicating that only one DEVICE LOGIC unit has answered an address, only transistor 822 is driven into saturation, both transistors 966 and 972 being biased off. When 10 milliamps or more are drawn off line 817, transistor 866 is also driven on, thereby driving transistor 972 into saturation and causing COMPARE line 823 to be connected through the collector-emitter junction of transistor 972 to ground 975. This causes the COMPARE line 823 to go to 0. At the same time, the current flow through resistors 968 and 969 raises the potential on line 825 to a logical 1. Thus, when more than one DEVICE LOGIC unit answers by raising ADR COMPARED, the COMPARE signal is prevented from being generated, and the COMPARE ERROR signal is generated.

CUB

Figure 14A:
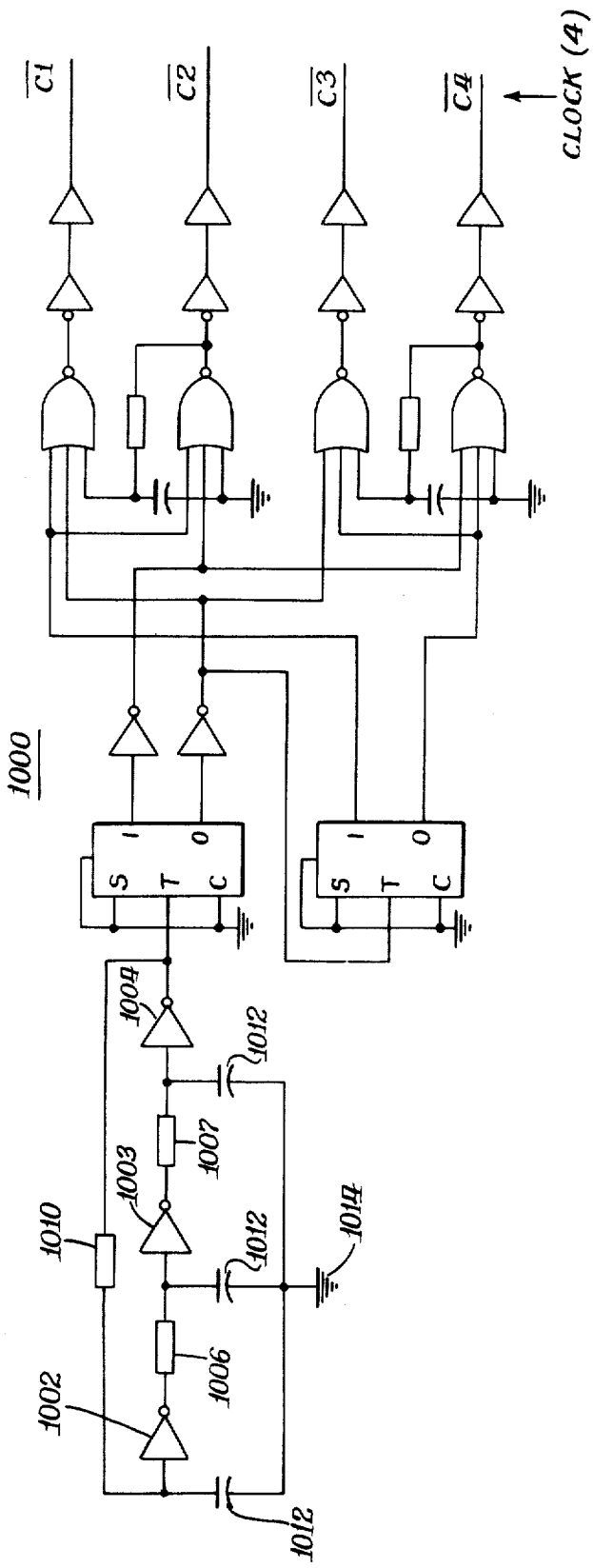
FIGS. 14A-C are a schematic diagram of the CUB.
Figure 14B:
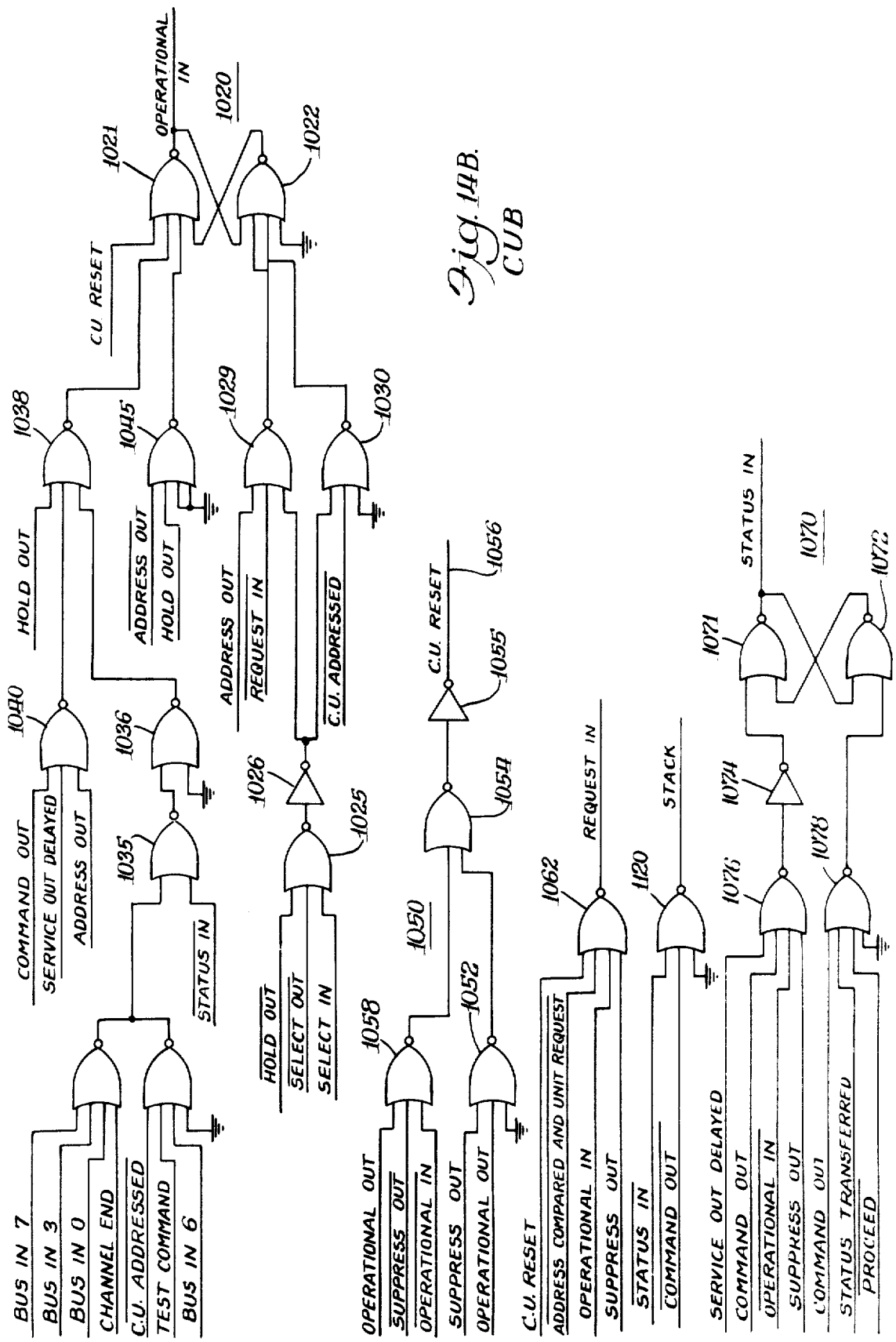
Figure 14C:
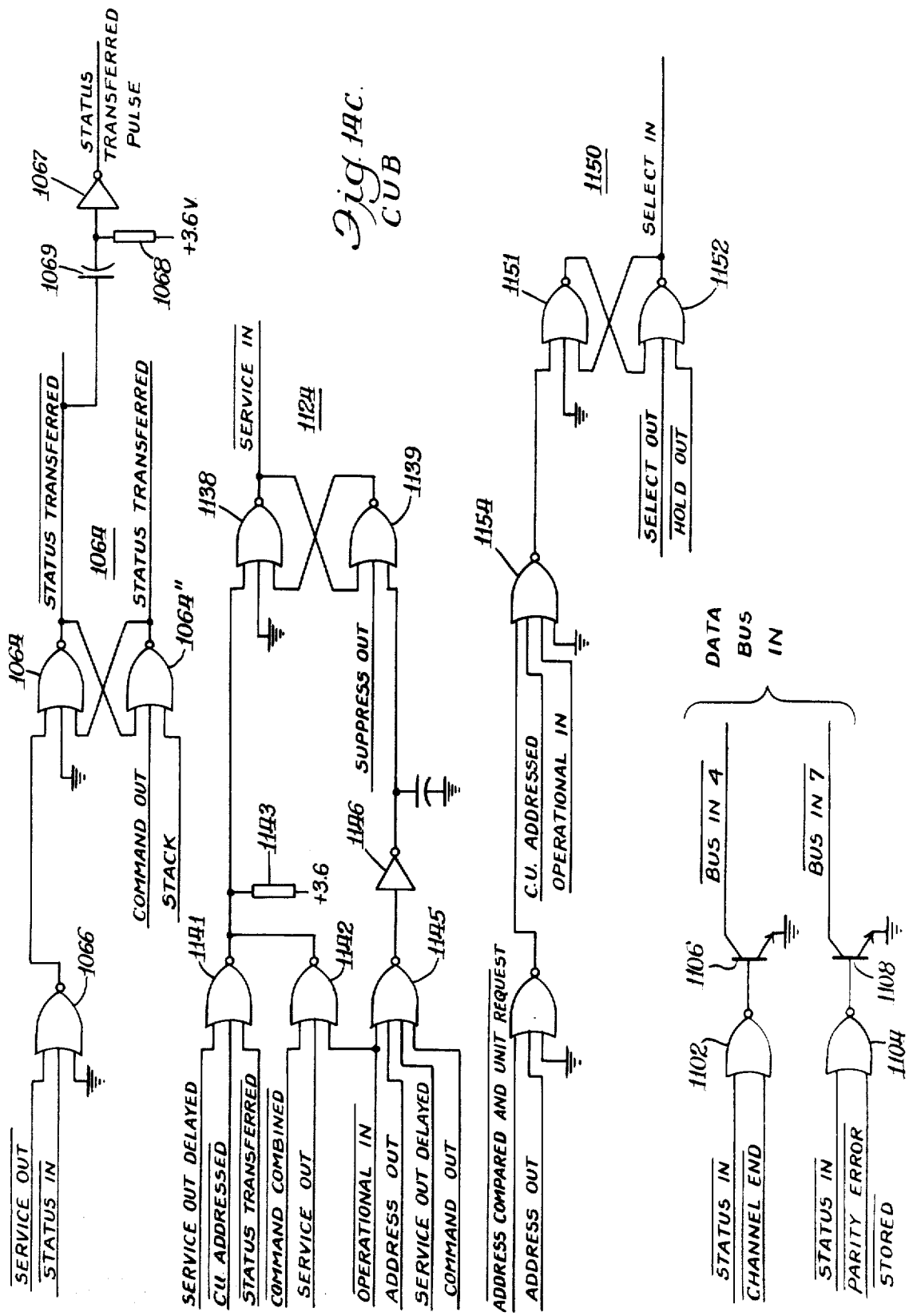

The various circuits forming the CUB are shown in detail in FIGS. 14A–C. In FIG. 14A, a master oscillator clock circuit 1000 is illustrated. FIG. 14B illustrates circuits for the tags OPERATIONAL IN, REQUEST IN, and STATUS IN, and circuits for generating the internally used STACK and CU RESET signals. In FIGS. 14C, circuits for the tags SERVICE IN, SELECT IN, and STATUS TRANSFERRED are shown, along with circuits which gate certain bits of the STATUS byte onto DATA BUS IN.

Generally, the setting and resetting of the circuits controlling the tag lines conform with the tag sequence requirements of the particular computer being utilized. Several standard responses and tag sequences are shown, for the particular computer utilized herein, in the time chart illustrated in FIGS. 17A–C. Further information on the sequence requirements may be obtained by referring to the manufacturer's specifications for the type of computer being utilized.

Master oscillator clock 1000, FIG. 14A, generates four clock pulses C1 through C4 during each clock cycle, the clock pulses having a frequency of 1 megahertz. Each clock pulse is spaced 90 electrical degrees from the preceding pulse, and each pulse occurs once every microsecond. Thus, pulse C2 occurs 250 nanoseconds after C1, pulse C3 occurs 500 nanoseconds after C1, and pulse C4 occurs 750 nanoseconds after C1. After another 250 nanoseconds, C1 again occurs, starting a new clock cycle.

Any conventional circuit may be used to form the oscillator 1000. By way of example, the circuit illustrated in FIG. 14A may be used. Three cascaded NOT gates 1002, 1003 and 1004 have a pair of 1,000 ohm resistors 1006 and 1007 inserted between the gates. A 1,000 ohm feedback resistor 1010 is connected from the output of NOT 1004 to the input of NOT 1002. Each input to the NOTs 1002, 1003 and 1004 has a capacitor 1012 connected from the input to a source of reference potential or ground 1014. Illustratively, the capacitor 1012 connected to the input of NOT 1002 may have a value of 27.0 picofarads, while the remaining capacitors 1012 coupled to the inputs of NOTs 1003 and 1004 may each have a value of 39 picofarads to give a clock rate of 4 megahertz.

NOR 1004 is coupled to a divide by four circuit which converts the oscillatory output therefrom into generally rectangular clock pulses C1 through C4, each clock pulse occurring for a short time period within its corresponding 90 electrical degrees. The illustrated circuit, formed from a pair of JK flip-flops and associated NORs, NOTs and RC networks, is suitable for this purpose, however, any conventional circuit may be used therefor, and will not be described in detail. The rectangular output from the circuit is coupled to the four CLOCK lines of CABLE TWO, C1 through C4, one line for each phase of the clock.

Turning to FIG. 14B, the OPERATIONAL IN tag is controlled by an OP IN flip-flop 1020. This tag is raised when the flip-flop is set, and conversely the tag is lowered when the flip-flop is reset. Flip-flop 1020 is formed from a multi input NOR gate 1021, the output of which is the OPERATIONAL IN tag, and a multi input NOR gate 1022. The flip-flop 1020 is set, generating a 1 output on the OPERATIONAL IN tag, whenever a 1 input is presented to NOR 1022, which controls the set operation. The reset operation of flip-flop 1020 is controlled by NOR 1021, and is cleared whenever a 1 input is coupled thereto.

OPERATIONAL IN is set when the computer has raised both the SELECT OUT and ADDRESS OUT tags, as seen in FIGS. 17A and 17B at times 854 and 955 respectively. Returning to FIG. 14B, all 0's are coupled to a NOR 1025 when the SELECT OUT tag is raised, because the SELECT IN tag is not raised at this time and the HOLD OUT tag is tied to operate with SELECT OUT, the negation of the latter two tags forming the inputs to NOR 1025. This generates a 1 output which is negated by a NOT gate 1026 to produce a pair of 0 inputs to NOR gates 1029 aNd 1030.

When the control unit initiates a sequence, as seen in FIG. 17A, the REQUEST IN tag is raised at 852, and no ADDRESS OUT tag is raised because the computer is not initiating communications. Thus, the inputs to NOR 1029, FIG. 14B, are all 0's at this time, i.e., there is no ADDRESS OUT and there is a 1 on the REQUEST IN tag, producing a 1 output which drives the output of NOR 1022 to 0, thus setting flip-flop 1020.

When the computer initiates a sequence, the CUA generates the CU ADDRESSED signal, as previously explained, causing the CU ADDRESSED input to NOR 1030 to go to 0 and produce a 1 output, setting flip-flop 1020. The prerequisites for setting OPERATIONAL IN are thus that SELECT OUT and HOLD OUT both be in their true states, and that SELECT IN has not been activated by any other CU MT, in the case of a system using multiple CU MTs.

OP IN flip-flop 1020 is reset when a 1 input is presented to NOR 1021. This normally occurs at the end of a communications sequence, when STATUS IN is in progress. The STATUS IN tag goes to 0, causing both inputs to a NOR gate 1035 to go to 0, producing a 1 output which is inverted by NOR gate 1036 to produce a 0 input to a NOR gate 1038. Another input to NOR 1038 is HOLD OUT, which is not present. The last input to NOR 1038 is the output of a NOR 1040. When the computer recognizes and accepts the STATUS IN sequence, it answers by raising SERVICE OUT, as seen in FIGS. 17A and 17B, causing the input SERVICE OUT DELAYED to NOR 1040 to go to 1 a short time thereafter. The 1 input forces a 0 output, causing all inputs to NOR 1038 to be 0 and hence generate a 1 output which resets flip-flop 1020.

Another reset operation occurs whenever the computer issues an interface disconnect signal, to indicate that all control units on SELECTOR CHANNEL 1 should clear their OP IN flip-flops. In the present system, this is indicated by the combination of ADDRESS OUT with the HOLD OUT tag not being present. As seen in FIG. 14B, an ADDRESS OUT tag and a HOLD OUT tag form the inputs to a NOR gate 1045, which combination causes all 0 inputs to NOR 1045 and hence a 1 output. This in turn clears NOR 1021, thus resetting flip-flop 1020.

The last path to reset flip-flop 1020 is the CU RESET input on NOR 1021. This signal is generated by a CU RESET circuit 1050, illustrated immediately below the OPERATIONAL IN circuit in FIG. 14B. A NOR gate 1052 has inputs for the SUPPRESS OUT and OPERATIONAL OUT tags. The lack of OPERATIONAL OUT with the lack of SUPPRESS OUT produces all 0 inputs to NOR 1052, producing a 1 output coupled to the input of a NOR gate 1054. This forces a 0 output from NOR 1054, which is negated by a NOT gate 1055 to produce a 1 output on a CU RESET line 1056. This signal resets OP IN flip-flop 1020.

The other possibility for generating CU RESET is controlled by a NOR gate 1058. When OPERATIONAL IN and SUPPRESS OUT are present, and the lack of OPERATIONAL OUT occurs, which requirements are seen in FIG. 14B, then all 0 inputs are present to cause NOR 1058 to have a 1 output. This forces NOR 1054 to have a 0 output, which is negated by NOT 1055 to again generate a 1 output on line 1056.

The REQUEST IN tag, also generated by the CUB, FIG. 14B, is raised during a DEVICE LOGIC initiated request for communications. As seen in FIG. 17A, the REQUEST IN tag at 852 occurs in response to the raising of a UNIT REQUEST AND ADR COMPARED tag at 850 by the addressed DEVICE LOGIC unit. Returning to FIG. 14B, the REQUEST IN tag goes up when all inputs to a NOR gate 1062 are 0's. This occurs when there is no CU RESET, there is an ADDRESS COMPARED AND UNIT REQUEST present, the negation of which is coupled to NOR 1062, OPERATIONAL IN has not yet been raised, and SUPPRESS OUT is not up. When OPERATIONAL IN is subsequently generated by the setting of flip-flop 1020, the 1 signal inputted to NOR 1062 drops the REQUEST IN tag.

The next group of circuits on FIGS. 14B and 14C are concerned with the STATUS byte. A STATUS TRANSFERRED flip-flop 1064, FIG. 14C, remembers whether or not the control unit has caused the STATUS byte to be transferred to the computer during the sequence then occurring. The normal state for flip-flop 1064 is to be set, generating the STATUS TRANSFERRED signal over CABLE TWO, indicating that STATUS has been transferred. As seen in FIG. 17A and 17B, the STATUS TRANSFERRED tag is normally up, and only drops when the STATUS byte should be transmitted to the computer.

Returning to FIG. 14C, flip-flop 1064 was originally set when STATUS was transferred during the prior communications sequence. At that time, the STATUS IN tag would have been up, and thereafter accepted by the simultaneous raising of SERVICE OUT. The negated signals from these tags form the inputs to a NOR gate 1066, which has a 1 output and forces a NOR gate 1064' of flip-flop 1064 to have a 0 output. This 0 forms one input of a NOR gate 1064'', which is the other side of flip-flop 1064. At this time, the other two inputs to NOR 1064'' are also 0, namely, there is no COMMAND OUT and no STACK. Therefore, NOR 1064'' has a 1 output, raising the STATUS TRANSFERRED tag.

The next communications sequence, initiated either by the computer or the machine control, begins with the STATUS TRANSFERRED flip-flop 1064 still being set. When the STATUS byte is to be transferred, the computer raises either the COMMAND OUT tag or a tag sequence which indicates STACK. Both of these form signal inputs to NOR 1064'', accordingly reset flip-flop 1064 and force a 0 output, which causes the STATUS TRANSFERRED tag to drop. After the STATUS byte is transferred and accepted by the computer, SERVICE OUT is raised during STATUS IN, causing flip-flop 1064 to again be set as previously described. The raising of STATUS TRANSFERRED tag clears all bits of the STATUS byte, both at CU MT and at the DEVICE LOGIC unit then being addressed.

When the STATUS TRANSFERRED signal goes to 1, indicating that STATUS has just been transferred, a STATUS TRANSFERRED PULSE signal is generated by a NOT gate 1067. The NOT has its input connected through a resistor 1068 to a source of positive potential, i.e., a logical 1 source. The input is also coupled through a capacitor 1069 to the STATUS TRANSFERRED output of NOR 1064'. Upon STATUS TRANSFERRED being raised, the output of NOR 1064' goes to 0, coupling a 0 through capacitor 1069 to the input of NOT 1067. This is negated to generate a 1 output on the STATUS TRANSFERRED PULSE line. As capacitor 1069 charges, the voltage at the input of NOT 1067 rises to the potential connected to resistor 1068, hence presenting a logical 1 thereto and causing the STATUS TRANSFERRED PULSE to go to 0. This pulse is not again generated until the STATUS TRANSFERRED signal goes to 0 and then rises to 1 after another transfer of the STATUS byte.

Immediately after STATUS TRANSFERRED flip-flop 1064 is cleared, the CUB attempts to send in the STATUS byte by setting a STATUS IN flip-flop 1070, FIG. 14B, formed from a NOR gate 1071 and a second NOR gate 1072. Flip-flop 1070 is set when both inputs to NOR 1071 are 0's. One input to NOR 1071 is coupled through a NOT gate 1074 to a NOR gate 1076. When all 0's are present at the input of NOR 1076, a 1 output occurs which is negated by NOT 1074 to produce the activating 0 input to NOR 1071. During a communications sequence, the OPERATIONAL IN tag is raised, the negation of which is an input of NOR 1076. Prior to transferring STATUS, the SUPPRESS OUT, COMMAND OUT and SERVICE OUT tags are not raised, hence all 0's occur (after a short delay) to the corresponding three inputs of NOR 1076, and a 1 output is coupled to NOT 1074.

NOR 1072 of flip-flop 1070 has an activating 1 input thereto when a NOR gate 1078 has all 0 inputs. At this time, the PROCEED signal is being generated on the CUA, as previously described, the negation of which forms a 0 input to NOR 1078. The STATUS TRANSFERRED flip-flop 1064, FIG. 14C, is reset to 0 when COMMAND OUT occurs, thus causing another 0 input to NOR 1078. However, because the COMMAND OUT tag is up, its input to NOR 1078 forces a 0 output at this time.

Referring to FIG. 17A, for example, the STATUS TRANSFERRED tag is dropped at a point 1090, as the COMMAND OUT tag is raised at point 880. The raising of COMMAND OUT at this time indicates the computer acceptance of the address at 858 which was previously transmitted in response to raising of ADDRESS IN at 856. When the computer drops COMMAND OUT, at a point 1092, it indicates that STATUS IN should be raised shortly thereafter, as seen at 1094, along with placing DATA on BUS IN, as seen at 1096, in the form of the STATUS byte.

Returning to FIG. 14B, as COMMAND OUT is dropped, all 0 inputs are now present to NOR 1078, causing a 1 output which forces a 0 output from NOR 1072, thus presenting a pair of 0's to the inputs of NOR 1071. This sets the flip-flop and generates a 1 output therefrom, which raises the STATUS IN tag.

The raising of STATUS IN is coupled onto CABLES ONE and TWO. As will appear, the raising on CABLE TWO causing the DEVICE LOGIC unit to gate its stored STATUS byte onto DATA BUS IN. Also, the STATUS IN tag is connected to gates on the CUB which pass those STATUS bits generated by and concerning the status of the CU MT. These STATUS bits are stored on the CUC, to be described later, and have outputs to gates on the CUB, which pass the bits onto DATA BUS IN. These gates, shown in FIG. 14C, are formed by NORs 1102 and 1104, and are used to gate the bits for CHANNEL END and UNIT EXCEPTION, respectively. These STATUS bits correspond to DATA BUS lines 4 and 7 respectively, as indicated in FIG. 6.

When CHANNEL END is present, and the STATUS IN tag is raised, the negated inputs thereof to NOR 1102 produce a 1 output which drives an NPN transistor 1106 into saturation. This drops the collector output line $\overline{\text{BUS IN 4}}$ to ground potential, thus gating the CHANNEL END bit onto DATA BUS IN. The UNIT EXCEPTION bit may be generated both at CU MT and at the DEVICE LOGIC location. When generated by the CU MT, and stored by the CUC, it indicates that a PARITY ERROR STORED has occurred. This stored signal is coupled to NOR 1104. When the STATUS IN tag is raised, NOR 1104 has a 1 output which drives an NPN transistor 1108 into saturation, thereby dropping the collector output line $\overline{\text{BUS IN 7}}$ to ground potential, hence gating the UNIT EXCEPTION bit onto DATA BUS IN. The computer accepts STATUS by raising SERVICE OUT, which after a time delay causes the STATUS IN flip-flop 1070, FIG. 14B, to reset. This couples a 1 to NORs 1102 and 1104, blocking the gates and terminating the STATUS byte.

If the computer is not able to accept the STATUS byte, it causes a STACK operation to occur. This is indicated by the computer raising COMMAND OUT. As seen in FIG. 14B, a NOR 1120 has an output which is the STACK signal. As COMMAND OUT is raised while STATUS IN is raised, the negation thereof causes a pair of 0 inputs to NOR 1120, thus generating a 1 output which forms the STACK signal. The STACK signal forms one input of NOR 1064", FIG. 14C, of STATUS TRANSFERRED flip-flop 1064. As the signal goes high, it prevents flip-flop 1064 from setting, and thus inhibits the generation of the STATUS TRANSFERRED signal, which is used to clear the STATUS bits stored at the CUC and DEVICE LOGIC unit, as will appear.

Although the prior STATUS IN signal caused the stored STATUS bits to be gated onto DATA BUS IN, the stored signals are not erased when the computer is not able to accept STATUS. Thereafter, another communications sequence is necessary to retransmit the STATUS bits to the computer. When the computer eventually accepts STATUS, no STACK signal is generated by NOR 1120, FIG. 14B, allowing the STATUS TRANSFERRED flip-flop 1064, FIG. 14C, to be set. This in turn allows the bits to be cleared from storage, thus completing the STATUS operation.

Another circuit on the CUB concerns the SERVICE IN tag, which controls the transfer of DATA bytes from the computer to the DEVICE LOGIC unit during a write sequence, and from the DEVICE LOGIC unit to the computer during a sense sequence. For example, the DATA may be a STATUS byte sent to the computer, seen at 1128 in FIG. 17B. Normally, when following a WRITE command, the SENSE byte has all 0 bits therein, indicating that data flow may proceed from the computer to the DEVICE LOGIC unit. The computer accepts STATUS by raising the SERVICE OUT tag, seen at 1130, causing the STATUS byte to terminate shortly thereafter in preparation for subsequent data flow. The machine control then raises the SERVICE IN tag, at 1132, to indicate it is ready to receive DATA. When the computer is ready to transmit, it places a DATA byte on BUS OUT, as seen at 1134, and thereafter raises SERVICE OUT.

The SERVICE IN tag is generated by a flip-flop 1124, FIG. 14C. The flip-flop is formed from a pair of NORs 1138 and 1139. NOR 1138 has an input coupled to a pair of NOR gates 1141 and 1142, both of whose outputs are coupled together and connected by a resistor 1143 to +3.6 volts, which forms a logical 1 source. After STATUS transfer, the STATUS TRANSFERRED tag goes up, causing the negation thereof to produce a 0 input to NOR 1141. The computer raises SERVICE OUT in response thereto, which blocks NOR 1142 and maintains a 0 output to NOR 1138. When SERVICE OUT drops, NOR 1142 has all 0 inputs, generating a 1 output. After a short time delay, SERVICE OUT DELAYED also drops, thereby causing all 0 inputs to NOR 1141, also generating a 1 output. The pair of 1's generated by NORs 1141 and 1142 cause the input to NOR 1138 to go high to 1, thereby forcing a 0 output on the $\overline{\text{SERVICE IN}}$ tag which is cross coupled to NOR 1139.

At this time, another NOR gate 1145 also has all 0 inputs. That is, there is no ADDRESS OUT or COMMAND OUT, and SERVICE OUT DELAYED has now dropped. A 1 output is generated and inverted by a NOT gate 1146, presenting a 0 input to NOR 1139. The third input to NOR 1139 is SUPPRESS OUT, which is not present at this time. Accordingly, NOR 1139 generates a 1 output, thereby setting flip-flop 1124 and causing the $\overline{\text{SERVICE IN}}$ tag to be down.

With SERVICE IN now present, the computer places a DATA byte on DATA BUS OUT, and raises the SERVICE OUT tag. When SERVICE OUT is raised, the raised SERVICE OUT input to NOR 1142 forces a 0 output therefrom. However, NOR 1141 still maintains a 1 output at this time. After the delay period, SERVICE OUT DELAYED also goes to 1, presenting a 1 input to NOR 1141. Since SERVICE OUT is still raised when SERVICE OUT DELAYED goes to 1, both NORs 1141 and 1142 have 0 outputs which present a 0 input to NOR 1138, allowing flip-flop 1124 to be reset when NOR 1139 generates a 0 output.

At this time, SERVICE OUT DELAYED goes to 1 at the input of NOR 1145, thereby generating a 0 output which is negated by NOT 1146 to produce a 1 input to NOR 1139. This forces a 0 output therefrom which forms the final 0 input to NOR 1138. Since all inputs of NOR 1138 are now 0, a 1 output is generated which resets flip-flop 1124 and causes the SERVICE IN tag to be dropped. As seen in FIG. 17B, the SERVICE IN tag, originally raised at 1132, is dropped before SERVICE OUT is dropped and before the DATA initiated at 1134 is removed from DATA BUS OUT.

The final circuit on FIG. 14C is concerned with the SELECT IN tag. The raising of SELECT IN is considered a fault, and indicates that a computer initiated address placed over DATA BUS OUT has not been recognized by any DEVICE LOGIC unit. A SELECT IN flip-flop 1150 includes a NOR gate 1151 and a NOR gate 1152. Briefly, when the computer places an address on DATA BUS OUT and raises ADDRESS OUT, the CU MT must recognize this address by generating the CU ADDRESSED signal before the computer raises SELECT OUT. As previously explained, CU ADDRESSED is generated by the CUA in response to a COMPARE signal, which in turn is generated in response to receiving a single raising of ADR COMPARED over CABLE TWO, meaning that a single DEVICE LOGIC unit has recognized and answered the address.

These signals control a NOR gate 1154 which forms an input to NOR 1151. Normally, CU ADDRESSED goes to 1 before SELECT OUT is raised, thus a 1 input is presented to NOR 1151 and forces a 0 output. This prevents NOR 1151 from being changed, hence flip-flop 1150 is not set when the two inputs $\overline{\text{SELECT OUT}}$ and $\overline{\text{HOLD OUT}}$ go to 0 at 1152. However, should no DEVICE LOGIC unit recognize the address, CU ADDRESSED remains 0 when SELECT OUT and HOLD OUT are raised. At the same time, OPERATIONAL IN has not yet been raised, hence NOR 1154 has all 0 inputs and generates a 1 output, which causes NOR 1151 to have a 0 output. Then, when $\overline{\text{SELECT OUT}}$ and $\overline{\text{HOLD OUT}}$ go to 0, NOR 1152 has all 0 inputs, generating a 1 on the SELECT IN tag.

In installations using multiple CU MTs, the SELECT IN tag generated by the first CU MT is connected to the SELECT OUT input of the next CU MT. Thus, if the first CU MT does not recognize the address, it passes that information to the next CU MT, which in turn, if not recognizing the address, passes a signal to further CU MTs. The last CU MT raises its SELECT IN tag, which in turn, is connected to CABLE ONE, hence informing the computer that no CU MT has recognized the address on CABLE ONE. In the case of a single CU MT, as is exemplary disclosed, the failure to recognize an address directly raises the SELECT IN tag of DATA BUS IN, indicating to the computer the occurrence of this error. This may activate an appropriate routine, within the computer program, which handles errors of this type.

CUC

Figure 15:
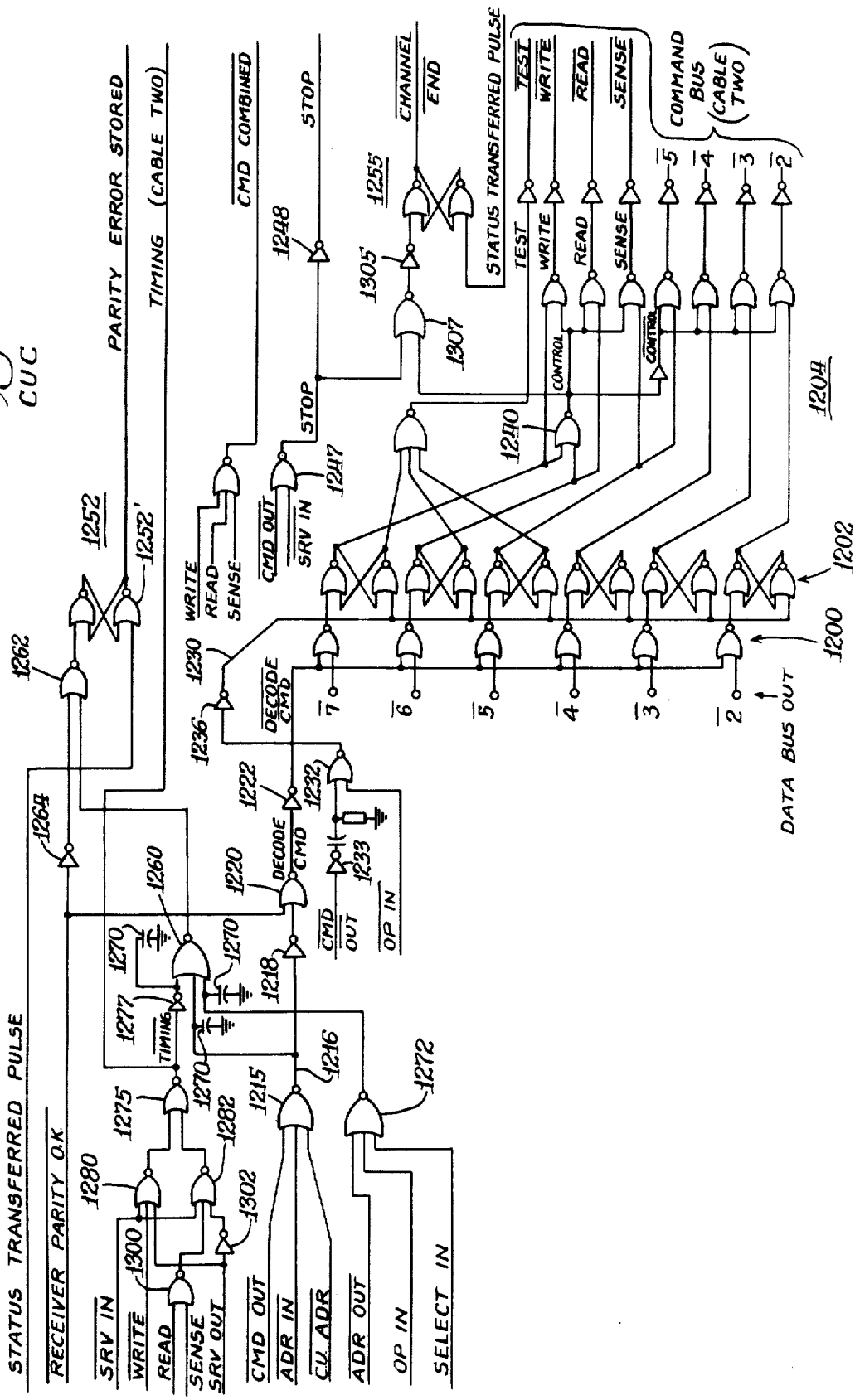
FIG. 15 is a schematic diagram of the CUC.

The CUC is illustrated in detail in FIG. 15. This unit decodes and stores the COMMAND byte from the computer, stores the STATUS bits associated with CU MT, and generates the TIMING signals coupled to CABLE TWO for controlling data transfer in both directions.

When the CUC determines that a COMMAND byte is on DATA BUS OUT, a series of NOR gates 1200 gate the bits on lines $\overline{2-7}$ of DATA BUS OUT to a plurality of RS flip-flops 1202, one for each line. A decoding circuit 1204 converts the stored bits into the signals which are transmitted to the DEVICE LOGIC units over the COMMAND BUS of CABLE TWO. The bits are decoded in accordance with the meaning assigned to the bit positions, as shown by the format of FIG. 7. The commands for TEST, SENSE, WRITE and READ activate individual lines of the COMMAND BUS, whereas the remaining or control commands are transmitted in coded form over lines $\overline{2-5}$ of the COMMAND BUS. Lines 6 and 7 of the original DATA BUS OUT are omitted for the control command lines of the COMMAND BUS, since they always carry 1's and hence are not necessary for coding purposes at the DEVICE LOGIC units.

One input of each two input NOR 1200 is connected to a corresponding line of DATA BUS OUT, and the other input is connected to a common $\overline{\text{DECODE CMD}}$ line 1206 which carries a 0 when a command is to be decoded. As seen in FIG. 17B, when a COMMAND byte is placed on DATA BUS OUT at 1210, the COMMAND OUT tag is raised at 1211, while the ADDRESS IN, originally raised at 957, remains raised for a short time thereafter. Returning to FIG. 15, a NOR gate 1215 is coupled to $\overline{\text{CMD OUT}}$ and $\overline{\text{ADR IN}}$, both of which are 0's when a command is placed on DATA BUS OUT. Since the control unit has been addressed, the CUA has generated CU ADR, the negation of which is also coupled to NOR 1215. Accordingly, an output line 1216 of NOR 1215 has a 1 thereon when a command is on DATA BUS OUT.

This 1 is coupled through a NOT 1218 to form a 0 input to a NOR gate 1220. The other input to NOR 1220 is $\overline{\text{RECEIVER PARITY OK}}$, generated by the PLCR/D, as will appear. This negated line has a 0 thereon when the receiver section PLCR indicates that the COMMAND byte was received over DATA BUS OUT without a parity error. The pair of 0 inputs to NOR 1220 produce a 1 output, called DECODE CMD, which is negated by a NOT 1222 to produce a 0 enabling input on line 1206. This opens NOR gates 1200 and passes the COMMAND byte to flip-flops 1202.

The COMMAND storage flip-flops 1202 are enabled a short time after NOR gates 1200 are opened, that is, after a sufficient time delay to allow valid information to appear at the flip-flops. This enabling is accomplished when a 0 input is placed on a line 1230, which forms the reset input to each of the flip-flops 1202. A NOR gate 1232 has an input connected to $\overline{\text{OP IN}}$, which is 0 during the time a COMMAND byte is placed on DATA BUS OUT. The other input to NOR 1232 is coupled through a delay RC network and a NOT gate 1233 to $\overline{\text{CMD OUT}}$. As this signal goes to 0, NOT 1233 passes a 1 through the capacitor directly to the input of NOR 1232. This forces a 0 output which is negated by a NOT gate 1236 to produce a 1 on reset line 1230, hence blocking flip-flops 1202. As the capacitor charges, the input to NOR 1232 goes to 0, and since the other input is 0, a 1 is generated and inverted by NOT 1236 to produce an activating 0 input on line 1230. This short time delay, sufficient for the information to become valid, allows the flip-flops to now be set by the bits on DATA BUS OUT.

Decoding circuit 1204 converts the stored bits into the COMMAND BUS signals, in accordance with the format of FIG. 7. A NOR gate 1240 determines when one of the special CONTROL commands are present, as indicated by the 1 bit being set in both the sixth and seventh binary positions. The two inputs of NOR 1240 are coupled to the negated outputs of the corresponding flip-flops 1202 for lines 6 and 7, thus generating a 1 output when CONTROL commands are present. The CONTROL commands are not decoded but are sent in coded form over lines $\overline{2-5}$. Of course, these signals could be decoded and sent over individual lines of the COMMAND BUS if so desired.

When a COMMAND is present, it is stored on the CUC and maintained over the COMMAND BUS, until flip-flops 1202 are reset. This occurs when OP IN is dropped, at the end of a complete computer initiated sequence, as seen in FIG. 17B. The COMMAND BUS thus remains energized throughout the entire time that DATA is being communicated over the DATA BUSes, in order to inform the addressed DEVICE LOGIC unit of the type of DATA being transmitted thereto.

The CUC also decodes a tag sequence by which the COMPUTER commands the machine control to STOP. As seen in FIG. 17B, whenever the machine control is ready to receive another DATA byte, it raises SERVICE IN. Thereafter, the computer normally places a DATA byte on BUS OUT and raises SERVICE OUT. However, when no further DATA is to be transmitted to the machine control, the computer instead raises COMMAND OUT, as seen at 1245. This tag, raised while SERVICE IN is raised, is interpreted as a STOP operation. Returning to FIG. 15, a NOR gate 1247 has a pair of inputs coupled to $\overline{\text{CMD OUT}}$ and $\overline{\text{SRV IN}}$ ($\overline{\text{SERVICE IN}}$). When both go to 0, NOR 1247 has a 1 output on a STOP line, thus generating the STOP signal. The STOP signal is inverted by a NOT 1248 to produce a $\overline{\text{STOP}}$ signal output. The STOP operation, because it signifies the end of transmission, also causes the CUB to raise STATUS IN, and cause a STATUS byte to be transmitted to the computer. As will be explained, the STOP signal forms one of the conditions which causes the CUC to set the CHANNEL END bit, which forms a part of the STATUS byte.

The CUC stores the STATUS bits which are concerned with the operation of CU MT. A flip-flop 1252 stores a PARITY ERROR STORED signal, generated in response to a parity error detected by the PLCR/D. This signal is coupled to the CUB and is gated by NOR 1104, FIG. 14C, when the STATUS IN is raised, thereby generating the seventh bit of the STATUS byte, which as seen in FIG. 6 is UNIT EXCEPTION. Returning to FIG. 15, the other STATUS bit stored by the CUC is CHANNEL END, in a flip-flop 1255. This signal is also coupled to the CUB and a NOR 1102, FIG. 14C, to generate the fourth bit of the STATUS byte, namely the CHANNEL END, as seen in FIG. 6.

PARITY ERROR STORED flip-flop 1252, FIG. 15, can be set at only those times during which parity should be checked by the receiver PLCR, namely, when DATA BUS OUT carries either machine DATA bytes, an ADDRESS, or a COMMAND. A NOR gate 1260 checks for these conditions, which when present causes a 0 output which is coupled to an input of a NOR gate 1262. The other input of NOR 1262 is coupled through a NOT gate 1264 to RECEIVER PARITY OK, from the PLCR. Whenever the total number of bits on DATA BUS OUT, including the PARITY line, have an odd sum, the PLCR generates the RECEIVER PARITY OK signal. The negated signal coupled to NOT 1264 produces a true signal input to NOR 1262. When parity is odd, the input signal is a 1 which forces NOR 1262 to have a 0 output, which has no effect on flip-flop 1252.

When the parity check indicates an even sum of bits, i.e., an error, the RECEIVER PARITY OK signal is a 1 which is inverted by NOT 1264 to produce a 0 at NOR 1262. When a parity check is to be made, the output from NOR 1260 also goes to 0. The pair of 0 inputs to NOR 1262 produces a 1 output which sets flip-flop 1252. This generates a 1 output from NOR 1252' of flip-flop 1252. Flip-flop 1252 is cleared by the input of NOR 1252' coupled to the STATUS TRANSFERRED PULSE from the CUB. When STATUS is transferred, this line briefly goes to 1, resetting the circuit.

Parity is thus checked each time the output of NOR 1260 goes to 0, which occurs each time any input to NOR 1260 goes to a 1. One input of NOR 1260 is line 1216 which carries a 1 whenever a COMMAND byte is on DATA BUS OUT, thus checking the parity of the COMMAND byte. It should be noted that each of the inputs to NOR 1260, including line 1216, is coupled through a capacitor 1270 to ground, i.e., a source of logical 0. Capacitors 1270 delay the presentation of a 1 to the input of NOR 1260. The value of capacitors 1270, such as 0.001 microfarads, is chosen to give sufficient time delay for the PLCR to have analyzed the information then on DATA BUS OUT and generated an output signal. Capacitors 1270 thus compensate for the propagation time of the signals through the PLCR.

Another input to NOR 1260 is the output of a NOR gate 1272, which generates a 1 when an address byte is on DATA BUS OUT. The inputs to NOR 1272 are ADR OUT, OP IN, and SELECT IN. As seen in FIG. 17B, when an address is placed on DATA BUS OUT at 911, the ADR OUT tag is raised at 910, OP IN is not yet raised, nor is SELECT IN raised. Returning to FIG. 15, these signals produce all 0's at NOR 1272, thereby generating a 1 output when an address is on DATA BUS OUT. This generates a 0 output from NOR 1260, allowing flip-flop 1252 to be enabled should a parity error occur at this time.

The final input to NOR 1260 goes to 1 whenever a DATA byte is placed by the computer on DATA BUS OUT, as indicated by the raising of the TIMING tag of CABLE TWO. A NOR 1275 generates the TIMING signal, which couples a 0 on the TIMING tag of CABLE TWO. This signal is also coupled through a NOT 1277 to the third input of NOR 1260. Thus, whenever a TIMING signal is generated, NOT 1277 generates a 1 input to NOR 1260, which enables flip-flop 1252 and allows a PARITY ERROR STORED to be set.

The TIMING circuit associated with NOR 1275 operates in the following manner. A NOR 1280 supplies a 1 input to NOR 1275 when the TIMING signal is to be generated during a computer initiated selection and WRITE sequence, in which the computer transmits the bytes of the machine block to an addressed DEVICE LOGIC unit. This 1 from NOR 1280 forces a 0 output from NOR 1275, on the TIMING tag of CABLE TWO. The other input to NOR 1275 is a NOR 1282, which couples an activating 1 thereto when the TIMING signal is to be generated during a computer initiated selection and SENSE sequence, in which bytes of the SENSE signal are transmitted from an addressed DEVICE LOGIC unit to the computer.

NOR 1280 is activated during the WRITE operation. As seen in FIG. 17B, when a byte of DATA is placed by the computer on DATA BUS OUT, at 1134, a WRITE command at 1210 will have previously been set to the CU MT (and stored in the CUC), SERVICE IN will have been raised at 1132 in preparation for receiving DATA, and the computer will have raised SERVICE OUT, as seen at 1285, when the DATA byte is placed on DATA BUS OUT. Returning to FIG. 15, these signals cause all 0 inputs to NOR 1280, the last 0 occurring when SRV OUT goes to 0, thereby generating a 1 from NOR 1280. As SRV IN is dropped, i.e., goes to 1, NOR 1280 is blocked and a 0 output is generated therefrom, terminating the TIMING signal. As seen in FIG. 17B, the TIMING signal at 1287 is generated initially with the raising of SERVICE OUT at 1285, and terminates when SERVICE IN, raised at 1132, is dropped. Thus, the TIMING signal terminates before the DATA byte is removed from DATA BUS OUT.

NOR 1282 is activated during the SENSE operation. The SENSE sequence may be understood by referring to the partial time chart in FIG. 17C, illustrating signals on certain tags and buses, which signals should be substituted for the signals shown on the same tags and buses in FIG. 17B. That is, both FIG. 17B and 17C show a computer initiated selection operation, with FIG. 17B showing the complete WRITE sequence, and FIG. 17C showing those portions which are different for the SENSE operation.

When the TIMING tag is raised at 1290, FIG. 17C, the addressed DEVICE LOGIC unit places a DATA byte, in the form of a SENSE byte, onto DATA BUS IN. This DATA byte at 1291 appears shortly after the TIMING tag is raised at 1290. At this time, SERVICE IN is also raised, as shown for example in FIG. 17B at 1132. Returning to FIG. 17C, it will be seen that SERVICE OUT is not raised because the computer is not placing DATA on the BUS, but rather is receiving DATA. When the computer accepts the DATA, it raises SERVICE OUT, as seen at 1293, causing a termination of the TIMING pulse, which also causes the DATA to be removed from DATA BUS IN. The TIMING tag remains raised for as long a time as is necessary for the computer to accept the DATA byte and raise SERVICE OUT. If the computer should not wish to accept the DATA byte, it may terminate transmission by raising COMMAND OUT, as seen at 1295, FIG. 17C, rather than raising SERVICE OUT. This is interpreted as a STOP, in the same manner as during a WRITE sequence.

Returning to FIG. 15, one input of NOR 1282 is SRV IN, which is present as described above. Both the READ and SENSE tags of the COMMAND BUS are coupled to a NOR 1300, producing a 0 output therefrom when present, and forming another 0 input to NOR 1282. Finally, SRV OUT is inverted by a NOT 1302 to form a true input to NOR 1282. As long as SRV OUT is not present, the third 0 input is present and NOR 1282 passes an activating 1 output to NOR 1275 when SRV IN is raised. Thus, the TIMING tag is raised as soon as SERVICE IN is raised, and terminates whenever the computer raises SERVICE OUT, thereby causing SRV OUT to be 0 and be inverted by NOT 1302 to produce a blocking 1 input to NOR 1282.

The raising of the TIMING tag forces a 0 output from NOR 1260, FIG. 15, thereby activating the PARITY ERROR STORED circuit associated with flip-flop 1252. This allows parity to be checked and recorded during a WRITE sequence. The PARITY ERROR STORED circuit is also activated during a SENSE sequence but serves no purpose at this time. The PLCD, as will appear, does not generate a PARITY OK during a SENSE, but rather generates a PARITY bit for DATA BUS IN. However, since the computer maintains raised the PARITY line when no other signals are on DATA BUS OUT, the RECEIVER PARITY OK line remains raised by the PLCR, and the storage circuit activated during SENSE will merely record no PARITY ERROR STORED. If desired, NOT 1277 could be replaced with a two input NOR which was blocked by a 1 during the time a READ or SENSE operation was occurring, thereby not activating the PARITY ERROR STORED circuit except during a WRITE operation.

The final circuit on the CUC is that associated with the CHANNEL END flip-flop 1255. This flip-flop is set to store a CHANNEL END bit when a 1 output is generated from a NOT gate 1305. A 1 output occurs from NOT 1305 when the input thereto, from a NOT gate 1307, is 0, which requires a 1 at either input to NOR 1307. One input thereto is the STOP line from NOR 1247. Thus, whenever the computer initiates a STOP operation, the CHANNEL END bit is set. The other input to NOR 1307 is the CONTROL line from NOR 1240. The special CONTROL commands, listed in FIG. 7, always end a computer initiated sequence when one of these commands are sent. Thus, the occurrence of any special CONTROL command also sets the CHANNEL END bit. After the STATUS byte has been gated to the computer, the CUB generates the STATUS TRANSFERRED pulse, which resets the CHANNEL END flip-flop 1255.

PLCR/D

In FIG. 16, a universal PLCR/D unit is shown in detail. Two of these units are utilized for parity operations, as seen in FIG. 3. One PLCR/D is associated with DATA BUS OUT, and the entire illustrated circuit is used as a receiver, designated PLCR. When used for this purpose, the BUS lines $\overline{0-7}$ are connected to the corresponding negated lines of DATA BUS OUT. When the total sum of bits present on the BUS, including the bit on a parity line P, is odd, a NOR gate 1340 generates a 0 output on a line 1341, called $\overline{\text{RECEIVER PARITY OK}}$. Line 1341 is coupled to the CUC and the PARITY ERROR STORED flip-flop located thereon.

The other PLCR/D is associated with DATA BUS IN, and only the driver portion, designated PLCD of the illustrated circuit is used for parity checking. When used for this purpose, the BUS lines $\overline{0-7}$ are connected to the corresponding negated lines of DATA BUS IN. When the DEVICE LOGIC unit places DATA on DATA BUS IN, such as a SENSE byte, the PLCD determines whether the sum of bits on lines 0-7 are odd or even. The output of a NOR gate 1345 is 0 if the sum is even. This output is connected to a line 1346 labeled $\overline{\text{PARITY BIT}}$, which is connected to the negated parity line $\overline{\text{P}}$ of DATA BUS IN. Thus, when the sum of bits from the DEVICE LOGIC unit is even, the PLCD generates an extra bit which is placed on the parity line of DATA BUS IN. When the sum of bits is odd, no extra bit is generated.

The PLCR/D is includes a plurality of circuits 1350, each associated with a different pair of lines to determine if the signals thereon have an odd or even sum of bits. Four of these circuits are associated with BUS lines $\overline{0-7}$, and the outputs of these circuits 1350 form the input of another two circuits 1350. The outputs of the latter two circuits 1350 input to a circuit 1350 which includes NOR 1345, and hence determines whether the sum total of all bits on BUS lines $\overline{0-7}$ is odd or even.

The operation of circuits 1350 will be explained by the circuit 1350 associated with $\overline{\text{BUS 0}}$ and $\overline{\text{BUS 1}}$. By way of example, it will be assumed that $\overline{\text{BUS 0}}$ has a 0 bit and $\overline{\text{BUS 1}}$ has a 1 bit. Both the negated lines input to a NOR gate 1352, and in addition the $\overline{0}$ line inputs to a NOT gate 1354 and the $\overline{1}$ line inputs to a NOT gate 1355. The outputs of NOTs 1354 and 1355 are coupled to a NOR gate 1357, having an output coupled to a NOR gate 1359. The other input of NOR 1359 is the output of NOR 1352. $\overline{\text{BUS 0}}$ has a 0 input to NOR 1352 and to NOT 1354. The 1 output of NOT 1354 forces NOR 1357 to have a 0 output to NOR 1359. $\overline{\text{BUS 1}}$ carries a 1 thereon which is coupled to the inputs of NOR 1352 and NOT 1355. The signal at NOT 1355 is inverted and presented as a 0 to NOR 1357, causing no effect. The 1 at NOR 1352 forces a 0 output to NOR 1359. Since two 0 inputs are present at NOR 1359, it generates a 1 output therefrom, signifying an odd number of bits on its original input lines.

Each circuit 1350 produces an output used as an input to another circuit 1350 until the circuit 1350 including NOR 1345 is reached. If the total sum on the input line $\overline{0-7}$ is odd, NOR 1345 has a 1 output on line 1346, signifying that no PARITY BIT is to be placed on the parity line P of DATA BUS IN. The above described circuits complete the PLCD portion of the unit.

The PLCR includes the entire circuit above described, and in addition the line 1346 forms an input to another circuit 1350. The other input thereof is $\overline{\text{BUS OUT P}}$, i.e., the negated parity line P of DATA BUS OUT. If line 1346 has a 1 thereon, indicating that the sum of bits on lines $\overline{0-7}$ of DATA BUS OUT is odd, then line $\overline{\text{BUS OUT P}}$ should have a 1 thereon, since the computer should not have generated a parity bit. These 1 inputs to circuit 1350 cause a 0 output from NOR 1340 on line 1341, thereby causing the $\overline{\text{RECEIVER PARITY OK}}$ signal to go to 0. This indicates that the parity of DATA BUS OUT is correct.

Should the signal on line 1346 be different than the signal on $\overline{\text{BUS OUT P}}$, thereby indicating an even sum of bits is on all BUS lines including the parity line, NOR 1340 generates a 1 output which indicates that the receiver parity is not okay. As previously described, the $\overline{\text{RECEIVER PARITY OK}}$ line 1341 is coupled to the CUC and used to set the parity error flip-flop when all BUS lines including the parity line have an even sum of bits. When DATA BUS OUT is not being used, the computer always maintains a bit on the true parity line P, in order that the sum total of bits is always odd.

ASA

The ASA is illustrated in detail in FIGS. 18A and 18B. The Interpolator Cycle Control or ICC portion of the ASA is mainly illustrated at location 1400 in FIG. 18A. The four step sequence of the ICC, which generates the CLEAR ACTIVE STORAGE, TRANSFER, and CLEAR BUFFER signals (the fourth step being to reset the circuit), is controlled by a pair of JK flip-flops 1402 and 1403 connected to four NOR gates 1405. As the ICC counts through the four step sequence, each NOR 1405 in turn has a 1 output when its associated step in the sequence is reached. The NOR blocks are labeled with the associated number 1–4 of the sequence.

While DEVICE LOGIC A and CONSOLE LOGIC A are actively controlling machine movement, the ICC in the ASA is in a rest condition, with both flip-flops 1402 and 1403 in a reset state. An RS flip-flop 1410, composed of a NOR 1411 and a NOR 1412, is also associated with circuit 1400. NOR 1411 has an input line 1414 connected to the END CARRY LINE from the RDC. While the ICC is in the rest state, a pair of 0 inputs are presented to NOR 1411, generating a 1 output therefrom which forms an input to NOR 1412, generating a 0 output therefrom which is inverted by a NOT 1416 to produce a 1 input on the preclear lines of the JK flip-flops 1402 and 1403, and also a 1 input to block a NOR 1418. The 1 from NOT 1416 is also inverted by a second NOT gate 1419 to generate a 0 output on the STOP CTR (STOP COUNTER) line 1420, which outputs from the ASA, FIG. 18B, to the RDC.

During the rest condition of the ICC, FIG. 18A, the NOR 1405, FIG. 18A, labeled "1" receives a 1 input from the 0 output of flip-flop 1402 (since it is reset), thereby coupling a 0 output to a NOR 1423. The other input to NOR 1423 is also a 0 at this time, as will appear, thereby generating a 1 output on a line 1424 which is the $\overline{\text{CLEAR ACTIVE STORAGE}}$ line. The NOR 1405 labeled "2" has a 1 input thereto from the 0 output of flip-flop 1403 (since it is reset), generating a 0 output which is inverted by a NOT 1426 to produce a 1 on a line 1427, corresponding to $\overline{\text{TRANSFER}}$. Finally, the NOR 1405 labeled "3" has 1 inputs from both flip-flops 1402 and 1403, generating a 0 output which is coupled both to a line 1430 and to an input to a NOR 1432. The other input of NOR 1432 is also a 0, as will appear, generating a 1 output on a line 1433 which is CLEAR BUFFER.

When the machine control completes an instruction block, the RDC generates an END CARRY signal which appears on line 1414, FIG. 18A, and causes initiation of the four step sequence of the ICC. Namely, the 1 on the line 1414 forces a 0 output from NOR 1411, producing a 0 input to NOR 1412. Since the other input thereto is also 0, the flip-flop 1410 is set and a 1 output is generated and inverted by NOT 1416 to ground the preclear line of the JK flip-flops 1402 and 1403, and to produce a 0 activating input to NOR 1418. The 0 signal is also inverted by NOT 1419 to generate a 1 on line 1420, generating the STOP CTR signal which is coupled to the RDC to prevent further counting of feedrate pulses. This causes the RDC to stop.

Because the output from NOT 1416 is a 0, NOR 1418 is enabled and allows the next C4 pulse to pass and activate the ICC. At C4 time, the $\overline{C4}$ line has a 0 which thereby presents all 0 inputs to NOR 1418, generating a 1 output to toggle T of flip-flop 1402. As the C4 pulse terminates, $\overline{C4}$ goes to 1 and causes the output of NOR 1418 to go to 0, producing a negative going signal which actuates flip-flop 1402. This causes flip-flop 1402 to set, generating 1 and 0 outputs on the 1 and 0 output lines, respectively. Flip-flop 1403 remains in its reset state, since the toggle input thereto has gone in a positive going direction, from 0 to 1. Both inputs to NOR 1405 labeled "1" are now 0, generating a 1 output which forces a 0 output from NOR 1423, thereby generating the $\overline{\text{CLEAR ACTIVE STORAGE}}$ signal. This signal is coupled to the ABS units and clears the DATA stored in the active storage section therein.

After the lapse of one microsecond, the C4 pulse again rises and falls, activating the toggle T of flip-flop 1402, causing the flip-flop to change the reset state. The 1 output line thereof now goes to 0, producing a negative going input to toggle T of flip-flop 1403, in turn causing flip-flop 1403 to change states and become set. At this time, both of the inputs of the NOR 1405 labeled "2" are 0, generating a 1 output which is negated to produce a 0 on line 1427, generating the $\overline{\text{TRANSFER}}$ signal. The TRANSFER signal in its true state, causes the ABS units to gate the DATA in the buffer areas to the active storage areas. In addition, the TRANSFER signal activates the BTC MASTER, causing the information in the 4BS MISC units to be transmitted over the DATA BUS of CABLE THREE to the MBS units in CONSOLE LOGIC A, which act as the active storage areas for miscellaneous data.

Upon the lapse of another microsecond, the C4 pulse again terminates and activates flip-flop 1402, causing it to change states and become set. However, because the toggle input to flip-flop 1403 goes from 0 to 1, flip-flop 1403 does not change states but remains set. At this time, both inputs to the NOR 1405 labeled "3" are 0, generating a 1 output which forces a 0 output from NOR 1432, generating a 0 on $\overline{\text{CLEAR BUFFER}}$ line. This signal is transmitted to the ABS units and causes the buffer storage areas to be cleared in preparation for receiving a new instruction block from the computer. The 1 output from the "3" of NOR 1405 is also coupled over line 1430 to set a LOAD BUFFER flip-flop 1440, FIG. 18B. The purpose of the RS type flip-flop 1440 will be described later.

Upon the lapse of the fourth microsecond, the ICC resets itself. That is, as the C4 pulse terminates, flip-flop 1402, FIG. 18A, changes to the reset state. Because the T input of flip-flop 1403 now goes from 1 to 0, it changes to the reset state. This produces a pair of 0 inputs to the NOR 1405 labeled "4," generating a 1 output on a line 1443. The 1 initially passes through a discharged capacitor 1445 to the input of NOR 1412, thereby forcing a 0 output which is coupled to an input of NOR 1411. The other input of NOR 1411 is the END CARRY line, which is now 0 since the END CARRY pulse from the RDC does not last for 4 microseconds. The pair of 0 inputs to NOR 1411 generate a 1 output which resets flip-flop 1410.

While this is occurring, capacitor 1445 is charging, through a resistor 1447 coupled to ground, to the potential of the 1 output on line 1443. After flip-flop 1410 resets, capacitor 1445 becomes fully charged and causes the input to NOR 1412 to drop to ground potential or logical 0. Flip-flop 1410 remains reset, however, because the 1 output from NOR 1411 maintains the 1 input to NOR 1412. The 0 output from NOR 1412 is inverted by NOT 1416 to produce a 1 output which blocks NOR 1418, preventing future C4 pulses from toggling the ICC. The 1 output of NOT 1416 is also inverted by NOT 1419 to produce a 0 on line 1420, thereby terminating the STOP CTR signal, and automatically generating the START CTR FORWARD signal if not otherwise inhibited, as will be described later.

A short time period after line 1420 goes to 0, a capacitor 1452, FIG. 18B, previously charged by the 1 on line 1420, discharges to 0, thereby presenting a 0 input to a NOR gate 1455. The other input to NOR 1455 is the output of an END OF BLOCK STOP flip-flop 1457, which has a 0 when automatic activation of the RDC is not to be inhibited. Since both inputs of NOR 1455 are 0, a 1 output is generated and coupled to an AND acting NOR 1460, producing a 0 which is inverted by a NOT gate 1461 to generate a 1 on the START CTR FORWARD line. This signal actuates the RDC, causing the instruction block now in active store in the ABS units as a result of the immediately preceding four step sequence of the ICC, to begin to control machine movement, by passing appropriate distance pulses from the RDC. In summary, upon completing execution of a machine block, the RDC generates the END CARRY signal which stops the RDC and actuates the ICC, causing the next machine block to be transferred from buffer to the active areas in the ABS units, after which the RDC is automatically actuated to begin running the new machine block.

When the RDC is not to be automatically actuated, the END OF BLOCK STOP flip-flop 1457, FIG. 18B, is set, generating a 1 output on a line 1465 which is coupled to NOR 1455 to prevent the 0 passed by capacitor 1452 from generating a 1 output from NOR 1455. Thus, setting of flip-flop 1457 allows the machine block then in active store to complete controlling the machine tool, but prevents the next machine block which is transferred into active store by the ICC from immediately controlling machine movement.

In order to now start NCMT-A, the operator must actuate the START control at OPERATOR CONSOLE A. This generates a 0 on the $\overline{\text{START}}$ line which inputs to a NOR 1470, FIG. 18B, the other input of which is the STOP CTR line which is 0 except during the fourth step sequence of the ICC. Upon actuating START, the pair of 0 inputs at NOR 1470 generate a 1 output which is coupled to NOR 1460, thereby generating a 1 on the START CTR FORWARD line. Alternatively, the operator could actuate the RETRACT control at OPERATOR CONSOLE A, generating a 0 on a $\overline{\text{RETRACT}}$ line which is coupled to a NOR gate 1472, which also has an input coupled to the STOP CTR line. The pair of 0's generates a 1 output on the START CTR REVERSE line. The purpose of the STOP CTR connection to NORs 1470 and 1472 is to disable the START and RETRACT controls for 4 microseconds, during the four step sequence of the ICC, preventing the RDC from being activated while DATA is being transferred from the buffer to the active areas. At the completion of the ICC sequence, the STOP CTR line again goes to 0 and enables the operator controls.

END OF BLOCK STOP flip-flop 1457 is set either when a PROGRAM STOP occurs at the end of a machine block, or an OP STOP is programmed and the operator has actuated the OP STOP control at OPERATOR CONSOLE A. A PROGRAM STOP NOR gate 1480, FIG. 18B, has a pair of inputs, one of which is coupled to the $\overline{\text{8 DRIVE}}$ line from the BTC, and the other of which is coupled to the $\overline{\text{7}}$ line of the DATA BUS of CABLE THREE. As seen in FIG. 4B, the seventh bit of the 14th byte of the instruction block is PROGRAM STOP. When a machine block is stored in DEVICE LOGIC A, the BTC MASTER places the fourteenth machine byte in the 4BS MISC-2, see FIG. 3. As the BTC is initially activated by the TRANSFER signal, an eight step count is begun, the eighth count generating the 8 DRIVE signal which gates the last byte in the 4BS MISC-2 onto the DATA BUS of CABLE THREE. A pair of 0 inputs are presented to NOR 1480, if, when the BTC gates the 14th byte onto the DATA BUS of CABLE THREE (a 0 on $\overline{\text{8 DRIVE}}$), a bit is set in the seventh position (a 0 on $\overline{\text{DATA BUS 6}}$). This generates a 1 output which indicates a PROGRAM STOP bit has been set.

A NOR 1483, FIG. 18B, is provided for OP STOP. One input of NOR 1483 is the $\overline{\text{8 DRIVE}}$ line of the BTC, and a second input is the $\overline{6}$ line of the DATA BUS of CABLE THREE. Referring to FIG. 4B, the sixth position is OPTIONAL STOP, so that two of the three inputs of NOR 1483, FIG. 18B, have activating 0 inputs when the BTC transfers the last byte to CONSOLE LOGIC A, if the OPTIONAL STOP bit is set therein. When the operator wishes to stop at the end of the next machine block which allows optional stops, he actuates the OP STOP control at OPERATOR CONSOLE A, which in its inverted form is the third input to NOR 1483. When all 0's are presented to NOR 1483, a 1 output is generated therefrom, indicating OP STOP.

Both PROGRAM STOP and OP STOP from NORs 1480 and 1483, respectively, are coupled to inputs of an AND acting NOR 1485, FIG. 18B. Either input when a 1 generates a 0 output which is coupled to a NOR 1487, the other input of which is line 1420. The occurrence of OP STOP or PROGRAM STOP occurs during the time that the BTC is transferring miscellaneous data over CABLE THREE, at which time the ICC is in its rest condition and line 1420 has a 0 thereon. Therefore, the pair of 0 inputs to NOR 1487 generates a 1 output which sets flip-flop 1457. In its set position, line 1465 has a 1 output, thereby disabling NOR 1455 in order to block the automatic generation of the START CTR FORWARD signal upon completion of the next ICC sequence.

END OF BLOCK STOP flip-flop 1457 also has an output line 1490 which carries a 0 thereon when flip-flop 1457 is set. This 0 forms one activating input to a NOR 1493, FIG. 18B. The other input to NOR 1493 is the output of NOR 1411, FIG. 18A, of flip-flop 1410, and has a 0 when the END CARRY pulse is generated. Thus, instead of automatically generating START CTR FORWARD (now blocked by the 1 input to NOR 1455), the NOR 1493 has a pair of activating inputs, generating a 1 output which sets the PROGRAM STOP flip-flop 1495, FIG. 18B. The output of flip-flop 1495 is inverted by a NOT 1497 to produce a 0 on the $\overline{\text{PROGRAM STOP}}$ line. This generates the PROGRAM STOP signal which is coupled over CABLE THREE to OPERATOR CONSOLE A, FIG. 2, and energizes the PROGRAM STOP visual indicator.

LOAD BUFFER flip-flop 1440, FIG. 18B, is set by the CLEAR BUFFER signal on line 1430, and indicates that the previous DATA stored in the buffer areas of the ABS units have been cleared, and hence new DATA must be sent thereto from the computer. Flip-flop 1440 remains set while the buffer storage areas of the ABS units are empty, and is reset only after the computer writes new DATA into the buffer areas. The reset path includes a three input NOR 1500, FIG. 18A, and an RS flip-flop 1502 set thereby. NOR 1500 produces a 1 output when the true states of ADR COMPARED, STOP and WRITE are logical 1's, thereby setting flip-flop 1502. A NOR 1510, FIG. 18B, is connected directly to the $\overline{\text{ADR COMPARED}}$ line, and through a NOT gate 1512 to the STATUS TRANSFERRED PULSE line. When the true state of both lines have a 1, NOR 1510 has a 1 output. This indicates, when following a WRITE operation (as indicated by flip-flop 1502, FIG. 18A, being set), that new DATA has been presented to the buffer areas and accepted for storage (because STATUS was transferred).

Output line 1514 of NOR 1510, FIG. 18B, is coupled to flip-flop 1502, FIG. 18A, and causes it to reset when NOR 1510 has a 1 output, thereby generating a 1 at output line 1504. This 1 is immediately coupled through a discharged capacitor 1505 and via a line 1507 to the LOAD BUFFER flip-flop 1440, which now resets. As capacitor 1505 charges, the 1 is reduced to a 0, and thereafter remains a 0 on line 1507 in order that the LOAD BUFFER flip-flop 1440 may again be set when the next CLEAR BUFFER signal is generated.

ASA also includes an interlock circuit which assures that a new cycle of the ICC will not begin unless the computer has written new DATA into previously emptied buffer areas, as indicated by the clearing of the LOAD BUFFER flip-flop 1440. More particularly, an output line 1520 from flip-flop 1440, FIG. 18B, forms an activating input to a NOR 1522, FIG. 18A. When the LOAD BUFFER flip-flop is not reset, indicating that new DATA has not yet been written into the buffer areas, line 1520 carries a 0 input to NOR 1522. Another 0 input to NOR 1522 is presented by a NOT 1524, which is connected to line 1443 of the ICC.

Flip-flops 1402 and 1403 of the ICC are both maintained in a reset state when the ICC is not active, as previously explained, hence a 1 exists on line 1443 which is negated by NOT 1524 to cause a 0 input to NOR 1522. Because NOR 1522 now has a pair of 0 inputs, it generates a 1 output which disables NOR 1418, preventing C4 pulses from passing to toggle the ICC. Thus, if the LOAD BUFFER flip-flop 1440 is not reset by the time END CARRY pulse occurs over line 1414, the setting of flip-flop 1410 is ineffective to activate NOR 1418, since the interlock still blocks NOR 1418. Once new DATA is written into the buffer areas, LOAD BUFFER flip-flop 1440 is reset, causing line 1520 to rise to 1 and produce a 0 output from NOR 1522, thereby enabling NOR 1418 and allowing the C4 pulses to toggle the ICC.

The ASA also contains circuits for raising the UNIT REQUEST and the ADR COMPARED AND UNIT REQUEST tags of CABLE TWO. A UNIT REQUEST flip-flop 1530, FIG. 18B, is set to generate a 0 on an output line 1531, which is the $\overline{\text{UNIT REQUEST}}$ line of CABLE TWO. Several conditions may set UNIT REQUEST. Each time the LOAD BUFFER flip-flop 1440 is set, a 1 is coupled to an AND acting NOR 1535, generating a 0 output which is inverted by a NOT 1537 to couple a 1 through a capacitor 1538 to the set input of flip-flop 1530. Thus, each time that the DEVICE LOGIC unit transfers information from buffer to active, and then clears the buffer area, a UNIT REQUEST is generated, to cause a computer initiated request for the STATUS byte. NOR 1535 also has inputs connected to UNIT CHECK STORED and ATTENTION. When either of these signals goes to 1, the UNIT REQUEST flip-flop 1530 is similarly set. As will appear, the ASC stores an appropriate bit which indicates the reason why the UNIT REQUEST tag was raised by the ASA.

Each time a 1 inputs to NOR 1535, NOT 1537 outputs a 1 which passes through capacitor 1538 to flip-flop 1530. As capacitor 1538 charges, the input to flip-flop 1530 goes to 0 via a resistor 1540 coupled to ground, allowing the flip-flop to be later reset by NOR 1510. A germanium diode 1541 is coupled across resistor 1540 to insure that the input of flip-flop 1530 does not go negative when capacitor 1538 discharges through NOT 1537 when the 1 signal is terminated.

UNIT REQUEST line 1531, FIG. 18B, is also coupled to an input of a NOR 1546. The other input to NOR 1546 is $\overline{\text{ADR COMPARED}}$. When both inputs go to 0, a 1 output is generated which drives a transistor 1548 into saturation, thereby dropping an output line 1550 to ground potential, putting a 0 on the $\overline{\text{ADR COMPARED AND UNIT REQUEST}}$ tag.

The UNIT REQUEST flip-flop 1530 is reset by a 1 output from NOR 1510, which indicates that the STATUS TRANSFERRED PULSE has occurred at the same time as ADR COMPARED. Thus, each time the STATUS byte is transferred by the addressed DEVICE LOGIC unit, flip-flop 1530 is cleared, hence also dropping the ADR COMPARED AND UNIT REQUEST tag.

The ICC can also be controlled directly by the computer. Lines $\overline{\text{2-5}}$ of the COMMAND BUS of CABLE TWO are coupled to a plurality of NOT gates 1560, FIG. 18A, having outputs connected to the inputs of a CLEAR ACTIVE NOR 1562 and a CLEAR BUFFER NOR 1564. The direct and negated inputs to NORs 1562 and 1564 present all 0 inputs thereto when the CLEAR ACTIVE and CLEAR BUFFER commands, respectively, are present, as seen by referring to the COMMAND byte format, FIG. 7. When the combination of bits indicates CLEAR ACTIVE, NOR 1562 has a 1 output coupled to an AND acting NOR 1567, which passes a 0 to a NOR 1568. If the other input of NOR 1568, namely ADDRESS COMPARE, is also 0, then a 1 is generated to indicate that this DEVICE LOGIC unit has been addressed and that the computer has commanded that the ICC generate the CLEAR ACTIVE STORAGE signal. The 1 from NOR 1568 forms an input to NOR 1423, thus forcing a 0 on the CLEAR ACTIVE STORAGE line 1424.

Similarly, when the buffer areas are to be cleared, NOR 1564 has a 1 output coupled to an AND acting NOR 1570, which couples a 0 to a NOR 1572, also having an input to ADDRESS COMPARED. If this DEVICE LOGIC unit has been addressed, NOR 1572 has a 1 output which is coupled to NOR 1432, thereby placing a 0 on CLEAR BUFFER line 1433. Because NOR 1432 is located after line 1430, the computer generated CLEAR BUFFER command does not cause the LOAD BUFFER flip-flop 1440, FIG. 18B, to be set, thus the UNIT REQUEST flip-flop 1530 is similarly not actuated.

Computer control of the ICC occurs, for example, when a SEQUENCE NUMBER SEARCH is made. As previously described, the computer programs command the active and buffer storage areas of the ABS units at DEVICE LOGIC A to be cleared, causing two computer initiated communication sequences which transmit the CLEAR ACTIVE and then the CLEAR BUFFER commands to the machine control. The SEQUENCE NUMBER SEARCH program meanwhile builds the new machine blocks for moving NCMT-A to the location where the new sequence number instruction is to start. Then, the computer outputs the START message over the COMMUNICATIONS TERMINAL to the operator, who actuates the START control.

The START signal generates a 1 output from NOR 1470, FIG. 18B, and causes generation of the START CTR FORWARD signal, which actuates the RDC. At this time, the cleared ABS units have no DATA stored therein, so all 0's are stored in their active and buffer storage areas. As will appear, the ASC generates fictional feedrate pulses when the ABS FR has all 0's stored therein, which pulses are passed by the ABS FR to the RDC. The RDC starts counting the fictional feedrate pulses, but the distance pulses outputting therefrom are all blocked by the ABS AXIS units, since they store all 0's in their active storage section.

When the RDC completes counting the fictional feedrate pulses, the END CARRY PULSE is generated and coupled to the ASA over line 1414, FIG. 18A, to set flip-flop 1410. This initiates the four step sequence of the ICC, generating signals coupled to the ABS units to cause all 0's in active storage to be cleared, the 0's in buffer storage to be transferred into active storage, and the 0's in buffer storage to be cleared. Upon clearing the ABS buffer area, the LOAD BUFFER flip-flop 1440, FIG. 18B, is set, thus causing the UNIT REQUEST tag to be raised. This initiates a DEVICE LOGIC request for communications with the computer, thereby presenting an interrupt to the computer program, which as previously described, causes the new machine blocks to be transmitted to DEVICE LOGIC A. Upon receipt, DEVICE LOGIC A stores the new machine blocks in the cleared buffer areas of the ABS units, after which the LOAD BUFFER flip-flop 1440 is reset.

During this time period, the ICC completed its four step sequence and placed a 0 on STOP CTR line 1420, thereby automatically generating another START CTR FORWARD signal. This initiated another cycle under control of the second set of 0's, now in the active storage areas in the ABS units. The RDC again counts another set of fictional feedrate pulses, which are blocked by the 0's in the ABS units. Upon completion of the count, another END CARRY is generated, again actuating the ICC, but this time shifting the new machine blocks in the buffer areas to the active areas in the ABS units. Upon automatic generation of START CTR FORWARD, NCMT-A moves in accordance with the new machine blocks, allowing the program to continue thereafter from the new sequence number instruction.

ASB

In FIG. 19, the ASB is illustrated in detail. The ASB for each DEVICE LOGIC unit contains an address compare circuit 1600 which uniquely identifies a different one of the addresses from the address counter in the CUA. For this purpose, all negated lines of the ADDRESS BUS which carry a 0 bit when the address of the ASB is present, are directly connected to a multiple input NOR 1603. The remaining negated lines of the ADDRESS BUS are connected through individual NOT gates 1605 to the inputs of NOR 1603.

When the ADDRESS BUS carries a combination of bits corresponding to the address assigned the ASB, all inputs to NOR 1603 are 0's, thereby generating a 1 output which forward biases transistor 1607. The transistor is connected in circuit with a 680 ohm resistor 1609, connected between +3.6 volts DC and its base electrode, and a 470 ohm resistor 1610 connected between its emitter electrode and ground. The collector electrode is connected to a line 1612 which is the ADR COMPARED tag of CABLE TWO. The base electrode is also coupled through a one kilohm resistor 1614 to a NOT gate 1615, having an output line 1616 which is an ADR COMPARED (B) line. Lines 1612 and 1616 are both logically identical, with more than one line being used in order to provide additional driving current for the system. Throughout the specification, all lines identified by letters in parenthesis are logically identical with lines identified by the same nomenclature, but without a letter in parenthesis. Thus, each time circuit 1600 identifies its address, a 0 is placed on both line 1612 and line 1616.

Resistors 1609, 1610 and 1614 are selected to have values which cause transistor 1607 to draw 1 milliamp off line 1612 when transistor 1607 is forwardly biased by the 1 output from NOR 1603. Should a corresponding transistor 1607 in another DEVICE LOGIC unit be forwardly biased at the same time as the transistor 1607 in DEVICE LOGIC A, each transistor would draw 1 milliamp off line 1612, causing 2 milliamps current flow. Line 1612 forms the ADR COMPARED tag of CABLE ONE, which inputs to line 817, of the CUA, FIG. 13A. As previously explained, when more than 1 milliamp is drawn off the ADR COMPARED tag, the CUA generates the COMPARE ERROR signal, and blocks generation of the COMPARE signal, thus recognizing that an error has occurred because more than one DEVICE LOGIC unit has recognized an address as its own.

The ASB also contains a byte counter 1620 for generating signals coupled to the ABS and 4BS units in order to gate the DATA byte then on DATA BUS OUT into its proper storage location. Byte counter 1620 includes a plurality of JK flip-flops 1623, connected in a counter circuit which sequentially sets each JK 1623 in turn, when toggled by a common input signal on a line 1624. The number of JKs 1623, herein 15, is 1 greater than the number of bytes in a machine block. The first 14 JKs 1623 each correspond with the 14 bytes of the machine block, as illustrated by the format in FIGS. 14A-B. Each JK 1623 has an output to an individual one of a plurality of NORs 1627. The NORs 1627 are connected through an individual one of a plurality of NOTs 1628 to a BYTE line corresponding to its byte position in the format. All NORs 1627 are connected to a common gating line 1630 which enables the NORs 1627 when the BYTE signals are to be gated to the ABS and 4BS units.

Byte counter 1620 is stepped by a signal on line 1624, to gate the DATA bytes on DATA BUS OUT into the proper storage locations in DEVICE LOGIC A. For this purpose, a NOR 1635 has one input connected to WRITE, and another input connected via a NOT gate 1636 to LOAD BUFFER. The third input to NOR 1635 is coupled through a NOT gate 1640 to the output of a NOR 1642. The inputs of NOR 1642 are ADR COMPARED (B), and via a NOT gate 1644, the TIMING tag. When the computer places a DATA byte on DATA BUS OUT, the WRITE command is true, and ADR COMPARED (B) is raised at the DEVICE LOGIC unit which is to write the information into its buffer storage areas. The LOAD BUFFER signal from the ASA is also raised, indicating that the buffer areas are cleared and hence ready to receive new bytes, and finally the CU MT raises the TIMING tag of CABLE TWO, to indicate that it has placed the first DATA byte onto DATA BUS OUT. These conditions produce all 0 inputs to NOR 1635, thereby generating a 1 output which is inverted by a NOT 1650 to couple an enabling 0 to NORs 1627. The 1 output from NOR 1635 is also coupled through a resistor 1653 to toggle line 1624, which is shunted to ground by a capacitor 1655. Initially, the 1 is shunted to ground, maintaining a 0 over line 1624. As capacitor 1655 charges, the signal goes to 1, in preparation for future toggling operations.

Counter 1620 is precleared after completion of each byte counting cycle, hence all JK flip-flops 1623 are now in the reset state. Only the first or leftmost JK 1623 in FIG. 19 has its 1 output connected to the input of its NOR 1627, the remaining JKs 1623 having their 0 outputs connected to the input of their respective NORs 1627. Accordingly, only the first JK 1623 has a 0 output to its NOR 1627. This 0, in combination with the 0 on line 1630 when the first byte is on DATA BUS OUT, produces a 1 output from the first NOR 1627. This is negated by its NOT 1628 to produce a 0 on the $\overline{\text{BYTE 1}}$ line. Since the first byte is not for axis control, see FIG. 4A, the BYTE 1 line is coupled to the 4BS MISC-1. Thus, when the first byte is received over DATA BUS OUT, it is gated into its proper byte storage area in a 4BS unit.

When the computer drops the first DATA byte, the TIMING tag drops to 0, and is negated by NOT 1644 to produce a 1 at NOR 1642. This forces a 0 output which is negated by NOT 1640 to generate a disabling 1 input to NOR 1635, thereby forcing a 0 output which is negated by NOT 1650 to produce a disabling 1 on line 1630. The 1 now blocks all NORs 1627, thereby terminating the BYTE signal. The 0 from NOR 1635 is also coupled to resistor 1653, allowing the previously charged capacitor 1655 to discharge, thereby dropping toggle line 1624 to 0 after a time delay, actuating all JK flip-flops 1623. Since only the left two JKs 1623 have enabling 0's on their set S inputs, only those flip-flops change to their set state. At this time, only the second JK 1623 has an activating 0 output to its NOR 1627 associated therewith, causing the count to shift to two. However, no BYTE 2 signal is generated because all NORs 1627 are disabled at this time by the 1 on line 1630.

When the computer places the second DATA byte onto DATA BUS OUT, the TIMING tag is again raised. As previously described, this causes a 0 on line 1630, thereby enabling all NORs 1627. Since JKs 1623 are already at the two count, the $\overline{\text{BYTE 2}}$ line immediately goes to 0. In accordance with the format, FIG. 4A, this BYTE is assigned to the second byte storage area of the 4BS MISC-1, so the BYTE 2 signal is coupled thereto, causing the BYTE to be entered and stored. Thereafter, counter 1620 continues to step and place each byte of DATA into its proper storage location. For the format illustrated in FIGS. 4A–B, signals BYTE 1 and BYTE 2 are coupled to the first and second buffer areas of the 4BS MISC-1, signals BYTE 3 and BYTE 4 are coupled to the ABS FR, signals BYTE 5 and BYTE 6 are coupled to the ABS X-axis, signals BYTE 7 and BYTE 8 are coupled to the ABS C-axis, signals BYTE 9 and BYTE 10 are coupled to the third and fourth buffer areas of 4BS MISC-1, and signals BYTE 11 through BYTE 14 are coupled to the first through fourth buffer areas of 4BS MISC-2, respectively.

Counter 1620 continues to step as long as the computer continues to place bytes onto the DATA BUS. The computer may generate a STOP tag sequence anywhere from the first to the fourteenth byte, after which DEVICE LOGIC A transfers its STATUS. This causes the ASA to generate a 1 on the STATUS TRANSFER PULSE AND ADR COMPARED (B) line, which inputs via a line 1660 of the ASB to the preclear inputs of all JKs 1623. This resets all JKs 1623, in preparation for the next byte counting operation.

The counter 1620 is disabled when the computer is to receive DATA from the DEVICE LOGIC unit, during a SENSE sequence. The CU MT now generates the SENSE rather than the WRITE command over the COMMAND BUS. $\overline{\text{WRITE}}$ is now 1, blocking NOR 1635 to prevent signals from being passed to enable NORs 1627 or toggle JKs 1623. $\overline{\text{SENSE}}$ is now 0, thereby enabling a NOR 1665, the other input of which is the output of NOT 1640. As the TIMING tag is raised, indicating that a DATA byte should be transmitted from the DEVICE LOGIC unit to the computer, NOR 1665 has a pair of 0 inputs which generate a 1 output, negated by NOT 1667 to produce an enabling 0 on a $\overline{\text{SENSE DRIVE PULSES}}$ line 1668. Line 1668 is coupled to the ASC for controlling the gating of the 4BS SENSE.

Byte counter 1620 includes an error detecting circuit which insures that each DATA byte is gated to only one location, and that not more than the maximum number of bytes in a machine block are counted. The failure of either condition indicates an INSERT ERROR, which generates a 1 on an output line 1670, coupled to the ASC to set a UNIT EXCEPTION bit in the STATUS BYTE. The clear C input to each JK 1623 is connected through an individual of a plurality of diodes 1672 and associated resistors 1674 to a common line 1675 connected to the base electrode of a transistor 1678. Line 1675 is also coupled through a resistor 1679 to ground. The emitter electrode of transistor 1678 is directly connected to ground, while the collector electrode is connected through a resistor 1681 to +3.6 volts DC.

If more than one JK 1623 couples an activating 0 to its NOR 1627, thereby raising more than one clear C input to a 1, more than one current path is provided through series diodes 1672 and resistors 1674. The increased current flow increases the voltage drop across resistor 1679, sufficient to bias transistor 1678 into saturation. This drops the collector voltage thereof to 0, which is negated by a NOT 1683 to generate a 1 coupled to an AND acting NOR 1685. NOR 1685 produces a 0 which is negated by a NOT 1688 to generate a 1 on INSERT ERROR line 1670. In this instance, the INSERT ERROR signal indicates that two or more BYTE signals have been generated, and thus the same BYTE on DATA BUS OUT has been improperly gated into two or more buffer storage locations.

An INSERT ERROR is also generated if byte counter 1620 should count a greater number of bytes than the maximum allowed by the format. One more cascaded JK 1623 is used in the counter than the number of bytes to be counted. This last JK 1623 has its 0 output coupled to a NOR 1690, the other input of which is line 1630. If the 15th byte should be counted, a pair of 0's are presented to NOR 1690, generating a 1 to NOR 1685, thereby causing INSERT ERROR line 1670 to again have a logical 1 thereon.

ASC

The ASC is illustrated in detail in FIG. 20. A STATUS storage area 1700 records the setting of bits forming the STATUS byte, for gating onto DATA BUS IN of CABLE TWO when STATUS is to be transmitted to the computer. Area 1700 includes an RS flip-flop 1702 for each bit of the STATUS byte which is stored on the ASC. Each flip-flop 1702 has a set line 1704 which sets the flip-flop when a 1 is carried thereon, thereby generating a 0 on an output line 1705. The output line 1705 also forms an input to a NOR 1706, for gating the stored bit onto DATA BUS IN. All flip-flops 1702 have a common reset line 1710 coupled to the STATUS TRANSFERRED PULSE AND ADR COMPARED (B) line.

The first flip-flop 1702, for storing the ATTENTION bit, has its input line 1704 coupled to an AUTO ENABLE signal, which may come from any conventional circuit which has a 1 signal when NCMT-A id down, i.e., not being used in production. The ATTENTION bit as used herein does not have the standard meaning assigned thereto by the computer manufacturer, but rather is used to log the cycle of time of the machine tool. By appropriate computer programming, the occurrence of an ATTENTION bit interrupt maintains a running tabulation of the off time of the machine tool associated therewith, in order for the computer to continuously monitor the efficiency of the system. The second flip-flop 1702, for the STATUS MODIFIER bit, is a spare. If desired, it may similarly be used to monitor special conditions, with an appropriate computer program being provided to interpret the setting of the bit.

The third flip-flop 1702, for BUSY, has its input line 1704 coupled to a NOR 1715 which sets the BUSY bit only when a WRITE command is sent to the DEVICE LOGIC unit and the LOAD BUFFER flip-flop in the ASA is not set. That is, there is no indication that the buffer storage areas in the 4BS units are empty, when the computer wishes to write new DATA therein. For this purpose, NOR 1715 is coupled to $\overline{\text{ADR}}$ $\overline{\text{COMPARED}}$, $\overline{\text{WRITE}}$ and LOAD BUFFER, all of which are 0 when the BUSY bit is to be set.

The fourth flip-flop 1702, for the DEVICE END bit, has its line 1704 coupled to a NOR 1717. The inputs to NOR 1717 are $\overline{\text{UNIT REQUEST}}$, and the negated LOAD BUFFER signal. These signals, generated by the ASA, are both 0 after the four step ICC sequence, thus indicating that the next machine block should be transmitted by the computer to the buffer areas in DEVICE LOGIC A.

The fifth flip-flop 1702, for UNIT CHECK, is coupled via line 1704 through a capacitor 1720 and a NOT 1721 to the $\overline{\text{SENSE COMPLETE}}$ signal from the BTC MASTER. Line 1704 is also coupled through a resistor 1723 to ground. When the operator actuates the ATTENTION control at OPERATOR CONSOLE A, the SED SENSE at CONSOLE LOGIC A loads the 4BS SENSE unit, thereby initiating a sequence which causes the SENSE bytes to be transmitted to DEVICE LOGIC A. As will appear, after the BTC MASTER has completed loading all SENSE bytes into the 4BS SENSE at DEVICE LOGIC A, the SENSE COMPLETE signal is generated. Thus, the setting of the UNIT CHECK flip-flop 1702 indicates that DEVICE LOGIC A is ready to send the SENSE BYTES to the computer.

Finally, the last flip-flop 1702 stores UNIT EXCEPTION, and has its input line 1704 coupled to the INSERT ERROR line from the ASB. The setting of the UNIT EXCEPTION bit thus indicates that a machine block has been received having more bytes than the maximum permitted by the format, or that the byte counter in the ASB has placed the same byte into two or more storage areas. It will be recalled that the UNIT EXCEPTION bit can also be set at CU MT in response to parity checking operations.

When the stored bits are to be gated onto DATA BUS IN to form the STATUS byte, the $\overline{\text{STATUS IN}}$ lines goes to 0. This forms one input to a NOR 1726, the other input being $\overline{\text{ADR}}$ $\overline{\text{COMPARED (B)}}$, so that NOR 1726 has a 1 output when the STATUS bits stored in this DEVICE LOGIC unit are to be gated onto DATA BUS IN. The 1 output is negated by a NOT 1728 to generate an activating 0 coupled to all NORs 1706, gating the bits stored in the associated flip-flops 1702 therethrough. When a bit is set, the pair of 0 inputs to NOR 1706 generate a 1 output which drives a transistor 1730 associated therewith into saturation, thereby dropping the corresponding negated line of DATA BUS IN to a 0.

Another function of the ASC is to generate the SENSE DRIVE signals coupled to the 4BS SENSE in the DEVICE LOGIC unit, in order to gate the SENSE bytes sequentially onto DATA BUS IN for transmission to the computer. A pair of JK flip-flops 1733 and 1734 are cross connected to form a four stage counter, having output lines coupled to a plurality of NOR gates 1736, which output via a plurality of NOT gates 1738 to the four $\overline{\text{SENSE DRIVE}}$ lines. NORs 1736 are all enabled by a SENSE DRIVE PULSES signal, which is also coupled through a NOT 1740 to the individual toggle T inputs of JKs 1733 and 1734. The preclear inputs of JKs 1733 and 1734 are coupled to the line 1710, which carries the STATUS TRANSFER PULSES AND ADR COMPARED (B) signal.

In operation, the SENSE DRIVE JKs 1733 and 1734 are precleared to their reset states when the STATUS byte is transferred to the computer just prior to the expected transmission of the SENSE bytes. Thereafter, the computer causes the TIMING tag to be raised while the SENSE command is maintained over the COMMAND BUS of CABLE TWO, causing the ASB to generate the SENSE DRIVE PULSES signal, as previously described. This negated signal is coupled to NORs 1736 enabling the NORs count of JKs 1733 and 1734 to the appropriate SENSE DRIVE line.

When precleared, JKs 1733 and 1734 are both in their clear state, presenting a pair of 0's to the topmost NOR 1736 in FIG. 20. This occurrence of a 0 on the $\overline{\text{SENSE DRIVE PULSES}}$ line is negated by NOR 1740 to produce a 1 at the toggles of JKs 1733 and 1734. However, since this signal is positive going, the flip-flops do not change states at this time. The 0 on $\overline{\text{SENSE DRIVE PULSES}}$ also couples a 0 to NORs 1736, the topmost one now having all 0 inputs. This generates a 1 output which is negated by the corresponding NOT 1738 to generate a 0 on $\overline{\text{SENSE DRIVE 1}}$.

When the computer tag sequence causes the TIMING tag to drop, the ASB drops the SENSE DRIVE PULSES signal, thereby coupling a 1 to NOT 1736, blocking the transmission of signals therethrough. At the same time, the output of NOT 1740 goes from 1 to 0, creating a negative going toggle pulse which actuates the flip-flops. JK 1733 now changes to the state set, while JK 1734 remains in the reset state. When the computer causes the TIMING tag to again raise, the ASB again generates the SENSE DRIVE PULSES signal.

At this time, NORs 1736 of the ASC are again enabled by 0 inputs. Since the second NOR 1736 has all 0 inputs, the $\overline{\text{SENSE DRIVE 2}}$ line has a 0 output. When the SENSE DRIVE PULSES signal is again dropped, JK 1733 remains in the set state, but JK 1734 changes to the set state. When the next SENSE DRIVE PULSES signal is generated, the $\overline{\text{SENSE DRIVE 3}}$ output line has a 0 thereon. The dropping of the third SENSE DRIVE PULSES signal changes JK 1733 to the reset state, but maintains JK 1734 in the set state, thereby causing $\overline{\text{SENSE DRIVE 4}}$ to go to 0 upon the occurrence of the fourth SENSE DRIVE PULSES signal. Since the SENSE signal consists of 4 bytes, see FIG. 5, this completes the SENSE operation. The generation of the STATUS TRANSFERRED PULSE AND ADR COMPARED (B) signal preclears both JKs 1733 and 1734, thereby clearing the counter in preparation for a future SENSE operation.

Another circuit on the ASC concerns synchronization of the CP. A NOT 1750 is coupled through a capacitor 1751 to a line 1752 connected to the $\overline{\text{SYNCH}}$ line of CABLE THREE. Line 1752 is coupled through a resistor 1753 to +3.6 volts DC, and the input to NOT 1750 is coupled through another resistor 1755 to +3.6 volts DC. When the operator wishes to resynchronize the machine tool following a JOG operation, he actuates the SYNCH control at OPERATOR CONSOLE A. This couples a 0 through capacitor 1751 to NOT 1750, generating a 1 output which is coupled both to a NOR 1757 and to an RS flip-flop 1759. The 1 output signal sets flip-flop 1759, generating a 1 output which is coupled to a capacitor 1762. The capacitor is coupled to a NOT 1763 whose input is also coupled through a resistor 1765 to +3.6 volts DC. The 1 input to capacitor 1762 results in a 1 input to NOT 1763, which therefore maintains a 0 output on the SYNCHRONIZE line, coupled to the CP.

As capacitor 1751 charges via resistor 1755, a 1 input to NOT 1750 appears after a time delay. The resulting 0 output is coupled to a NOR 1757. At C3 time, $\overline{\text{C3}}$ goes to 0, presenting a pair of 0 inputs which generate a 1 output, resetting flip-flop 1759. The 0 output therefrom is coupled through capacitor 1762 and negated by NOT 1763 to produce a momentary 1 output on the SYNCHRONIZE line. Capacitor 1762 then charges to a 1, returning the input to NOT 1763 to a 1, terminating the SYNCHRONIZE signal. The circuit is now maintained in its rest state until the occurrence of the next SYNCH signal.

Finally, the ASC contains an AUTOMATIC FEEDRATE INSERTION circuit 1770. When a new machine block is to be shifted into active storage, the ICC generates a CLEAR AC- TIVE storage signal, which inputs to circuit 1770 and causes an RS flip-flop 1772 and an RS flip-flop 1774 to reset, and a JK flip-flop 1776 to preclear. The ICC then completes shifting the new block into the ABS and 4BS units. If the machine block now in active store has a 0 or no feedrate number as occurs during a SEQUENCE NUMBER SEARCH operation (as described in the section on the ASA), the ABS FR blocks all feedrate pulses. Since no F pulses pass to the RDC, the END CARRY signal cannot be generated, which signal is necessary to actuate the ICC in the ASA and thus allow the program to continue.

Circuit 1770 determines when the condition occurs, and in response thereto generates fictional feedrate pulses in order that the RDC can complete its count and generate the END CARRY signal. Of course, if no distance multipliers are set in the ABS units for each axis, as during the initial part of a SEQUENCE NUMBER SEARCH, the fictional F pulses are not gated to the CP, and hence cause no machine movement. Circuit 1770 dwells for a period of time during which a feedrate pulse F should have occurred, and if none are generated during this time, assumes that the feedrate number is zero. This causes flip-flop 1774 to be set, as will appear, coupling an enabling 0 to a NOR 1780. The other input of NOR 1780 is an output F line of the VC which has feedrate pulses occurring at an intermediate rate, as $\overline{F6}$. Upon the occurrence of each F6 time, NOR 1780 generates a 1 output coupled to an INSERT FEEDRATE PULSES line. This connects to an AND on the ABS FR in order to gate fictional feedrate pulses to the RDC. The feedrate approximates a 4 second count time on the RDC.

More particularly, FEEDRATE PULSES from the output of the ABS FR are coupled via line 1782 to the set input of flip-flop 1772. Following the resetting of all flip-flops in circuit 1770, the occurrence of any feedrate pulse will set flip-flop 1772 and cause a 1 output to be coupled to a NOR 1784. This forces a 0 output, coupled to the set input of flip-flop 1774, to prevent flip-flop 1774 from being set by a 1 input. Flip-flop 1774 therefore maintains a 1 output which disables NOR 1780, preventing F6 pulses from being gated onto the INSERT FEEDRATE PULSES line.

If no feedrate pulses occur on line 1782, then flip-flop 1772 does not set. The last F pulse to be generated by the VC is F14, which pulse is coupled via a line 1786 to the toggle input of flip-flop 1776. As the F14 pulse terminates, flip-flop 1776 is toggled to its set state, thereby generating a 1 output which charges a capacitor 1788 to a 1. However, since a 1 was already being maintained to the input of NOR 1784 by a resistor 1790 coupled to +3.6 volts, the charging of capacitor 1788 has no immediate effect. As a safety precaution, circuit 1770 will not generate AUTOMATIC FEEDRATE PULSES until no feedrate pulses from the ABS FR have occurred after the lapse of two F14 pulses. By this time, feedrate pulses should have occurred unless the feedrate number is zero.

Upon the occurrence of the second F14 pulse, flip-flop 1776 is again toggled on the lagging edge of the pulse, thereby changing to the reset state and coupling a 0 to capacitor 1778. This 0 is momentarily coupled to the input of NOR 1784. The other input to NOR 1784 is the output of flip-flop 1772, and if no feedrate pulses have yet occurred, flip-flop 1772 remains reset and couples a 0 input to NOR 1784. Since two 0's are coupled to NOR 1784, it generates a 1 output which sets flip-flop 1774, enabling NOR 1780. Thereafter, each 0 on $\overline{F6}$ generates a fictional feedrate pulse. Circuit 1770 is thereafter disabled when the CLEAR ACTIVE STORAGE line again goes to 1.

VC

In FIGS. 21A-B, the VC is illustrated in detail. FIG. 21A illustrates the variable counter circuit which outputs pulses FO through F14, while in FIG. 21B, the JOG circuit is illustrated. Turning to FIG. 21A, a 15 stage counter is formed from 15 JK flip-flops 1800. Each JK 1800 is a bistable unit maintained in either its set or clear states, and each has its 1 output connected to the input of a three-legged input NOR 1802. Another input of NOR 1802 is a common line 1804 which carries a 0 thereon to enable all NORs 1802 at the proper time. The third input to each NOR 1802, except for the initial one associated with FO, is a line connected to the output of a NOR 1806 and to the S and C inputs of the JK 1800 associated therewith.

Each NOR 1806 has an input connected to a common line 1810, connected to ground. The other input of each NOR 1806, except for the initial one associated with FO, is the output of a NOR 1812, whose inputs are connected to the 0 output of the preceding JK 1800 and to the output of the preceding NOR 1806. The other input of initial NOR 1806, illustrated to the left in FIG. 21A, is the 1 output of the first JK 1800. All of the preclear inputs of JKs 1800 are connected via a line 1816 to ground. The S and C inputs of the first JK 1800 are also grounded. The toggle T inputs of all JKs 1800 are connected to a common line 1820.

When all inputs to one of the NORs 1802 are 0's, that NOR has a 1 output which forms an F pulse. Separate lines F0-F14 are provided for each stage of the counter. Only one F line has an output when line 1820 toggles all stages of the counter, the particular line depending upon the state of the JKs 1800 and the outputs of the NORs 1806. Each NOR 1806 has a 0 output only when all JKs 1800 preceding that NOR are in their set state.

A free running oscillator 1830 generates a continuous series of pulses at an output line 1832. Line 1832 is connected to the toggle T input of a JK flip-flop 1834, which has its 0 output connected to the toggle input of another JK flip-flop 1836. JKs 1834 and 1836 form a divide-by-4 counter, and provides a string of output pulses from the 0 output of JK 1836 at one-fourth the input frequency from oscillator 1830. These pulses are coupled to a circuit 1840 which synchronizes the divided oscillator pulses to the phase of the clock system, producing pulses on a line 1844 which approximately occur at C1 time. The fifteen stage counter continuously counts the series of pulses on line 1844, generating one F pulse for each pulse on line 1844.

For this purpose, line 1844 inputs to a NOR 1846 and a NOR 1848. The output of NOR 1846 is directly connected to toggle line 1820. The output of NOR 1848 is connected through a NOT 1850 to line 1804, which line 1804 is also coupled back through a line 1852 to form an input of NOR 1846. The second input to NOR 1848 is $\overline{C1}$.

The 15 stage counter circuit provides an output F pulse from a stage before the corresponding flip-flop in that stage of the counter is set. Without this operation, the fast clock rate of the system could not be maintained, because a flip-flop cannot internally set in sufficient time to generate an output pulse within the time necessary to allow the system to continue operating at the maximum speeds the present invention allows. The novel circuit disclosed herein obviates this problem by providing an F pulse in anticipation of the flip-flop associated with that stage being set.

By way of example, it will be initially assumed that all JKs 1800 are in their clear or reset state, as opposite their set state. In this case, the FO associated NOR 1802, to the left in FIG. 21A, has a 0 input from the 1 output of its JK 1800. The middle input to this NOR is directly grounded and the third input is line 1840, which is normally maintained at 1. When a pulse is to be connected, a 0 appears at line 1844. Upon the occurrence of $\overline{C1}$, NOR 1848 has a pair of 0 inputs which generate a 1 output, negated by NOT 1850 to generate a 0 on line 1804. This 0 forms all 0 actuating inputs to FO associated NOR 1820, thereby causing a 1 to appear on output line FO. At the same time, the 0 on line 1804 is coupled via line 1852 to NOR 1846, which is similarly coupled to line 1844. The pair of 0 inputs generates a 1 output on line 1820, causing the toggle T input of all JKs 1800 to rise positively. When the C1 pulse terminates, $\overline{C1}$ goes to 1, forcing a 0 output from NOR 1848 which is negated by NOT 1850 to produce a 1 on line 1804. This 1 blocks all NORs 1802, thereby terminating pulse FO.

At the same time, the 1 is coupled via line 1852 to NOR 1846, thereby forcing a 0 on line 1820. The toggle input of all JKs 1800 now goes from 1 to 0, providing a triggering input thereto. However, only the JK 1800 associated with FO has its S and C inputs grounded, so only the first JK changes to its set state. Thus the first output pulse FO occurred before the first JK flip-flop associated therewith was set, and in anticipation of the setting of that flip-flop.

At C1 time, the first JK 1800 was not yet set, and hence its 1 output carried a 0 to the first NOR 1806. Since the other input to NOR 1806 was 0, a 1 output was generated from the first NOR 1806, and coupled to the S and C inputs of the succeeding JK 1800 to prevent its setting upon the negative going toggle signal at the end of C1 time. This disabling 1 was also coupled to the second NOR 1802, preventing the generation of an F pulse therefrom. Finally, the 1 output of NOR 1806 was coupled to the next NOR 1812, forcing another 0 input at the input of the next NOR 1806, whose other input was also 0 from the reset JK, generating another 1 output. This step repeats for all cascaded NORs 1806. The resulting 1 outputs disable the S and C inputs of all JKs succeeding the first JK, and similarly disable all NORs 1802 succeeding the first NOR 1802.

When the counter is to be actuated by the next pulse, a 0 again appears on line 1844 at approximately C1 time. The 0 could appear on line 1844 at the immediately next C1 time, or 2 or more clock cycle times later, depending upon the frequency output of oscillator 1830. As previously described, a 0 appears on line 1804 to form an enabling input to NORs 1802. At this time, the NOR 1802 associated with F1 has its upper input at 0 from the still reset JK associated therewith, and has its middle input connected to the preceding NOR 1806 which now has a 0 output since all preceding stages (in this case being only the first stage) are set. The F1 associated NOR 1802 now generates a 1 output on line F1. The FO NOR 1802 is disabled at this time, from the 1 output of its set JK 1800 associated therewith. As C1 drops, the second JK 1800 is set, and the first JK 1800 is reset.

Thereafter, the JKs 1800 are set in straight binary form. That is, the next pulses first set both the first and second flip-flops, then set the third flip-flop while the first and second flip-flops are reset, after which the first flip-flop is set, then the second flip-flop is also set, after which the fourth flip-flop sets while the first three flip-flops reset, and so on. The output pulse F occurs from only the NOR 1802 associated with the flip-flop 1800 which thereafter changes to the set state, following the termination of C1 time, due to the cascaded NORs 1806 which control the actuating inputs of NORS 1802.

Oscillator 1830 is controlled by the OPERATOR FEEDRATE OVERRIDE control at OPERATOR CONSOLE A, in the form of a potentiometer 1860 coupled between +0.5 volts DC and through a resistor 1861 to +3.6 volts DC. The wiper of potentiometer 1860 is coupled through a small value resistor and an output line 1862 to a plurality of parallel connected resistors 1864. Each resistor 1864 is coupled through one of a plurality of capacitors 1866 to ground reference potential. The voltage across each capacitor 1866 is coupled through a diode 1868 to a corresponding NOT gate 1870. The output of each NOT 1870 is connected through a resistor 1872 to the input of the succeeding NOT 1870. The values of the resistors and capacitors are chosen to cause circuit 1830 to freely oscillate at 4 megahertz when line 1862 is coupled a low voltage, from 0.5 volts to ground potential. By way of example, one circuit used resistors 1864 of 5.0 kilohms, capacitors 1866 of 680 picofarads and resistors 1872 of 1.5 kilohms. A NOT 1875 serves as an amplifier for the free running oscillator 1830 and couples the oscillatory output therefrom to line 1832. In operation, as an operator varies potentiometer 1860, the frequency of oscillations drops to about one-tenth of the highest value as the DC potential at the line 1862 climbs to approximately +3.0 volts.

A computer override of the OPERATOR FEEDRATE OVERRIDE control is provided by a transistor 1877, whose base is coupled to a line 1878 connected with the PREVENT FR OVERRIDE line from the ABS FR. The collector of transistor 1877 is directly connected to line 1862, whereas the emitter is directly coupled to ground. When the computer is to prevent the operator adjustment of the FEEDRATE OVERRIDE control, the leftmost bit of BYTE 3 in the binary sequential format, see FIG. 4A, carries a 1. This 1 bit is stored in the first bit storage area in the ABS FR, and has a line directly connected to line 1878. The presence of a 1 bit drives transistor 1877 into saturation, thereby grounding line 1862 and causing oscillator 1830 to have a 4 kilohertz output.

Another control of oscillator 1830 is provided by an FR OVERRIDE line which is coupled through a resistor 1879 to the junction between potentiometer 1860 and resistor 1861. Resistor 1879 has a smaller value than resistor 1861. The FR OVERRIDE line is coupled over CABLE THREE (not illustrated in FIG. 2, for clarity) to the SED SENSE in CONSOLE LOGIC A. As will appear, when the following error exceeds a permissible amount, the SED SENSE generates the FR OVERRIDE signal, which indicates that the rate of movement along the axes should decrease, in an attempt to reduce the following error. This couples a 1 to resistor 1879, which adds to the voltage coupled through resistor 1861. The summed voltages cause the potential at the wiper of potentiometer 1860 to rise, which as previously explained causes oscillator 1830 to have a lower frequency of oscillation. This in turn decreases the rate at which the feedrate pulses F are generated, causing movement along each axis to slow by a proportional amount.

The output of oscillator 1830 is coupled to a divide-by-4 circuit formed from JKs 1834 and 1836. The output pulses from the divide-by-4 circuit are connected to circuit 1840, in order to synchronize each pulse with C1 time. For this purpose, the 0 output of JK 1834 is coupled to the toggle T of a JK 1882, whose set S goes to ground and whose clear C goes to plus or logical 1. When a pulse is to be counted, the output from JK 1836 goes from 1 to 0, thereby triggering the toggle of JK 1882 and causing the flip-flop to change to the set state, provided it is not being precleared. This causes the 1 output thereof to rise positively, which output is coupled to the toggle of a second JK 1884. The above operation stores a pulse which is to be synchronized with C1 time.

Upon the occurrence of C4, $\overline{C4}$ goes to 0 and is inverted by a NOT 1887 to a 1. This 1 is coupled to a delay circuit, in the form of a 27 picofarads capacitor 1890 connected with a 1 kilohm resistor 1891 to ground. The amount of time delay causes a 1 to appear after C4 time, but slightly preceding C1 time, by an amount sufficient to compensate for the propagation time through JK 1884. The 1 preclears the JK 1882 which was previously set by a pulse from JK 1836, causing the 1 output to go to 0, thereby actuating JK 1884 and generating a 0 from its 0 output. The 0 now appearing on line 1844 is synchronized with approximately C1 time. Thereafter, at C2 time, line C2 goes to 1 and preclears JK 1884, resetting circuit 1840 in order to receive the next pulse from the variable counter.

The above described synchronizing action places the divided oscillator pulses in phase with the clock system, and cancels those clock pulses which are not in phase, that is, those pulses occurring when JK 1882 is being precleared. For example, if oscillator 1830 were running at 3.6 megahertz, the 0 output of JK 1836 would be at 900 kilohertz, and the arrival of pulses to JK 1882 would be at a varying time with reference to the system clock, slowly changing from immediately following C1 time until the next C1. The circuit 1840 would accept approximately nine pulses in a row, but the tenth pulse would be blocked by the preclear operation of JK 1882. The resulting output on line 1844 would be a sequence of nine pulses, all on C1 time, with the tenth pulse being missed, thereby providing the desired repetition rate of 900 kilohertz.

The jog circuit is shown in FIG. 21B. A plurality of NORs 1900 are each connected to a different $\overline{F}$ line output from the 15 stage counter in FIG. 21A. The other inputs to NORs 1900 are directly coupled to a JOG RATE A line and a JOG RATE B line, and through NOT gates 1903 and 1904 to the same JOG RATE lines. The JOG RATE A and JOG RATE B lines each carry either a 0 or 1 thereon, as selected by the operator on a conventional RATE control at OPERATOR CONSOLE A. The circuit arrangement illustrated in FIG. 21B results in all 0 inputs at one of the NORs 1900 each time its associated $\overline{F}$ line has a 0. The resulting output depends on the four possible combinations of 0's and 1's on JOG RATE A and JOG RATE B lines, as illustrated in the chart, FIG. 21C.

For example, if the JOG RATE A and JOG RATE B lines both have 0's thereon, the uppermost NOR 1900, coupled with $\overline{F11}$, has all 0 inputs at each F11 time, thereby passing 30.2 pulses per second to an AND acting NOR 1906. NOR 1906 has inputs to the outputs of each of the NORs 1900, to pass a 0 output to a NOR 1908. The other input of NOR 1908 is $\overline{C3}$. At C3 time, when NOR 1906 has a 0 output, NOR 1908 has a 1 output which is negated by a NOT 1910 to generate a $\overline{JOG\ PULSES}$ output, coupled to the ABS FR.

The output of NOR 1906 also forms a set input for an RS flip-flop 1913, causing it to set each time NOR 1906 passes an F pulse therethrough. Flip-flop 1913 is reset on each C4 pulse, thereby generating a 1 output which blocks NOR 1908 and terminates the JOG PULSE just passed therethrough.

RDC

In FIGS. 22A-B, the RDC is illustrated in detail. The RDC includes a 15 stage binary counter for out-putting pulses D0-D14. This counter is similar to, and operates is generally the same manner as the 15 stage counter in the VC, FIG. 21A. All elements of the counter formed from the same logical units and performing the same functions as previously described for the VC are identified by the same number, followed by a prime, and reference should be made to the description of the VC for the operation of the elements.

The RDC may be run in either a forward or a reverse mode of operation. The forward mode of operation is identical with the operation of the counter in the VC, and provides distance pulses D to the ABS units for each axis. The reverse mode is operative when the operator actuates the RETRACT control at OPERATOR CONSOLE A, in order to cause the machine tool to retract along the same path in which it entered the part being machined.

The RDC is set to operate by the setting of a JK flip-flop 1950, FIG. 22A. When JK 1950 is cleared or reset, the counter is stopped. A JK flip-flop 1952, when in its clear state, indicates that the counter is operating in the forward mode, and when in the set state, indicates a reverse mode of operation. Assuming the counter has been stopped and is to start in the forward mode, the ASA generates the START CTR FORWARD signal which is coupled to a line 1956. This couples a 1 to a NOR 1958, generating a 0 output which is delayed 100 nanoseconds by resistive capacitive network 1960 before being coupled to the S input of JK 1950. Thereafter, at C4 time, a $\overline{C4}$ is coupled to the toggle T of JK 1950, generating a negative going trigger pulse. Since input S is now held at 0, JK 1950 is toggled to its set state. This causes a 0 to appear on the 0 output, which is coupled via a line 1962 to a three input NOR 1964, FIG. 22B, to form a 0 input thereto.

Another input of NOR 1964 is generated in response to whether the circuit is presently set in the same mode as the direction just selected by the signal to NOR 1958, FIG. 22A. Assuming JK 1952, FIG. 22A, is in the clear mode indicating forward, a 0 is coupled from the 1 output thereto to a NOR 1966. The other input to NOR 1966 is the START CTR REVERSE line, presently 0, coupled through a NOT 1968. The resulting 1 input to NOR 1966 generates a 0 to a NOR 1970. The 0 output of JK 1952 has a 1 which is coupled to a NOR 1972, now forcing a 0 output to the other input of NOR 1970. The other input to NOR 1972 is the START CTR FORWARD line, now at 1, coupled thereto via a NOT 1974. The pair of 0's to NOR 1970 generates a 1 output which preclears a JK flip-flop 1978, FIG. 22B. At C4 time, $\overline{C4}$ is coupled to the toggle T input of JK 1978, and attempts to set the flip-flop. However, the presence of the 1 preclear signal from NOR 1970 prevents the setting of JK 1978, thereby causing the 1 output thereof to remain at 0. This 0 forms the second input to NOR 1964.

The third activating 0 input to NOR 1964 is the line 200, FIG. 22B, which is coupled to the $\overline{FEEDRATE\ PULSES}$ output from the ABS FR. As each FEEDRATE PULSE is generated, line 200 goes to 0 and causes a 1 output from NOR 1964, which is inverted by a NOT 1980 to couple a 0 to the toggle T input of JK 1884'. The FEEDRATE PULSES reach JK 1884' at a delayed C1 time, but prior to C2. The negative going signal sets JK 1884', causing a 0 output on line 1844' which is coupled to NORs 1846' and 1848'. NOR 1848' also has an input coupled through a 100 nanosecond RC delay network 1984 to $\overline{C2}$.

In operation, at 100 nanoseconds after C2 time (to insure that a 0 is now present on line 1844' if a FEEDRATE PULSE is present), NOR 1848' has 0 inputs thereto, generating a 1 output which is negated by a NOT 1850' to generate a 0 coupled via line 1804' to NORs 1802' of the binary counter. As described for the VC, this causes the appropriate output pulse, herein labeled D, to be generated on the corresponding D line, as corresponds to the F pulse on the F line of the VC. At the same time, line 1852' couples a 0 to NOR 1846', thereby generating a 1 output which is coupled to line 1820' to raise the toggle input of all JKs 1800° of the binary counter. In the RDC, a cascaded NOR 1987 and NOT 1988 are coupled between NOR 1846' and line 1820', for reasons to be explained later. The 1 output from NOR 1846' is inverted to a 0 by NOR 1987 and is again inverted by NOT 1988 to couple a 1 to line 1820'.

Thereafter JK 1884' is precleared at C4 time, by a NOT 1990 coupled between the preclear input and $\overline{C4}$. The preclear operation causes JK 1884' to reset, generating a 1 on line 1844' which causes a 1 to be coupled via line 1804' to NORs 1802', thereby terminating the D pulse. Also, line 1820' goes to 0, generating a negative going toggle which triggers the JKs 1800', causing the binary counter to add by one, in the same manner as in the VC. Each FEEDRATE PULSE thereafter causes the counter to step as above described, in the same manner as in the VC, until all stages of the counter are in a set condition.

A NOR 2000, FIG. 22B, has its two lower inputs connected in the same manner as prior cascaded NORs 1812'. In addition, a third input is coupled to line 1804'. After all JKs 1800' have been set, the occurrence of the next FEEDRATE PULSE causes a third 0 to be coupled to NOR 2000, thereby generating a 1 output which is negated by a NOT 2002 to generate an $\overline{END\ CARRY\ (B)}$ signal which inputs on FIG. 22A to a NOR 2004. The other input to NOR 2004 is the 1 output of JK 1952, which is 0 since JK 1952 is in its clear state corresponding to the forward mode. The pair of 0 inputs cause NOR 2004 to have a 1 output on a line 2005, generating the END CARRY signal. This signal is coupled to the ASA in order to actuate the four step sequence of the ICC, as previously described.

The first signal generated on the ASA in response to END CARRY is STOP CTR, which inputs to the RDC and is coupled to a NOT 2007, FIG. 22A, to cause a 0 to be coupled to the clear C input of JK 1950. This allows JK 1950 to change states upon the occurrence of the next toggle pulse. Accordingly, when the toggle T input thereto goes negative at the termination of the next C4 time, JK 1950 changes to the clear state, indicating a stop. The clear state couples a 1 to the 0 output of JK 1950, thereby coupling a 1 via line 1962 to NOR 1964, FIG. 22B, disabling the gate and preventing subsequent FEEDRATE PULSES from being passed to the binary counter. As the STOP CTR signal terminates, NOT 2007, FIG. 22A, causes a 1 to be coupled to input C of JK 1950. In addition, when no START CTR FORWARD or START CTR REVERSE signals are being generated, a pair of 0's are coupled to NOR 1958, thereby generating a 1 output which maintains a 1 on the set S input of JK 1950. Since S and C inputs are both held to 1, JK 1950 is prevented from changing states upon the occurrence of following toggled inputs at the termination of C4 time.

The four step sequence of the ICC in the ASA thereafter generates the TRANSFER signal, which inputs on the RDC and is coupled to line 1816', FIG. 22B, to cause all preclear inputs of JKs 1800' to go to 1, thereby resetting the 15 stage binary counter in preparation for counting another block of FEEDRATE PULSES the next time the RDC is activated. Line 1816' also couples a 1 via a line 2010, FIG. 22A, to the preclear input of JK 1952, clearing the flip-flop regardless of whether the forward or reverse mode was previously set therein. Thus, upon the next actuation of the RDC, JK 1952 is in the forward mode. This completes the cycle of operation of the RDC. Thereafter, the RDC is again actuated by another signal over START CTR FORWARD or START CTR REVERSE, generated by the ASA either automatically by completion of the ICC sequence, or manually in response to operation actuation of the START or RETRACT controls.

When the RDC is to operate in its reverse mode, the START CTR REVERSE signal is coupled via a line 2016, FIG. 22A to NOR 1958. To describe the reverse mode, it will be assumed that the RDC is operative in the forward mode and is counting FEEDRATE PULSES, thereby generating D pulses. The 1 input to NOR 1958 generates a 0 output which is coupled to input S of JK 1950. However, since JK 1950 is already set, the 0 on S has no effect thereon. The 1 on line 2016 is coupled to NOT 1968, coupling a 0 to NOR 1966. JK 1952 is in its clear state, because the RDC is presently counting in its forward mode. Accordingly, the 1 output of JK 1952 has a 0 bit which is similarly coupled to NOR 1966. Since both inputs are not 0's, a 1 output is generated to NOR 1970, forcing a 0 output on the preclear line of JK 1978.

Normally the preclear line of JK 1978, FIG. 22B, is continuously held at 1, as previously described. Because the preclear is now 0, the next $\overline{C4}$ toggles JK 1978, thereby setting the flip-flop and generating a 1 bit from its 1 output. This blocks NOR 1964, preventing FEEDRATE PULSES from being passed to the binary counter. The 0 output from JK 1978 has a 0 thereon, which is coupled to the preclear line of a JK flip-flop 2020. This enables JK 2020 to be set upon termination of C4. As $\overline{C4}$ goes to 0, a NOT 2022 generates a 1 output which is coupled to the toggle T input of 2020. Thereafter, as $\overline{C4}$ goes to 1, the NOT 2022 generates a 0 which produces a negative going toggle. This sets JK 2020, thereby generating a 1 from the 1 output, which is inverted by a NOT 2025 to produce a 0 to a NOR 2027.

The other two inputs to NOR 2027 are low at this time, as will appear, thereby causing a 1 output coupled to NOR 1987. This forces a 0 output from NOR 1987, which is negated by NOT 1988 to generate a 1 on line 1820', raising the toggle of all JKs 1800' to a 1. This step is in preparation for the subsequent complement pulse which is to be delivered to the JKs 1800'. At the same time, the 0 output of NOT 2025 is also coupled to an input of a NOR 2030, the other input of which is also 0 at this time, as will appear. This generates a 1 output which is coupled to line 1810', forcing a 0 output from all NORs 1806', FIG. 22A, which in turn causes the S and C inputs of each JK 1800' to go to 0, assuring that every stage in the binary counter is enabled to be toggled by the following steps.

As JK 2020 is set, the 0 output has a 0 bit, coupled to the precleared input of another JK flip-flop 2032. Upon the next C4 time, JK 2032 is toggled in order to produce a delay. That is, the 0 on the 0 output of JK 2032 is coupled to the preclear of another JK flip-flop 2034. Thereafter, upon the termination of the next C4 pulse, JK 2034 is toggled and changes to its set state. The 1 output therefrom now has a 1, which blocks NOR 2027, causing the output therefrom to go low, and unblocking NOR 1987. Since the other input to NOR 1987 is also low, a 1 is generated and negated by NOT 1988 to cause a negative going 0 to appear at the toggle T of all JKs 1800'. The instantaneous state of each state of the binary counter is now reversed, regardless of whether that stage was in its set or reset condition. Such action produces the exact complementary number of the binary count immediately prior to initiation of the RETRACT operation.

The setting of JK 2034, FIG. 22B, also couples a 0 to the preclear line of a JK flip-flop 2038. At the next C4 time, $\overline{C4}$ goes to 0 and toggles JK 2038. The 1 output therefrom goes to 1, blocking NOR 2030 and forcing an 0 output therefrom which, via line 1810', returns a 0 to the inputs of all NORs 1806'. At the same time, the 0 output of JK 2038 goes to 0, and is coupled via a line 2042 to the S and C inputs of JK 1952, FIG. 22A, enabling the JK to be toggled upon the occurrence of $\overline{C4}$. When this occurs, JK 1952 goes set, corresponding to the reverse mode.

The now set JK 1952 generates a 1 from its 1 output, which thereby forces a 0 output from NOR 1966. Since NOR 1972 also has a 0 output, NOR 1970 has a pair of 0 inputs which generate a 1 output and preclears JK 1978, FIG. 22B. This in turn generates a 1 output which preclears JK 2020, which generates a 1 to preclear JK 2032, and so on, thereby also preclearing all remaining cascaded JKs 2034 and 2038, terminating the RETRACT mode of operation.

At this time, set JK 1952, FIG. 22A, has a 0 on its 0 output, which is negated by a NOT gate 1973 to generate a 1 or MIRROR signal. This signal is coupled to the CP, and causes the output square waves therefrom to be shifted in a direction opposite to their previous direction of shift with respect to the reference phase. Therefore, subsequent square wave outputs from the CP will cause machine movement along all axes in directions exactly opposite to movement just prior to the RETRACT.

When JK 1978, FIG. 22B, is precleared, its 1 output goes to 0, thereby again enabling NOR 1964 and allowing FEEDRATE PULSES to be passed to the binary counter. The 15 stage binary counter now continues to count in the same manner as previously described. However, because its instantaneous state was complemented, the number of pulses D outputting from the counter until all stages set is exactly equal to the number of pulses D which had previously outputted from the counter from its initial precleared state to the time of occurrence of the RETRACT. Since the MIRROR signal is generated at this time, the DATA bytes in the ABS units have not changed, the machine tool moves, in an opposite direction, the same distance it had previously moved since starting the machine block, and thus retracts along the same path it had entered the part, to the point at which it started the machine block.

When all stages of the counter become set, the $\overline{\text{END CARRY (B)}}$ signal is generated to couple a 0 to NOR 2004, FIG. 22A. However, the other input of NOR 2004 is a 1 from JK 1952, which was set during the reverse mode. Therefore, NOR 2004 does not have a 1 output on line 2005, and no END CARRY signal is generated as occurs following a forward mode cycle. The 0 on $\overline{\text{END CARRY (B)}}$ is also coupled to a NOR 2050, the other input of which is the 0 output of JK 1952, which is a 0 since JK 1952 is set, corresponding to reverse mode.

The pair of 0 inputs to NOR 2050 generates a 1 output which sets an RS flip-flop 2054. This causes a 1 to be coupled to a line 2056, generating the RETRACT STOP signal. This signal is coupled over the RETRACT STOP line of CABLE THREE to OPERATOR CONSOLE A, FIG. 2, and energizes the RETRACT STOP indicator. It also there generates the BEGIN OF BLOCK signal which is coupled to the 4BS SENSE in CONSOLE LOGIC A, setting the RETRACT STOP bit to indicate that the RDC is now back at the beginning of the instruction block which it had been performing.

Flip-flop 2054 also couples a 1 via a line 2057 to the preclear of JK 1950, causing it to clear and causes the RDC to be in its stop state. This completes the retract cycle of the RDC. Thereafter, the operator must actuate the START control to again cause the RDC to count in its forward direction.

Or, the operator could cause the SEQUENCE NUMBER SEARCH operation to occur before again actuating the START control. Once the START control is actuated, the ASA generates the START CTR FORWARD signal, which is coupled via line 1956 and a line 2058 to the reset side of flip-flop 2054, thereby resetting the flip-flop and terminating the RETRACT STOP signal output. At the same time, the START CTR FORWARD signal again actuates the forward mode of the RDC.

ABS

In FIG. 23, a universal ABS unit is illustrated, used for the BAS FR and the ABS AXES units. These units are of conventional design, and will only be briefly described with reference to the schematic representation thereof in the drawing. BUFFER flip-flop (FF) areas 2100 and 2102 each contain eight RS flip-flops, in order for each to store a byte of DATA. The individual inputs thereto from DATA BUS OUT of CABLE TWO are schematically illustrated by line 2104. Each negated line forming BUS 2104 is connected to one input of a corresponding two-legged NOR, eight of which are schematically illustrated by block 2106, and the remaining eight of which are illustrated by schematic block 2108. The other inputs of all NORs 2106 are coupled to a common line 2112, connected to BYTE N, while the other inputs of all NORs 2108 are coupled to the common line 2114, connected to BYTE N+1.

Lines 2112 and 2114 are coupled to the BYTE lines of the byte counter in the ASB. The particular BYTE line coupled to correspond to the byte which the particular ABS unit is to enter. For example, when used as the ABS FR, BYTE N line 2112 is connected to BYTE 3 (N corresponding to byte 3 of the format) and BYTE N + 1 line 2114 is connected to BYTE 4 of the ASB, thereby causing the third and fourth bytes on DATA BUS OUT to be gated to the BUFFER FFs 2100 and 2102, respectively. As seen with reference to FIG. 4A, these bytes correspond to the feedrate number.

Similarly, when used as the ABS X-AXIS, N corresponds to the number 5, so lines 2112 and 2114 gate the two bytes of the X-AXIS multiplier to the BUFFER FF areas. Thus, when the sequential appearing bytes on DATA BUS OUT correspond to the type of information stored by that ABS, line 2112 and 2114 received 0's thereon, generating 1 outputs from the plurality of NORs 2106 and 2108 when a bit is present, thereby causing each NOR to pass a 1 over separate output lines to the individual RS flip-flops in BUFFER areas 2100 and 2102. Each RS flip-flop within areas 2100 and 2102 stores a separate bit of the two bytes.

Separate ACTIVE flip-flops FF for each bit of the two bytes are also provided, eight of which are indicated by block 2120, and the remaining eight of which are indicated by block 2122. The output of each BUFFER flip-flop, which is a 0 when a bit is present, is connected through a separate two-legged input NOR gate to an input of a corresponding ACTIVE flip-flop. The separate NOR gates are illustrated schematically by blocks 2126 and 2128. The second input of all NORs 2126 and 2128 are connected to a common gating line 2130, coupled to TRANSFER. For clearing the ABS, all reset inputs of the flip-flops in ACTIVE FFs 2120 and 2122 are connected to a common line 2132 coupled to CLEAR ACTIVE STORAGE. Similarly, all reset inputs of the flip-flops in BUFFER FFs 2100 and 2102 are similarly connected to a common line 2134 coupled to CLEAR BUFFER.

In operation, when DATA bytes are to be placed into BUFFER storage, the ASB sequentially energizes each of the BYTE lines, causing each of the ABS units to sequentially place the appropriate byte into the BUFFER flip-flops 2100 and 2102. This operation usually occurs while DEVICE LOGIC A is being controlled by the byte already in the ACTIVE FFs 2120 and 2122. Thereafter, when the RDC generates END CARRY, the ICC in the ASA is actuated to generate CLEAR ACTIVE STORAGE, which via line 2132 clears all flip-flops in ACTIVE areas 2120 and 2122. Next, TRANSFER goes to 0 on line 2130, thereby gating the two bytes stored in BUFFER FFs 2100 and 2102 into the corresponding storage areas in ACTIVE FFs 2120 and 2122. Finally, CLEAR BUFFER goes to 1 on line 2134, and clears the storage areas in the BUFFER FFs 2100 and 2102.

The individual outputs from ACTIVE FFs 2120 and 2122 are coupled to a plurality of NORs, the outputs of which are coupled to AND acting NORs to produce a single combined output, as schematically represented by block 2140. Also inputting to the NORs are a plurality of lines 2142, which carry the output pulses from the 15 stage binary counter in the VC or the RDC. That is, for the ABS FR, lines 2142 are coupled to the F0-F14 feedrate pulses from the VC. Similarly, for the ABS X-AXIS and ABS C-AXIS, lines 2142 are coupled to the D0-D14 distance pulses from the RDC.

The NORs within block 2140 are arranged in any conventional manner to pass selected pulses on lines 2142 to a common output line 2150, in accordance with the information represented by the feedrate number or the distance multiplier bits, as stored in straight binary form in the ACTIVE FFs 2120 and 2122. The individual outputs from each ACTIVE flip-flop for each bit are directly coupled to NORs 2140, without any gating, so that pulses on line 2150 appear immediately after pulses appear on lines 2142. The output pulses on common line 2150 are generally evenly spaced apart, in accordance with conventional numerical control principles.

In the ABS FR, line 2150 corresponds to line 200, FIG. 3, and carries combined feedrate pulses to the RDC. The RS flip-flop within area 2120 which stores the first bit of the byte is not coupled to NORs 2140, but rather has an independent output line 2154, called PREVENT FR OVERRIDE. As seen in the format, FIG. 4A, this bit of BYTE 3 is set by the computer to prevent the operator from overriding the programmed feedrate numbers. Line 2154 is coupled to line 1878 of the VC, FIG. 21A, and when carrying a 1 prevents an operator override of the frequency of the oscillator. Also, the ABS FR has an additional input line 2156 which is coupled to a final AND acting NOR in area 2140, for the purpose of directly passing any pulses thereon to the common output line 2150. Line 2156 is coupled to the INSERT FR PULSES line from NOR 1780 of the ASC, FIG. 20. The series of pulses inputting to the other side of the final AND acting NOR in area 2140 provide the FEEDRATE PULSES input on line 1782 of the ASC. When all 0's are stored in ACTIVE FFs 2120 and 2122, no FEEDRATE PULSES are generated, so that ASC generates fictional feedrate pulses, which are directly coupled to line 2150, FIG. 23, in order to create a fictional feedrate output, for the reasons previously described.

In the ABS AXES units, common line 2150 corresponds to line 202, FIG. 3, and carries a total number of pulses which in sum represents the block size. These pulses are identified as the COMMAND pulses, which input to the CP. The last RS flip-flop within area 2122, which carries the last bit of the second byte, is not coupled to area 2140, but rather is coupled to a separate output line 2158, called + SIGN. As seen in FIG. 4A, this bit for each axis represents the direction of movement, and when the bit is 0, indicating + or positive movement, generates a 1 on + SIGN. Line 2158 is coupled to the + SIGN input of the corresponding axis section in the CP.

CP

In FIG. 24, a CP of conventional design is illustrated schematically. An ADD/SUBTRACT LOGIC circuit 2200 is provided for each axis, and is responsive to the COMMAND pulses on lines 202, from the corresponding ABS units, to add or subtract pulses from CI pulses, in accordance with whether movement along that axis is in the positive or negative direction, respectively. The resulting output pulses, on a line 2202 are coupled to Divide By 1000 circuits 2205 for each axis. The divided outputs are generally square wave signals, coupled to the corresponding PHASE CMD lines of CABLE THREE.

To provide an unshifted standard output for the feedback devices in NCMT–A, C1 pulses are also directly coupled to a reference Divide By 1000 circuit 2205, which generates the reference PHASE CMD output. The amount by which the square waves on each axis PHASE CMD line leads or lags the reference PHASE CMD square waves indicates the distance that axis is to be driven. Square waves which lead the reference signal indicates, for example, positive direction movement, while lagging square waves indicate movement in a minus direction.

Divide by 1000 circuits 2205 may be any conventional binary counter commonly used in numerical controls. Such counters have an input line 2207 for a SYNCHRONIZE signal, which herein is generated by NOT 1763, of the ASC, FIG. 20. When an operator wishes to synchronize the axes with the reference phase, after a JOG operation, he actuates the SYNC control at OPERATOR CONSOLE A, causing the ASC to generate the SYNCHRONIZE signal coupled to line 2207. The circuits 2205 thereafter synchronize each phase in a conventional manner.

ADD/SUBTRACT LOGIC 2200 may similarly be formed from any conventional circuit, one suitable circuit being illustrated in detail for the X-AXIS. The COMMAND line 202, from the ABS X-AXIS is coupled to a NOR 2210. When a COMMAND pulse appears, the output of NOR 2210 goes low, coupling a 0 to a NOR 2212 and a NOR 2214. Only one NOR 2212 or NOR 2214 has a 1 output therefrom, depending upon whether movement is to be in a positive or minus direction, respectively.

The + SIGN input from the ABS X-AXIS is coupled to a NOR 2216, and causes a 1 input when movement is to be in a positive direction. The other input to NOR 2216 is MIRROR, from the RDC, FIG. 22A, and is 0 except during a RETRACT operation. Assuming, for example, that the programmed movement is positive, the + SIGN signal is a 1, generating a 0 output from NOR 2216 which is coupled to NORs 2220 and 2222. When the circuit is not in a JOG operation, the $\overline{JOG}$ ENABLE line has a 1 thereon, which is negated by a NOT 2226 to couple 0's to NORs 2220 and 2222. Since the third input to NOR 2220 is MIRROR, which is 0, all 0 inputs are provided, generating a 1 output which forces a NOR 2228 to have a 0 output on a $\overline{PLUS}$ line, thus indicating positive movement.

The 0 on $\overline{PLUS}$ enables NOR 2212, and via a NOT 2230 generates a 1 which disables NOR 2214. When a COMMAND pulse is present, at approximately C3 time, NOR 2210 generates a 0 output, causing a pair of 0's at NOR 2212 which generates a 1. This 1 is passed by an AND acting NOR 2235 and forces a 0 pulse on line 2202, at C3. $\overline{C1}$ pulses are coupled to a NOR 2240, the other input of which is 0 when + SIGN is 1, as will appear. The pair of 0's generates a 1 which is also coupled to NOR 2235, thereby generating a 0 on line 2202 at C1 time. Thus, when movement is to be in the positive direction, each COMMAND pulse adds a 0 pulse at C3 time to the 0 pulses at C1 time, increasing the number of pulses by an amount equal to the number of COMMAND pulses, which in turn is equal to the amount of desired movement. The increased number of pulses cause the leading edge of the square wave output of X-AXIS circuit 2205 to shift forwardly with respect to the leading edge of the reference square waves, by an amount equal to the number of pulses from NOR 2212.

When movement is to be in a minus direction, the + SIGN line carries a 0, causing the $\overline{PLUS}$ line to be 1. This blocks NOR 2212, and via NOT 2230 presents an enabling 0 to NOR 2214, the other input of which is a 0 from NOR 2210 each time a COMMAND pulse is present. This generates a 1 output which sets an RS flip-flop 2243 when the COMMAND pulse appears, at C3 time. Since the reset side of flip-flop 2243 is coupled to C2, which now is 0, a 1 output is generated on a line 2244, blocking NOR 2240. When $\overline{C1}$ goes to 0 in another half clock cycle, no 1 output is generated by NOR 2240. Thus, minus movement blanks out the C1 pulse which immediately follows a C3 COMMAND, thereby subtracting from the number of 0 pulses passed by NOR 2235.

Having blocked C1, C2 then goes to 1, resetting flip-flop 2243 in order to allow NOR 2240 to pass subsequent C1 pulses, unless again blocked by subsequent COMMAND pulses. The resulting output on the X-AXIS PHASE CMD is a square wave which lags the square wave from the reference PHASE CMD.

When the MIRROR line goes to 1, the instantaneous state of the $\overline{PLUS}$ line changes, thereby causing the circuit 2200 to operate as if the opposite direction movement was programmed. The MIRROR line is coupled to the MIRROR output of the RDC, and is generated in response to the novel RETRACT operation already described. In addition, the MIRROR line may also be coupled to known MIRROR circuits which are used to produce a mirror image of a programmed movement.

ADD/SUBTRACT LOGIC circuit 2200 may also be controlled by the JOG circuits. When the operator initiates a JOG operation, conventional JOG circuits cause the $\overline{JOG\ ENABLE}$ line to go to 0. This presents a pair of 0's to NORs 2260 and 2261. NOR 2260 is also coupled to $\overline{JOG\ SIGN\ PLUS}$, which has a 0 when the JOG is to move in the positive direction. This results in a pair of 0's to NOR 1260, generating a 1 output which forces NOR 2228 to have a 0 on the $\overline{PLUS}$ line. The $\overline{JOG\ ENABLE}$ line is also negated by NOT 2226, generating a 1 which disables NORs 2220 and 2222. Thus, then the JOG is operative, the + SIGN circuit is disabled and the JOG circuits control the direction of movement. Similarly, NOR 2261 is coupled to $\overline{JOG\ PULSES}$, thereby generating 1 outputs which force NOR 2210 to have 0's therefrom. During a JOG there are no COMMAND pulses, so no special gating is necessary to disable the COMMAND line 202.

DISC

In FIG. 25, a universal DISC unit is illustrated, one unit being used for each axis of the machine tool. One input to the DISC is the PHASE CMD line of CABLE THREE corresponding to the axis controlled by that DISC. When FIG. 25 is used as the DISC X-AXIS, the PHASE CMD line corresponds to the X PHASE CMD from the CP, FIG. 24. Similarly, the C PHASE CMD from the CP is coupled to the PHASE CMD input of the DISC C-AXIS. While a particular circuit for the DISC is illustrated in FIG. 25, any other conventional NC discriminator circuit may be substituted therefor. Such circuits compare the phase of the FEEDBACK signal with the axis PHASE CMD signal, and in response thereto generate an analog MOTOR DRIVE signal which controls the motor for that axis.

The reference PHASE CMD, entering CONSOLE LOGIC A as a part of the PHASE CMD (3) lines of FIG. 2, is bypassed via a line (for clarity, not illustrated in FIG. 2), which couples directly to the energizing input of the feedback devices 104 in NCMT–A. This bypass line couples the reference PHASE CMD from the CP to the resolvers and the inducto-syncs, in order that movement of the axis can shift the reference signal input by an amount proportional to the actual movement of the axis. The shifted signal output, having a generally sine waveform, is coupled via the FEEDBACK line of CABLE FOUR to the DISC, for comparison with the square waves of the PHASE CMD, to determine the difference between the desired position and the actual position of the axis. Each DISC includes an isolating and squaring section 2300, FIG. 25, which converts the FEEDBACK sine waves into generally square waves on an output line 2303. The phase of the square waves on line 2303 is compared with the square wave input of the PHASE CMD line, inputting on a line 2305.

The square waves on lines 2303 and 2305 are coupled to similar divide-by-four counters 2310. Each counter consists of a pair of JK flip-flops 2312 and 2313, connected in a binary divide-by-4 circuit. Each input line is connected to the toggle T input of its JK 2312. Both JKs 2312 and 2313 have their S, C and preclear inputs grounded. The 1 output of JK 2313 for the feedback channel is connected through a 0.0047 microfarad capacitor 2320 to a line 2321, which is bypassed to ground through a 10 kilohm resistor 2323. The 0 output is connected through a capacitor 2325 to a line 2326, and bypassed to ground through a resistor 2328. Similarly, for the PHASE CMD channel, the 1 output of JK 2313 is coupled through a capacitor 2330 to a line 2331, and bypassed to ground through a resistor 2332. The 0 output is coupled through a resistor 2335 to a line 2336, and bypassed to ground through a resistor 2338.

A pair of RS flip-flops 2340 and 2342 are connected in a circuit which determines whether the divided PHASE CMD signal leads or lags the divided FEEDBACK signal. The outputs of flip-flops 2340 and 2342 which are set by a 1 from the 0 output of JKs 2313, are coupled to a NOR 2345, and the opposite outputs are coupled to a NOR 2346, as illustrated in FIG. 25. As will appear, only one of the NORs 2345 or 2346 has a series of square wave outputs varying between 0 and 1, the other NOR being disabled, depending on whether the PHASE CMD is leading or lagging the FEEDBACK.

In operation, either the flip-flop 2340 or 2342 changes state before the other, in response to a 1 from one of the outputs of the toggled JK 2313. The line raising to 1 thereafter goes to 0 as the capacitor associated therewith charges. The flip-flop 2340 or 2342 which changes state couples a 0 over one output thereof to either NOR 2345 or 2346. Since the other flip-flop has not yet changed states, a 0 is present at the other input to that NOR, generating a 1 output. A short time thereafter, the other JK 2313 changes state, which results in a 1 to the NOR previously having a pair of 0 inputs. This terminates the 1 output. Further toggling of JKs 2313 cause only one NOR 2345 or 2346 to have a train of 1's and 0's, whereas the other NOR is at all times disabled by a 1 input.

When NOR 2345 has 1 outputs, the signals are coupled through a resistor 2350 to drive an NPN transistor 2352 into saturation. This electrically couples the collector electrode to the emitter electrode, which is coupled to ground. The collector is connected through a resistor 2354 to the base of an PNP transistor 2356, also coupled through a resistor 2357 to +15 volts. The collector of transistor 2356 is connected through a resistor 2359 to a summing point 2360. Transistors 2352 and 2356 form a driver amplifier. When a 1 output appears on NOR 2345, both transistors are driven into saturation in order to couple a positive current flow to summing point 2360.

The drive channel for NOR 2346 is similar to the drive channel for NOR 2345, but causes a negative current flow at summing point 2360. More particularly, 1 outputs from NOR 2346 are negated by a NOR 2365 and coupled as a 0 to a resistor 2366 connected to the base electrode of a PNP transistor 2369, also coupled through a resistor 2371 to −15 volts DC. The emitter electrode of the transistor is directly grounded. When NOR 2365 has a 0 output, the current flow through resistors 2371 and 2366 causes a negative voltage at the base of transistor 2369, driving it into saturation. Conversely, when a 1 output appears from NOR 2365, the current flow causes the base of transistor 2369 to be raised above ground potential, maintaining the transistor in an off state.

The collector electrode of transistor 2369 is coupled through a resistor 2373 to the base electrode of a NPN transistor 2375. The emitter electrode transistor 2375 is coupled through a resistor 2377 to −15 volts. The collector electrode of transistor 2375 is connected through a resistor 2380 to the summing point 2360. In operation, when a 1 output appears from NOR 2346, both transistors 2369 and 2375 are driven into saturation, causing a current to flow from summing point 2360, through resistor 2380 and the conducting transistor 2375, to the minus DC source.

Summing point 2360 adds together the positive and negative movement channels, in a non-linear summation, in order to generate the MOTOR DRIVE signal. The signal at summing point 2360 is generally square wave shaped, because the transistors 2356 and 2375 are being driven between saturation and cut off. An RC filter 2385 is connected between summing point 2360 and the MOTOR DRIVE line, in order to smooth out the square waves to create an analog signal having an average DC value representative of the switching frequency of the transistors 2356 and 2375. The polarity of the signal, which determines the direction of rotation of the motor, depends on which channel is providing the current to summing point 2360. One suitable RC filter 2385 produced a DC level with a maximum ripple of 0.6 volts.

Circuit 2300, which converts the generally sine wave input on the FEEDBACK line of CABLE FOUR into a generally square wave on line 2303, includes an AC coupled NPN transistor 2387 connected in an emitter-follower circuit. Connected to the emitter electrode of transistor 2387 is an LC filter 2390, having component values chosen to eliminate noise in the FEEDBACK signal. For the present system, the filter has a bandpass centering at 1,000 kilohertz, corresponding to the frequency of the reference PHASE CMD which becomes the FEEDBACK signal.

The output line of LC filter 2390 is coupled through another NPN transistor 2392 connected in an emitter-follower circuit, and having an output AC coupled to a NOT 2394. The input of NOT 2394 is coupled to a voltage divider, consisting of series resistors 2396 and 2397 coupled between +3.6 volts DC and ground. The values of the resistors are chosen to bias NOT 2394 to a point which causes the AC wave input to switch the NOT between the two binary states with an approximately 50 percent duty cycle. In one embodiment, resistor 2396 was 33 kilohms and resistor 2397 was 10 kilohms, producing a 0.7 volt switching point.

In order to determine the amount of following error, each DISC has a NOR 2399 with a pair of inputs individually connected to the outputs of NORs 2345 and 2346. NOR 2399 acts as an AND, generating a 0 on a $\overline{\text{SERVO ERROR}}$ line whenever a 1 output occurs from either channel. Since width of the 1 output is directly representative of the amount of following error, the width of the 0 on the $\overline{\text{SERVO ERROR}}$ line is directly proportional to the following error for that axis. The SERVO ERROR line is coupled to the SED SENSE which monitors the width of the 0 output from NOR 2399 in order to determine if the following error is within permissible limits for the machine tool.

4BS

In FIG. 26, a universal 4BS unit is illustrated, several being used for storage of MISCELLANEOUS bytes and SENSE bytes at both DEVICE LOGIC A and CONSOLE LOGIC A, see FIGS. 2 and 3. Each 4BS unit is of conventional design, and will only briefly be described with reference to the schematic representation thereof in FIG. 26. Four byte flip-flop (FF) areas 2400 are each provided with eight RS flip-flops, in order for each to store a byte of DATA. The DATA enters on BUS lines $\overline{0-7}$, each line being individually connected to an input of its associated two-legged NOR gate, the eight gates for each byte being schematically illustrated by NOR block 2402. The other input of all NORs within each area 2402 are connected to a common gate line 2404, which enables the associated eight NOR gates when a 0 is coupled thereto.

The four gate lines 2404 for the four storage FFs 2400 are individually connected to $\overline{\text{ENTER 1}}$ through $\overline{\text{ENTER 4}}$, which are sequentially energized to place each byte on the BUS $\overline{0-7}$ into its storage location. For example, when the first byte of DATA is placed on lines $\overline{0-7}$, a 0 is coupled to $\overline{\text{ENTER 1}}$. This enables all NORs in the uppermost area 2404, causing the individual bits to be coupled to separate flip-flops in upper area 2400. Then, $\overline{\text{ENTER 1}}$ goes to 1, blocking the upper gates 2402, thereafter, each of the remaining $\overline{\text{ENTER}}$ signals are generated as its byte is placed on lines $\overline{0-7}$, thereby causing four bytes of DATA to be stored in the 4BS.

Each RS flip-flop within an area 2400 has an individual output connected to an input of an associated two-legged NOR gate, the eight NORs being schematically illustrated by area 2410. The other input of each NOR within area 2410 is connected to a common gate line 2412 for enabling all gates when a 0 is coupled thereto. Each line 2412 is connected to a corresponding $\overline{\text{DRIVE}}$ signal, for gating the outputs of all eight RS flip-flops to individual output lines 2420 when a 0 is coupled to line 2412. Each individual line 2420 corresponding to the same bit is connected to an input of an associated AND acting NOR, in order to pass any 1 output from the same bit lines to the corresponding bit line of $\overline{\text{DATA BUS}}$ 2425. The plurality of NORs for all bits of the BUS are schematically illustrated by the area 2430. Thus, for example, when $\overline{\text{DRIVE 1}}$ goes to 0, all bits stored in the uppermost area 2400 are gated over their individual lines 2420 and through NOR gates 2430 to the corresponding bit lines $\overline{\text{0-7}}$ of the $\overline{\text{DATA BUS}}$. Similarly, when $\overline{\text{DRIVE 2}}$ goes to 0, the outputs of the second area 2400 are all coupled to the corresponding bit lines $\overline{\text{0-7}}$ of the $\overline{\text{DATA BUS}}$. The RS flip-flops for all four areas 2400 have their reset inputs connected to a common line 2435, connected to CLEAR, for resetting all RS flip-flops on the 4BS.

Three of the 4BS units are used in DEVICE LOGIC A, as seen in FIG. 3. The two units used as 4BS MISC-1 and 4BS MISC-2 have input lines $\overline{\text{0-7}}$ of FIG. 26 connected to the corresponding negated lines of DATA BUS OUT of CABLE TWO, and output lines 2425 connected to the DATA BUS of CABLE THREE. The control signal lines are connected as illustrated in FIG. 29. The ASB, as seen in FIG. 29, generates the ENTER signals which cause each byte of a machine block to be stored in its separate byte storage area 2400, FIG. 26, as that byte on DATA BUS OUT of CABLE TWO reaches DEVICE LOGIC A. The BTC MASTER, as will appear, generates the DRIVE signals which cause each stored byte to be sequentially placed on the DATA BUS of CABLE THREE, for transmission to CONSOLE LOGIC A.

The third 4BS unit in DEVICE LOGIC A forms the 4BS SENSE. Its input lines $\overline{\text{0-7}}$ are connected to corresponding negated lines of the DATA BUS of CABLE THREE, and the output lines 2425 are connected to the corresponding negated lines of DATA BUS IN of CABLE TWO. As seen in FIG. 29, the BTC MASTER generates INSERT signals which are coupled to the corresponding ENTER lines 2404, for passing each SENSE byte as received from CONSOLE LOGIC A into its storage area 2400. When the stored bytes are to be gated to the computer, the ASC generates the SENSE DRIVE signals which are coupled to the corresponding DRIVE lines 2412.

In CONSOLE LOGIC A, a single 4BS unit is used as the 4BS SENSE, for storing the four SENSE bytes in areas 2400, in accordance with the SENSE format, FIG. 5. The 4BS unit of FIG. 26 is modified for this purpose. Separate input lines $\overline{\text{0-7}}$ are connected to each area 2402, since the bytes to be entered are not sequentially generated. That is, lines $\overline{\text{0-7}}$ of the uppermost area 2402 are connected to the negated DESIRED SEQUENCE NO. lines and BEGIN OF BLOCK or END OF BLOCK lines in FIG. 2. The $\overline{\text{0}}$ line of FIG. 26 is connected via a DESIRED SEQUENCE NO. line to the SEARCH control, to enter the SEQUENCE NO. SEARCH bit. The $\overline{\text{1}}$ line is connected to the BEGIN OF BLOCK line, and as seen in FIG. 5, enters the RETRACT STOP bit. The $\overline{\text{2}}$ line is connected to the END OF BLOCK line, and enters the PROGRAM STOP bit. The remaining four lines $\overline{\text{4-7}}$ ($\overline{\text{3}}$ is a spare) are connected to the first four or most significant bits of the DESIRED SEQUENCE NO. Similarly, lines $\overline{\text{0-7}}$ of the next lower area 2402 in FIG. 26 are connected to the remaining seven bits of the DESIRED SEQUENCE NO.

Lines $\overline{\text{0-7}}$ for the remaining two areas 2402 are connected to corresponding output lines from the SENSORS 108 of NCMT-A, and enter the SERVICE CONDITION bits. Such SENSORS may take any conventional form for monitoring of conditions, and may include analog to binary converters in order to output a monitored condition in straight binary form.

The SENSE bytes which simultaneously appear at gate areas 2402 of FIG. 26 are sequentially gated to their flip-flop areas 2400 by ENTER signals generated by the SED, see FIG. 29. When the SENSE bytes are to be transmitted to DEVICE LOGIC A, the BTC SLAVE generates the DRIVE signals for gating each SENSE byte stored in flip-flop areas 2400 onto lines 2425, which are connected to the negated lines of the DATA BUS of CABLE THREE, for transmission to the 4BS SENSE at DEVICE LOGIC A.

MBS

In FIG. 27, a universal MBS unit is illustrated, used for each of the MBS units in CONSOLE LOGIC A. These units are of conventional design, and will only be briefly described with reference to the schematic representations thereof in the drawing.

Three byte storage flip-flops areas 2460 are provided to store three separate bytes of DATA on each MBS unit. Each area 2460 includes eight separate RS FLIP-flops, one for each bit of the byte, having output lines which are directly connected to a relay driver for that bit, the eight relay drivers for each area 2460 being identified by the area 2464. Each relay driver in turn has an individual output line, so that output lines 0-7 each have a logical 1 thereon when a 1 is stored in the corresponding flip-flop within area 2460. Because the MBS units are used for active storage of miscellaneous DATA, the bytes entered in flip-flop areas 2460 are immediately coupled to the output lines 0-7, without gating.

The bytes stored in areas 2460 are coupled to the MBS unit over the DATA BUS of CABLE THREE, which inputs in parallel to three sets of NOR gates. Each set has one two input NOR for each line of the BUS, eight of which are collectively illustrated by area 2470. Each NOR has its output line directly connected to a corresponding RS flip-flop within area 2460, and one of its inputs connected to the corresponding line of the DATA BUS of CABLE THREE. The other input for each gate within area 2470 is connected to a common gate line 2475, coupled to an INSERT line corresponding to that area 2460. When, for example, a byte on the DATA BUS is to be stored in the middle flip-flop area 2460, FIG. 27, the $\overline{\text{INSERT 2}}$ signal is generated. This couples enabling 0's to the middle NOR area 2470, gating the bits on the DATA BUS to the middle FF areas 2460 for direct energization of the middle group of output lines 0-7.

As seen in FIG. 2, one MBS unit is used for storing the SEQUENCE NO. Since the sequence number consists of only two bytes of DATA, namely BYTE 1 and 2 in FIG. 4A, only the first two FF areas 2460 of the MBS unit are utilized. The first two groups of output lines 0-7 from the corresponding relay drivers 2464 are coupled via the PRESENT SEQUENCE NO. lines of CABLE FOUR, FIG. 2, to directly energize the binary visual indicators forming the PRESENT SEQUENCE NO. indicators of OPERATOR CONSOLE A.

The remaining two MBS units, labeled MISC-1 and MISC-2 in FIG. 2, store the remaining miscellaneous bytes. BYTES 9, 10 and 11, see FIG. 4B, are stored in MBS MISC-1, while BYTES 12, 13 and 14 are stored in MBS MISC-2. The six groups of output lines 0-7 from relay drivers 2464 on both MBS units are coupled via the MISC DRIVE lines of CABLE FOUR to relay 106 which control the miscellaneous functions of NCMT-A in a conventional manner.

As seen in FIG. 29, the BTC SLAVE controls generation of the INSERT signals which sequentially place each byte of DATA transmitted over the DATA BUS of CABLE THREE, into its appropriate storage area. The MBS internally generates its own clear signal on the leading edge of the bits gated to the flip-flops through gate areas 2470. Therefore, no externally generated clear signal is necessary to reset the flip-flops within areas 2460 in order to store new bytes of DATA. Any conventional circuit may be used for clearing the flip-flops upon the occurrence of the leading edge of new signals. Or, the INSERT signal can be used to clear the flip-flops, with the INSERT signal to gate areas 2470 being slightly delayed in order to allow time for the flip-flop area 2460 to be cleared.

In addition to the internally generated clear signal, each RS flip-flop within the areas 2460 has its reset input connected to a common line 2478, connected to a RESET ACTIVE line. This line in turn is connected to the SED SENSE, which generates a 1 thereon each time the system is initially energized, to insure that all 0 bits are stored within areas 2460. A manually actuated switch on the SED SENSE also allows a 1 to be coupled to line 2478, to reset flip-flop areas 2460 whenever desired, as will be explained in the section on the SED SENSE.

BTC

A universal BTC unit is illustrated in detail in FIGS. 28A–C. One such unit forms the BTC MASTER in DEVICE LOGIC A, and another such unit forms the BTC SLAVE in CONSOLE LOGIC A. Certain input and output lines of the illustrated unit are used only at the MASTER, and other lines are used only at the SLAVE, as labeled in the drawings. For any particular unit, the unused lines are left open-circuited. The lines between FIGS. 28A, B and C may be interconnected by placing FIG. 28B below FIG. 28A, and FIG. 28C to the right of both FIGS. 28A and 28B.

The interconnections between the BTC MASTER and the BTC SLAVE, and the interconnections between both BTC units and the units controlled thereby, are illustrated in FIG. 29. For simplification, only the lines for control signals are illustrated in FIG. 29, the DATA BUS of CABLE THREE being omitted. The DATA BUS, as seen in FIGS. 2 and 3, interconnects the 4BS units at DEVICE LOGIC A with the MBS and 4BS SENSE units at CONSOLE LOGIC A. During the description of the BTC shown in FIGS. 28A–C, reference should be made to FIG. 29 for the destination of the control signals generated by the BTC unit.

The BTC unit used for both MASTER and SLAVE, includes a transmit section and a receive section, with certain circuits being used in common by both sections. An RS flip-flop 2501, FIG. 28A, is set by a 1 signal called TRANSFER at the BTC MASTER and GONE at the BTC SLAVE, to activate the transmit section of the BTC. An RS flip-flop 2503, FIG. 28A, when set by a 1 signal called RECEIVE activates the receive section of the BTC. When a BTC is in a rest condition, i.e., not active in controlling the transmission or reception of miscellaneous DATA bytes, both flip-flops 2501 and 2503 are maintains in a clear state.

When DATA bytes are to be transmitted over CABLE THREE, an activating signal is generated by the LOGIC unit which is storing the bytes which are to be transmitted to the other LOGIC unit. For example, if the miscellaneous bytes stored in the 4BS MISC-1 and 4BS MISC-2 at DEVICE LOGIC A are to be transmitted to CONSOLE LOGIC A, then the ASA generates the TRANSFER signal. This signal sets flip-flop 2501, causing the BTC MASTER to assume the transmit mode. In response thereto, the BTC MASTER generates a TRANSMIT signal, which as seen in FIG. 29, forms an input to the RECEIVE line of the BTC SLAVE. Upon receipt, flip-flop 2503 of the BTC SLAVE is set, forcing the unit to assume the receive mode.

Generally at the same time, the BTC MASTER also generates the first DRIVE signal, which is coupled to the 4BS MISC-1 to gate the first byte stored therein onto the DATA BUS of CABLE THREE. A signal flow sequence over the INCREMENT lines, see FIG. 29, indicates to the BTC SLAVE at what time it should accept the byte on CABLE THREE. In response thereto, the BTC SLAVE generates the first INSERT signal, coupled to the MBS SEQUENCE NO. to cause the byte then on CABLE THREE to be gated into the first byte storage area. Thereafter, the BTC MASTER initiates another transmission cycle, by generating the next DRIVE signal, and upon receipt the BTC SLAVE generates the next INSERT signal. This operation continues until all miscellaneous DATA bytes have been transmitted to CONSOLE LOGIC A and stored in the proper MBS units.

Alternatively, CONSOLE LOGIC A may transmit DATA bytes to DEVICE LOGIC A. For example, during a SENSE operation, the 4BS SENSE at CONSOLE LOGIC A stores the SENSE bytes which are to be transmitted to DEVICE LOGIC A and then to the computer. When the bytes are to be transmitted, the SED SENSE at CONSOLE LOGIC A generates the GONE signal, which sets flip-flop 2501, FIG. 28A, in the BTC SLAVE. This causes the BTC SLAVE to assume the transmit mode, and generate the TRANSMIT signal which is coupled over CABLE THREE to the RECEIVE input of the BTC MASTER. The RECEIVE signal sets flip-flop 2503, forcing the BTC MASTER to assume the receive mode.

At the same time, the BTC SLAVE generates the first DRIVE signal, which gates the first SENSE byte in the 4BS SENSE onto CABLE THREE. By a signal flow sequence over the INCREMENT lines of CABLE THREE, the BTC MASTER generates the first INSERT signal, which is coupled to the ENTER input of the 4BS SENSE at DEVICE LOGIC A, see FIG. 29, and causes the first SENSE byte to be gated into the first byte storage area. The transmission cycle then repeats until all bytes of the SENSE signal have been transmitted from the 4BS SENSE at CONSOLE LOGIC to the 4BS SENSE at DEVICE LOGIC A. Thereafter, the ASC generates the SENSE DRIVE signals which gate the SENSE bytes stored in the 4BS SENSE at DEVICE LOGIC A onto DATA BUS IN of CABLE TWO, for transmission to the computer.

The BTC MASTER has transmit priority over the BTC SLAVE. The TRANSMIT signal from the BTC MASTER IS also coupled to a PREVENT TRANSMIT input at the BTC SLAVE, in addition to the RECEIVE input. When the BTC MASTER assumes a transmit mode, the signal input at PREVENT TRANSMIT prevents the BTC SLAVE from assuming the transmit mode should the SED SENSE generate a GONE signal. No corresponding input is utilized at the BTC MASTER. Therefore, if the BTC SLAVE was in the transmit mode, and the BTC MASTER received the TRANSFER signal from the ASA, it would override the receive mode and force the BTC MASTER to assume the transmit mode. This in turn would generate a signal over CABLE THREE which would input to the RECEIVE and PREVENT TRANSMIT inputs of the BTC SLAVE, forcing the BTC SLAVE into the receive mode. Thus, the receipt of a machine block has higher priority than the transmission of a SENSE signal. Such priority is chosen because CONSOLE LOGIC A must store the miscellaneous bytes of a machine block in order to allow NCMT–A to continue operation, whereas a SENSE signal is informational only, and can be sent, after a new machine block has been received by CONSOLE LOGIC A.

The control signal sequence occurring during the transfer of the first DATA byte will now be described, before a detailed description of the circuit is given. By way of example, it will be assumed the DATA flow is from DEVICE LOGIC A to CONSOLE LOGIC A. Where differences occur depending on which BTC is transmitting or receiving, the special requirements are noted. Reference should be made to both FIGS. 28A–C and FIG. 29 for the signal flow destinations. Initially, flip-flops 2501 and 2503, FIG. 28A, at both the BTC MASTER and BTC SLAVE are cleared, and the INCREMENT OUT line at both units has a 1 thereon (thus both INCREMENT IN inputs also have a 1 thereon). The TRANSMIT lines at both the BTC MASTER and BTC SLAVE have a 0 thereon, hence the RECEIVE input lines at the opposite BTC also has a 0. The above lines form the INTERLOCK lines of CABLE THREE.

In addition, the DRIVE and INSERT lines at both BTC units have all 0's. Both the DRIVE and INSERT lines each consist of eight lines labeled 1–8, one line for each miscellaneous byte of DATA. The particular DRIVE or INSERT line energized corresponds to the count of a shift register 2505, FIG. 28C. Shift register 2505 is formed from a plurality of JK flip-flops 2507. When the BTC is at rest, all JKs 2507 are in their precleared state. This causes shift register 2505 to have an output which tends to enable the 1 DRIVE and 1 INSERT lines, FIG. 28C. However, no DRIVE lines can be enabled until a 0 signal is placed on a line 2510, which presently is held at 1. Similarly, no INSERT lines can be enabled until a 0 is placed on a line 2512, which also presently is held at 1.

When DATA transfer is to begin, the ASA generates the TRANSFER signal which sets flip-flop 2501 at the BTC MASTER. This enables the transmit section, which immediately places a 0 on line 2510. Since shift register 2505 at this time has a count of 1, the 1 DRIVE signal is generated and coupled to the first DRIVE input of the 4BS MISC-1, gating the first byte onto the DATA BUS of CABLE THREE. At the same time, flip-flop 2501 couples a 1 to the TRANSMIT line, FIG. 28A, which is coupled to CABLE THREE. Also, the activation of the transmit section causes a 0 to be coupled to the INCREMENT OUT line, FIG. 28B, which is similarly coupled to CABLE THREE. Thus, at approximately the same time, a 1 on the TRANSMIT line, a 0 on the INCREMENT OUT line, and the bits of the first byte on the DATA BUS lines are all generated.

These signals propagate along CABLE THREE, which may be a substantial length, until reaching CONSOLE LOGIC A at approximately the same time. When the signals on the DATA BUS lines first reach CONSOLE LOGIC A, they remain disconnected from all MBS units, because no INSERT signal is being generated. The INCREMENT IN line, FIG. 28A, of the BTC SLAVE, now goes to 0. As will appear, this 0 normally would toggle the JKs 2507 in shift register 2505. However, because the BTC SLAVE is still at rest, the preclear lines of JKs 2501 remain at 1, preventing JKs 2505 from changing count. At the same time, the RECEIVE line, FIG. 28A, of the BTC SLAVE goes to 1. This line is coupled through a delay network 2515 to flip-flop 2503. Flip-flop 2503 is not set until after the signal on INCREMENT IN has finished going negative and reaches its steady state 0. At that time, flip-flop 2503 sets and activates the receive section of the BTC SLAVE. This operation insures that the first 0 on INCREMENT IN will not change the count of the shift register 2505. However, since further 0's on INCREMENT IN will occur with the receive section of the BTC SLAVE already activated, they will cause a stepping of the shift register.

As flip-flop 2503 sets and activates the receive section of the BTC SLAVE, a four step counter 2517, FIG. 28B, is activated to control the RECEIVE cycle. The first count serves as a delay, to insure that the signals have settled. The second count generates a 1 output from a NOR 2520, enabling a circuit which checks the modal bytes of the machine block, herein BYTES 9 through 13, see FIG. 4B. These bytes correspond to a count of 3 through 7, on the shift register, because they are the third through seventh miscellaneous bytes stored in the 4BS units. If a byte is modal, and should not be entered, generation of the INSERT signal on the next count of counter 2517 is prohibited.

On the third count, a 1 output is obtained from a NOR 2522. This 1 output places a 0 on line 2512, tending to enable the INSERT lines. Since the shift register 2505, FIG. 28C, at this time has a count of 1, the 1 INSERT signal is generated and coupled to the MBS SEQUENCE NO., thereby causing the DATA byte on CABLE THREE to be entered in the first byte storage area. At the end of the third count, NOR 2522 returns to a 0 output, which causes a 1 to appear on line 2510, terminating the 1 INSERT signal. On the fourth count, a NOR 2524 has a 1 output, which causes the counter 2517 to return to its deenergized state, and also places a 0 on the INCREMENT OUT line. This completes the operation of the receive section of the BTC SLAVE, as indicated by the 0 on INCREMENT OUT.

The 0 on INCREMENT OUT from the BTC SLAVE now propagates over CABLE THREE to INCREMENT IN of the BTC MASTER, to indicate that the BTC SLAVE has entered the prior DATA byte into storage, and has disconnected its storage areas from CABLE THREE in preparation for the receipt of the next DATA byte. At the time the 0 inputs on INCREMENT IN, a 0 remains on line 2510, FIG. 28C, because flip-flop 2501, FIG. 28A, is set. As a result, the 1 DRIVE signal is still being coupled to the 4BS MISC-1, maintaining the first DATA byte over CABLE THREE. The 0 on INCREMENT IN now causes the JKs 2507, FIG. 28C, to toggle, advancing the count of shift register 2505 by 1. Register 2505 now has a two count, thereby enabling the 2 DRIVE line while also disabling the 1 DRIVE line. This causes the 4BS MISC-1 to immediately couple the second stored byte onto the DATA BUS of CABLE THREE. At the same time, the 0 on INCREMENT IN also causes the INCREMENT OUT line, FIG. 28B, to rise to 1.

The 1 signal on INCREMENT OUT of the BTC MASTER and the second DATA byte are now propagated, essentially simultaneously, along CABLE THREE to CONSOLE LOGIC A. Upon reaching CONSOLE LOGIC A, the second DATA byte is not entered into any storage area, because no INSERT signal is being generated by the BTC SLAVE. The INCREMENT IN input of the BTC SLAVE also goes to 1, causes the INCREMENT OUT line to go to 1, indicating that the BTC SLAVE has received the BTC MASTER's acknowledgement of the fact that the BTC SLAVE had entered the last DATA byte.

This 1 signal is propagated along CABLE THREE to the BTC MASTER. Upon reaching the BTC MASTER, and before the BTC MASTER can act thereupon, the INCREMENT OUT lines of the BTC MASTER and BTC SLAVE now have a 1 thereon, thus completing the first cycle of operation. The inputting of the 1 on INCREMENT IN at BTC MASTER initiates the next cycle of operation. The 1 input does not toggle JKs 2507, FIG. 28C, since the toggle signal is positive going rather than negative going. As a result, shift register 2505 does not change count, but maintains the 2 DRIVE signal output which causes the second DATA byte to remain on CABLE THREE. However, the 1 input does cause the INCREMENT OUT line to go to 0. The 0 output on INCREMENT OUT signifies that the BTC SLAVE may initiate its receive cycle, in that the byte to be entered is already valid on the DATA BUS of CABLE THREE.

As the 0 reaches the BTC SLAVE and inputs on its INCREMENT IN, it both toggles JKs 2507, FIG. 28C, and activates the four step counter 2517, FIG. 28B. The JKs 2507 immediately change state, causing shift register 2505 to advance its count to two. This tends to enable the 2 INSERT line, except that line 2512 still has a blocking 1 thereon. Shift register 2505 completes its change of count before counter 2517, FIG. 28B, completes its first count, which count is chosen to provide this amount of delay.

Thereafter, counter 2517 continues as previously described, that is, the two count causes NOR 2520 to check the modal circuit, and then the three count enables NOR 2522 which causes an activating 0 to be placed on line 2512, thereby tending to enable the INSERT lines. Since shift register 2505 is now in its second count, the 2 INSERT line is activated, and causes the second byte storage area in the MBS SEQUENCE NO. to enter the byte then on the DATA BUS of CABLE THREE. The fourth count of counter 2517, FIG. 28B, completes the receive operation, and causes a 0 to be placed on INCREMENT OUT. This 0 now propagates over CABLE THREE to the BTC MASTER and causes it to place the next DATA byte onto CABLE THREE, along with a 1 on its INCREMENT OUT. The BTC SLAVE thereafter answers with a 1 on its INCREMENT OUT, returning the system to cycle completion for the second byte. Thereafter, the BTC MASTER will generate a 0 on its INCREMENT OUT, which will cause the third DATA byte then waiting at CONSOLE LOGIC A to be entered, by the same series of steps described above.

The detailed description of the BTC will now be given. Shift register 2505, FIG. 28C, is formed from JKs 2507 which are interconnected as illustrated. The output lines of the JKs 2507 are coupled to a plurality of NORs 2530, one NOR corresponding to each count of the shift register. The shift register has more JKs 2507 than are necessary to generate the signals necessary for NORs 2530, in order that additional NORs 2530 may be added if the number of bytes to be controlled by the BTC is desired to be increased.

All JKs 2507 have their preclear line connected to a common line 2532. When the BTC is at rest, a 1 is maintained on line 2532, causing all JKs 2507 to be in their clear state. Thus, as is apparent from the illustrated arrangement, only the leftmost NOR 2530 in FIG. 28C has a pair of 0 inputs thereto when JKs 2507 are all cleared. This NOR generates a 1 output, thus indicating that the shift register has a count of 1. All toggle inputs T of JKs 2507 are connected to a common line 2534. When the signal on line 2534, which has the same state as the signal on INCREMENT IN of FIG. 28A, goes from 1 to 0, all JKs 2507 are toggled if line 2532 has a 0 thereon. Each toggling causes the shift register 2505 to change its count, thereby enabling a 1 output from the next NOR 2530, so that each NOR 2530 has an output 1 in sequential order.

The 1 outputs from NORs 2530 are negated by a plurality of individual NOT gates 2537 to generate enabling 0's which are coupled to a plurality of NORs 2540. A pair of NORs 2540 are associated with each NOR 2530 and its NOT 2537, so that each pair of NORs 2540 is associated with a given count from shift register 2505. One of the pair of NORs 2540 outputs to the DRIVE line. Its pair of inputs are connected to the output from the NOT 2537 associated therewith, and to the common enabling line 2510 for all DRIVE lines. The other of the pair of NORs 2540 outputs to the INSERT line. Its pair of inputs are connected to the same NOT 2537 as for the first of the pair, and to the common enabling line 2512 for all INSERT lines.

If shift register 2505 is for example, in its all cleared state, the leftmost NOR 2530 has a 1 output, which is negated by its NOT 2537 to couple a pair of 0's to the inputs of NORs 2540 associated with 1 DRIVE and 1 INSERT. If line 2510 is coupled to 0, the 1 DRIVE signal is generated, which occurs when the BTC is in the transmit mode. Alternatively, if a 0 is coupled to line 2512, then the 1 INSERT signal is generated, as occurs when the BTC is in the receive mode.

Upon the occurrence of a negative going toggle pulse on line 2534, the shift register makes another count, and the NOR 2530 illustrated second from the left has a 1 output. Accordingly, the 2 INSERT of 2 DRIVE lines have a 1 depending on whether the lines 2512 or 2510, respectively, have a 0 thereon. The shift register thereafter continues to count through the eight byte positions controlled by the BTC, sequentially generating all eight DRIVE or all eight INSERT signals, depending upon whether the BTC is in the transmit or receive modes, respectively.

Transmit flip-flop 2501, FIG. 28A, consists of a NOR 2501' and a NOR 2501". When in its cleared or at rest state, NOR 2501" has a 0 output which is negated by a NOT 2545 to generate a 1 on a line 2546. Line 2546 is coupled to line 2510, thereby disabling all DRIVE NORs 2540, FIG. 28C. In addition, the 1 on line 2546 is also coupled via a line 2548 to a NOR 2550, FIG. 28B, thereby generating a 0 output which inputs to a NOR 2552, whose output is the INCREMENT OUT line. The other input of NOR 2552 is a NOR 2554. One input of NOR 2554 is a line 2556 which, as will appear, has a 1 thereon when the receive flip-flop 2503 is also in its cleared state. This 1 causes NOR 2554 to have a 0 output which thereby presents a pair of 0's to NOR 2552, generating a 1 on INCREMENT OUT.

Finally, the 1 on line 2546, FIG. 28A, is coupled to a line 2557, which inputs to a NOR 2558" of a flip-flop 2558, FIG. 28B. Another NOR 2558' forms the other side of flip-flop 2558. As will appear, flip-flop 2558 generally controls the IN-CREMENT OUT line. When the transmit flip-flop 2501 is cleared, the 1 coupled via lines 2546 and 2557 causes NOR 2558" to have a 0 output, which inputs to NOR 2558'. The other input thereto corresponds to the state of the INCRE-MENT IN line, which now is a 1. Accordingly, the clearing 1 input to NOR 2558" has no effect, since the 1 input to NOR 2558' forces a 0 output to NOR 2550. The other input to NOR 2550 is line 2548, which as discussed above is a 1 when the transmit flip-flop is cleared.

Receive flip-flop 2503, FIG. 28A, consists of a NOR 2503' and a NOR 2503". When in its cleared or at rest state, NOR 2503" has a 0 output which is negated by a NOT 2560 to generate a 1 on a line 2561. Line 2561 is coupled to line 2556, FIG. 28B, thereby coupling a 1 to NOR 2554 in order to generate a 1 on INCREMENT OUT. In addition, line 2561 is coupled to a NOR 2563, FIG. 28B, causing it to have a 0 output at this time, which is negated by a NOT 2565 to maintain a 1 on line 2512, thereby disabling all of the INSERT NORs 2540, FIG. 28C. In general, the cleared state of flip-flops 2501 and 2503 of FIG. 28A generate blocking signals coupled to the transmit and receive sections of the BTC.

When transmit flip-flop 2501 is set, either by a TRANSFER signal, at the BTC MASTER or a GONE signal, at the BTC SLAVE, NOR 2501' has a 0 output, which is negated by a NOT 2570 to generate a 1 connected to the TRANSMIT line. This 1 is also coupled to a NOR 2572, and forces a 0 on preclear line 2532 for JKs 2507, FIG. 28C. This allows future negative going INCREMENT IN signals to toggle the shift register 2505. The 1 from NOR 2570 is also coupled to the delay circuit 2515, to reset receive flip-flop 2503.

The output from NOT 2545, FIG. 28A, goes to 0 as transmit flip-flop 2501 is set, coupling a 0 down line 2546, hence terminating the 1 signal which had blocked the transmit section of the BTC. This 0 is coupled via line 2548 to NOR 2550, FIG. 28B. The other input to NOR 2550 is a 0 from NOR 2558', because a 1 input exists on the INCREMENT IN line. The pair of 0's to NOR 2550 generates a 1 output which forces NOR 2552 to have a 0 output, thereby coupling a 0 over INCRE-MENT OUT. The 0 on line 2546 is also directly coupled to line 2510, thus enabling the DRIVE NORs 2540, FIG. 28C. Since only the leftmost NOR 2530, FIG. 28C, has a 1 output, which is negated by its NOT 2537, only the NOR 2540 associated with 1 DRIVE has a pair of 0 inputs, thereby generating a 1 output which causes the 4BS unit connected thereto to gate its first byte onto the DATA BUS of CABLE THREE. This completes the initial part of the transmit cycle.

The transmit BTC now waits for a 0 input on its INCRE-MENT IN line, FIG. 28A. When it occurs, the 0 is coupled through a resistor 2575 to a NOT gate 2576, generating a 1 on a line 2578. The 1 is also coupled through a NOT gate 2579 to generate a 1 on a line 2580. Line 2580 is directly coupled to toggle line 2534, and thus causes shift register 2505, FIG. 28C, to count to the next state. This produces a pair of 0's at the NOR 2530 illustrated second from the left in FIG. 28C, thereby generating a 1 which is negated by NOT 2537 to produce a 0 input to the NORs 2540 associated 2 INSERT and 2 DRIVE. Since line 2510 still has a 0 thereon, only the NOR 2540 associated with 2 DRIVE has a pair of 0 inputs, thereby generating a 1 output. This causes the next byte stored in the associated 4BS SENSE to be coupled to CABLE THREE.

The 0 on line 2580, FIG. 28A, is also coupled to an input of a NOR 2584, FIG. 28A, and to NOR 2558', FIG. 28B. Returning to NOR 2584, FIG. 28A, the other input thereto is a line 2586, which is coupled to the output of NOR 2530 illustrated to the far right in FIG. 28C. This NOR 2530 does not have a 1 output until the eighth count of shift register 2505 is reached, corresponding to the last byte of miscellaneous DATA. Accordingly, the output of this NOR is a 0 at this time, which is coupled via line 2586 to NOR 2584, FIG. 28A. NOR 2584 now generates a 1 output which is coupled to NOR 2558", FIG. 28B, thereby generating a 0 output which is cross coupled to NOR 2558'. Since the other input to NOR 2558' is the 0 on line 2580, NOR 2558' generates a 1 output causing flip-flop 2558 to reset. The 1 output from NOR 2558' forces NOR 2550 to have a 0 output, coupled to NOR 2552. Since the output of NOR 2554 is also 0, NOR 2552 generates a 1, thereby raising the INCREMENT OUT line to 1. This completes the final part of the transmit cycle, in that the next DATA byte has been sent over CABLE THREE and the INCREMENT OUT line has been returned to a 1.

The above operation continues at the transmitting BTC for each byte of DATA. When the shift register 2505 reaches its eight count, the NOR 2530 to the far right in FIG. 28C has a 1 output. This 1 is negated by its NOT 2537, causing the 8 DRIVE signal to be generated. At the same time, INCREMENT OUT, FIG. 28B, goes to 0, because flip-flop 2558 has a 1 input to NOR 2558', thereby forcing a 0 output as previously described. The 0 from NOR 2558' is coupled via a line 2590 to a NOR 2591, FIG. 28A. Another input to NOR 2591 is a line 2593, which is coupled to the 0 output from NOT 2537, FIG. 28C, of the last NOR 2530. The third input to NOR 2591, FIG. 28A, is line 2580, which has the same state as the INCREMENT IN line.

When the receiving BTC returns a 0, all inputs to NOR 2591 are 0, thereby generating a 1 output which is coupled to NOR 2501'' to reset transfer flip-flop 2501. The resulting 0 output from NOR 2501'' is negated by NOT 2545 to couple a blocking 1 to line 2546, thereby disabling the transmit section of the BTC. The 1 on line 2546 is also coupled via line 2548 to NOR 2550, FIG. 28B, forcing a 0 output to NOR 2552. Since the output of NOR 2554 is also 0, NOR 2552 generates a 1 on INCREMENT OUT. The 1 on line 2546 is directly coupled to line 2510, thereby disabling the 8 DRIVE signal from the associated NOR 2540, FIG. 28C.

The now reset flip-flop 2501, FIG. 28A, has a 1 output from NOR 2501', which is negated by NOT 2570 to couple a 0 on the TRANSMIT line, thereby terminating the TRANSMIT signal. This 0 is also coupled to NOR 2572, the other input of which is 0 since the receive flip-flop 2503 is clear. The pair of 0's at NOR 2572 generates a 1 on line 2532, thereby preclearing all JKs 2507, FIG. 28C, and returning the shift register 2505 to its initial one count.

Finally, the 1 on line 2546 is also coupled through a capacitor 2600, FIG. 28A, to a NOT 2602, thereby generating a 0 output on a CLEAR line. The input of NOT 2602 is coupled through a resistor 2604 to ground. As capacitor 2600 charges, the input to NOT 2602 returns to a 0, causing the true state of CLEAR to terminate. The CLEAR signal is coupled to the CLEAR input of the 4BS MISC-1 and 4BS MISC-2, see FIG. 29. This causes all miscellaneous bytes to be cleared, since transmission to the MBS units in CONSOLE LOGIC A has been completed. If the transmitting BTC had been the BTC SLAVE, the CLEAR signal would be coupled to the 4BS SENSE, causing all SENSE bytes to be cleared once transmission to the 4BS SENSE in DEVICE LOGIC A had been completed.

The prior transmit BTC now waits for the receiving BTC to return a 1 on INCREMENT IN. This 1 is coupled when received, to NOR 2558', FIG. 28B, to reset flip-flop 2558. The 0 output to NOR 2550, however, has no effect at this time, because the already cleared transmit flip-flop 2501 maintains a blocking 1, coupled via lines 2546 and 2548, to NOR 2550, see FIG. 28B. As a result, a 1 remains on INCREMENT OUT. The BTC is now returned to its reset condition.

The operation of the BTC when in a receive mode will now be described in detail. Receive flip-flop 2503, FIG. 28A, is set when the RECEIVE line goes to 1. This signal is inverted by a NOT 2610 to produce a 0 at a NOR 2612. The other input to NOR 2612 is the TRANSMIT line, which is 0. The pair of 0's generates a 1 from NOR 2612, which is coupled to delay network 2515, consisting of a capacitor 2614 coupled to ground. The 1 signal is initially shunted to ground, and after a time delay rises to a 1, which inputs to NOR 2503', setting flip-flop 2503.

Prior to being set, flip-flop 2503 remains reset, producing a 1 from NOR 2503', which is negated by a NOT 2616 to generate a 0 coupled to NOR 2572. Since flip-flop 2501 is also reset, NOR 2572 has a pair of 0 inputs which generate a 1 output, thereby raising preclear line 2532 to a 1. At approximately the same time the RECEIVE line goes to 1, INCREMENT IN goes to 0, coupling a 0 to toggle line 2534. However, the negative going toggle drops to a steady state 0 before capacitor 2614 charges and allows the preclear to go to 0, thus JKs 2507, FIG. 28C, are not toggled by the initial 0 on INCREMENT IN. After flip-flop 2503 sets, the preclear line 2532 remains at 0 so that future negative going signals will toggle the shift register 2505.

When the receiving BTC is the BTC MASTER, indicating that SENSE bytes are to be transmitted from CONSOLE LOGIC A to DEVICE LOGIC A, the 1 from NOT 2616 is also coupled through a capacitor 2695 to a NOT 2696, thereby generating a 0 on $\overline{\text{CLEAR SENSE 4BS}}$ (not used at the BTC SLAVE). As seen in FIG. 29, this signal clears the storage areas at the 4BS SENSE in DEVICE LOGIC A, in anticipation of receiving new SENSE bytes. As capacitor 2695, FIG. 28A, charges to its 1 input, the input of NOT 2696 is dropped to a 0, due to a resistor 2697 coupled from its input to ground. Thus, each time a receive sequence is begun at the BTC MASTER, a pulse is generated which clears the 4BS SENSE at DEVICE LOGIC A.

Setting of receive flip-flop 2503 causes NOT 2560, FIG. 28A, to have a 0 output coupled to line 2561. In general, this enables the receive section of the BTC. As the RECEIVE line went to 1, the INCREMENT IN line went to 0, causing line 2580 to have a 0 thereon coupled to a NOR 2620, FIG. 28B. The other input to NOR 2620 is the output of a NOR 2622'' of a flip-flop 2622. The other side of the flip-flop is formed from a NOR 2622'. At this time, the flip-flop 2622 is reset, forcing a 0 output from NOR 2622''. The pair of 0's at NOR 2620 generates a 1 which inputs to a NOR 2625' of a flip-flop 2625. The other side of flip-flop 2625 is a NOR 2625''. The output from NOR 2620 is delayed by a capacitor 2627 which is coupled to ground.

As 0 appears on INCREMENT IN, the 1 output from NOR 2620, FIG. 28B, is delayed before setting flip-flop 2625. After capacitor 2627 charges, a 1 appears at NOR 2625'. At approximately the same time, due to delay network 2515, a 0 now appears from NOT 2560, FIG. 28A, and is coupled via line 2561 to NOR 2625'', FIG. 28B. This 0 now allows flip-flop 2625 to be set by the 1 input to NOR 2625'. When set, flip-flop 2625 generates a 0 output from NOR 2625' which is coupled via a line 2630 to a NOR 2632, in order to activate counter 2517 and initiate the four step receive cycle.

NOR 2632 now generates a 1 output which activates a multivibrator 2634 which has a 4 to 5 microsecond cycle. Each cycle of multivibrator 2634 generates a negative going toggle signal from a NOR 2636, which inputs to counter 2517. Thus, the counter 2517 completes its four step count in from 16 to 20 microseconds. Counter 2517, FIG. 28B, consists of a pair of binary connected JK flip-flops 2640 and 2641, having output lines coupled to NORs 2520, 2522 and 2524 in order to input all 0's thereto on the 2, 3 and 4 count, respectively. When multivibrator 2634 is stalled out, counter 2517 is maintained in its fourth count, i.e., JKs 2640 and 2641 are both set. Upon the occurrence of the 0 enabling input to NOR 2632, multivibrator 2634 begins to cycle, almost immediately toggling counter 2517 and causing JKs 2640 and 2641 to both reset. This corresponds to the 1 count, and is used to produce a delay time. The next cycle of multivibrator 2634 causes JK 2640 to set, thereby coupling all 0 inputs to NOR 2520, which generates a 1 output for enabling the modal circuit.

The modal circuit activated by NOT 2520, which is illustrated in the lower left portion of FIG. 28B, is responsive to a modal byte to block the INSERT signal generated on the next step of counter 2517, when the modal byte indicates the DATA should not be entered in storage. As seen in FIG. 4B, bytes 9–10 and 11–13 form a pair of modal sets, which are to be entered in storage only when the first bit thereof is a 1. Although Bytes 1 and 2 of the format, FIG. 4A, are also modal, in the present embodiment these bytes are always entered into storage, with the modal enter bit being used only to energize an indicator signifying the presence of the bit.

Bytes 9 and 11 of the machine block are the first bytes in each modal set, and correspond to miscellaneous bytes 3 and 5. When the shift register 2505, FIG. 28C, counts to 3 or 5, the NORs 2530 associated therewith have a 1 output which is coupled over lines 2645 and 2646, respectively, to an AND acting NOR 2648, FIG. 28B. Thus, whenever the shift register counts to the byte which contains the modal entry bit, NOR 2648 has an enabling 0 output which is coupled to a NOR 2650 and a NOR 2651 in the modal circuit.

NORs 2650 and 2651 also have an input coupled, via a NOT gate 2653, to the output of NOR 2520. Upon the two count of counter 2517, the 1 output from NOR 2520 is negated by NOT 2653 to couple an enabling 0 to NORs 2650 and 2651. The last input to NOR 2651 is the $\overline{0}$ line of the DATA BUS, which, as seen in FIG. 4B, carries the modal entry bit. The $\overline{0}$ line is also coupled through a NOT 2655 to NOR 2650, forming the third input thereto. When a modal byte is to be entered, $\overline{\text{DATA BUS 0}}$ carries a 0. Thus, when counter 2517 is on its second count, and the shift register 2505 is on either its third or fifth count, then NOR 2651 has all 0 inputs, generating a 1 output which sets a flip-flop 2660, formed from a NOR 2660' and a NOR 2660''. The setting of flip-flop 2660 indicates that a modal byte is present and should be entered.

Set flip-flop 2660 causes NOR 2660' to have a 0 output on a line 2662, which forms an enabling input to NOR 2563, and as will appear, allows an INSERT signal to be generated. Conversely, if the modal byte was not to be entered, $\overline{\text{DATA BUS O}}$ would carry a 1 thereon, blocking NOR 2651 and presenting all 0 inputs to NOR 2650. This would cause a 1 output which would reset flip-flop 2660, thereby coupling a 1 onto line 2662 and blocking NOR 2563, to prevent the generation of a subsequent INSERT signal.

Once modal entry flip-flop 2660 is set, it remains set for the subsequent bytes forming the modal set. Thus, if set during the third miscellaneous byte, it remains set for the fourth miscellaneous byte. When the shift register reaches count 5, NORs 2650 and 2651 are again enabled, causing modal entry flip-flop 2660 to again assume a state corresponding to the modal entry bit. This state is held during the next two counts of the shift register. The first nonmodal byte after the third miscellaneous byte is the eighth miscellaneous byte, which is Byte 14 in the format, FIG. 4B. When shift register 2505, FIG. 28C, reaches the 8 count, its NOR 2530 generates a 1 which is coupled via a line 2668 to a NOT 2670, FIG. 28B, forcing line 2662 to go to 0 and reset model entry flip-flop 2660. This in turn maintains a 0 on line 2662, thereby enabling NOR 2563 in order to pass subsequent INSERT signals.

As counter 2517, FIG. 28B, is again toggled by multivibrator 2634, JK 2641 is set and JK 2640 is cleared. This terminates the two count, causing NOR 2620 to have a 0 output which disables the modal circuit. NOR 2522 now has all 0 inputs and produces a 1 output which is negated by a NOT 2672 to produce an activating 0 at NOR 2563. Another input of NOR 2563 is line 2561, which has a 0 thereon because receive flip-flop 2503 is set. The final input to NOR 2563 is line 2662 from the modal circuit. Except when a modal byte is not to be entered, line 2662 has a 0 thereon. The occurrence of all 0's generates a 1 output from NOR 2563, which is negated by NOT 2565 to couple a 0 to line 2512, thereby enabling the INSERT NORs 2540, FIG. 28C.

The particular INSERT NOR 2540 has its other input enabled by a 0 from the NOT 2537 corresponding to the count of shift register 2505 and generates a 1 output on its INSERT line. As seen in FIG. 29, this causes the MBS unit associated therewith to gate open its byte storage area, causing the DATA byte then waiting on the DATA BUS of CABLE THREE to be entered therein. Upon the completion of count 3 from counter 2517, FIG. 28B, the output of NOR 2522 goes to 0, and via NOT 2672 couples a blocking 1 to NOR 2563, causing the line 2512 to go to 1 and terminate the INSERT signal.

Upon the next cycle of multivibrator 2634, FIG. 28B, JK 2640 sets while JK 2641 remains set, producing the four count which generates a 1 output from NOR 2524. This 1 is coupled through a capacitor 2675 to the input of NOR 2622' and NOR 2625''. The 1 at NOR 2625'' resets flip-flop 2625, generating a 1 on line 2630 which blocks NOR 2632 and terminates the oscillations of multivibrator 2634. This causes counter 2517 to remain on count 4.

The 1 coupled to NOR 2622' sets flip-flop 2622 generating a 0 from NOR 2622', which 0 is coupled to NOR 2554. Since line 2556 is also at 0, because receive flip-flop 2503 is set, a 1 output is generated by NOR 2554, forcing a 0 output from NOR 2552. This causes the INCREMENT OUT line to drop from 1 to 0, indicating that the receiving BTC has completed its receive cycle and has placed the DATA byte previously sent thereto into its storage area in a MBS. Although NOR 2524 maintains a 1 output, capacitor 2675 charges, causing the opposite side thereof, which is coupled through a resistor 2677 to ground, to go to 0. This allows flip-flop 2622 to later reset.

Special conditions at NCMT-A may prevent the four step counter 2517 from cycling through the receive cycle. Format bytes 11-13, FIG. 4B, contain tool changer information. These bytes correspond to the fifth through seventh miscellaneous bytes, stored in the third byte area in MBS MISC-1 and the first and second byte areas in MBS MISC-2 for immediate control over the tool changer. Accordingly, when a tool pick up is in process, the tool changer bytes must be prevented from being placed into the active MBS storage areas, until the tool pick up is completed.

The BTC SLAVE prevents the entry of tool changer bytes until the tool changer at NCMT-A completes its prior operation. As seen in FIG. 29, a TOOL PICK UP IN PROGRESS relay 106, conventionally provided at NC machine tools equipped with an automatic tool changer, when energized has a 1 output which is coupled to the BTC SLAVE. As seen in FIG. 28B, this presents a 0 on a $\overline{\text{TOOL PICK UP IN PROGRESS}}$ line which forms an input to a NOR 2680. Another input of NOR 2680 is a line 2682, which is coupled to the NOT 2537, FIG. 28C, associated with count 5 of shift register 2505. When the first tool changer byte is to be entered, line 2682 carried a 0 thereon. The final input to NOR 2680, FIG. 28B, is $\overline{\text{DATA BUS 0}}$. If the modal tool changer byte is to be entered, this line also carries a 0.

The occurrence of all 0 inputs to NOR 2680 generates a 1 output to an INHIBIT MACHINE line, and also couples a 1 to a NOR 2686, which forms a part of multivibrator 2634. As seen in FIG. 29, the INHIBIT MACHINE signal is coupled to a conventional STOP MACHINE relay 106 at NCMT-A, thereby placing a hold on the machine tool. At the same time, the 1 input to NOR 2686 open circuits the multivibrator 2634, preventing oscillations. Thus, when flip-flop 2625 is thereafter set, in order to start the multivibrator 2634, the 1 output of NOR 2680 places a hold on the circuit and prevents the four step sequence of counter 2517 from being initiated. This prevents NOR 2522 from having a 1 output, which would generate the 5 INSERT signal. It also prevents a 1 output from NOR 2524, hence the BTC SLAVE does not place a 0 on INCREMENT OUT, so the transmitting BTC MASTER maintains the first byte of tool changer information on the DATA BUS of CABLE THREE.

When the tool changer completes its prior pick up operation, $\overline{\text{TOOL PICK UP IN PROGRESS}}$ goes to 1, blocking NOR 2680 and terminating the INHIBIT MACHINE signal. This also removes the stop placed on multivibrator 2634, allowing counter 2517 to be activated and proceed through its four step operation. This causes entry of the tool changer and remaining bytes of miscellaneous DATA, completing the data transfer operation.

After the receiving BTC places a 0 on INCREMENT OUT, it waits for the transmitting BTC to place a 1 on its INCREMENT OUT. This 1 inputs at INCREMENT IN, FIG. 28A, of the receiving BTC. Assuming that the shift register 2505 has not counted to its eighth count, then the last NOR 2530, FIG. 28C, has a 0 output which via line 2586 couples a 0 to a NOR 2690, FIG. 28A. The other input thereto is the output of NOT 2576, which now goes to 0. The pair of 0's on NOR 2690 generates a 1 which is coupled to NOR 2622'', FIG. 28B, resetting flip-flop 2622 and generating a 1 output from NOR 2622'. This is coupled to NOR 2554 and forces a 0 output to NOR 2552, the other input of which is also 0, thereby generating a 1 on INCREMENT OUT. This completes the cycle of operation of the receiving BTC, which now waits for another control signal sequence from the transmitting BTC.

If shift register 2505 had counted to its eighth count, it would have inserted the eighth DATA byte when its INCREMENT IN last went to 0. When INCREMENT IN then goes to 1, the rightmost NOR 2530, FIG. 28C, now has a 1 output. The 1 from NOR 2530 is coupled via line 2586 to NOR 2690, FIG. 28A, which is now blocked. The NOT 2537 of the righthand most NOR 2530, FIG. 28C, has a 0 output, which is coupled via line 2593 to a NOR 2692, FIG. 28A. The middle input of NOR 2692 is the output of NOR 2622', FIG. 28B, which is 0 because flip-flop 2622 remains set since NOR 2690 of FIG. 28A is blocked by the 1 on line 2586. The final input to NOR 2692, FIG. 28A, is the output of NOT 2576, which goes to 0 as INCREMENT IN goes to 1.

The all 0 inputs to NOR 2692 causes a 1 output which resets the receive flip-flop 2503, causing the BTC to return to its rest condition. That is, the output of NOR 2560 now goes to 1, and is coupled via line 2561 to NOR 2622'', FIG. 28B, of flip-flop 2622, thus causing it to reset. The 1 on line 2561 preclears JKs 2640 and 2641 in counter 2517, and also disables the remaining receive section of the BTC.

If the receiving BTC had been the BTC MASTER, the resetting of receive flip-flop 2503 generates a 0 from NOT 2616, which is directly coupled to the $\overline{\text{SENSE COMPLETE}}$ line. This line (not illustrated in FIG. 29) is coupled to the ASC and sets the UNIT REQUEST bit in the STATUS byte. Thus, the UNIT REQUEST bit signifies that the BTCs have completed transmitting a SENSE signal from CONSOLE LOGIC A to DEVICE LOGIC A, and that the 4BS SENSE in DEVICE LOGIC A has stored the last SENSE byte. The computer may now initiate a sequence which causes the ASC to generate the SENSE DRIVE signals, causing the SENSE bytes to be sequentially transmitted to the computer.

SED

In FIG. 30, the SED SENSE is illustrated in detail. This unit includes a circuit for generating the ENTER signals which load the SENSE bytes into the 4BS SENSE, a circuit for generating RESET ACTIVE, which clears all MBS units, and a SERVO ERROR circuit.

When the operator wishes to transmit the SENSE signal to the computer, he actuates the ATTENTION control at OPERATOR CONSOLE A. This couples a 1 via CABLE FOUR to the ATTENTION line, FIG. 30, and sets a flip-flop 2700, consisting of a NOR 2700' and a NOR 2700''. When set, NOR 2700' has a 0 output which is coupled to a NOR 2703. The other input to NOR 2703 is the negated output of an oscillator having a clock frequency of 4,000 hertz. When flip-flop 2700 is set, the 0 enables NOR 2703 to pass the 4,000 hertz pulses, each pulse generating a 1 which is negated by a NOT 2705 to generate a 1 output.

The gated clock pulse output is coupled to the toggled T inputs of a plurality of JK flip-flops 2710. JKs 2710 are the same as previously described JKs, but for clarity are illustrated with the toggle T inputs on the upper portion thereof. The interconnected JKs 2710 are initially in an all cleared state. A plurality of NOT gates 2715 are coupled to the 1 output of each second JK 2710. The outputs of NOTs 2715 form the $\overline{\text{ENTER}}$ signal which is coupled to the 4BS SENSE in order to allow the SENSE bytes to be stored thereon. When flip-flop 2700 is set, the clock pulses toggle JKs 2710 and cause the signals $\overline{\text{ENTER 1}}$ through $\overline{\text{ENTER 4}}$ to be sequentially generated.

When the last JK 2710, illustrated to the right in FIG. 30, is set, its 1 output has a 1 which is negated by NOT 2715 to generate a 0 on $\overline{\text{ENTER 4}}$. In addition, the 1 signal is coupled to NOR 2700'', and resets flip-flop 2700, causing a blocking 1 to be coupled to NOR 2703. This prevents further clock pulses from being passed to toggle the counter. That is, the 1 on NOR 2703 maintains a 0 output which is negated by NOT 2705 to maintain a 1 output on the toggle inputs. In addition, this 1 is negated by a NOT 2717 to generate a 0 to a NOR 2720. The other input to NOR 2720 is the 0 output of the last JK 2710, which is now set. This causes a pair of 0 inputs to NOR 2720, generating a 1 output which is connected to the preclear inputs of all JKs 2710, causing each JK 2710 to reset to its clear state.

At the same time, the 1 output of NOR 2720 is coupled through a capacitor 2722 to a line 2723, generating the GONE signal. As capacitor 2722 charges, GONE drops to 0, via a resistor 2725 connected to ground. The momentary GONE signal indicates that the SED SENSE has completed loading all SENSE bytes, and that transmission of the SENSE bytes from CONSOLE LOGIC A to DEVICE LOGIC A may now begin. The GONE line is coupled to the BTC SLAVE and sets the transmit flip-flop 2701, FIG. 28A, thereby causing the BTC SLAVE to initiate a transmit mode.

Another circuit on the SED SENSE generates the RESET ACTIVE signal, which is coupled to all MBS units to cause all flip-flops 2460, FIG. 27, to be cleared. As seen in FIG. 30, a resistor 2730 and a capacitor 2732 are connected in series between +3.6 volts DC and ground. The +3.6 volts potential does not appear until power is first connected to the system. The junction between resistor 2730 and capacitor 2732 is coupled through a NOT 2735 and a NOT 2736 to a NOR 2740' of a flip-flop 2740, the other side of which is formed from a NOR 2740''. The junction between NOTs 2735 and 2736 is connected to an input of NOR 2740''. The output of flip-flop 2740 is coupled through a capacitor 2745 and a NOT 2747 to a resistor 2749 connected to the base electrode of a PNP transistor 2750. The emitter electrode is coupled through a resistor 2752 to +3.6 volts. The collector electrode is directly connected to the RESET ACTIVE line.

In operation, when the system is first activated, the POWER SUPPLIES generate the necessary volts including +3.6 volts, thereby coupling a 1 through resistor 2730 to capacitor 2732. The capacitor initially shunts this 1 to ground, allowing the potential to appear at the remaining portion of the circuit. After capacitor 2732 charges, a 1 appears at the input to NOT 2735. This produces a 0 output which is negated by NOT 2736 to couple a 1 to NOR 2740', setting flip-flop 2740. This generates a 1 output from NOR 2740'', which is coupled through capacitor 2745 to NOT 2747. This produces a 0 output which causes transistor 2750 to be driven into saturation, thereby coupling a 1 to the RESET ACTIVE line. This 1 is coupled to the RESET ACTIVE line of each MBS unit, see FIG. 27, causing all active storage flip-flops therein to be cleared. Thus, the above safety circuit insures that all 0 bits are initially stored in the MBS units when the system is first activated.

Although flip-flop 2740 remains set while power is supplied to the system, capacitor 2745 only passes the 1 output for a short period of time, and thereafter charges, causing a 0 to appear at NOT 2747. This forces a 1 output which drives transistor 2750 off, terminating the RESET ACTIVE signal. The MBS units are thereafter cleared by their internal circuits, previously described, which clear the flip-flops upon the occurrence of the leading edge of the byte gated thereto. Flip-flop 2740 does not reset until power is removed from the system, which causes the input to NOT 2735 to return to 0 when the POWER SUPPLIES are deactivated.

For test purposes, the RESET ACTIVE signal may be manually generated. A normally open single-pole single-throw switch 2760 has one pole connected to +3.6 volts, and the other pole connected through a diode 2762 to NOT 2747. When the operator wishes to set all 0 bits in all MBS units, he manually actuates switch 2760, closing the circuit and coupling a 1 through diode 2762 to NOT 2747. This forces a 0 output which again saturates transistor 2750, causing the RESET ACTIVE signal to be generated.

The final circuit on the SED SENSE concerns the following error of the servomechanisms which drive each axis. The DISC for each axis generates a SERVO ERROR signal, in which the width of duration of the 1 signal on the SERVO ERROR line is proportional to the amount of following error, as previously described in the section on the DISC. The SERVO ERROR signal for each axis inputs on FIG. 30 to a conventional SERVO ERROR circuit 2770 for each axis. Each circuit 2770 has two time constants, which when exceeded, indicate an excess following error. The smallest time constant, when exceeded, generates a 1 on a line 2772, indicating that the square wave input to the DISC from the axis channel must reduce its rate, or the following error may reach an unrecoverable amount. The lines 2772 from each circuit 2770 are connected to an AND acting NOR 2775, whose output is the $\overline{\text{FR OVERRIDE}}$ line. When the following error exceeds a desired limit, but has not yet reached an unrecoverable condition, a 0 is placed on $\overline{\text{FR OVERRIDE}}$. In the present system, this signal is coupled to the VC and causes the potential on potentiometer 1860 to rise, see FIG. 21A, causing oscillator 1830 to oscillate at a slower rate. This in turn causes the repetition rate of the feedrate pulses F1–F14 to slow down, resulting in a slower rate of movement along each axis. This allows the following error to diminish to a value within the permissible limits of the system.

Should the amount of following error continue to increase, despite the slow down produced by generation of the FR OVERRIDE signal, the longer time constant in circuit 2770 is exceeded, generating a 1 on a line 2780. This 1 signifies that the following error has reached an unrecoverable amount and the system must be shut-down. Lines 2780 from each circuit 2770 are coupled to an AND acting NOR 2782, forcing a 0 output when the following error of any axis exceeds the maximum permissible limit.

The 0 output of NOR 2782 is coupled to a NOR 2784, the other input of which is now 0, as will appear, generating a 1 output which forms another input of NOR 2782. NOR 2784 thus forms a holding circuit to maintain a 0 output from NOR 2782 whenever an unrecoverable following error has been detected. This 0 is negated by a NOT 2786 to generate a 1 which drives a NPN transistor 2788 into saturation. The emitter electrode of transistor 2788 is directly connected to ground, and the collector electrode is connected to the $\overline{\text{SERVO ERROR}}$ line. This line in turn is connected to the STOP MACHINE relay 106 (illustrated in FIG. 29), and forms another energizing input thereto, in addition to the INHIBIT MACHINE signal from the BTC SLAVE. When transistor 2788 is driven into saturation, a 0 appears on $\overline{\text{SERVO ERROR}}$, thereby energizing the STOP MACHINE relay and shutting down NCMT–A.

In order to terminate the 0 on $\overline{\text{SERVO ERROR}}$, the operator actuates a normally open, single-pole single-throw switch 2790, which has one pole connected to +3.6 volts and the other pole connected to the other input of NOR 2784. When actuated, switch 2790 couples a 1 to NOR 2784, thereby forcing a 0 output which releases the holding circuit formed by NOR 2784. This allows the output of NOR 2782 to return to a 1, and be negated by NOT 2786 to bias off transistor 2788. Since NCMT–A has been shut-down by energization of the STOP MACHINE relay, the outputs of lines 2780 will have returned to 0, allowing the output of NOR 2782 to return to 1.

In addition to the above-described circuits, the SED SENSE and/or the other units within CONSOLE LOGIC A may contain other circuits of a conventional nature, for controlling NCMT–A. These circuits may include other types of safety circuits in addition to the circuits described above.

We claim:

1. A control system for machine apparatus, comprising:
   data processing means including input and output channel means for data, said data processing means coupling blocks of machine part instructions data to said output channel means for controlling the operation of the machine apparatus, language translator means for converting source language instructions data into blocks of machine part instructions data, and said data processing means interpreting and acting upon control instructions data including said source language instructions data for controlling the data coupled to said output channel means;
   machine control means including means connectable with said output channel means for interpreting said blocks of machine part instructions data and controlling the operation of the machine apparatus in accordance therewith and means connectable with said input channel means for generating control instructions data including source language instructions data identifying prescribed operations; and
   data link means coupled between the input and output channel means and said machine control means for transmitting instructions data in both directions between said data processing means and said machine control means to cause said machine apparatus when so enabled to immediately perform said prescribed operations.

2. The control system of claim 1 wherein said machine control means includes data display means coupled by said data link means to the output channel means of said data processing means for visually displaying data coupled to the output channel means.

3. The control system of claim 1 wherein said machine control means includes means storing information on the operating condition of the machine apparatus other than a request for a block of machine part instructions data, and
   sense means for controlling transmission by said data link means of the stored operating condition information from said storing means to the input channel means of said data processing means.

4. The control system of claim 3 wherein said data processing means includes means establishing a sequence of instructions data for controlling the operation of the machine apparatus, and
   means responsive to particular stored operating condition information transmitted to said input channel under control of said sense means for modifying the operation of said establishing means.

5. The control system of claim 4 wherein said particular stored operating condition information indicates the location of the machine apparatus after machine part instructions data has been coupled to said interpreting means.

6. The control system of claim 5 wherein said particular stored operating condition information is stored in response to the machine apparatus retracting to a location prior to the location indicated by the machine part instructions data.

7. The control system of claim 1 for a plurality of machine apparatuses, wherein said data processing means includes storage means for storing a plurality of programs each consisting of a series of source language instructions data and for storing said language translator means, means for determining when individual stored programs are to control an individual machine apparatus, execution means responsive to said determining means for causing the stored language translator means to individually convert the stored programs,
   a plurality of machine control means each corresponding with a machine apparatus, and
   means including the data link means for switching the input and output channel means of said data processing means between each of the machine control means, whereby the data processing means individually services each of said machine apparatuses with machine part instructions data corresponding to individual stored programs.

8. The control system of claim 7 wherein said switching means includes a control unit for time sharing the data processing means with each of said machine apparatuses, and
   said plurality of machine control means each includes means for storing machine part instructions data from said data processing means and for causing the machine apparatus associated therewith to be controlled by the stored machine part instructions data while said control unit is time sharing said data processing means with other machine apparatuses.

9. The control system of claim 8 wherein said control unit includes means for sequentially generating a plurality of addresses, each of said machine control means being uniquely identified by one of said addresses, said machine control means each includes means coupled to said address generating means for generating an address compared signal when an address corresponding to the unique address of that machine control means is identified, and means responsive to more than one machine control means generating said address compared signal for generating an error signal.

10. The control system of claim 9 wherein said control unit includes means responsive to said error signal for preventing said data processing means from transmitting machine part instructions data to said data link means.

11. The control system of claim 7 wherein each machine control means includes operator actuable attention means coupled via said switching means to the input channel means of said data processing means, said attention means, upon actuation by an operator, causing said data processing means to determine independent of said determining means that said data processing means is to be connected via said switching means with the machine control means corresponding to the actuated attention means in order to individually service the corresponding machine apparatus.

12. The control system of claim 1 wherein said interpreting means includes means storing machine part instructions data which forms a portion of a prescribed sequence of machine part instructions data presently controlling said machine apparatus, said generating means being actuable to generate modify control instructions data to indicate a modification to be made to said prescribed sequence of machine part instructions data, and said data processing means includes means responsive to said modify control instructions data for generating instructions data coupled via said output channel means and said data link means to said storing means to modify the machine part instructions data stored therein.

13. The control system of claim 12 wherein said storing means is responsive to said modify control instructions data to clear the machine part instructions data stored therein.

14. A control system for machine apparatus, comprising:

data processing means including input and output channel means for data, said data processing means coupling blocks of machine part instructions data to said output channel means for controlling the operation of the machine apparatus, language translator means for converting source language instructions data into blocks of machine part instructions data, and said data processing means interpreting and acting upon control instructions data including said source language instructions data for controlling the data coupled to said output channel means;

machine control means including storing means connectable with said output channel means for storing said blocks of machine part instructions data and controlling means for controlling the operation of the machine apparatus in accordance with the blocks of data stored in said storing means and manual selection means connectable with said input channel means and actuable by an operator for generating source language instructions data; data link means coupled between the input and output channel means and said machine control means for transmitting instructions data in both directions between said data processing means and said machine control means, said data link means coupling said manual selection means via the input channel means to the language translator means to control the blocks of machine part instructions data next coupled to said output channel means by said data processing means.

15. The control system of claim 14 wherein said data processing means includes storage means for storing instructions data for machining a part on the machine apparatus, and means for entering into said storage means instructions data corresponding to the blocks of machine part instructions data coupled to said output channel means as a result of actuation of said manual selection means.

16. The control system of claim 14 wherein said data processing means includes program means for establishing a series of individual machine part instructions data blocks which are to be performed in a given sequential order by said machine apparatus, means for coupling in said sequential order each part instructions data block from said program means to said output channel means for transmission by said data link means to said storing means, said manual selection means includes means for generating identifying control instructions data which identifies a part instructions data block other than the next sequential part instructions data block which said coupling means would otherwise couple from the program means to said output channel means, said data processing means further includes means responsive to said identifying control instruction data for generating a machine part instructions data block to control movement of said machine apparatus to a location where the identified part instructions data block is to start controlling the machine apparatus, means connecting said generated machine part instructions data block to said coupling means, and search means for thereafter coupling the identified part instructions data block from said program means to said coupling means in order to continue the program from the identified part instructions data block.

17. The control system of claim 16 wherein said data processing means includes means responsive to said identifying control instructions data for generating a clear instructions data, and means coupling said clear instructions data via said data link means to said storing means to clear said individual part instructions data block stored therein prior to connecting said generated part instructions data block to said coupling means.

18. The control system of claim 14 wherein said data processing means includes storage means for storing a series of machine part instructions data blocks which are to be performed and for storing a given sequential order for performing said blocks by the machine apparatus, means for coupling in said sequential order each part instructions data block from said storage means and via said output channel means and data link means to said storing means for control of said machine apparatus, and means responsive to generated source language instructions data from said manual selection means for modifying said series of part instructions data blocks while said machine apparatus is being controlled thereby.

19. The control system of claim 18 wherein said modifying means deletes one of said series of part instructions data blocks in response to delete source language instructions data from said manual selection means.

20. The control system of claim 18 wherein said modifying means adds a new part instructions data block after an intermediate one of said series of part instructions data blocks in response to add source language instructions data from said manual selection means.

21. The control system of claim 20 including means for selecting whether the next part instructions data block after a modified part instructions data block is to be coupled by said coupling means from said storage means or from said modifying means in response to add source language instructions data.

22. The control system of claim 18 wherein said data processing means includes a new program memory means for recording part instructions data blocks coupled to said storing means, said modifying means shunting a portion of said series of part instructions data blocks from said storage means to said new program memory means and blocking said portion of part instructions data blocks from being coupled to said storing means in response to proceed without motion source language instructions data from said manual selection means.

23. A control system for machine apparatus, comprising:

data processing means including input and output channel means for data, said data processing means includes coupling means for coupling blocks of machine part instructions data to said output channel means for controlling the operation of the machine apparatus and processing means for interpreting control instructions data to control the data coupled to said output channel means;

machine control means including means connectable with said output channel means for interpreting said blocks of machine part instructions data and controlling the operation of the machine apparatus in accordance therewith and means connectable with said input channel means for generating control instructions data;

data link means coupled between the input and output channel means and said machine control means for transmitting instructions data in both directions between said data processing means and said machine control means;

data display means coupled by said data link means to the output channel means of said data processing means for visually displaying data coupled to the output channel means;

said data processing means includes message means for generating information related to but different than machine part instructions data, said coupling means and said data link means transmits to said data display means said information from said message means prior to the interpreting means controlling the machine apparatus in accordance with the related machine part instructions data; and means actuable by an operator upon approval of the visually displayed information for causing said interpreting means to control the operation of the machine apparatus in accordance with the machine part instructions data related thereto.

24. The control system of claim 23 wherein said data processing means includes language translator means for converting source language instructions data into blocks of machine part instructions data, said control instructions generating means include manual selection means actuable by an operator for generating source language instructions data coupled by the data link means to the input channel means to control assembly of part instructions data which is to be performed by the machine apparatus, said message means generating information related to but different than assembled part instructions data, and said means actuable by the operator upon approval of the visually displayed information causes the assembled part instructions data to be interpreted by said interpreting means to immediately control the operation of the machine apparatus.

25. A control system for machine apparatus, comprising:

data processing means including input and output channel means for data, said data processing means generating part instructions data coupled to said output channel means for controlling the operation of the machine apparatus, and said data processing means interpreting and acting upon control instructions data for controlling the data coupled to said output channel means;

machine control means including means connectable with said output channel means for interpreting said part instructions data and controlling the operation of the machine apparatus in accordance therewith and means connectable with said input channel means for generating control instructions data; and data link means coupled between the input and output channel means and said machine control means for transmitting instructions data in both directions between said data processing means and said machine control means, said data link means includes data transfer control means for controlling transfer of data to and from said data processing means and machine transfer control means for controlling transfer of data to and from said machine control means, each transfer control means having circuits for receiving instructions data from the data link means and circuits for transmitting instructions data to the data link means and each transfer control means having means establishing which of said circuits is active to control the operation of the transfer control means, said data respective transfer control means having its receiving circuits connected to said input channel means and its transmitting circuits connected to said output channel means, said machine transfer control means having its receiving circuits connected to said interpreting means and its transmitting circuits connected to said generating means, means for causing the establishing means in one of said transfer control means to activate one of said circuits therein, and means intercoupling said establishing means and responsive to activation of one of said circuits in said one transfer control means to cause the establishing means in the other of said transfer control means to activate the opposite of said circuits therein, thereby transferring instructions data over said data link means.

26. The control system of claim 25 wherein the transmitting circuits in each of said transfer control means generates a transmit control signal coupled to said data link means to indicate that the instructions data then on the data link means should be accepted, the receiving circuits in each of said transfer control means includes means responsive to receipt of the transmit control signal to gate the data link means to the means connected with said receiving circuits and to generate a receive control signal coupled to said data link means to indicate that the instructions data has been accepted, the transmitting circuits in each of said transfer control means further includes means responsive to receipt of the receive control signal to gate the next instructions data to said data link means and generate the next transmit control signal.

27. The control circuit of claim 25 wherein one of said transfer control means includes override means forcing its establishing means to activate a particular one of said circuits when the other of said circuits has been activated and the establishing means in the other of said transfer control means activates circuits opposite to the circuits which are activated, whereby instructions data transmitted in one of said directions over said data link means has priority over instructions data transmitted in the opposite direction over said data link means.

28. A control system for controlling movement of a machine tool, comprising:

data processing means generating part instructions data for controlling the operation of the machine tool, including feedrate information for controlling the rate of movement of the machine tool; and machine tool control means including means coupled to said data processing means for interpreting said part instructions data and controlling the operation of the machine tool in accordance therewith and feedrate override means manually actuable by an operator for overriding the feedrate information on the part instructions data coupled to the interpreting means to change the instructed rate of movement of the machine tool, without changing the part instructions data from said processing means, wherein the part instructions data includes prevent override information in addition to said feedrate information when an operator is to be prevented from overriding the feedrate information, and said machine tool control means includes means responsive to the prevent override information for disabling the feedrate override means.

29. The control system of claim 28 wherein said interpreting means includes an oscillator and pulse generating means having a generated pulse output with a repetition rate controlled by the frequency of said oscillator, said generated pulse output being coupled to a multistage counter, each stage of said counter generating a counter pulse, storage and interpolating means having a storage section for storing said feedrate information and having an interconnecting section with a plurality of inputs coupled to each stage of the counter and a common feedrate output, said interconnecting section being responsive to the stored feedrate information in said storage section for passing counter pulses to said common feedrate output to control the rate of movement of the machine tool, said feedrate override means varying the frequency of said oscillator, a clock having a fixed reference phase, and means synchronizing the generated pulse output to said fixed reference phase of said clock, whereby the rate of movement of the machine tool is synchronized with respect to said clock whether the rate is controlled by said feedrate information or by said feedrate override means.

30. A control system for controlling movement of a machine tool, comprising:

data processing means generating part instructions data for controlling the operation of the machine tool, including feedrate information for controlling the rate of movement of the machine tool; and machine tool control means including means coupled to said data processing means for interpreting said part instructions data and controlling the operation of the machine tool in accordance therewith and feedrate override means manually actuable by an operator for overriding the feedrate information on the part instructions data coupled to the interpreting means to change the instructed rate of movement of the machine tool, without changing the part instructions data from said data processing means, means for determining when the following error of the machine tool exceeds a predetermined value and means for generating a signal in response to the determination, and means responsive to said signal for actuating said feedrate override means to reduce the rate of movement of the machine tool.

31. A control system for a plural axes machine tool, comprising:

means for supplying part instructions data for moving the machine tool along a plural axes path; and machine tool control means including means coupled to said supplying means for interpreting said part instructions data and controlling the operation of the machine tool in accordance therewith to move said machine tool along said plural axes path, and means responsive to information in the part instructions data for retracting the machine tool along the same plural axes path which the machine tool followed under control of the part instructions data.

32. The control system of claim 31 wherein said supplying means supplies a series of individual part instructions data blocks, each individual block moving the machine tool along a plural axes path, and said retracting means moves the machine tool to the start of the path defined by the individual block controlling movement of the machine tool when the retract occurs.

33. The control system of claim 32 wherein said interpreting means includes a counter stepped through a plurality of states representing numbers, interpolating means responsive to the individual block and the states of the counter for moving the machine tool along said plural axes path, means for selecting a retract operation, said retracting means includes means responsive to said selecting means for stopping said counter in its instant state, means for changing the state of said counter to represent a number complementary to the number represented by its instant state, means coupled to said interpolating means for directing movement in an opposite direction along each of the plural axes, and means effective after operation of said changing means for starting said counter to cause the counter to step through the same number of states which had occurred up to the time of stopping of the counter.

34. The control system of claim 31 wherein said supplying means supplies in a given sequential order a series of individual part instructions data blocks, each individual block moving the machine tool along a plural axes path, means actuable by an operator for indicating that the machine tool is to retract along the plural axes path followed since a selected prior individual block, and said retracting means moves the machine tool in an opposite direction along the plural axes path defined by each prior individual block to the start of the path defined by the selected prior individual block.

35. A control system for a machine tool, comprising:

computer means for storing a plurality of part programs each consisting of a series of instructions including axes data for controlling movement along the axes of the machine tool and miscellaneous data for controlling machine tool functions other than axes movement, and a control program shared in common with the plurality of stored part programs and selectable to modify at least the machine tool movement produced by the axes data forming the stored part programs;

machine control means including movement means responsive to said axes data for controlling the machine tool movement and means responsive to the miscellaneous data for controlling the other functions of the machine tool;

machine logic means for maintaining continuous data coupling with the machine control means; and a control unit for establishing and directing the flow of data between the computer means and the machine logic means to directly control the machine toll by the computer means, including operator selectable means for concurrently selecting one of said part programs and said control program to cause said control program to modify at least the stored axes data of the selected one part program, whereby said machine control means produces a machine tool movement modified from the movement defined by the stored part program.

36. The control system of claim 35 for a plurality of machine tools each directly controllable by two or more of said plurality of stored part programs, including machine control means for each of said plurality of machine tools and an associated machine logic means for maintaining continuous data coupling with its associated machine control means, and machine logic means includes means for storing said axes data and said miscellaneous data to uninterruptedly control the machine control means associated therewith while said control unit is establishing and directly the flow of data between the computer means and a different machine logic means, said control unit includes operator selectable means for each of said machine tools to cause said computer means to share said control program in common with each of the plurality of machine tools.

37. A remote control system for a plurality of digital controlled, plural axes machine apparatuses located in an electrically noisy environment, comprising:

binary processing means located remote from the apparatuses and the electrically noisy environment for generating a plurality of sequences of binary signals, each of the sequences forming a program to control the operation of one of the digital controlled apparatuses, said binary signals being subject to interference by electrical noise;

a plurality of machine apparatus control means each associated with one of said plurality of machine apparatuses, each control means including first means located remote from the associated machine apparatus for converting said binary signals into a plurality of noise immune signals comprising an analog phase shifted signal for each axis of the associated machine apparatus, and second means located adjacent the associated machine apparatus for receiving the noise immune phase shifted signals from the associated first means and controlling the operation of the plural axes in accordance therewith; and time share means for connecting said binary processing means to each of said plurality of machine apparatus control means for simultaneously controlling each of said plurality of machine apparatuses by the program for that machine apparatus.

38. The remote control system of claim 37 wherein each of said first means stores at least a portion of said binary signals in a plurality of separate memories each individually gatable to couple the signals stored therein to a data link coupled to the associated second means, transmit control means for sequentially gating each of said memories, each of said second means includes a plurality of storage means for directly controlling the associated machine apparatus in accordance with signals stored therein, and receive control means operating in synchronism with said transmit control means for sequentially gating the signals on said data link to each of said storage means.

39. A control system for machine apparatus, comprising:

program means for establishing a series of individual part instruction blocks which are to be performed in a given sequential order by the machine apparatus;

machine control means for controlling the operation of the machine apparatus in response to a part instruction block coupled thereto;

means for coupling in said sequential order each part instruction block from said program means to said machine control means;

means to select a part instruction block other than the next sequential part instruction block which said coupling means would otherwise couple from the program means to said machine control means;

means for automatically moving said machine apparatus to the location where the selected part instruction block is to start controlling the machine apparatus; and means to couple the selected part instruction block from said program means to said coupling means in order to continue the program from the selected part instruction block.

40. The control system of claim 39 wherein each of said individual part instruction blocks includes data identifying the absolute position of the machine apparatus when controlled by that block, said moving means includes first means responsive to the part instruction blocks for storing the absolute position data of the machine apparatus at its instant location and second means responsive to the selected part instruction block for storing the absolute position data of the machine apparatus at the location where the selected part instruction is to start, compare means for subtracting the absolute position data stored in said first and second means to determine a difference amount, and means responsive to said difference amount for generating a part instruction block coupled to said machine control means to produce a corresponding amount of movement.

41. The control system of claim 39 wherein said machine control means includes means for storing individual part instruction blocks to control the operation of the machine apparatus, means responsive to said selected part instruction block to generate a clear signal, and said coupling means includes means coupling said clear signal to said storing means for clearing the individual part instruction block prior to said moving means causing said machine apparatus to move to the location where the selected part instruction block is to start controlling the machine apparatus.

42. A control system for machine apparatus, comprising:

means storing a machine part instruction block for controlling the operation of the machine apparatus, said block including a plurality of data bits which collectively control at least a portion of the operation of the machine apparatus;

machine control means responsive to said plurality of data bits for controlling said portion of the operation of the machine apparatus;

link means coupled between said storing means and said machine control means and including control lines and a plurality of data lines less than said plurality of bits, at least one of said data lines being utilized to transmit data in both directions;

means for transmitting data over said at least one data line from the location of said machine control means to a remote location; and transfer control means for transmitting said plurality of bits from said storing means to said machine control means, including first means associated with said storing means for gating a portion of said plurality of bits to said data lines and for generating a signal coupled to said control lines to indicate that the machine control means should accept the bits then on the data lines, second means associated with said machine control means and responsive to receipt of said accept signal on said control lines for coupling the data lines to the machine control means and for generating a signal coupled to the control lines to indicate completion of the receive operation, said first means being responsive to receipt of said completion signal on said control lines for actuating the transfer control means in order to gate the next portion of said plurality of bits to said data lines.

43. The control system of claim 42 wherein said storing means includes a plurality of separately gatable memories less than the plurality of data bits, said memories storing said plurality of data bits therein, each memory including output gate means actuable to couple the bits stored therein to said data lines, said first means includes a counter having a plurality of separate output lines, each output line being coupled to the output gate means of a different one of said memories, means for stepping said counter to sequentially actuate each of the output gate means, each stepping of said counter generating said accept signal, said machine control means includes a plurality of separately gatable memories corresponding to the memories in said storing means and having outputs controlling said portion of the operation of the machine apparatus, each memory including input gate means actuable to couple the memory to the data lines, and said second means includes a counter having a plurality of separate output lines, each output line being coupled to the input gate means of a different one of said memories, said counter being stepped in response to said accept signal on said control lines to sequentially actuate each of the input gate means, each step generating said completion signal.

44. A counter, comprising:

a plurality of stages, only one of which generates an output pulse at a time, each stage including a bistable unit having first and second states;

a clock for generating a series of sequentially occurring clock pulses;

first means connecting said bistable units in circuit with said clock for causing only one bistable unit to change from its first to its second state for each of said clock pulses, the bistable unit which changes from its first to its second state corresponding to the stage of the counter which is to generate said output pulse; and second means connecting said bistable units in circuit with said clock for causing each stage to generate its output pulse before the bistable unit in that stage changes from its first to its second state.

45. The counter of claim 44 including synchronous means connecting said bistable units in circuit with said clock to cause said output pulses to be generated at a fixed phase relationship with respect to said clock pulses.

46. The counter of claim 44 wherein said second means includes gate means associated with each stage, each of said gate means having an input from the bistable unit associated with that stage and an input from the gate means from the preceding stage, each gate means having an output only when its associated bistable unit and all preceding bistable units are in their second state, and compare means associated with each stage, each compare means having an input from the bistable unit associated with that stage, an input from the gate means associated with the preceding stage, and an input from said clock, said compare means being actuated when the associated bistable unit is in its first state and said gate means associated with the preceding stage and said clock have outputs to generate said output pulse.

47. The counter of claim 44 including complement means for generating after actuation the same number of said output pulses as occurred from the time all of said bistable units were in their first state to the time of actuation, said complement means includes means responsive to actuation for disconnecting said clock from said first and second means, means for changing each of said bistable units to its opposite state in order to complement the state of the counter, and means for connecting said clock to said first and second means to cause said bistable units to change states until all bistable units are in said second state.

48. The counter of claim 47 in a control system for a plural axes machine tool, including means responsive to said output pulses for moving said machine tool along a plural axes path, and retract means for retracting the machine tool to the start of said path, including means responsive when said retract is to occur for actuating said complement means, and means to cause movement in an opposite direction along each of the plural axes when said connecting means connects said clock to said first and second means.

49. A control system for a machine tool, comprising:
machine tool control means including logic means for interpreting individual part instructions forming a single program to control the operation of the machine tool, data request means operative during the time said machine tool is being controlled by said single program for generating a data request signal in response to utilization of an individual part instruction by said logic means, sense means operative during the time said machine tool is being controlled by said single program for generating a sense signal in response to a condition other than utilization of said individual part instruction by said logic means;

data processing means coupled to said machine tool control means and including part program means for supplying individual part instructions in a predetermined sequence defining said single program, request program means responsive to said request signal for coupling from said part program means to said logic means the next individual part instruction in said predetermined sequence, and sense program means responsive to said sense signal for coupling to said logic means an individual part instruction different than said next individual part instruction in said predetermined sequence.

50. The control system of claim 49 wherein said part program means includes means for identifying each individual part instruction by a unique sequence number, said sense means includes supply means for supplying a desired sequence number and generate means responsive to the supplying of said desired sequence number to generate said sense signal which identifies said desired sequence number, and said sense program means being responsive to said desired sequence number for searching the identifying means and coupling to said logic means the individual part instruction in said part program means which is identified by said desired sequence number.

51. The control system of claim 50 wherein said sense program means includes means for generating an initial individual part instruction to control movement of the machine tool to the location where the desired individual part instruction is to start controlling the machine tool and means for initially coupling said initial individual part instruction and thereafter coupling said desired individual part instruction to said logic means.

52. The control system of claim 51 wherein said sense program means includes means to compare said location with prerecorded position limits for said machine tool to generate an error signal when the position limits are exceeded.

53. The control system of claim 49 wherein said sense means includes register means for indicating the present position of said machine tool, said sense signal comprises a sense word indicating said present position in said register means, and said sense program means being responsive to different indicated positions in said sense word to couple different individual part instructions to said logic means.

54. The control system of claim 53 wherein said register means includes retract stop means to indicate that the logic means is stopped at the beginning of an individual part instruction.

55. The control system of claim 53 wherein said register means includes program stop means to indicate that the logic means is stopped at the end of an individual part instruction.

56. A control system for machine apparatus, comprising:
machine control means including logic means having storage means for storing individual part instructions forming a single program and interpreting means responsive to stored instructions for controlling the operation of said machine apparatus, and command means coupled to said logic means for decoding a command instruction to alter the operation produced by said logic means;

data processing means coupled to said machine control means and including program means for transmitting to said logic means a specific individual part instruction in said single program which identifies a specific operation to be produced by said machine apparatus, means operative during the time said machine apparatus is being controlled by said single program and responsive to a condition for determining that an operation different than said specific operation should be produced by said machine apparatus, and modifying means actuated by said determining means and operative during the time said machine apparatus is being controlled by said single program for generating said command instruction to effectively alter said single program.

57. The control system of claim 56 wherein said determining means is effective after said specific individual part instruction has been transmitted to said logic means to actuate said modifying means, whereby said command means alters the operation produced by said logic means after storage of said specific individual part instruction.

58. The control system of claim 57 wherein said determining means actuates said modifying means to generate a clear command instruction when an individual part instruction different than said specific individual part instruction should control the operation of said machine apparatus, and said command means decodes said clear command instruction to erase said specific individual part instruction stored in said storage means.

59. The control system of claim 58 wherein said determining means includes search means effective after generation of said clear command instruction for transmitting to said storage means said different individual part instruction.

60. The control system of claim 58 wherein said storage means includes active storage means for storing the individual part instruction presently controlling the operation of the machine apparatus and buffer storage means for storing the individual part instruction next transferred to the active storage means, said modifying means generates a clear active command instruction and a clear buffer command instruction, and said command means decodes said clear active and clear buffer command instructions to clear the active storage means and the buffer storage means, respectively.

61. The control system of claim 56 wherein said machine control means includes data request means for generating a data request signal in response to utilization of an individual part instruction by said logic means and sense means for generating a sense signal in response to a condition other than utilization of said individual part instruction by said logic means, and said determining means being responsive to said sense signal for actuating said modifying means to cause generation of said command instruction.

62. The control system of claim 56 wherein said interpreting means comprises interpolator means for generating machine control pulses controlled by the storage means, and said command means decodes a stop command instruction to terminate the operation of said interpolator means.

63. An on-line control system for a machine tool, comprising:
machine tool control means for interpreting blocks of machine part instructions to control the operation of the machine tool;
data link means for transmitting instructions;
data processing means coupled by said data link means to said machine tool control means and including
part program storage means for storing a plurality of individually identifiable part programs each comprising a sequence of source language statements in which at least some of said statements represent more than one block of machine part instructions,
language translator means having a translator input, a translator output, and translation means for converting source language statements supplied to said translator input into blocks of machine part instructions supplied to said translator output;
data entry means adjacent said machine tool and coupled to said data processing means by said data link means for generating instructions identifying that one of said stored part programs is to control said machine tool;
said data processing means further includes
monitor means responsive to said data entry means for coupling the source language statements forming said one part program to said translator input and for coupling the translator output to said data link means.

64. The control system of claim 63 wherein said data processing means includes file means for storing all blocks of machine part instructions representing the total sequence of source language statements comprising a part program, said monitor means includes output means coupling said file means between said translator output and said data link means, run means for coupling the total sequence of source language statements which forms said one part program to said translator input, and save means for causing the total sequence of source language statements coupled to said translator input to be retained as source language statements.

65. The control system of claim 64 wherein said output means includes buffer storage means for storing a plurality of blocks of machine part instructions sufficient to allow a plurality of individual transmissions to said machine tool control means, and buffer fill means for automatically refilling said buffer storage means with blocks of machine part instructions from said file means in response to a predetermined depletion condition in said buffer storage means.

66. The control system of claim 63 wherein said data processing means includes file means for storing blocks of machine part instructions, said monitor means includes output means coupling said file means between said translator output and said data link means, actuable conversational means to couple to said translator input sequences of source language statements less than the total sequence of source language statements which form said one part program, and said data entry means includes proceed means for repeatedly actuating said conversation means to thereby translate the total sequence of source language statements.

67. The control system of claim 66 including communications terminal means manually actuable to generate source language statements, and alternate input means for coupling said communications terminal means to said translator input in order to insert new machine part instructions in said one part program controlling the operation of said machine tool.

68. The control system of claim 63 wherein said data processing means includes save means for storing source language statements, and reprogramming means operative after said monitor means has coupled source language statements to said translator input for adding or deleting said last named source language statements to said save means.

69. A control system for a plurality of machine tools, comprising:
a plurality of machine tool control means each associated with one of said plurality of machine tools, each machine tool control means including logic means for interpreting instructions to control the operation of the associated machine tool and data request means for generating a request signal in response to utilization of an instruction by said logic means;
equipment other than machine tools for performing support operations for the control system;
equipment control means including request means for generating a request signal when a support operation is to be performed;
data processing means coupled to said machine tool control means and said equipment control means and including
program means for supplying instructions for said machine tool control means and support operations for said equipment control means,
interrupt storage means for storing interrupts,
interrupt posting means for posting first type interrupts in said interrupt storage means in response to receipt of request signals from said machine tool control means and for posting second type interrupts in said interrupt storage means in response to receipt of request signals from said equipment control means,
supervisor means for individually processing posted interrupts stored in said interrupt storage means in order to cause said program means to service the requests which caused the posted interrupts, and
routine means responsive to the posting of a first type interrupt in said interrupt storage means for causing said supervisor means to terminate the processing of a second type interrupt and immediately process the first type interrupt.

70. The control system of claim 69 wherein said routine means includes queue means for reposting in the interrupt storage means the terminated second type interrupt and save means for causing the supervisor means to continue after processing of the first type interrupt with processing of the terminated second type interrupt from the point of termination.

71. The control system of claim 70 wherein said supervisor means includes priority means for processing pending first type interrupts stored in said interrupt storage means prior to pending second type interrupts including said terminated second type interrupt.

72. An on-line control system for a machine tool, comprising:

machine tool control means for interpreting blocks of machine part instructions to control the operation of the machine tool;

data link means for transmitting instructions;

data processing means coupled by said data link means with said machine tool control means and including program storage means for storing a series of blocks of machine part instructions which are to control a programmed operation of the machine tool, including means establishing unique sequence representations for identifying at least some of said series of blocks, means for coupling each block of machine part instructions from said program storage means to the data link means; and reprogramming means coupled by said data link means with said data processing means and manually actuable while the machine tool is being controlled by said series of blocks of machine part instructions for selecting at least one block of machine part instructions identified by one of said unique sequence representations and modifying at least said selected one block to replace the stored programmed operation with an operation produced by the modified block when coupled to said machine tool control means.

73. The control system of claim 72 wherein said reprogramming means includes add means for creating a block of machine part instructions which is to control the operation of the machine tool after occurrence of one of said series of blocks, and said coupling means is responsive to said add means to insert the created block of machine part instructions after said one block of machine part instructions.

74. The control system of claim 73 wherein said reprogramming means includes data display means for visually displaying data and unique sequence representations, said data processing means includes message means for generating both instructions data concerning the operation of said add means and unique sequence representations concerning identification of blocks being coupled from said data processing means, and conversational means for coupling said message means via said data link means with said data display means.

75. A control system for a machine tool, comprising:

machine tool control means for interpreting blocks of machine part instructions to control the operation of the machine tool;

communications means including data display means for visually displaying data to an operator and data entry means for allowing the operator to manually generate messages;

data processing means coupled with said machine tool control means and said communications means and including program means for storing a sequence of blocks of machine part instructions defining a program, processor means for processing the stored blocks to control transmission of blocks to the machine tool control means and to control storage of blocks in the program means to allow future use of the program, instruction routine means effective during processing of the program for generating instructions data coupled to said data display means to visually display an instruction requiring the operator to manually generate a response message before allowing further processing by said processor means, and analysis routine means responsive to the response message for controlling the processor means and thereafter causing continuation of the program.

76. The control system of claim 75 wherein said program means includes temporary storage means for temporarily storing blocks of machine part instructions and permanent storage means for permanently storing blocks of machine part instructions, said processor means placing blocks of transmitted machine part instructions in said temporary storage means during performance of a program, and said analysis routine means being responsive to a save response message for transferring the contents of said temporary storage means to said permanent storage means.

77. The control system of claim 75 wherein said analysis routine means is responsive to the response message for controlling whether the next block transmitted to the machine tool control means is to be supplied by the program means or the data entry means.

78. The control system of claim 75 wherein said data entry means manually generates a proceed response message including a sequence number defining a specified block of machine part instructions stored in said program means, and said analysis routine means is responsive to the proceed response message to cause said processor means to uninterruptedly transmit to said machine tool control means the sequence of blocks prior to said sequence number.

79. The control system of claim 75 wherein said program means includes existing program storage means for storing said sequence of blocks defining said program and new program storage means for storing blocks from said processor means, and said analysis routine means being responsive to a copy response message for causing said processor means to transfer blocks stored in said existing program storage means to said new program storage means.

80. A control system for a multi-axis machine tool, comprising:

storage means for storing instructions defining operations for the machine tool including movements along the axes of the machine tool and functions other than axes movement, including record storage means for storing a series of instructions defining a reusable stored program capable of controlling the machine tool, temporary storage means for storing a series of instructions defining a corrected program formed by at least some instructions from said stored program and new instructions;

control means for coupling instructions from said record storage means to said machine tool to control movements along the axes of the machine tool and functions other than axes movement, including stop means operative to cause the machine tool to be stopped at least at intermediate points in said stored program;

console means located adjacent the machine tool to allow an operator to observe the machine tool while being controlled by said stored program in order to determine corrections which might be necessary, including add means manually actuable by the operator for creating said new instructions defining operations to be performed at said intermediate points;

correction reprogramming means for selectively transmitting instructions to said temporary storage means from said record storage means and said add means in order to create said corrected program; and means for transferring the instructions in said temporary storage means to said record storage means to create a corrected stored program.

81. The control system of claim 80 wherein said console means includes delete means manually actuable by the operator for deleting selected instructions from said stored program, and said reprogramming means is responsive to said delete means to block transmission of said selected instructions from said record storage means to said temporary storage means.

82. The control system of claim 80 wherein said console means includes proceed means manually actuable by the operator for indicating that the machine tool should be controlled uninterruptedly by instructions in the stored program through a selected point in the stored program, and said reprogramming means is responsive to said proceed means for transmitting uninterrupted to said temporary storage means the instructions from said record storage means through said selected point.

83. The control system of claim 82 wherein said control means is responsive to said proceed means for uninterruptedly coupling instructions to said machine tool from said record storage means to control movements and functions at the same time the instructions are being stored in said temporary storage means.

84. The control system of claim 80 wherein the series of instructions are grouped in blocks, said stop means being operative to cause block-by-block operation of the machine tool wherein the machine tool stops after transmission of a block from said record storage means to said machine tool, and said console means includes start means manually actuable by the operator for causing the next block from said record storage means to be transmitted by said control means to said machine tool.

85. The control system of claim 80 including data display means located adjacent the machine tool and the console means for visually displaying data, message means for generating data concerning instructions from said record storage means and said add means, and conversational means for coupling said message means to said data display means to display data for observation by the operator before said reprogramming means is enabled by said conversational means to selectively transmit the instructions corresponding to the displayed data to said temporary storage means.

86. The control system of claim 85 wherein said console means includes approval means manually actuable by the operator after observing and approving of the data displayed on said data display means for actuating said conversational means which enables said reprogramming means to cause the instruction corresponding to the displayed data to be transmitted to said temporary storage means.

87. The control system of claim 86 wherein said storage means includes work area means for temporarily storing instructions prior to storage in said temporary storage means, said console means includes delete means manually actuable by the operator after observing and disapproving of the data displayed on said data display means for causing said conversational means to effectively block the reprogramming means from transmitting to said temporary storage means the instruction in said work area means corresponding to the displayed data, and said reprogramming means being responsive to actuation of said approval means for transmitting the instruction from said work area means to said temporary storage means.

88. The control system of claim 85 wherein said message means includes means for determining the absolute position of the machine tool along each of said axes after execution of the instruction from said record storage means or said add means, and said conversational means transmits the determined absolute position to said data display means.

89. The control system of claim 80 including language translator means for converting source language instructions into blocks of machine part instructions, said record storage means stores a series of source language instructions defining said stored program, said control means couples said language translator means between said record storage means and said machine tool, said add means being manually actuable by the operator for creating said new instructions in the form of source language instructions, conversational means for coupling said add means to said language translator means, and said reprogramming means transmits only source language instructions or blocks of machine part instructions to said temporary storage means to create said corrected program.

90. A control system for a multi-axis machine tool, comprising:

program storage means for storing a series of instructions identified by unique sequence numbers, at least some of said instructions including machine data for defining movements along the axes of the machine tool and miscellaneous data for defining functions other than axes movement;

control means for coupling each instruction from said program means to said machine tool to control the operation of the machine tool;

sequence number display means for visually displaying the sequence number of the instructions coupled to said control means;

message display means for visually displaying messages;

desired sequence number means manually actuable by an operator for selecting a desired sequence number other than the next sequence number which would otherwise be displayed on said sequence number display means;

switch means manually actuable by an operator for initiating a search operation;

sequence search means responsive to actuation of said switch means for searching said program means to locate the instruction identified by the selected desired sequence number;

accumulating search means for accumulating data from the stored instructions located between the present instruction coupled to the control means and the located instruction in order to allow the machine tool to continue to operate from the located instruction;

message generating means coupled to said message display means for generating a message concerning the operation of said search means; and coupling means for coupling the located instruction from said program means to said control means in order to continue the program from the located instruction.

91. The control system of claim 90 including limit means for establishing predetermined limits which the accumulated data should not exceed, and compare means for comparing the accumulated data with the predetermined limits to determine when the predetermined limits are exceeded.

92. The control system of claim 91 wherein said message generating means is responsive to said compare means to generate an error message when the predetermined limits are exceeded, said coupling means being inoperative in response to generation of the error message.

93. The control system of claim 90 including determining means responsive to said sequence search means for determining that the instruction identified by the selected desired sequence number was not located, said message generating means being responsive to said determining means to generate an error message, said coupling means being inoperative in response to generation of the error message.

94. The control system of claim 90 including completion means for determining that the sequence search means located the instruction identified by the selected desired sequence number and that the accumulating search means completed accumulating data, said message generating means being responsive to said completion means for generating an operator message which requires an operator response before said coupling means is enabled.

95. The control system of claim 94 wherein said message generating means is responsive to said completion means to generate a start message, and start means manually actuable by the operator after observing the start message on said message display means for enabling said coupling means in order to continue the program from the located instruction.

* * * * *

Disclaimer 3,668,653.—*Donald G. Fair*, Belvidere. Ill.; *Harold L. Baeverstad*, and *William G. Fisher*, Rockford, Ill. CONTROL SYSTEM. Patent dated June 6, 1972. Disclaimer filed June 1, 1976, by the assignee, *Sundstrand Corporation*.

Hereby enters this disclaimer to claims 28–30 of said patent.

[*Official Gazette December 7, 1976.*]